US012748842B2

(12) United States Patent
Thompson et al.

(10) Patent No.: US 12,748,842 B2
(45) Date of Patent: Sep. 29, 2026

(54) SYSTEMS AND METHODS FOR CAPTURING AND PRESERVING CYBER RESILIENCE PERFORMANCE PRIMITIVES

(71) Applicant: AS0001, Inc., Carmel, IN (US)

(72) Inventors: Jonathan J. Thompson, Carmel, IN (US); Simon Mullaney, Dublin (IE)

(73) Assignee: AS0001, Inc., Carmel, IN (US)

( * ) Notice: Subject to any disclaimer, the term of this patent is extended or adjusted under 35 U.S.C. 154(b) by 0 days.

(21) Appl. No.: 19/041,985

(22) Filed: Jan. 30, 2025

(65) Prior Publication Data

US 2026/0220260 A1 Jul. 30, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS

2012/0303355 A1* 11/2012 Liu ...................... G06F 40/126 704/9
2013/0232245 A1* 9/2013 Antosz ..................... G06F 8/30 709/222
2020/0327225 A1* 10/2020 Nguyen .................. G06N 3/08
2025/0063054 A1 2/2025 Vipat et al.
2025/0265365 A1 8/2025 Ramesh et al.
2026/0019380 A1 1/2026 Bhat et al.

* cited by examiner

*Primary Examiner* — Vance M Little
(74) *Attorney, Agent, or Firm* — Foley & Lardner LLP

(57) ABSTRACT

Systems, methods, and computer-readable media for modeling cyber resilience data are disclosed. A system can include one or more processing circuits configured to receive a request to re-model one or more safeguards of at least one entity including modeling parameters and a temporal interval. The processing circuits can identify one or more tokens including the safeguards and one or more proofs of the entity at the temporal interval. The processing circuits can generate at least one re-modeled output at the temporal interval based at least on re-modeling the one or more tokens. The re-modeled output can include an update to at least one of (i) a safeguard status or (ii) a resilience score. The processing circuits can generate at least one new token including the re-modeled output, the safeguards, and the proofs and record the new token in a token storage.

20 Claims, 31 Drawing Sheets

SYSTEMS AND METHODS FOR CAPTURING AND PRESERVING CYBER RESILIENCE PERFORMANCE PRIMITIVES

BACKGROUND

The present implementations relates generally to computer security architecture and software for information security and cybersecurity. In a computer networked environment, entities can have safeguards or configurations for cybersecurity, and/or the entities or third parties can desire to model or evaluate the safeguards or configurations.

SUMMARY

Some implementations of the present disclosure relate to systems and methods for capturing and preserving cyber resilience performance primitives in tokens with retroactive pivoting to third-party requirement tokens and scoring methodologies. Systems and methods are disclosed that improve cybersecurity assessments by utilizing tokenized primitives configured to retain immutable data points and support dynamic analyses across various scoring frameworks. Systems and methods are disclosed that include mechanisms for capturing primitives, tokenizing the primitives into immutable data tokens, and/or allowing retroactive application of third-party scoring models to analyze historical data. For example, systems and methods in accordance with the present disclosure can tokenize data such as cybersecurity configurations, incident data, and/or safeguards, preserving these primitives for subsequent processing by third-party scoring systems. Additionally, the disclosed systems and methods can include operations for applying evolving scoring methodologies, generating comparative metrics, or performing compliance verifications. The disclosed systems and methods can also generate new evaluation layers over the tokenized primitives, where the layers can be configured to address cybersecurity challenges such as analyzing historical compliance, identifying risk trajectories, and/or incorporating updated regulatory frameworks. By preserving immutable primitives and supporting dynamic scoring overlays, the disclosed systems and methods enhance cybersecurity evaluation processes by providing retrospective, data-driven insights for applications such as cybersecurity protections and/or adaptive operations management.

Some implementations of the present disclosure can relate to a method. In some implementations, the method can include receiving, by one or more processing circuits from a third-party computing system, a request to re-model one or more safeguards of at least one entity, wherein the request includes one or more modeling parameters and a temporal interval. In some implementations, the method includes identifying, by the one or more processing circuits, one or more tokens including the one or more safeguards and one or more proofs of the at least one entity at the temporal interval, wherein the one or more safeguards correspond with a plurality of modeled outputs, and wherein the plurality of modeled outputs include at least one first modeled output corresponding with a safeguard status based at least on a safeguard threshold and at least one second modeled output corresponding with at least one resilience score. In some implementations, the method includes generating, by the one or more processing circuits using the one or more tokens, at least one re-modeled output at the temporal interval based at least on re-modeling the one or more tokens, wherein the at least one re-modeled output includes an update, based on the one or more modeling parameters, to at least one of (i) the safeguard status or (ii) the at least one resilience score, and wherein the update to at least one of (i) the safeguard status or (ii) the at least one resilience score is based at least on the one or more safeguards or the one or more proofs. In some implementations, the method includes generating, by the one or more processing circuits, at least one new token including the at least one re-modeled output, the one or more safeguards, and the one or more proofs. In some implementations, the method includes recording, by the one or more processing circuits, the at least one new token in a token storage.

In some implementations, the method includes receiving, by the one or more processing circuits, an updated safeguard threshold corresponding with the at least one entity and generating, by the one or more processing circuits, the at least one re-modeled output including an update to the safeguard status based on the updated safeguard threshold.

In some implementations, the method includes receiving, by the one or more processing circuits, a heuristic scoring model corresponding with the at least one entity and generating, by the one or more processing circuits using the heuristic scoring model and the one or more safeguards, the at least one re-modeled output including an update to the at least one resilience score or one or more protection sub-scores, wherein generating the one or more protection sub-scores includes generating the at least one resilience score.

In some implementations, the method includes receiving, by the one or more processing circuits, an updated safeguard threshold corresponding with the at least one entity and a heuristic scoring model corresponding with the at least one entity and generating, by the one or more processing circuits, the at least one re-modeled output including an update to the safeguard status based on the updated safeguard threshold and an update to the at least one resilience score or one or more protection sub-scores using the heuristic scoring model and the one or more safeguards.

In some implementations, the method includes generating, by the one or more processing circuits, a first plurality of protection sub-scores based on the one or more safeguards and one or more coverage parameters of a heuristic scoring model, the one or more coverage parameters corresponding with safeguard types of the one or more safeguards implemented in one or more entity computing systems of the at least one entity. In some implementations, the method includes generating, by the one or more processing circuits, a second plurality of protection sub-scores based on the one or more safeguards and one or more configuration parameters of the heuristic scoring model, the one or more configuration parameters corresponding with entity configurations associated with the safeguard types. In some implementations, the method includes generating, by the one or more processing circuits, the at least one resilience score based on a weighted aggregation of the first plurality of protection sub-scores and the second plurality of protection sub-scores.

In some implementations, the one or more tokens correspond with the temporal interval, wherein the temporal interval corresponds with a time period for evaluating the at least one entity, and wherein at least one token of the one or more tokens corresponds with a temporal sub-interval including a portion of the temporal interval.

In some implementations, the method includes, responsive to determining the safeguard status fails to satisfy the safeguard threshold, determining, by the one or more processing circuits, one or more actions to perform the update to the at least one of (i) the safeguard status or (ii) the at least one resilience score.

In some implementations, the method includes retrieving or extracting, by the one or more processing circuits, the at least one re-modeled output, the one or more safeguards, and the one or more proofs and encapsulating, by the one or more processing circuits, the at least one re-modeled output, the one or more safeguards, and the one or more proofs in a structured format corresponding with the at least one new token, the structured format including a plurality of metadata fields corresponding with the one or more safeguards and the one or more proofs.

In some implementations, the method includes updating, by the one or more processing circuits, the at least one new token as a third-party token by adding or updating a metadata field of the at least one new token indicating an association with a third-party entity corresponding with the third-party computing system. In some implementations, the method includes, responsive to generating one or more additional tokens, programmatically establishing, by the one or more processing circuits, a data link between the at least one new token and the one or more additional tokens based on determining one or more metadata fields of the one or more additional tokens indicate the association with the third-party entity.

In some implementations, the method includes, responsive to determining the request corresponds with re-analysis of the one or more safeguards, re-analyzing, by the one or more processing circuits, the one or more safeguards and the one or more proofs and determining, by the one or more processing circuits, an update to at least one safeguard of the one or more safeguards based on the re-analysis.

In some implementations, the request includes a requirements token including one or more third-party requirements of a third-party associated with the third-party computing system, and the method includes identifying, by the one or more processing circuits, the one or more modeling parameters based on extracting the one or more third-party requirements from the requirements token.

In some implementations, the method includes receiving, by the one or more processing circuits from the third-party computing system in real-time, a second request including a second set of modeling parameters to re-model the one or more safeguards.

Some implementations of the present disclosure relate to a system including one or more processing circuits. In some implementations, the one or more processing circuits can be configured to receive, from a third-party computing system, a request to re-model one or more safeguards of at least one entity, wherein the request includes one or more modeling parameters and a temporal interval. In some implementations, the one or more processors can be configured to identify one or more tokens including the one or more safeguards and one or more proofs of the at least one entity at the temporal interval, wherein the one or more safeguards correspond with a plurality of modeled outputs, and wherein the plurality of modeled outputs include at least one first modeled output corresponding with a safeguard status based at least on a safeguard threshold and at least one second modeled output corresponding with at least one resilience score. In some implementations, the one or more processors can be configured to generate, using the one or more tokens, at least one re-modeled output at the temporal interval based at least on re-modeling the one or more tokens, wherein the at least one re-modeled output includes an update, based on the one or more modeling parameters, to at least one of (i) the safeguard status or (ii) the at least one resilience score, and wherein the update to at least one of (i) the safeguard status or (ii) the at least one resilience score is based at least on the one or more safeguards or the one or more proofs. In some implementations, the one or more processors can be configured to generate at least one new token including the at least one re-modeled output, the one or more safeguards, and the one or more proofs. In some implementations, the one or more processors can be configured to record the at least one new token in a token storage.

In some implementations, the one or more processors can be configured to receive an updated safeguard threshold corresponds with the at least one entity and generate the at least one re-modeled output including an update to the safeguard status based on the updated safeguard threshold.

In some implementations, the one or more processors can be configured to receive a heuristic scoring model corresponding with the at least one entity and generate, using the heuristic scoring model and the one or more safeguards, the at least one re-modeled output including an update to the at least one resilience score or one or more protection sub-scores, wherein generating the one or more protection sub-scores includes generating the at least one resilience score.

In some implementations, the one or more processors can be configured to receive an updated safeguard threshold corresponding with the at least one entity and a heuristic scoring model corresponding with the at least one entity and generate the at least one re-modeled output including an update to the safeguard status based on the updated safeguard threshold and an update to the at least one resilience score or one or more protection sub-scores using the heuristic scoring model and the one or more safeguards.

In some implementations, the one or more processors can be configured to generate a first plurality of protection sub-scores based on the one or more safeguards and one or more coverage parameters of a heuristic scoring model, the one or more coverage parameters corresponding with safeguard types of the one or more safeguards implemented in one or more entity computing systems of the at least one entity. In some implementations, the one or more processors can be configured to generate a second plurality of protection sub-scores based on the one or more safeguards and one or more configuration parameters of the heuristic scoring model, the one or more configuration parameters corresponding with entity configurations associated with the safeguard types. In some implementations, the one or more processors can be configured to generate the at least one resilience score based on a weighted aggregation of the first plurality of protection sub-scores and the second plurality of protection sub-scores.

In some implementations, the one or more tokens correspond with the temporal interval, wherein the temporal interval corresponds with a time period for evaluating the at least one entity, and wherein at least one token of the one or more tokens corresponds with a temporal sub-interval including a portion of the temporal interval.

In some implementations, the one or more processors can be configured to, responsive to determining the safeguard status fails to satisfy the safeguard threshold, determine, by the one or more processing circuits, one or more actions to perform the update to the at least one of (i) the safeguard status or (ii) the at least one resilience score.

In some aspects, the techniques described herein relate to a non-transitory computer readable medium (CRM) including one or more instructions stored thereon. In some implementations, the instructions can be executable by one or more processors. In some implementations, the instructions can cause the one or more processors to receive, from a third-party computing system, a request to re-model one or more safeguards of at least one entity, wherein the request includes one or more modeling parameters and a temporal interval. In some implementations, the instructions can cause the one or more processors to identify one or more tokens including the one or more safeguards and one or more proofs of the at least one entity at the temporal interval, wherein the one or more safeguards correspond with a plurality of modeled outputs, and wherein the plurality of modeled outputs include at least one first modeled output corresponding with a safeguard status based at least on a safeguard threshold and at least one second modeled output corresponding with at least one resilience score. In some implementations, the instructions can cause the one or more processors to generate, using the one or more tokens, at least one re-modeled output at the temporal interval based at least on re-modeling the one or more tokens, wherein the at least one re-modeled output includes an update, based on the one or more modeling parameters, to at least one of (i) the safeguard status or (ii) the at least one resilience score, and wherein the update to at least one of (i) the safeguard status or (ii) the at least one resilience score is based at least on the one or more safeguards or the one or more proofs. In some implementations, the instructions can cause the one or more processors to generate at least one new token including the at least one re-modeled output, the one or more safeguards, and the one or more proofs. In some implementations, the instructions can cause the one or more processors to record the at least one new token in a token storage.

Figure 1:
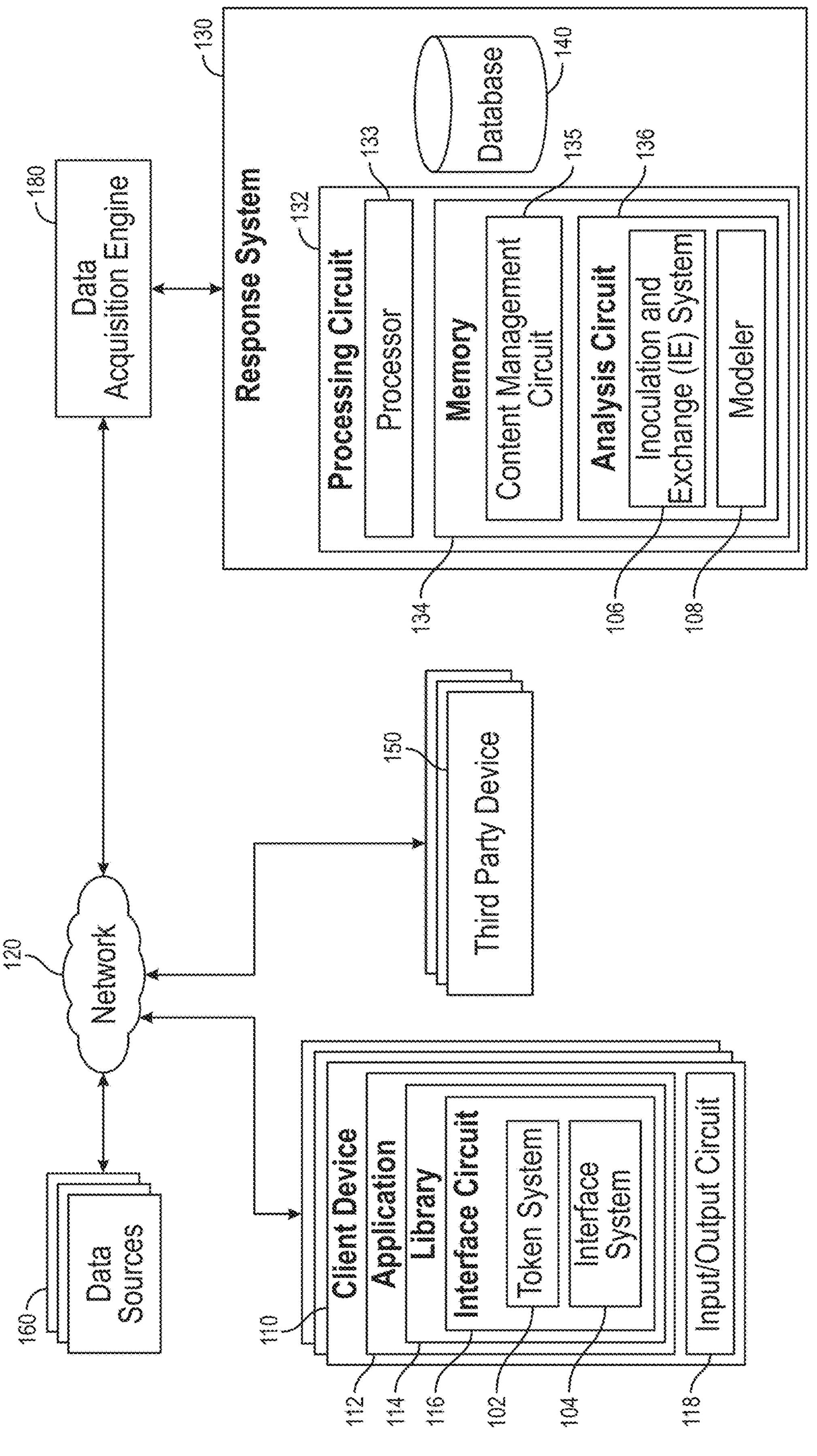
FIG. 1 depicts a block diagram of an implementation of a security architecture for synchronizing and protecting data, according to some implementations.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Referring generally to the FIGURES, systems and methods relate generally to implementing a cybersecurity framework for preserving and dynamically analyzing immutable performance primitives. In some implementations, the system represents an implementation of a security architecture that employs tokenization to capture verified cyber resilience primitives and/or models primitives to facilitate retroactive analyses using third-party scoring systems. In some implementations, the system represents an implementation of a security architecture that integrates primitives with changing scoring models and frameworks, allowing stakeholders to analyze historical cybersecurity data against updated compliance or risk standards.

Systems and methods are disclosed related to preserving cyber resilience primitives for retroactive analyses. Analytical operations vary in scope and complexity, influencing the adaptability of scoring methodologies applied to tokenized primitives. For example, operations can include capturing immutable primitives, generating tokens with cryptographic integrity, pivoting the tokens to third-party scoring models, and/or/or dynamically overlaying updated scoring layers. These operations can rely on external factors, such as the scoring models provided by third-party entities and/or evolving regulatory standards. Addressing these factors introduces challenges in designing systems capable of preserving data integrity while supporting flexible, retrospective analyses. Thus, the disclosed systems and methods provide mechanisms configured to preserve immutable primitives and allow dynamic, non-destructive scoring overlays, improving the functionality of cyber resilience analyses to facilitate compliance verifications, risk assessments, and/or historical data examinations.

Certain existing systems use static datasets and/or fixed analytical processes for managing cybersecurity assessments, which lack flexibility to address evolving standards and/or updated scoring methodologies. For example, static systems do not provide mechanisms for retroactively applying new scoring models to historical data and/or supporting comparative analyses across time periods. Such systems often face limitations in accommodating updated compliance requirements, reducing the effectiveness of long-term cybersecurity evaluations. That is, while static data preservation can be employed in systems, these systems fail to dynamically integrate updated scoring frameworks and/or provide insights into historical data analyzed under new methodologies. Thus, the disclosed systems and methods address these technical problems by providing mechanisms that preserve immutable primitives, allow retroactive application of scoring models, and/or dynamically adapt evaluation layers to align with evolving cybersecurity needs. Additionally, these systems allow for integration with third-party scoring frameworks and/or regulatory standards to facilitate collaborative assessments and continuous analytical improvements.

Systems and methods in accordance with the present disclosure preserve immutable primitives in tokens to support dynamic, retrospective analyses. The system supports operations such as capturing and tokenizing cyber resilience primitives, applying third-party scoring models, and/or generating comparative insights based on updated analytical frameworks. The system can be implemented to integrate third-party scoring tokens and/or frameworks for dynamic pivoting and analyses. The tokenized primitives remain immutable, ensuring data integrity while allowing flexible overlays of analytical criteria. That is, the disclosed systems and methods provide a framework where immutable primitives allow continuous, dynamic, and/or/or retroactive analyses of cybersecurity data, improving the adaptability and effectiveness of scoring processes. Thus, the systems support real-time and/or retrospective updates to scoring layers, facilitate third-party integrations, and/or address cybersecurity challenges through flexible, data-driven analytical methodologies.

For example, a system can process tokenized primitives representing cyber resilience configurations and/or safeguards and apply third-party scoring models to generate analyses. The scoring models can include compliance checks for regulatory frameworks, risk assessments for insurance underwriting, and/or/or dynamic analyses for performance monitoring. Additionally, the system can generate new evaluation layers by integrating updated scoring methodologies from third-party entities, allowing retrospective and comparative analyses. The system can apply these analyses to improve cybersecurity insights in real time or retrospectively.

In some implementations, the system can integrate with third-party scoring frameworks and/or regulatory standards to expand the scope of analytical operations. Integration can support collaborative assessments, access to updated scoring methodologies, and/or/or comparative analyses across historical data sets. By dynamically adapting evaluation layers and preserving the integrity of tokenized primitives, the system improves cybersecurity assessment processes by addressing a range of compliance, risk, and/or performance evaluation challenges.

Additionally, existing cybersecurity systems and architectures exhibit multiple technical limitations, reducing effectiveness in managing and responding to cyber threats or modeling cyber resilience data. For example, some computing systems can fail to store cybersecurity safeguards such as configurations, safeguard data, and/or incident metrics, in a format that supports subsequent evaluations without causing modifications to the underlying data. For example, traditional computing systems can store data in mutable formats or can otherwise fail to properly protect or version data, which can lead to inadvertent data corruption or inconsistent results if the data is subsequently accessed or evaluated. In contrast, the technical solutions presented herein tokenize entity safeguard data in an immutable and/or structured format and provide access to the tokenized data to facilitate subsequent evaluations (e.g., re-modeling of safeguards) while preserving data integrity (e.g., without modifying the underlying data). Additionally, some computing systems can fail to evaluate cybersecurity safeguards of multiple types or configurations, and/or can fail to evaluate such safeguards in a consistent, uniform, and/or adaptable manner. For example, traditional approaches can use individual or fragmented evaluation tools or processes that are not structured to dynamically reflect evolving entity or third-party requirements. In some implementations, the technical solutions presented herein address these challenges by providing a unified framework for modeling safeguards and mapping safeguard data to corresponding parameters or outputs. For example, the technical solutions present herein can dynamically evaluate and compute subscores for individual safeguards of various types (e.g., encryption, endpoint protection, phishing protection, multifactor authentication (MFA), etc.) and generated an aggregate resilience score based on a unified scoring model.

In some examples, traditional systems can lack mechanisms to consistently weigh or normalize scoring components across heterogeneous safeguard types. For example, evaluating encryption coverage and endpoint protection coverage can involve differing metrics, which can result in inconsistent or incomplete scoring methodologies. In contrast, the technical solutions presented herein can scale scoring components to a uniform range to facilitate consistent evaluations and scoring. For example, safeguard subscores can be weighted dynamically based on entity configurations, regulatory requirements, and/or other parameters based on a heuristic scoring model or other entity or third-party requirements or thresholds. Further, some systems can lack temporal mapping capabilities that support evaluating historical safeguard data against updated thresholds or criteria. In some examples, this limitation can restrict the entity from assessing compliance with revised standards or model cyber resilience trends over time. In contrast, the technical solutions presented herein provide temporal mapping functionalities and facilitates retrieval of historical safeguard data to be analyzed or re-analyzed based on updated scoring criteria. For example, safeguard data associated with a prior period (e.g., "Q1 2021") can be evaluated against thresholds introduced in subsequent periods (e.g., "Q3 2023") without modifying the underlying data, which provides a more robust and adaptable evaluation framework. In some implementations, the technical solutions herein provide mechanisms for third-party evaluations of encryption safeguards while maintaining the security of the underlying data. For example, tokenized safeguard data can include cryptographic proofs that represent encryption states or key validity. Third parties or entities can perform evaluations using these proofs without requiring direct access to unencrypted data. Accordingly, the technical solutions presented herein support secure evaluations and reduces risks of exposing or altering sensitive information while facilitating compliance with updated regulatory or operational requirements.

Another technical limitation involves the absence of integrated incident response capabilities. Numerous systems operate in isolation, utilizing separate tools for threat detection, response, and/or recovery, leading to delays in response times, communication challenges between components, and/or fragmented visibility into the overall security posture. Another limitation includes the absence of streamlined processes for engaging third-party vendors for incident response services, often including navigation through complex procurement protocols during a cyber incident, which delays mitigation efforts. Systems frequently implement incomplete assessment mechanisms for readiness in incident response, resulting in unclear visibility into system capabilities and constraints, complicating communication with potential response providers. Static defenses, often employed by current systems, fail to adjust to emerging threats. These static defenses introduce vulnerabilities, as attackers continuously evolve their strategies and methods. Systems fail to account for changes in infrastructure and operations, such as the integration of new technologies or modifications in business processes, introducing new potential attack vectors. The reliance on static defenses limits the system from maintaining a robust security posture, increasing exposure to an evolving threat landscape.

The implementations described herein provide technical solutions for preventing cyber threats, including unauthorized access, data breaches, and/or cyberattacks, by generating a customized cybersecurity framework tailored to technical requirements. The framework and implementations can be used to identify current cybersecurity vulnerabilities and facilitate connections with vendors offering targeted protection plans. Thereby, the systems can provide enhanced data protections including safeguarding sensitive information such as medical records, financial data, and/or proprietary business information. The framework and implementations can also reduce economic and infrastructure burdens associated with data breaches, including expenses related to infrastructure failures, forensic investigations, and/or legal actions. The cybersecurity models described herein can detect and address vulnerabilities while providing dynamic monitoring of relationships between networks, hardware, devices, and/or financial entities. The implementations can also improve cybersecurity by enhancing network, infrastructure, technology, and/or data security. Vendors can use the systems and methods described herein to actively monitor and provide responses to potential threats, improving the overall security posture. The customized cybersecurity frameworks address existing vulnerabilities and anticipate future threats, offering an adaptive and proactive solution to cybersecurity.

Implementation of customized cybersecurity frameworks facilitate technical systems to identify existing vulnerabilities, map vulnerabilities to assets, and/or provide targeted protection strategies. The technical benefit includes generating remediation recommendations and preventing successful hacking activities, cyberattacks, data breaches, and/or other cyber incidents. Systems and methods disclosed herein facilitate connections of systems to suitable vendors and other entities, offering security plans customized to vulnerabilities and identified gaps. Implementations of customized cybersecurity frameworks can improve the process of identifying and addressing vulnerabilities by streamlining resources, allowing continuous monitoring of the cybersecurity status of the system by vendors, providing dynamic responses to potential threats, and/or maintaining the integrity and security of system infrastructure. Customized frameworks provide technical capabilities to facilitate determinations about cybersecurity strategies by selecting from a range of vendor plans and services, activating plans dynamically, and/or ensuring cybersecurity is actively monitored and managed.

A technical improvement in dynamic cybersecurity architecture comprehension is provided by identifying and mapping cybersecurity vulnerabilities within customized cybersecurity frameworks. For example, maintaining separate inventories of network weaknesses, infrastructure vulnerabilities, and/or operating system susceptibilities can be reduced or eliminated. The implementations of the customized cybersecurity framework can include identifying potential security gaps associated with system identifiers, such as domain identifiers, IP addresses, and/or subnets. Rather than assessing at least one (e.g., each) subclass of vulnerabilities separately, a computing system utilizes a unified view into the computing environment of the target system and centrally manages the identification of different types of vulnerabilities and associated potential security threats. Vulnerability identification operations can include computer-executed processes to model one or more cybersecurity statuses, determine vulnerabilities based on statuses, and/or integrate or connect systems to suitable vendors offering appropriate cybersecurity plans.

Additionally, the cybersecurity framework enhances data management and sharing through tokenization of cybersecurity information. Tokenization can encrypt cybersecurity posture and insurance information for secure access and storage, with access controlled by smart contracts. Tokenization can be used to prevent unauthorized access and improves data integrity, enhancing data sharing and trust among stakeholders. Additionally, Distributed Non-Fungible Tokens (DNFTs) can provide transparency in tracking and verifying cybersecurity management events and insurance-related activities. Transparency in these processes can improve the accuracy of cyber risk assessments and reduces the likelihood of fraud, as multiple parties can verify the authenticity of performance history events through mechanisms such as multi-signature wallets or signature verification within smart contracts. Tokenization of cybersecurity information, using NFTs or DNFTs, provides real-time visibility into a cyber risk posture of a client. For example, dynamic visibility can facilitate monitoring of compliance and adjustments to policies based on the current risk status of the client. That is, access to up-to-date information facilitates insurers to provide accurate and fair policy pricing, aligning incentives between insurers, brokers, and/or policyholders. Real-time monitoring capabilities can also provide responsive updates to potential threats and improve the overall security posture of an entity or organization.

Token integration within cybersecurity frameworks provides a unified and view of system cybersecurity status. By consolidating information from various security systems into a single platform, the implementations can conduct cyber threat and risk assessments with greater accuracy and efficiency by accessing data mapped to tokens. That is, the implementations facilitate communication and collaboration between systems, vendors, and/or carriers to identify cyber risks collectively. Data location mapping, connection of security stacks, and/or provision of targeted protection strategies can improve alignment of incentives between various cyber resilience entities. Tokenization further improves cyber resilience systems through improved protection and fair policy pricing, and/or provides insurers, vendors, and/or brokers with access to cyber protection data.

Decentralized ledger implementation, such as Blockchain, can be used to improve the security and integrity of the data exchange process. Decentralized ledgers provide transactions and data entries that are immutable and verifiable, providing a secure and transparent audit trail for cybersecurity activities. Blockchain architecture provides a distributed consensus mechanism that validates transactions without using a central authority, reducing the risk of data tampering and unauthorized access. The decentralized nature of Blockchain improves interoperability between different security platforms and facilitates communication among various cybersecurity tools and stakeholders. Resilient infrastructure configured to withstand cyberattacks facilitates secure and efficient data sharing and management. Tokens on a decentralized ledger improve reliability in cyber risk assessments and improve stakeholder access to implemented security measures and other cyber resilience data.

Systems and Methods for Synchronizing and Protecting Data

Referring to FIG. 1, a block diagram of an implementation of a security architecture for synchronizing and protecting data is shown, according to some implementations. The implementation shown in FIG. 1 includes a client device 110 (also referred to herein as a "client device 110"), response system 130, third-party device 150, data sources 160, blockchain 170, and/or data acquisition engine 180 for modeling proof-of-controls (e.g., cybersecurity policies, procedures, technologies, practices, etc. used by an entity). These components can be interconnected through a network 120 that supports secure communications profiles (e.g., TLS, SSL, HTTPS, etc.).

In some implementations, the client device 110 can include an application 112 and an input/output circuit 118. The application 112 can include a library 114, and/or the library 114 can include an interface circuit 116. The interface circuit 116 can further include a token system 826 and an interface system 104. In some implementations, the response system 130 can include a processing circuit 132 and a database 140. The processing circuit 132 can include a processor 133 and memory 134. The memory 134 can further include a content management circuit 135 and an analysis circuit 136, and/or the analysis circuit 136 can include an inoculation and exchange (IE) system 106 and a modeler 108, as further described herein.

Client device 110 (sometimes referred to herein as a "mobile device") can be a mobile computing device, smartphone, tablet, smart watch, smart sensor, and/or any other device configured to facilitate receiving, displaying, and/or interacting with content (e.g., web pages, mobile applications, etc.). Client device 110 can include an application 112 to receive and display content and to receive user interaction with the content. For example, application 112 can be a web browser. Additionally, and/or alternatively, application 112 can be a mobile application. Client device 110 can also include an input/output circuit 118 for communicating data over network 120 (e.g., receive and transmit to response system 130).

In various implementations, application 112 interacts with a content publisher to receive online content, network content, and/or/or application content. For example, application 112 can receive and present various dashboards and information resources from distributed by the content publisher (e.g., content management circuit 135). Dashboards and/or information resources can include web-based content such as a web page or other online documents. The dashboards information resources can include instructions (e.g., scripts, executable code, etc.) that when interpreted by application 112 cause application 112 to display a graphical user interface such as an interactable web page and/or an interactive mobile application to a user (e.g., various dashboards including cyber resilience data or associated information). In various implementations, application 112 can include one or more application interfaces for presenting an application (e.g., mobile application, web-based application, virtual reality/augmented reality application, smart TV application and so on).

Application 112 is shown to include library 114 having an interface circuit 116. The library 114 can include a collection of software development tools contained in a package (e.g., software development kit (SDK), application programming interface (API), integrated development environment (IDE), debugger, etc.). For example, library 114 can include an application programming interface (API). In another example, library 114 can include a debugger. In yet another example, the library 114 can be an SDK that includes an API, a debugger, and/or IDE, and/or so on. In some implementations, library 114 includes one or more libraries having functions that interface with a particular system software (e.g., iOS, and/orroid, Linux, etc.). Library 114 can facilitate embedding functionality in application 112. For example, a user can use library 114 to automatically transmit event logs whenever an event occurs on application 112. As a further example, library 114 can include a function configured to collect and report device analytics and a user can insert the function into the instructions of application 112 to cause the function to be called during specific actions of application 112 (e.g., during testing as described in detail below). In some implementations, interface circuit 116 functionalities are provided by library 114.

In various implementations, interface circuit 116 can provide one or more interfaces to users, which can be accessed through an application interface presented in the viewport of client device 110. These interfaces can take the form of dashboards and other graphical user interfaces, offering a variety of functionality to the user. For example, a user can view incident responses, remediate claims, communicate with team members, purchase or extend products and services, view results of comparative or retroactive analyses, and/or more. The interfaces provided by interface circuit 116 can be customizable and dynamic, allowing users to configure and adjust them to align with various operational parameters. They can also be designed to present real-time data associated with current incident responses, potential incidents or threats, protection scoring, and/or other important information, allowing users to make informed decisions and take proactive steps to manage risk.

For example, interface circuit 116 can generate dashboards that provide real-time data and insights. These dashboards can be customized for individual users or groups, providing a comprehensive view of incident responses, potential threats, and/or the status of remediation efforts. For example, a dashboard might show the status of incident responses across different regions, and/or highlight areas where additional resources are to be allocated based on modeling or retroactively modeling safeguards of at least one entity. In another example, the interface circuit 116 can generate a landscape of all currently connected devices to the entity, such as a company or institution. This can include information on the types of devices, their locations, and/or other important details that can help inform incident response efforts. With this information, users can better understand the scope of potential threats, identify vulnerable areas, and/or take steps to improve security and resilience.

In another example implementation, the application 112 executed by the client device 110 can cause a web browser to the display the interfaces (e.g., dashboards) on the client device 110. For example, the user can connect (e.g., via the network 120) to a website structured to host the interfaces. In various implementations, interface can include infrastructure such as, but not limited to, host devices (e.g., computing device) and a collection of files defining the interface and stored on the host devices (e.g., in database 140). The web browser operates by receiving input of a uniform resource locator (URL) into a field from an input device (e.g., a pointing device, a keyboard, a touchscreen, mobile phone, and/or another form of input device). In response, the interface circuit 116 executing the interface in the web browser can request data such as from content (e.g., vendor information, settings, current incident response, other dashboards, etc.) from database 140. The web browser can include other functionalities, such as navigational controls (e.g., backward and forward buttons, home buttons). In some implementations, the debugging interface can include both a client-side interface and a server-side interface. For example, a client-side interface can be written in one or more general purpose programming and can be executed by client device 110. The server-side interface can be written, for example, in one or more general purpose programming languages and can be executed by the response system 130. Additional details associated with the interface are described further herein.

Interface circuit 116 can detect events within application 112. In various implementations, interface circuit 116 can be configured to trigger other functionality based on detecting specific events (e.g., transactions, in-app purchases, performing a test of a vendor, scrolling through an incident response plan, sending a contract to a vendor, spending a certain amount of time interacting with an application, etc.). For example, interface circuit 116 can trigger a pop-up window (overlayed on an interface) upon selecting an actionable object (e.g., button, drop-down, input field, etc.) within a dashboard. In various implementations, library 114 includes a function that is embedded in application 112 to trigger interface circuit 116. For example, a user can include a function of library 114 in a transaction confirmation functionality of application 112 that causes interface circuit 116 to detect a confirmed transaction (e.g., purchase cybersecurity protection plans, partnering, evaluations, modeling, etc.). It should be understood that events can include any action corresponding with a user within an application and are not limited to the examples expressly contemplated herein. In various implementations, interface circuit 116 is configured to differentiate between different types of events. For example, interface circuit 116 can trigger a first set of actions based on a first type of detected event (e.g., selecting actionable objects within the static response plan, a first scoring or modeling output, etc.) and can trigger a second set of actions based on a second type of detected event (e.g., running a test, a second scoring or modeling output, etc.). In various implementations, interface circuit 116 is configured to collect event logs associated with the detected event and/or events and transmit the collected event logs to content management circuit 135.

In various implementations, the interface circuit 116 can collect events logs based on a designated session. In one example, the designated session can be active from when application 112 is opened/selected to when application 112 is closed/exited. In another example, the designated session can be active based on a user requesting a session to start and a session to end. At least one (e.g., each) session, the interface circuit 116 can collect event logs while the session is active. Once completed, the event logs can be provided to any system described herein. During the session, the event logs can trace at least one (e.g., each) event in the session such that the events are organized in ascending and/or descending order. In some implementations, the events can be organized utilizing various other techniques (e.g., by event type, by timestamp, by malfunctions, etc.).

In various implementations, the interface circuit 116 of the client device 110 (or third party device 150) can start collecting event logs when application 112 is opened (e.g., selected by the user via an input/output circuit 118 of the client device 110), thus starting a session. In some implementations, once the application is closed by the user the interface circuit 116 can stop collecting event logs, thus ending the session. In various implementations, the user can force clear event logs or force reset application 112 such that the current session can reset, thus ending a particular session and starting a new session. Additional details regarding the interface circuit 116 functionalities, and/or the dashboards and interfaces presented within a viewport of client device 110 are described further herein.

The input/output circuit 118 is structured to send and receive communications over network 120 (e.g., with response system 130 and/or third-party device 150). The input/output circuit 118 is structured to exchange data (e.g., bundled event logs, content event logs, interactions), communications, instructions, etc. with an input/output component of the response system 130. In one implementation, the input/output circuit 118 includes communication circuitry for facilitating the exchange of data, values, messages, and/or the like between the input/output circuit 118 and the response system 130. In yet another implementation, the input/output circuit 118 includes machine-readable media for facilitating the exchange of information between the input/output device and the response system 130. In yet another implementation, the input/output circuit 118 includes any combination of hardware components, communication circuitry, and/or machine-readable media.

In some implementations, the input/output circuit 118 includes suitable input/output ports and/or uses an interconnect bus (not shown) for interconnection with a local display (e.g., a touchscreen display) and/or keyboard/mouse devices (when applicable), and/or the like, serving as a local user interface for programming and/or data entry, retrieval, and/or other user interaction purposes. As such, the input/output circuit 118 can provide an interface for the user to interact with various applications (e.g., application 112) stored on the client device 110. For example, the input/output circuit 118 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and/or the like. As another example, input/output circuit 118, can include, but is not limited to, a television monitor, a computer monitor, a printer, a facsimile, a speaker, and/or so on. As used herein, virtual reality, augmented reality, and/or mixed reality can at least one (e.g., each) be used interchangeably yet refer to any kind of extended reality, including virtual reality, augmented reality, and/or mixed reality.

In some implementations, input/output circuit 118 of the client device 110 can receive user input from a user (e.g., via sensors, and/or any other input/output devices/ports described herein). A user input can be a plurality of inputs, including by not limited to, a gesture (e.g., a flick of client device 110, a shake of client device 110, a user-defined custom gesture (e.g., utilizing an API), biological data (e.g., stress level, heart rate, hand geometry, facial geometry, psyche, and/or so on) and/or behavioral data (e.g., haptic feedback, gesture, speech pattern, movement pattern (e.g., hand, food, arm, facial, iris, and/or so on), and/or combination thereof, etc. In some implementations, one or more user inputs can be utilized to perform various actions on client device 110.

For example, a user can use a gesture, such as a flick or a shake, to quickly invoke an incident response through the response system 130 from their client device 110. With the use of biological and behavioral data, a user can trigger an incident response, access the vendor marketplace, and/or recall proof of state using custom-defined gestures via an API with input/output circuit 118. The drag and drop file tokenization feature can also be activated by a gesture, allowing a user to seamlessly tokenize files and secure them on the blockchain with a simple motion or touch on their client device 110.

Input/output circuit 118 can exchange and transmit data information, via network 120, to all the devices described herein. In various implementations, input/output circuit 118 transmits data via network 120. Input/output circuit 118 can confirm the transmission of data. For example, input/output circuit 118 can transmit requests and/or information to response system 130 based on selecting one or more actionable items within the interfaces and dashboards described herein. In another example, input/output circuit 118 can transmit requests and/or information to third party devices 150 operated one or more vendors. In various implementations, input/output circuit 118 can transmit data periodically. For example, input/output circuit 118 can transmit data at a predefined time. As another example, input/output circuit 118 can transmit data on an interval (e.g., every ten minutes, every ten hours, etc.).

In some implementations, the third party device 150 includes an application, library, interface circuit, and/or input/output circuit. The application, library, interface circuit, and/or input/output circuit of the third-party device 150 can function substantially similar to and include the same or similar components as the components of client device 110, such as application 112, library 114, interface circuit 116, and/or input/output circuit 118, described above. As such, it should be understood that the description of the client device 110, such as application 112, library 114, interface circuit 116, and/or input/output circuit 118 of the client device 110 provided above can be similarly applied to an application, library, interface circuit, and/or input/output circuit of the third party device 150. However, instead of a user of a company or institution operates the third party device 150, a vendor or providers (e.g., goods or services) operates the third party device 150.

In some implementations, one or more elements of FIG. 1 can be communicably coupled (connected) to a distributed ledger (e.g., blockchain 170) or other authoritative data source to provide data integrity and security. For example, the database 140 can be a private ledger and data source 160 can be a public ledger, and/or data transactions (e.g., updates to proof/posture state data, cybersecurity parameters, entity data, etc.) recorded on the database 140 can be validated against entries recorded on the data source 160 to verify that updates to entries are accurately reflected and can be audited against an immutable record (e.g., results can be traceable and linkable). In some implementations, the application 112 can be configured to integrate with technology and databases (e.g., database 140, response system 130, etc.) to access information used synchronizing or protecting data. The user can access the application 112 through a variety of devices, including client device 110. The application 112 is described in greater detail below and with reference to FIGS. 2A-2B.

In some implementations, the response system 130 is operably connected to data acquisition engine 180 and includes analysis circuit 136 to democratize posture threats, incidents, and/or claim data (e.g., cyber security data, protection data, protection control schemas, historical protection data, etc.) to synchronize and protect the data. The analysis circuit 136 can use the democratized data in underwriting, claims, the resilience process, and/or more (e.g., in embedding data in a protection application). Using the data acquisition engine 180, the response system 130 can collect and process data (e.g., unstructured data) from various sources, such as client device 110, third-party devices 150 and data sources 160 to model proof-of-controls.

In some implementations, the client device 110 (or entity computing system) can provide a proof token corresponding with a protective entity (e.g., cybersecurity company, etc.) via the network 120, and/or the proof token can be received or identified by other components shown in FIG. 1 (e.g., response system 130). In some implementations, the proof token can be generated by the token system 828 and/or communicated to other elements of FIG. 1 (e.g., response system 130) by the token system 828. For example, the response system 130 can identify or receive a proof token corresponding with a prospective entity (e.g., an organization using or desiring cybersecurity protection) from client device 110, and/or the proof token received or identified by the response system 130 can include an encoded proof and an encoded posture state based on cybersecurity safeguards and firmographic data. For example, the encoded proof of the proof token can be generated by and transmitted from the token system 828 and can include a digitally encoded verification in a secure format (e.g., digital signature generated using a private key of the client device 110 and verified using a public key of the client device 110). For example, the encoded posture state can include entity data and/or other cybersecurity data (e.g., encryption standards, data collection policy, other cyber security safeguards, entity size, entity industry, other firmographic data, etc.) and be encoded by the token system 828 using public/private key pairs, as described above.

In some implementations, the modeler 108 of analysis circuit 136 can generate the proof token corresponding with the prospective entity based on encoding a proof and encoding a posture state based on the cybersecurity safeguards and the firmographic data. That is, the process includes correlating the cybersecurity measures and business characteristics into a unified token that signifies a security posture and risk profile of an entity. For example, the modeler 108 can incorporate data reflecting the adherence to cybersecurity frameworks of entity like NIST or its deployment of technologies such as firewalls or intrusion detection systems. In another example, the modeler 108 can incorporate data of the operational practices of the entity, such as employee cybersecurity training programs or incident response protocols. Additionally, while the client device 110 or the modeler 108 can generate the proof token, the modeler 108 can further model the proof-of-controls using the proof token.

Generally, encoding the proof can include the embedded of verification evidence into a secure, digital format that can be both tamper-evident and verifiable. For example, encoding proof can includes the application of cryptographic algorithms to create a digital signature using a private key, which can then be verified with the corresponding public key. Encoding the posture state can include generating a digital representation of a cybersecurity posture of an entity, including its adherence to security policies, deployment of security measures, and/or compliance with regulatory standards. For example, encoding the posture state can include the use of public/private key pairs to encrypt the data. The encoded posture state can provide a snapshot of the security status of the entity, encapsulating data on encryption standards, cybersecurity safeguards, and/or other relevant firmographic information.

In some implementations, the proof token received via the token system 828 can be modeled (or analyzed) by the response system 130 (e.g., modeler 108) in modeling proof-of-controls. In some implementations, the modeler 108 can model the proof token with a set of protection parameters (e.g., encryption standards such as AES-76 for secure data storage, incident response plans, regulatory requirements, etc.) defined by a third-party (sometimes referred to herein as a protection entity, e.g., vendor, insurer, certification authorities (Cas), technology partners, audit and compliance firms, cybersecurity framework organizations) to generate a protection eligibility. For example, the modeler 108 can analyze the proof token with a set of protection parameters defined by a protection entity to generate a cybersecurity protection eligibility. In another example, the protection eligibility can be generated by the modeler 108 based on the alignment of cybersecurity measures of an entity with cybersecurity standards (e.g., AES-256, ISO/IEC 27001).

In some implementations, the modeler 108 can model the proof token by matching the proof token to the set of protection parameters based on comparing the encoded proof and the encoded posture state to the set of protection parameters of a protection provider to generate protection eligibility. For example, the modeler 108 can compare data of the encoded proof and/or encoded posture state (e.g., encryption standards of an entity) to cybersecurity requirements of a cybersecurity protection product. In some implementations, the proof token modeled by the modeler 108 can correspond to a secured authenticated bundle of entity information identifying the protection posture of the prospective entity. For example, the information identifying the protection posture of the prospective entity can include legal data (e.g., regulatory impact, privacy impact, etc.), firmographic data (e.g., industry, revenue, etc.), and/or cybersecurity data (e.g., safeguards, root cause, etc.) of the entity. In some implementations, the set of protection parameters used by the modeler 108 can correspond to at least one of a verifiable configuration (e.g., network firewall configurations benchmarked against industry best practices), a revenue range (e.g., enterprises with annual revenues exceeding $100 million), one or more cyber security implementations (e.g., MDR, endpoint detection and response systems, etc.), and/or/or one or more compliance attestations (e.g., e.g., ISO 27001 certification for information security management).

In some implementations, a posture state within the proof token can be a data package encapsulating a cybersecurity disposition of the entity. This includes a mapping of compliances (e.g., regulatory and privacy impacts) and firmographic insights (e.g., industry classification and revenue metrics). Furthermore, the cybersecurity dimension of the posture state can include a spectrum of protective measures and their rationale. For example, the encoded posture state can integrate data reflecting the encryption protocols of the entity, thereby offering a "snapshot" of its technical safeguards. This data can be used by a vendor, provider, CAs, cybersecurity framework organization, and/or insurer to assess the alignment of the entity with cybersecurity benchmarks and standards, such as ISO 27001 certification. In some implementations, the proof, embedded within the proof token, provide verifiable elements that support the assertions made in the posture state. It provides a verifiable account of the cybersecurity measures of the entity, such as the implementation of advanced threat detection systems like MDR and endpoint detection and response solutions.

Furthermore, the encoded proof and posture state of the proof token can be subject to modeling having a set of protection parameters. This set can include criteria like network firewall configurations benchmarked against industry best practices, revenue thresholds that categorize enterprises based on financial size, the presence of cybersecurity implementations or compliance attestations, and/or so on. In some implementations, the comparative analysis can facilitate the modeling of the proof token, facilitating the identification of a secured, authenticated bundle of information that accurately reflects the prospective protection posture of the entity.

In some implementations, the proof token can be recorded and validated in a distributed ledger or another data source (e.g., blockchain 170, for example, using database 140 and/or data source 160) corresponding to an immutable recorded of the encoded proof and the encoded posture state. For example, the token system 828 can create a digital token representing cybersecurity/entity proof data (e.g., by generating a unique cryptographic token including an encoded proof and encoded posture state based on cybersecurity safeguards and firmographic data), which can be stored on a distributed ledger (e.g., by token system 828, response system 130, etc.) and can communicate data related to the digital token to the application 112 for display to the user (e.g., to verify data integrity, to show modifications to data, etc.). In some implementations, the database 140 can be a private ledger and data source 160 can be a public ledger. Further, the proof token received or identified from the token system 828 can be recorded in the database 140 (e.g., maintaining and storing blockchain 170) and can be validated against entries recorded on the data source 160 to verify that proofs and states are reflected and can be audited against an immutable record. For example, an entry on the database 140 can include the encoded proof and/or encoded posture state generated by the token system 828. The proof token is described in greater detail below with regard to FIG. 5.

In some implementations, the response system 130 (e.g., modeler 108) can generate a protection product (e.g., cybersecurity product, compliance certification, security audit, insurance product, vendor product) for protection of the computing and networking infrastructure of the prospective entity. For example, the protection product can be a cybersecurity protection offering or plan, vendor protection offering or plan, and/or insurance product or plan for an entity. In another example, the modeler 108 can generate a product for protection of a computing and networking infrastructure of a prospective entity (e.g., client device 110) based on the generated protection eligibility and protection entity-provided rates In some implementations, after modeling the proof token with a set of protection parameters, the modeler 108 can generate the protection product based on the generated protection eligibility and dynamic value parameters. For example, the generated protection eligibility can be an eligibility of a prospective entity for a protection plan based on cybersecurity requirements of the protection plan (e.g., encryption standards, managed detection and response (MDR) system requirements, etc.). Additionally, the dynamic value parameters can include rates tied to the effectiveness of current cybersecurity measures, such as encryption strength, endpoint security coverage, and/or MDR system efficiency. In some implementations, the protection product generated based on the generated protection eligibility and dynamic value parameters can be provided to the entity computing system (e.g., client device 110).

In some implementations, modeling proof-of-controls can further include determining a recency or quality of the cybersecurity of the prospective entity based on the encoded proof and the encoded posture state. For example, the IE system 106 can determine a recency (e.g., 30 days or less)

or quality (e.g., configured to receive certain data types, matching fields, etc.) of the cyber security of the prospective entity based on data collected from an external data source (e.g., distributed ledger, database 140/data source 160, third party device 150, etc.). In some implementations, modeling proof-of-controls can further include automatically disqualifying the prospective entity based on a set of threshold parameters of the third party. For example, automatically disqualifying the prospective entity based on threshold parameters can include comparing the recency and quality metrics of the cybersecurity data of the entity against the minimum standards of the third-party, and/or disqualifying entities whose cybersecurity measures are outdated or below an established benchmark. In another example, disqualification can occur if a cybersecurity profile of entity does not include mandatory data fields used by the risk assessment protocol of the third-party.

In some implementations, modeling proof-of-controls can further include determining dynamic value parameters for the protection product based on third-party-provided rates, and/or the dynamic value parameters can be based on the encoded proof and encoded posture state data within the proof token. For example, the dynamic value parameters can be adjusted in real-time, reflecting the current security posture as indicated by the latest encoded proof and posture state data. In some implementations, modeling proof-of-controls can further include receiving an acceptance of the protection product included an exchange instrument satisfying the dynamic value parameters for processing the acceptance and activating the protection product. For example, the dynamic value parameters can be adjusted according to a protection (or risk) score derived from the encoded proof and posture state data, where higher scores indicating better security measures result in more favorable protection rates from the third-party. In some implementations, receiving acceptance of the protection product can include verifying that the payment or exchange instrument aligns with the calculated risk-based pricing before finalizing the transaction. In another example, the acceptance process can include a smart contract on a blockchain that automatically executes when the dynamic value parameters are met and modeled by the encoded data.

In some implementations, modeling proof-of-controls can further include providing an exchange record of the acceptance to the prospective entity. For example, the IE system 106 can generate and transmit a secure digital confirmation to the entity, including the acceptance of the protection product. In some implementations, modeling proof-of-controls can further include recording the exchange record, a proof of exchange, and/or the protection product in a distributed ledger. For example, the transaction data (e.g., the digital confirmation number, timestamp, and/or cryptographic hashes representing the protection product and terms) can be encrypted and recorded as a new block in blockchain 170, using smart contracts to automate the verification and verify the integrity and non-repudiation of the acceptance and terms agreed upon.

In some implementations, modeling proof-of-controls can further include activating the protection product and, in response to activating the protection product, identifying a new cybersecurity incident. For example, upon activation, the protection product monitoring systems can automatically scan the network of the entity for anomalies, identifying a new cybersecurity incident by comparing network traffic against known threat patterns. For example, the new cybersecurity incident can correspond with the prospective entity of a plurality of entities. For example, the new cybersecurity incident can correspond with incident data captured by at least the entity computing system (e.g., client device 110). In some implementations, modeling proof-of-controls can further include normalizing the incident data and providing the normalized incident data to a plurality of third-party computer systems (e.g., third-party device 150). For example, the IE system 106 can normalize the incident data by applying a standardized formatting and classification scheme. For example, the IE system 106 can provide the normalized incident data to other computing elements of FIG. 1 (e.g., third party device 150).

Additionally, providing the normalized incident data can be provided to third party devices 150 for herd inoculation of a plurality of computing systems against the new cybersecurity incident and one or more identified threats of the new cybersecurity incident. For example, the plurality of third-party (also referred to herein as "third party") computing systems can include at least one of a protectors computing system, a vendor computing system, and/or the cybersecurity computing system. In some implementations, herd inoculation can include disseminating updates to threat intelligence databases and deploying security patches or configuration changes aimed at mitigating the risk posed by the identified threats across the network of participating computing systems. For example, this process can include the automatic distribution of signatures for newly discovered malware or instructions for reconfiguring firewalls and intrusion detection systems to recognize and block the emerging threat vectors. Additionally, the various third-party computing systems can integrate this shared threat intelligence into their security operations centers (SOCs) and incident response protocols, facilitating an improved response to emerging threats, effectively raising the collective security posture of the networked entities.

In some implementations, the IE system 106 can group the incident data to generate grouped incident data based on one or more metrics or threat vector of the new cybersecurity incident. For example, the IE system 106 can group incidents by their similarity in attack patterns, such as phishing attempts, malware distribution methods, and/or exploitation of vulnerabilities. In another example, the IE system 106 can classify incidents based on their impact severity, targeted industry sectors, and/or the geographical location of the affected systems. That is, the grouping process allows a more structured analysis and response by highlighting commonalities among incidents, facilitating the identification of widespread campaigns or targeted attacks, and/or aiding in the prioritization of response efforts based on the potential impact or threat vectors identified.

In some implementations, the incident data can be identified, normalized, and/or/or grouped based on the prospective entity enrolling in a cyber incident sharing plan. For example, the enrollment process includes configuring the systems of the entity to automatically detect and report cybersecurity incidents through a API (e.g., secure API using a data channel) to the response system 130 (e.g., a centralized monitoring platform). In some implementations, the entity computing system (e.g., client device 110), after enrolling in the cyber incident sharing plan, can share the incident data when new cybersecurity incidents occur. For example, this data sharing provides real-time alerts and collaborative threat intelligence sharing among enrolled entities.

In some implementations, the incident data can be further identified, normalized, and/or/or grouped based on at least one of the plurality of third party computing systems (e.g., third-party devices 150) enrolling in the cyber incident sharing plan. For example, third-party systems can contribute to a collective threat intelligence pool by sharing anonymous incident data, which can be analyzed for emerging threat patterns. In some implementations, at least one of the plurality of third-party computing systems, after enrolling in the cyber incident sharing plan, can share (e.g., automatically, upon request, and/or periodically) data when a new cybersecurity incidents occur.

In some implementations, modeling proof-of-controls can further include modeling the normalized incident data using a cyber threat intelligence (CTI) attribute model. For example, the modeler 108 can model the normalized incident data and/or grouped incident data (e.g., indicators of compromise, attack patterns, vulnerabilities) using a machine learning-based model or agnostic framework. In some implementations, modeling the normalized incident data using the CTI attribution model can further include determining a first valuative portion of the incident data provided by the entity computing system. For example, this process includes attributing a value to the incident data shared by the entities as a form of compensation or incentive for their contribution (e.g., per use compensation, per time period compensation, per X number of uses compensation). In some implementations, modeling the normalized incident data can further include determining the first valuative portion of the incident data provided by the entity computing system based on a first quantitative proportional impact (e.g., attribution) of the contribution of the incident data in an acquisition or use by another computing system. For example, the first valuative portion can be calculated based on the number of times the incident data is accessed or used by a vendor, with compensation increasing incrementally with at least one (e.g., each) access or application within their security solutions. In another example, this attribution can be quantified in terms of the enhancement of detection rates or the expansion of the threat intelligence database of the model. In some implementations, modeling the normalized incident data can further include determining a second valuative portion of the incident data provided by at least one of the plurality of third-party computing systems. For example, this evaluation can assess the strategic value of third-party data in an acquisition or use by another computing system. In some implementations, the second valuative portion of the incident data can be determined based on a second quantitative proportional impact of the contribution of the incident data in an acquisition or use by another computing system. For example, the second valuative portion of the incident data can be determined by the volume of uses or the application context in which the third-party computing system employs the data, such as for developing new security products or enhancing existing ones. In another example, this might reflect the role of third-party data in improving the predictive accuracy or broadening its analytical scope of the model.

In some implementations, a CTI attribution model can implement a compensation mechanism for data providers (e.g., entities, third-parties). Furthermore, the CTI attribution model can be, but is not limited to, a framework that dynamically adjusts compensation based on the qualitative and quantitative value of data contributions and/or per use or acquisition by a vendor. In another example, the CTI attribution model executed by the IE system 106 can allocate credits or monetary rewards to entities based on the assessed impact of their shared data on the performance of the model. In yet another example, the CTI attribution model can deploy smart contracts on blockchain platforms to automate the compensation process. In some implementations, the performance metrics of the CTI attribution model can be, but is not limited to, the efficiency of data utilization, improvement in threat identification, and/or reduction in false positives. For example, the effectiveness of the compensation mechanism can be evaluated by the growth in the volume and quality of data shared by participating entities.

The analysis by the CTI attribution model of at least one (e.g., each) data contribution of an entity can be quantified using algorithms and statistical models. The quantification can include parsing through normalized and enriched incident data to evaluate its direct impact on the acquisition or use by a vendor (e.g., cyber security vendor). For example, if an entity submits incident data containing indicators of compromise (IoC) that is used by a vendor that leads to the identification of a new malware variant, the contribution is evaluated based on several parameters. These might include the uniqueness of the IoC, measured by comparing them against a database of known IoC, and/or the relevance to current threat landscapes, with a higher weight given to IoC related to active campaigns. As an example, a submitted IoC can increase the threat detection rate by 5% of a cybersecurity vendor an uplift considering the baseline accuracy might be 90%. This improvement is then translated into an attribution score, with the model assigning a value, for example, 100 points for every 1% improvement in detection rate, resulting in a 500-point increase for the contributing entity. Additionally, if the data also leads to a 3% reduction in false positives by a cybersecurity vendor, from a baseline rate of 10% down to 7%, and/or given the model values at least one (e.g., each) percentage point reduction at 200 points, this can add another 600 points to the attribution score of the entity. Consequently, the total contribution of the entity would be quantified at 1100 points. These points can then be converted into compensation values, such as monetary rewards, service credits, and/or access to premium intelligence feeds or products (e.g., offered by the response system 130 for acquisitions or uses by vendors), based on a predefined conversion scale established by the CTI platform.

In some implementations, modeling proof-of-controls and normalized incident can further include performing a first exchange for the first valuative portion. For example, the IE system 106 can perform the first exchange by distributing credits or compensation to the entity computing system based on the first quantitative proportional impact of the contributed incident data of the entity computing system. For example, this can include assigning credit values to different tiers of impact, such as 100 credits for viewing and up to 500 credits for downloading that lead to the identification of new threats. In some implementations, modeling proof-of-controls and normalized incident data can further include performing a second exchange for the second valuative portion. For example, the IE system 106 can perform the second exchange by distributing credits or compensation to the entity computing system based on the second quantitative proportional impact of the contributed incident data of the entity computing system, as described above regarding the first exchange. For example, this can include additional rewards for data that fills in gaps in the knowledge of the vendor, quantified by the rarity and usefulness of the information provided.

In some implementations, modeling proof-of-controls and normalized incident can further include calculating a protection savings of the third-party issuing the protection product. For example, the IE system 106 can calculate a protection savings (e.g., reduced premium rates for cybersecurity product) of a cybersecurity protection entity administering the protection product by evaluating the overall impact of shared incident data on risk mitigation. In some implementations, calculating the protection savings can include determining an avoidance amount based on the identification of the new cybersecurity incident corresponding with another cybersecurity incident from affecting a plurality of protected entities of the third party. For example, an avoidance amount can be a monetary cost that would have resulted from a breach but was prevented by proactive measures informed by shared incident data, quantified as the sum saved from potential claims. For example, this calculation might compare the cost of potential breaches, averaging $200,000 per incident, against the operational cost of implementing new security measures, leading to a net savings of $50,000 when factoring in the reduced risk of breach occurrences. In some implementations, the avoidance amount can be determined based at least on a comparison of potential claim expenses against a new cybersecurity expense and generating a new savings as a result of the incident data provided to the plurality of third-party computing systems. For example, this includes a financial analysis projecting long-term savings from enhanced security measures versus immediate cybersecurity investments. In some implementations, modeling proof-of-controls and normalized incident can further include providing an exchange request for the protection savings for the third party. For example, submitting a report and request for reduced premiums based on demonstrated risk mitigation through effective use of shared incident data.

In some implementations, modeling proof-of-controls can further include determining an update or patch derived from the incident data. For example, analyzing the shared incident data to generate a software patch that addresses a vulnerability exploited in a recent cyber-attack. In some implementations, the update or patch can correspond to remediating a vulnerability or exploit identified in the incident data. For example, deploying a security patch that closes an SQL injection vulnerability discovered through analysis of incident data. In some implementations, modeling proof-of-controls further includes distributing the update or patch to a plurality of entity computing systems. For example, automatically pushing the update to some or all affected systems within the network to provide rapid mitigation of the vulnerability. In some implementations, the distribution can correspond to executing herd inoculation of the plurality of entity computing systems against the new cybersecurity incident and one or more identified threats of the new cybersecurity incident. For example, generating and transmitting a widespread deployment of the patch across multiple organizations to preemptively protect against a malware campaign identified through shared threat intelligence.

In some implementations, in response to the generation of the protection product and prior to providing the protection product to the entity computing system, modeling proof-of-controls can further include providing the protection product to a third party computing system for issuance by the third party. For example, the IE system 106 can digitally transmit the finalized protection product data, such as cybersecurity product policies or software-based security solutions, to the third party system for review, customization according to the third party offerings, and/or formal issuance processes. In some implementations, in response to the generation of the protection product and prior to providing the protection product to the entity computing system, modeling proof-of-controls can further include receiving an issuance acceptance including the protection product. For example, the third party can respond with a digitally signed acceptance confirmation, including any modifications or terms to their issuance protocols, thereby recording the protection product readiness for distribution to the targeted entity computing systems.

In some implementations, the IE system 106 can prepare and report cyber incidents according to various governmental regulations. In some implementations, the IE system 106 can determine when a cyber incident is substantial based on a government regulation, which can range from significant losses in the confidentiality, integrity, and/or availability of information systems, to serious impacts on operational safety, disruptions in business activities, and/or unauthorized access stemming from third-party compromises. Upon identifying such incidents, the IE system 106 can gather a set of data for reporting. This data collection can encompass correspondence with threat actors, indicators of compromise, relevant log entries, forensic artifacts, network data, and/or information on how the threat actor compromised the system, among others. Additionally, the IE system 106 can track and document data related to any ransom payments, including the amount, the decision process, and/or the aftermath of the payment.

For example, a substantial cyber incident can lead to one or more of the following: a substantial loss of confidentiality, integrity or availability of a covered entity information system or network, a serious impact on the safety and resiliency of a covered entity operational systems and processes, a disruption of a covered entity ability to engage in business or industrial operations, and/or deliver goods or services, unauthorized access to a covered entity information system or network, and/or any nonpublic information contained therein, that is facilitated through or caused by a: compromise of a cloud service provider, managed service provider, and/or other third-party data hosting provider; or supply chain compromise.

Furthermore, in some implementations, the IE system 106 can also be configured to manage and submit follow-up reports dynamically. This can include generating supplemental reports when new or different information about a cyber incident becomes available or if additional ransom payments are made. Thus, the IE system 106 can provide relevant data such that it is accurately preserved and maintained for a minimum period (e.g., set at two years), following the submission of the most recent report. This data preservation can include the initial detection of a compromise to the full resolution and analysis of the incident, including any payments made and the identification of exploited vulnerabilities.

In some implementations, the operational framework of the IE system 106 aligns with timely and incident reporting and data preservation to assist organizations in maintaining compliance with regulatory requirements. By automating the process of collecting, preserving, and/or reporting information about cyber incidents and ransom payments, the IE system 106 reduces manual effort and enhances the accuracy of the information reported. This approach can be used to fulfil legal and regulatory obligations and strengthen the overall cybersecurity posture of organizations by providing a structured response to incidents and facilitating continuous improvement through incident analysis and feedback.

In some implementations, the preservation requirement of the IE system 106 can include correspondence with the threat actor, regardless of the forum or method; indicators of compromise; relevant log entries; relevant forensic artifacts; network data; data and information that can help identify how a threat actor compromised or potentially compromised an information system; system information that can help identify exploited vulnerabilities; information about exfiltrated data; data or records related to the disbursement or payment of any ransom payment; and any forensic or other reports concerning the incident, whether internal or prepared for the covered entity by a cybersecurity company or other third-party vendor.

Figure 2A:
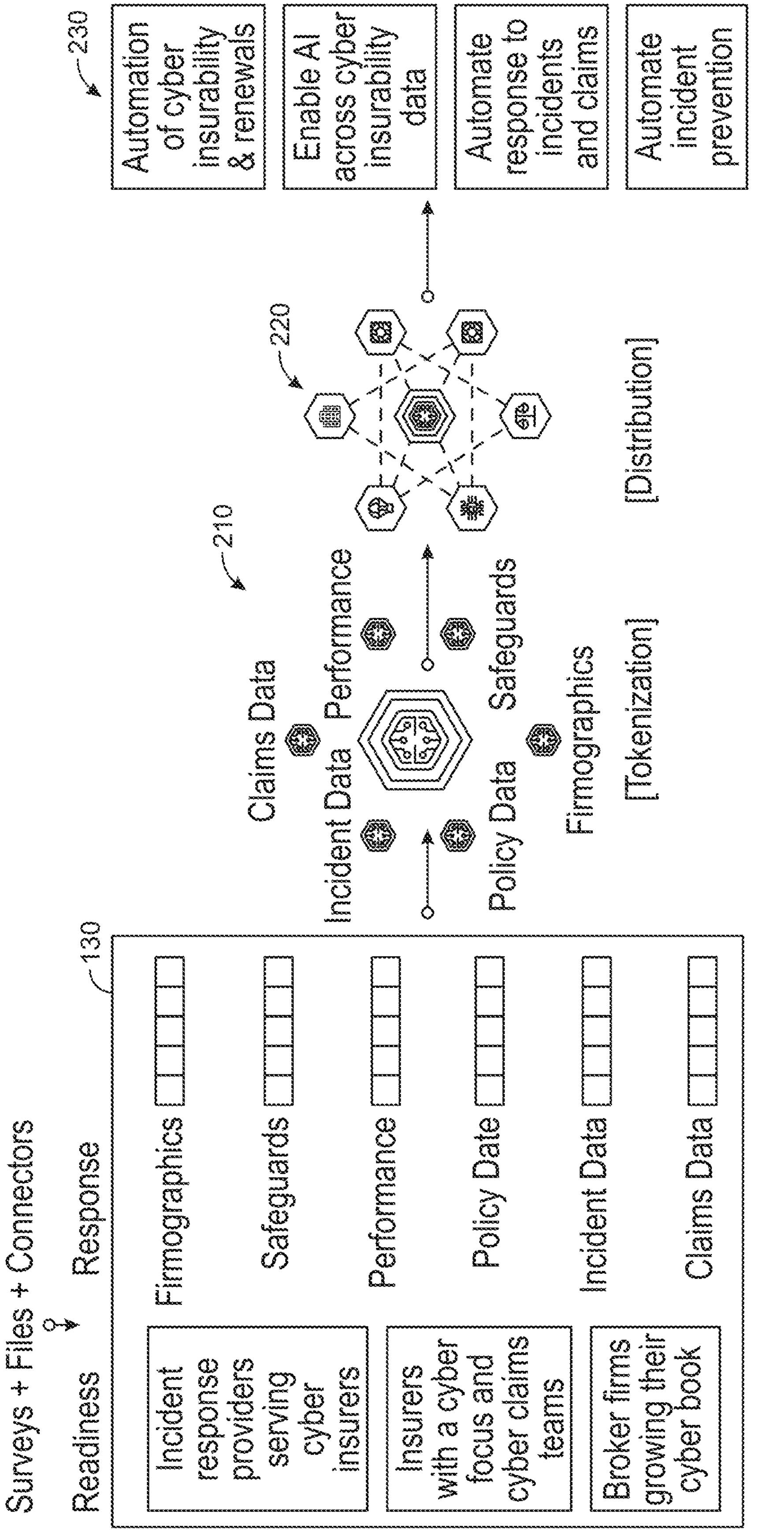
FIGS. 2A-2B depicts a block diagram of another architecture of certain systems or devices of FIG. 1, according to some implementations.
Figure 2B:
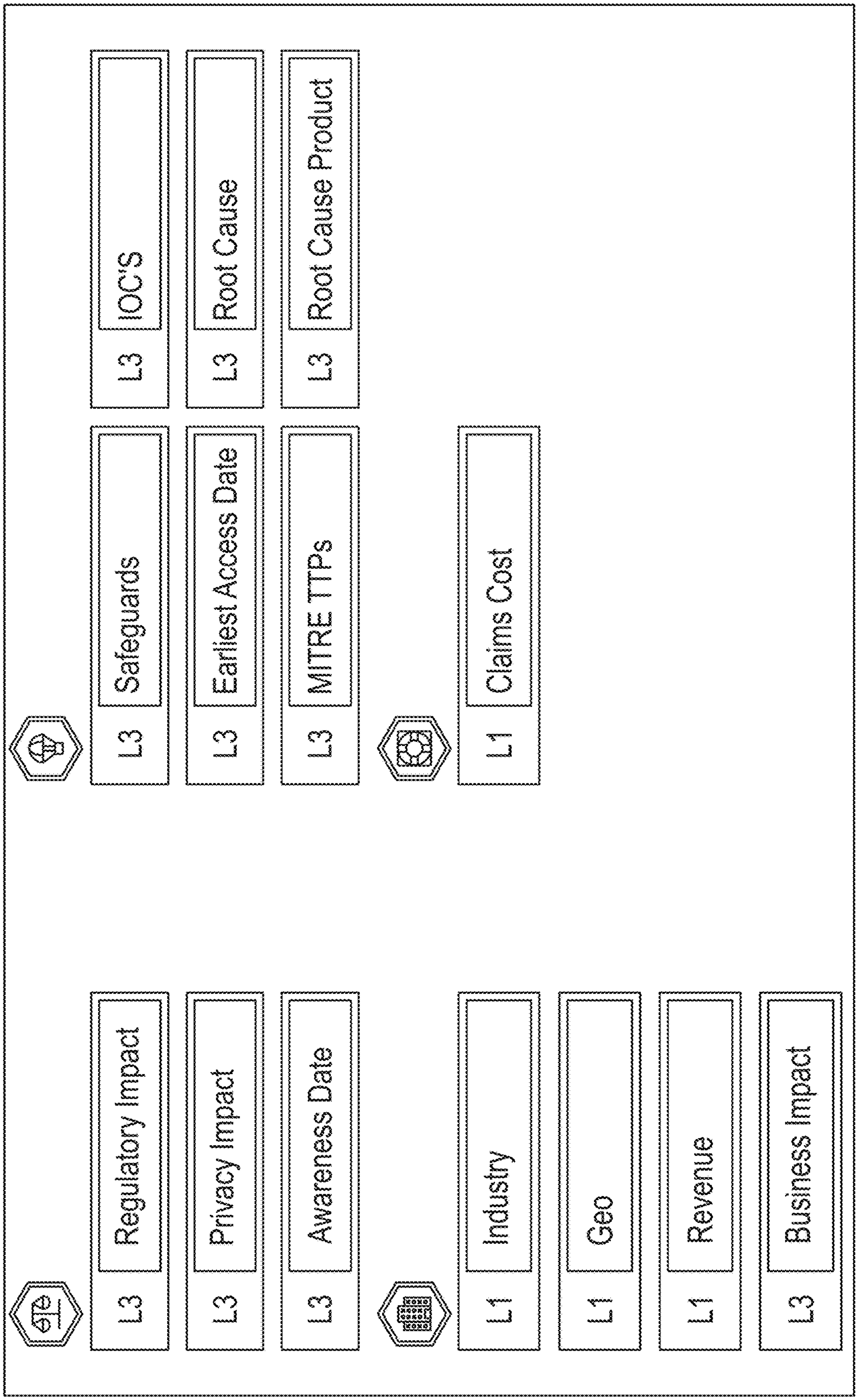

Referring generally to FIGS. 2A-2B, block diagrams of implementations of a system for tokenizing cybersecurity data and a system for managing and exchanging cybersecurity data are shown, respectively. Referring to FIG. 2A in more detail, tokenizing posture, state, cybersecurity protection, insurance, and/or incident data is shown. In some implementations, FIG. 2A includes a response system 130, posture state data at step 210, mapped posture state data (tokenization) at step 220, and/or automations (distribution) at step 230. In some implementations, the response system 130 shown in FIG. 2A can incorporate the same or similar functionality as the response system 130 of FIG. 1. In some implementations, the response system 130 can analyze posture, state, cybersecurity protection, insurance, and/or/or incident data to generate posture state data at step 210 (e.g., firmographics, safeguards, performance data, policy data, incident data, claims data, etc.). For example, the posture, state, cybersecurity protection, insurance, and/or incident data can be provided by incident response providers (e.g., those serving cyber protection entities), by cyber protection entities (e.g., those with cyber claims teams), and/or/or by brokerage firms (e.g., those expanding into cyber fields). In some implementations, the generated posture state data at step 210 can be mapped (e.g., using modeler 108 and/or IE system 106 of FIG. 1) and output as mapped posture state data at step 220 (e.g., mapped firmographics, mapped safeguards, etc.). Further, the generated posture state data at step 210 can be used to mapped at step 220 to allow automations at step 230. In some implementations, the automations at step 230 (allowed by the normalization, tokenization, and/or distribution) can include automation of cyber protectability and renewals, automation of responses to cybersecurity incidents and cybersecurity claims, automation of incident prevent, and/or allowing artificial intelligence (AI) models to interact with cybersecurity data.

As shown, surveys, files, and/or connectors can be provided (e.g., by a plurality of entities) to the response system 130, where the response system communicates and integrates with incident response providers serving cyber protectors, protectors with a cyber focus and cyber claims teams, and/or broker firms growing their cyber book (e.g., various uses). The response system 130 can also analyze, sort, interpolate, and/or store various data including, but not limited to, firmographics, safeguards, performance, policy data, incident data, claims, based on the third-parties and the data provided by the entities (e.g., customers of the third-parties or enrolled in the response system 130). The analyzing, sort, interpolating, and/or storing is collectively referred to herein as normalization of the data into categorization for modeling and analysis. That is, the data can be structured into one or more formats by the response system 130. The various data can be modeled (e.g., tokenized, encoded) at step 210 and mapped (for distribution) at step 220. For example, tokenizing the normalized data can include converting the data into a series of discrete tokens that represent aspects of the data, such as individual firmographics, cybersecurity safeguards, incident specifics, and/or claims information. These tokens can then be used within the system to securely and efficiently handle and analyze the data. That is, tokenizing by modeling the normalized data can facilitate the creation of a structured, machine-readable format that enhances data privacy, security, and/or interoperability among the different components of the response system 130 and its integration with third-party services. In another example, the modeling at step 210 might include leveraging natural language processing (NLP) and machine learning techniques to extract actionable insights from unstructured data sources like surveys and incident reports. In yet another example, the mapping at step 220 relates to a sharing mechanism of the tokenized data without transferring actual data around or outside the network. That is, mapping the tokenized data for distribution includes creating a reference system that allows third parties to access or query data tokens without transferring the raw data itself, thereby preserving data confidentiality and minimizing data exposure. For example, the tokens can be distributed through a secure API that permits third-party systems to request data tokens based on criteria or gaps, with access controls verifying that authorized users can retrieve the tokens. In another example, the system might utilize blockchain technology to create a decentralized ledger of data tokens, where at least one (e.g., each) token access and usage can be transparently tracked and audited without compromising the underlying data security. This approach can be used such that the integrity and confidentiality of the original data are maintained by avoiding the direct transfer of sensitive information between parties. Additionally, automation at this stage can include deploying AI-driven algorithms to predict future cyber incidents based on patterns identified in the data, thereby facilitating proactive mitigation strategies. In another example, it can include the use of robotic process automation (RPA) to streamline the processing of cyber claims, reducing response times and operational costs.

Referring to FIG. 2B in detail, data packages for managing and exchanging cybersecurity data is shown. In some implementations, the system can attribute (e.g., credit) tangible value to in-network entities providing cybersecurity information to the system. For example, cybersecurity information provided to the system can include legal data (e.g., regulatory impact, privacy impact, awareness date, etc.), firmographic data (e.g., industry, geo, revenue, business impact, etc.), cybersecurity data (e.g., safeguards; earliest access data; MITRE tactics, techniques, and/or procedures (TTPs); IOC, root cause, root cause product, etc.), and/or claim data (e.g., claims cost) of the entity. In general, the method and steps of FIG. 2A facilitates the processing circuits of the response system 130 to attributing ownership of the entities provide data into the system, and/or persist that ownership through subsequent use cases, thereby providing royalty (payout) distribution based on use (or acquisition) of that data.

In some implementations, once the entity inputs cybersecurity information (e.g. legal data, firmographic data, etc.) into the system, the inputs can be tagged for attribution (e.g., credit). In some implementations, in response to a new user inputting cybersecurity information replacing unpublished information inputted by a previous user, the system can tag the new user for attribution. In some implementations, licensing for accessing the system can be granted by in-network protection providers to participating entities on a usage basis, on a participation basis, for a fee/for free, etc.

Figure 3:
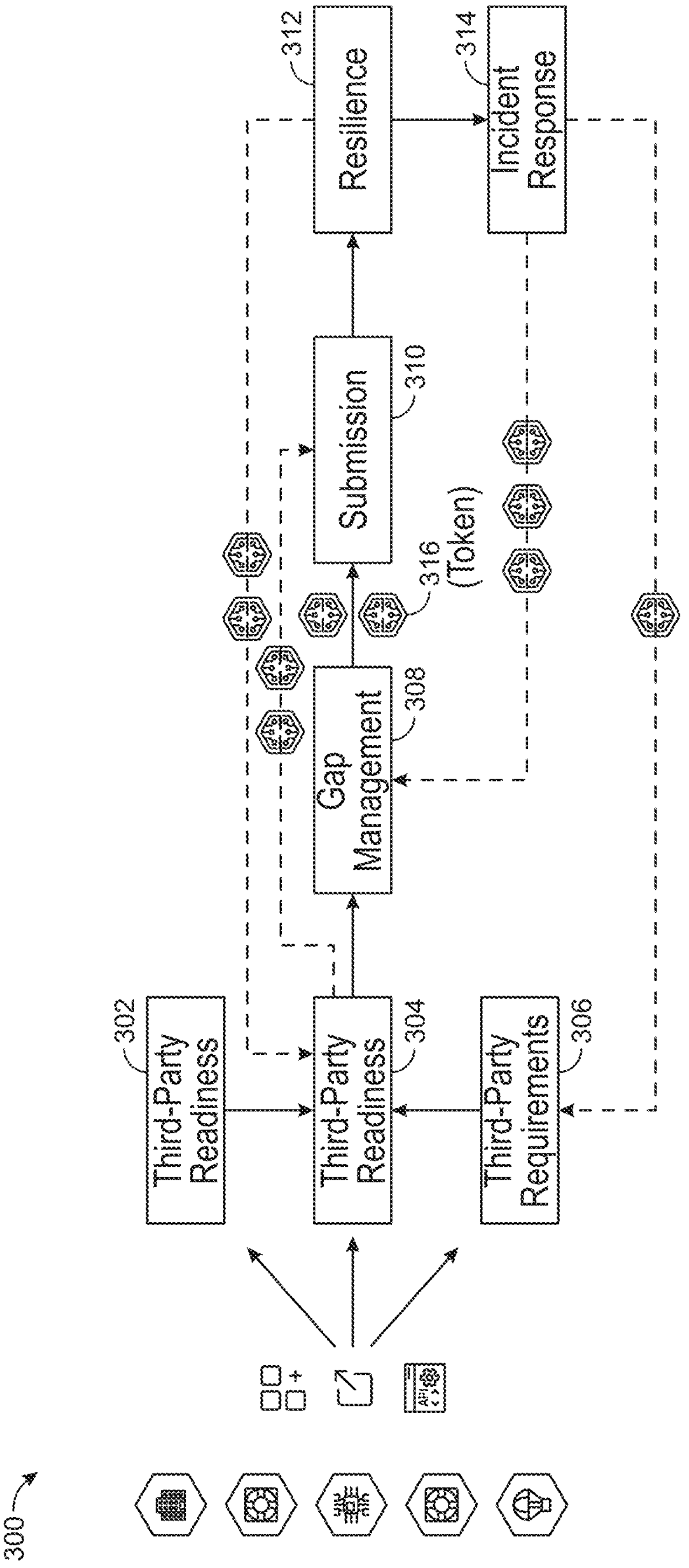
FIG. 3 depicts a block diagram of another architecture of certain systems or devices of FIG. 1, according to some implementations.

Referring to FIG. 3, a block diagram of an implementation of a system 300 for matching protection providers with entities is shown. In general, response system 130 of FIG. 1 can include the various systems and devices of system 300, for example, as subsystems of the analysis circuit 136. In some implementations, the system 300 can include a third-party readiness system 302, protectability (or insurability or eligibility) readiness system (e.g., third-party insurability readiness system 304), protection provider (cybersecurity provider, insurer, vendor, and/or another third-party) requirements system (e.g., third-party requirements system 306), gap management system 308, submission system 310, resilience system 312, and/or incident response system 314. In some implementation, the system 300 can receive and analyze cyber security data such as entity readiness data, protectability readiness data, and/or protection provider requirements.

In general, the various systems of FIG. 3 can transmit and provide tokens (e.g., token 316) to the various other systems described in FIG. 3. For example, the gap management system can generate or receive a token 316 and transmit the token to the submission system 310 when a gap in protection requirements is identified, allowing targeted adjustments to be made before finalizing the submission for coverage. Token 316 can act as a digital representation encapsulating data related to the cybersecurity readiness and gap analysis or other analyses described herein, facilitating secure and efficient data exchange between systems. In some implementations, the third-party readiness system 302 can receive incident data, entity data, environmental data, and/or cybersecurity information about a plurality of entities. The third-party readiness system 302 can analyze this data to assess the current cybersecurity posture and readiness of entities for protection coverage (e.g., cybersecurity coverage, insurance coverage, data breach defense, identify theft defense, regulatory compliance coverage, network security defense, cyber extortion defense), identifying areas of strength and potential vulnerabilities. In some implementations, the third-party requirements system 306 can also receive incident data, entity data, environmental data, and/or cybersecurity information about a plurality of entities. The third-party requirements system 306 can process this information to define and update the criteria and benchmarks for eligibility for a cybersecurity product or insurability, reflecting emerging cyber threats and industry best practices. Furthermore, the third-party insurability readiness system 304 can also receive incident data, entity data, environmental data, and/or cybersecurity information about a plurality of entities. The third-party insurability readiness system 304 can evaluate the alignment between a cybersecurity measures of an entity and the requirements of the third-party (e.g., protection requirements, cybersecurity requirements, insurance requirements, third-party requirements), identifying gaps and recommending improvements. Additionally, the third-party readiness system 302 and third-party requirements system 306 can provide outputs to the third-party insurability readiness system 304 that can include consolidated reports on cybersecurity readiness, gap analyses, and/or recommendations for achieving or maintaining third-party standards.

The third-party insurability readiness system 304 can then send gap analysis reports and recommendations for improvements to the gap management system 308. After an entity is uses or enrolls in a product, and/or is protected, the gap management system 308 can connect entities with gaps to in-network vendors to close the gaps and provide proof of closure. For example, this can include automating the dispatch of cybersecurity improvement tasks to specialized service providers and tracking the implementation progress in real-time. The gap management system 308 and the third-party insurability readiness system 304 can provide outputs to the submission system 310 which can be configured to tokenize the results. For example, the gap management system 308 can provide digital certificates of gap closure and the third-party insurability readiness system 304 can provide standardized risk profiles, which is used by the submission system 310 to create a blockchain-based ledger entry verifying the integrity and verifiability of the risk assessment and remediation actions.

Additionally, the submission system can output the tokenized results and information to the resilience system 312 to perform external checks and pre-renewals to increase stickiness for lowest risk entities (e.g., external vulnerability scans). For example, the resilience system 312 can utilize automated scanning tools to continuously assess the cybersecurity posture of entities, identifying new vulnerabilities before they can be exploited. The resilience system 312 can output security assessment reports back to the third-party insurability readiness system 304 to update the entity risk profile and tailor cybersecurity products, cybersecurity defense products, and/or other protection offerings accordingly. For example, adjustments to cybersecurity product premiums or coverage limits can be recommended based on the improved security stance. Additionally, the resilience system 312 can output alerts and recommendations to an incident response system 314. The incident response system 314 can initiate immediate response protocols for new threats identified during the resilience checks. The outputs of the incident response system 314 can be provided to the gap management system 308 and the third-party requirements system 306. For example, one output can be updates on new cybersecurity incidents and their resolutions, enhancing the understanding of current threat vectors of the third-party. In another example, an output can be data on the effectiveness of implemented security measures, contributing to the refinement of underwriting criteria.

In some implementations, the cybersecurity data (e.g., entity readiness data, cybersecurity readiness, insured readiness, environmental data, etc.) can be transmitted to the gap management system 308. For example, the gap management system 308 can allow brokerage services within its network to automatically match a prospective entity with protection providers that have an appetite for the risk profile of the prospective entity (e.g., before submission of a formal protection application). For example, if a prospective entity is identified by the gap management system 308 (e.g., response system 130 of FIG. 1) to have gaps in a risk profile (e.g., missing data in entity profiles used by protection providers), the gap management system 308 can connect the prospective entity with service providers in the system 300.

In some implementations, data analyzed and/or output by the gap management system 308 can be transmitted to the submission system 310. In some implementations, the response system 130 of FIG. 1 can manage the submission (e.g., electronic submission) of protection applications using the submission system 310. For example, the results of submitting a protection application can be tokenized by a protection system (e.g., submission system 310) to standardize and digitize the data analyzed and/or output by the gap management system (e.g., cybersecurity information such as firmographic data, legal data, etc.). In some implementations, the resilience system 312 can execute external checks (e.g., external scans, DarkwebIQ checks, pixel checks, etc.) for cybersecurity threats prior to renewal of a protection product of the entity. In some implementations, the incident response system 314 can execute a collaborative data exchange function (e.g., using electronic surveys) to collect cyber claims data and/or to allow streamlined renewal of the protection product. Additionally, information related to resilience and incident response are described above with reference to FIGS. 1 and 4.

Systems and Methods for Security Intelligence Exchange

Figure 4:
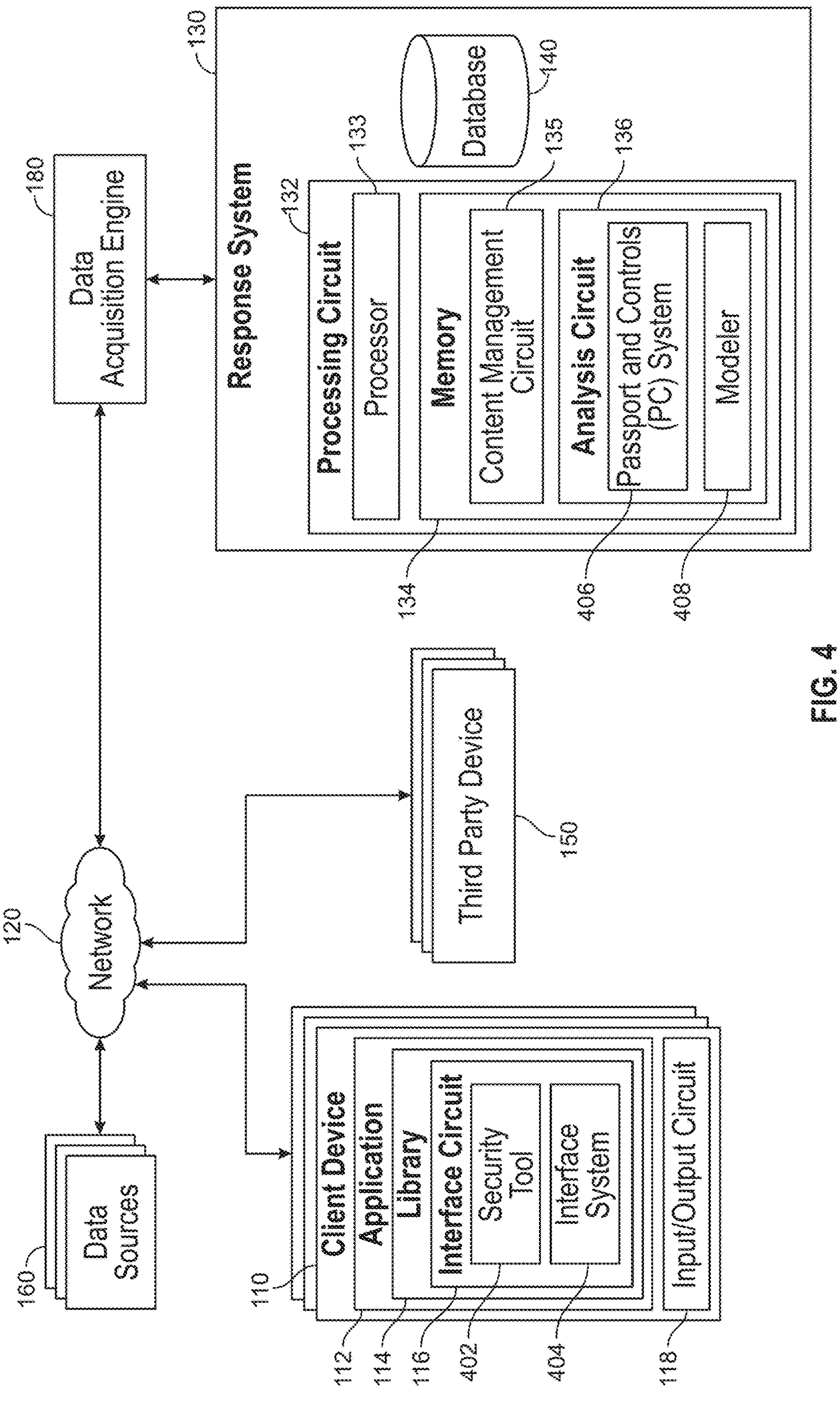
FIG. 4 depicts a block diagram of an implementation of a system for improving cybersecurity protections across a plurality of entities, according to some implementations.

Referring now to FIG. 4, a block diagram depicting an implementation of a system for improving cybersecurity protections across the plurality of entities. In some implementations, the interface circuit 116 of the client device 110 within the implementation of the system shown on FIG. 4 can include a security tool 402 and an interface system 404. As described herein, the library 114 can include the interface circuit 116. The security tool 402 of the interface circuit 116 can include a plurality of features to enhance the security of the client device 110 or the application 112. The plurality of features can include antivirus software, firewalls, instruction detection systems, vulnerability scanners, endpoint security software, and/or the like. The security tool 402 can monitor, secure, and/or protect the interface system 404 by executing the plurality of features. Using aspects of the technical solution described herein, can improve the cybersecurity protection of the client device 110, the third party device 150, and/or the data sources 160.

The interface system 404 can collect or identify the incident data associated with the cybersecurity incident. During the claims process of the claim handling by a claim handling system (e.g., implementation shown on FIG. 4), the interface system 404 can monitor and collect the incident data at every step of the process. For example, the interface system 404 can collect incident data from the environmental data of the entity during the modeling of the plurality of cybersecurity protection plans. The incident data from the environmental data can correspond anomalies or potential cybersecurity incidents in the environment of the entity. In some implementations, the interface system 404 can identify incident data from the reports of the claim handling system. In some implementations, the interface system 404 can collect incident data from the questionnaire generated by the analysis circuit 136. For example, a questionnaire can gather information related to the incident or the claim submitted. From the information, the interface system 404 can extract incident data associated with the claim.

The interface system 404 can collect the incident data to satisfy a threshold or upon the reception of a signal from the analysis circuit 136. For example, the interface system 404 can identify incident data from application 112, a questionnaire, proof of readiness, and/or other components within the analysis circuit 136. The threshold can increase or decrease based on the submitted claim or incident. Responsive to the interface system 404, the interface system 404 can record the incident data within the distributed ledger of the analysis circuit 136.

Figure 5:
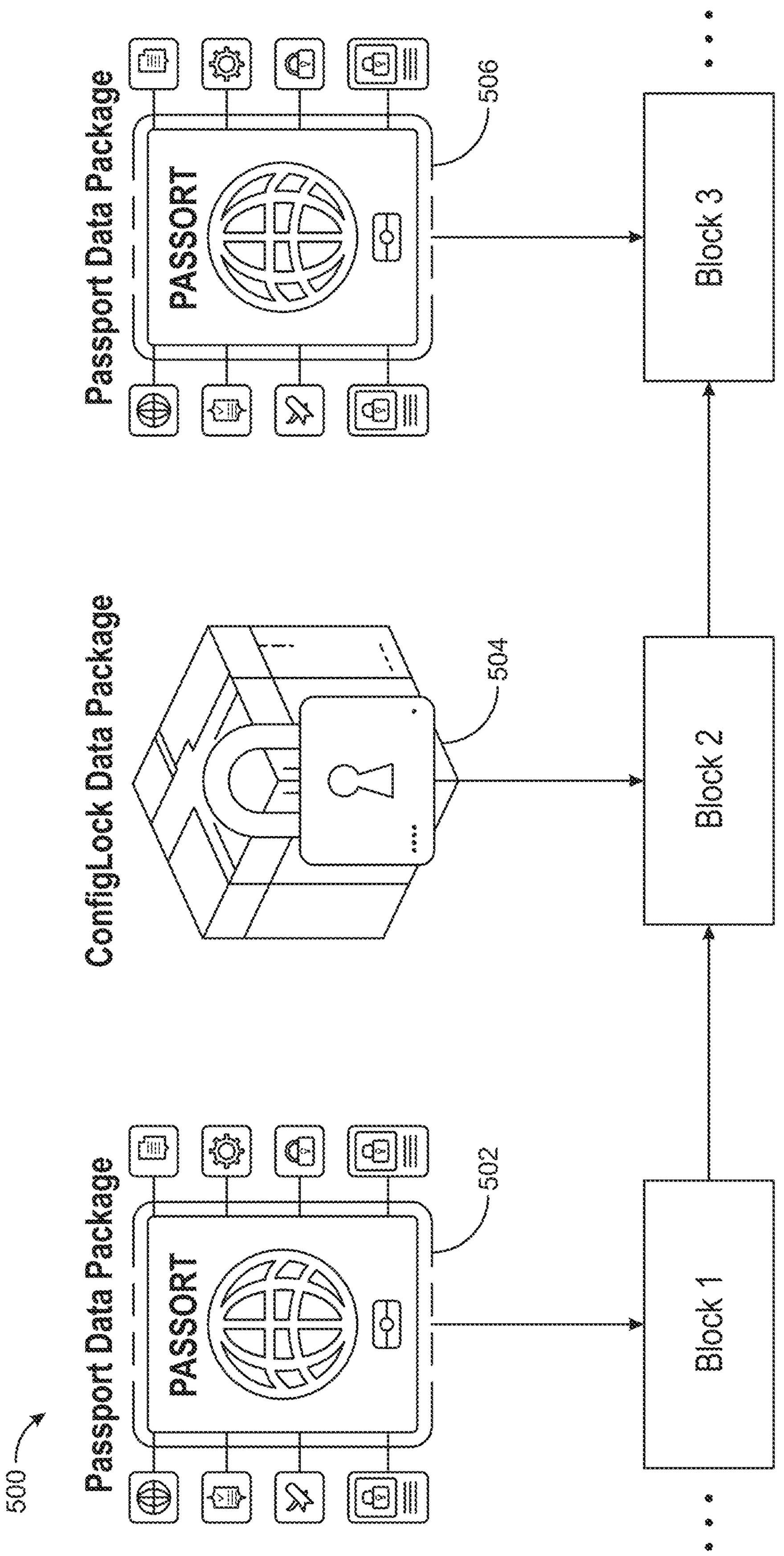
FIG. 5 depicts a block diagram of a system to analyze proof of performance of the plurality of entities to improve cybersecurity protections.

Referring now to FIG. 4 and FIG. 5, FIG. 5 depicts a block diagram 500 depicting a passport and controls (PC) system 406. The analysis circuit 136 can include the passport and controls (PC) system 406 and a modeler 408. The PC system 406 can include a passport data package 502 (e.g., first passport data package), a ConfigLock data package 504, and/or a second passport data package. In some implementations, the PC system 406 can generate a decentralized identity passport for at least one (e.g., each) entity in the plurality of entities. The decentralized identity passport can be located with the passport data package 502. The decentralized identity passport can be built from a distributed ledger and stored within a blockchain network, as shown in FIG. 5. At least one (e.g., each) decentralized identity passport can include a decentralized identifier to ensure at least one (e.g., each) identify passport is distinct.

In some implementations, the PC system 406 can attach or embed a plurality of proof of controls to the corresponding decentralized identity passport of one entity in the plurality of entities. The plurality of proof of controls can be based on one or more cybersecurity protection actions implemented by the entity. For example, a first entity can use mitigation strategies as a cybersecurity protection action, whereas a second company can use firewalls as a cybersecurity protection action.

The analysis circuit 136 of response system 130 of FIG. 4 can monitor environmental data of the third-party devices 150 (e.g., computing devices) of an entity. To monitor for environmental data, the analysis circuit 136 can detect interactions between an end-user and a computing device. The computing devices can be servers, laptops, tablets, phone, and/or the like associated with an entity of the decentralized identity passport. The interactions can reveal or indicate compliance corresponding to the cyber protections of the entity. For example, a first end-user can access a website blocked by a firewall on the computing device of then entity. The analysis circuit 136 can flag the interaction as out of compliance with the cyber security protection.

When the analysis circuit 136 flags an interaction, the entity can receive an indication that the entity is out of compliance with a cybersecurity parameter from the analysis circuit 136. The indication can be at least one of an alert, a notification, and/or a message. For example, after the analysis circuit 136 flags the interaction, the analysis circuit 136 can transmit the indication to the entity to notify the entity of the lack of compliance. The indication can include a recommendation to update the one or more cybersecurity protection actions. Updating the one or more cyber security protection actions can including updating the security tools 402 of the client device 110.

Each time an entity executes at least one proof control of the plurality of proof controls, the PC system 406 can embed the proof control within the decentralized identity passport. The proof control can indicate that the entity executed the one or more cyber security protection actions in response to a cyberthreat. For at least one (e.g., each) attached proof control, the PC system 406 can record or store the proof control within the data sources 160 or the distributed ledger. When on the distributed ledger, at least one (e.g., each) block corresponding to the attached proof control can link to the decentralized identity passport as one or more exchanges. In some implementations, the analysis circuit 136 can validate the one or more cyber security protections for at least one (e.g., each) entity. The database 140 can include a collection of cyber security protections for at least one (e.g., each) entity. The analysis circuit 136 can match the cybersecurity protection action with the stored cybersecurity action in the database 140 to validate the one or more cybersecurity protections. Upon validation of the one or more cybersecurity protections, the analysis circuit 136 can record the validation in the distributed ledger or within the data sources 160 as a new exchange linked to the decentralized identity passport.

The PC system 406 can identify a plurality of level 1 (L1) or first level configurations corresponding to at least one operational or security action performed on the plurality of client devices 110 of the entity. The L1 configurations can include at least one of network settings, security tool settings, access control lists, endpoint protection settings, and/or encryption keys. The L1 configurations can include system-level operations or security actions performed on the plurality of computing systems. In some implementations, the PC system 406 can include a plurality of level 2 (L2) configurations that include secondary or maintenance operations or security actions on the plurality of computing systems.

The PC system 406 can tokenize the plurality of L1 configurations within the ConfigLock data package 504. The ConfigLock data package 504 can include the plurality of L2 configurations. To tokenize the plurality of L1 configurations, the PC system 406 can digitize and represent the plurality of L1 configurations on a blockchain. The PC system 406 can execute one or more smart contracts to tokenize the L1 configurations. For example, the PC system 406 can execute a first smart contract to tokenize one or more L1 configurations and a second smart contract to tokenize one or more L2 configurations. Upon tokenizing the L1 configurations, the PC system 406 can store or record the L1 and L2 configurations on the distributed ledger or a data source 160 as show in FIG. 5.

In some implementations, the PC system 406 can provide a recovery key to the entity. The recovery key can be configured to allow the recovery of the tokenized L1 configurations. In some implementations, the interface circuit 116 can receive the recovery key and provide the plurality of L1 configurations from the distributed ledger or data source 160. The interface circuit 116 can detokenize or decrypt the plurality of L1 configuration using the recovery key.

The modeler 408 can be an artificial intelligence (AI) or machine learning (ML) model designed to identify, detect, and/or respond to incidents, claims, and/or cyber threats. The modeler 408 can include a data collection layer to gather incident data from the interface system 404. The modeler 408 can include a preprocessing layer and a feature engineering layer. The modeler 408 can use a model training layer to train the modeler 408 to model the incident data by using one or more training data sets within the database 140. In some implementations, the modeler 408 can include a model evaluation layer to evaluate the trained model using one or more validation data sets within the database 140. In some implementations, the modeler 408 can execute heuristic analysis, pattern identification, anomaly identification, and/or threat projections.

In some implementations, the modeler 408 can generate verifiable credentials, designed to encapsulate and validate the cybersecurity efforts of entities. Utilizing statistical analysis and correlation techniques, the modeler 408 can analyze, correlate, and/or cross-reference datasets to identify patterns indicative of potential security threats or vulnerabilities. This process can employs algorithms capable of detecting anomalies in network traffic, unauthorized access attempts, and/or the presence of malicious software by comparing observed behaviors against established norms. For example, the modeler 408 can evaluate a security posture of an organization by analyzing both historical incident data and existing cybersecurity measures. This thorough assessment aids in the stratification of security priorities. The verifiable credentials generated as a result encapsulate the evaluated security posture, offering entities a means to demonstrably showcase their cybersecurity diligence to partners, regulators, and/or other stakeholders. Moreover, the modeler 408 can integrate domain-specific heuristic analysis to bolster its predictive analysis capabilities. This provides the generation of verifiable credentials that are broad in scope and also customized to address the unique threats pertinent to an entity operational domain. Additionally, the incorporation of regulatory compliance tracking into the modeler 408 analytical framework provides that the generated verifiable credentials also reflect adherence to legal and industry standards.

Using the modeler 408, the analysis circuit 136 can model the incident data to generate one or more verified intelligences corresponding to at least one cybersecurity threat. For example, the modeler 408 can model the incident data by generating a cyberthreat and transmit the generated cyberthreat to the analysis circuit 136. Responsive to receiving the generated cyberthreat, the analysis circuit 136 can use the generated cyberthreat to generate one or more verified intelligences to address the cyberthreat. The one or more verified intelligences can include at least one of threat indicators, vulnerability patches, and/or mitigation strategies corresponding to the at least one cybersecurity threat. In some implementations, the generated one or more verified intelligences can be a plurality of steps, a process, and/or a method to protect against the cyber threat.

The analysis circuit 136 can determine the one or more verified intelligences by using the generated cyberthreat. In some implementations, the one or more verified intelligences can correspond to at least one of firmographic data, identified security gaps, and/or existing protection guards. For example, the one or more verified intelligences can be based on firmographic data of the cyberthreat. In another example, the one or more verified intelligences can be based on identified security gaps of the cyberthreat. The firmographic data, the identified security gaps, and/or the existing protection guards can correspond to an entity profile of at least one (e.g., each) of the plurality of entities.

To determine the one or more verified intelligences, the analysis circuit 136 can monitor interactions between an end-user and the interface system 404. The interactions can reveal that the end-user executed intelligences stored within the database 140. For at least one (e.g., each) executed intelligence, the analysis circuit 136 can identify the verified intelligence if the executed intelligence corresponds to the cyberthreat. For example, an entity can execute a mitigation strategy to protect against a cyberthreat. The analysis circuit 136 can detect the mitigation strategy and determine or identify the mitigation strategy as verified intelligence.

The analysis circuit 136 can decode the one or more verified intelligences into entity data formats of one entity in the plurality of entities. In this manner, the analysis circuit 136 can automatically generate the one or more verified intelligences in a format of one entity. For example, a first entity can use seven verified intelligences, whereas a second entity can use eight verified intelligences. At least one (e.g., each) of the verified intelligences for the first entity and at least one (e.g., each) of the verified intelligences for the second entity can differ based on the protections of the first entity and the second entity.

During the decoding of the one or more verified intelligences, the analysis circuit 136 can translate the one or more verified intelligences into formats compatible with the security tool 402. The format can define the configuration for the security tool 402. For example, the format can be an API in the programming language of the security tool 402. The format for a first entity can differ from the format for a second entity to ensure the security tools 402 of at least one (e.g., each) entity are not the same.

The analysis circuit 136 can configure or reconfigure the security tool 402 of the respective entity. The analysis circuit 136 can transmit a configuration to the security tool 402 to modify, adjust, and/or change the API of the security tool. The configuration can allow the security tool 402 to protect the entity again the cyberthreat. In some implementations, the analysis circuit 136 can transmit a subsequent configuration that can include the first configuration. The subsequent configuration can update the security tool 402 to protect again a subsequent cyberthreat and the first cyber threat. In this manner, the analysis circuit 136 can continuously update at least one (e.g., each) security tool 402 from at least one (e.g., each) entity to protect the respective entity from the cyberthreat.

Still referring to FIGS. 4-14, the modeler 408 can be configured to generate of a decentralized identity passport (e.g., passport data package 502 and 506) for at least one (e.g., each) entity (or sub-entity, such as group or subsidiary of an entity or company). The generation by the modeler 408 can include collecting and integrating cybersecurity-related actions and measures performed and executed by these entities into their respective identity passports. These actions can be encapsulated in proofs of control, which demonstrate the adherence of the entity to prescribed cybersecurity practices and measures. Once generated, these proofs are linked with the decentralized identity passport of the entity and recorded on a distributed ledger or data source. Accordingly, the cybersecurity action by an entity can be transparently and immutably documented.

Upon attaching or embedding the proofs of control to the decentralized identity passports, the modeler 408 can validate the cybersecurity measures for at least one (e.g., each) entity. This validation process determines the efficacy and adherence of the implemented cybersecurity actions against established benchmarks or standards. After successful validation, the modeler 408 can record this validation as a new exchange on the distributed ledger or data source, linked to the decentralized identity passport. This recorded validation acts as a verifiable badge of cybersecurity compliance, enhancing the credibility and trustworthiness of the entity within a digital ecosystem. Continuously monitoring environmental data across computing systems of the registered entities, the modeler 408 can uphold one or more cybersecurity standards. This monitoring can be used to identify deviations or non-compliance with cybersecurity parameters. In response to any detected discrepancies, the modeler 408 can issue alerts to the entities involved, advising them on updating their cybersecurity measures.

In some implementations, the modeler 408 can identify a plurality of first-level configurations corresponding to operational or security actions performed on computing systems of an entity. The modeler 408 can encrypt or tokenize these configurations and record them on a distributed ledger or data source. For example, the modeler might encrypt network settings adjustments made to enhance security, ensuring that such changes are securely documented and verifiable. That is, the verifiable configurations can be stored in a ConfigLock data package 504. For example, ConfigLock data package 504 can be encrypted and compartmentalized into segments, at least one (e.g., each) representing different dimensions or areas of the cybersecurity framework of the entity, such as network configurations, access controls, and/or endpoint security settings. Furthermore, the ConfigLock data package 504 can then be indexed and timestamped. This process ensures that changes to configurations are auditable and resistant to tampering.

In some implementations, the modeler 408 can provide a recovery key to the entity, allowing for the recovery of encrypted or tokenized first-level configurations. For example, a client device 110 (particularly the security tool 402) can use the recovery key to receive the first-level configurations from the distributed ledger based on decrypting or detokenizing with the recovery key by the modeler 408. The modeler 408 can regenerate the recovery key upon detecting a potential compromise or at predefined intervals. For example, in the case of a security breach, the modeler 408 can regenerate the recovery key to maintain the integrity of the stored configurations.

In some implementations, the configurations of the plurality of first-level configurations can be system-level operations or security actions, while a plurality of second-level configurations pertain to secondary or maintenance operations. For example, the modeler differentiates between the application of a security patch (first-level) and routine software updates (second-level), ensuring at least one (e.g., each) is appropriately categorized and documented. In some implementations, the first-level configurations include network settings, security tool settings, access control lists, endpoint protection settings, and/or encryption keys. For example, the modeler 408 can record changes to firewall rules or the deployment of new antivirus definitions, capturing data for security management.

In some implementations, the configurations can be a level of configuration such as, cryptographic proof of provenance (e.g., Level 4 or L4), with subsequent levels corresponding to validations (e.g., Level 3 or L3), documented evidence of actions (e.g., Level 2 or L2), and/or commitments made by the entity (e.g., Level 1 or L1). For example, the modeler 408 can verify provenance of the new encryption key through digital signatures, then document its deployment across the network as an action taken. It should be understood the various levels of configuration are described herein but should not be limited to hierarchical categorizations, as configurations can also be interdependent or require cross-validation for security assessments. In particular, the flexibility of the modeler 408 allows for dynamic adaptation to emerging security challenges and technological advancements, ensuring that the modeler 408 remains effective in a rapidly evolving cybersecurity landscape.

In some implementations, the highest or best configuration level can be for cryptographic proof of provenance obtained by the modeler 408 from the entity and programmatically. For example, the modeler 408 can derive and encode the cryptographic proof of provenance for software updates from development logs and code repositories, ensuring that verified updates are applied to the systems of the entity. In another example, the modeler 408 can programmatically attest to the integrity of third-party components by validating their cryptographic signatures against trusted certificate authorities, bolstering supply chain security.

In some implementations, the second highest or second best configuration level can be validation by one or more authorized entities. For example, validation can include cross-referencing the digital signatures of installed applications with a database of verified publishers to confirm authenticity. In another example, validation might include checking the conformity of network configuration changes against industry-standard security protocols, ensuring that the network of the entity remains resilient against known vulnerabilities.

In some implementations, the third highest or third best configuration level can be documented evidence of an action. For example, documented evidence can include logging the sequence of steps taken to apply a security patch, complete with timestamps and system snapshots.

In another example, it might involve retaining change logs that include the rationale and implementation data of new access control policies, providing a clear audit trail for security audits.

In some implementations, the fourth highest or fourth best configuration level can be commitments made by the entity. For example, commitments made by the entity can be encapsulated in a policy document that outlines the approach to data encryption of the entity, specifying the algorithms and key management practices to be adhered to. In another example, commitments might be demonstrated through the publication of a regular security newsletter that includes the ongoing efforts of the entity to maintain and enhance its cybersecurity posture, fostering transparency and accountability.

In some implementations, the identifying process includes acquiring and verifying cryptographic proof of provenance based on digital signatures and transaction records. For example, the modeler 408 can use digital signatures to confirm the authenticity of a newly implemented access control list before recording it. In some implementations, the modeler 408 updates second, third, and/or fourth-level configurations in response to updates in operational or security actions. For example, if an entity revises its data retention policy, the modeler 408 can update the relevant configurations to reflect this change, ensuring the ledger remains current and accurate.

In some implementations, the passport and controls (PC) system 406 can prepare and report cyber incidents according to various governmental regulations. In some implementations, the PC system 406 can determine when a cyber incident is substantial based on a government regulation, which can range from significant losses in the confidentiality, integrity, and/or availability of information systems, to serious impacts on operational safety, disruptions in business activities, and/or unauthorized access stemming from third-party compromises. Upon identifying such incidents, the PC system 406 can gather a set of data for reporting. This data collection can encompass correspondence with threat actors, indicators of compromise, relevant log entries, forensic artifacts, network data, and/or information on how the threat actor compromised the system, among others. Additionally, the PC system 406 can track and document data related to any ransom payments, including the amount, the decision process, and/or the aftermath of the payment.

For example, a substantial cyber incident can lead to one or more of the following: a substantial loss of confidentiality, integrity or availability of an information system or network of a covered entity, a serious impact on the safety and resiliency of an operational systems and processes of a covered entity, a disruption of an ability to engage in business or industrial operations of a covered entity, and/or deliver goods or services, unauthorized access to an information system or network of a covered entity, and/or any nonpublic information contained therein, that is facilitated through or caused by a: compromise of a cloud service provider, managed service provider, and/or other third-party data hosting provider; or supply chain compromise.

Furthermore, in some implementations, the PC system 406 can also be configured to manage and submit follow-up reports dynamically. This can include generating supplemental reports when new or different information about a cyber incident becomes available or if additional ransom payments are made. Thus, the PC system 406 can provide relevant data such that it is accurately preserved and maintained for a minimum period (e.g., set at two years), following the submission of the most recent report. This data preservation can include the initial detection of a compromise to the full resolution and analysis of the incident, including any payments made and the identification of exploited vulnerabilities.

In some implementations, the operational framework of the PC system 406 aligns with timely and incident reporting and data preservation to assist organizations in maintaining compliance with regulatory requirements. By automating the process of collecting, preserving, and/or reporting information about cyber incidents and ransom payments, the PC system 406 reduces manual effort and enhances the accuracy of the information reported. This approach can be used to fulfil legal and regulatory obligations and strengthen the overall cybersecurity posture of organizations by ensuring a structured response to incidents and facilitating continuous improvement through incident analysis and feedback.

In some implementations, the preservation requirement of the PC system 406 can include correspondence with the threat actor, regardless of the forum or method; indicators of compromise; relevant log entries; relevant forensic artifacts; network data; data and information that can help identify how a threat actor compromised or potentially compromised an information system; system information that can help identify exploited vulnerabilities; information about exfiltrated data; data or records related to the disbursement or payment of any ransom payment; and any forensic or other reports concerning the incident, whether internal or prepared for the covered entity by a cybersecurity company or other third-party vendor.

Verified Intelligence

Figure 6:
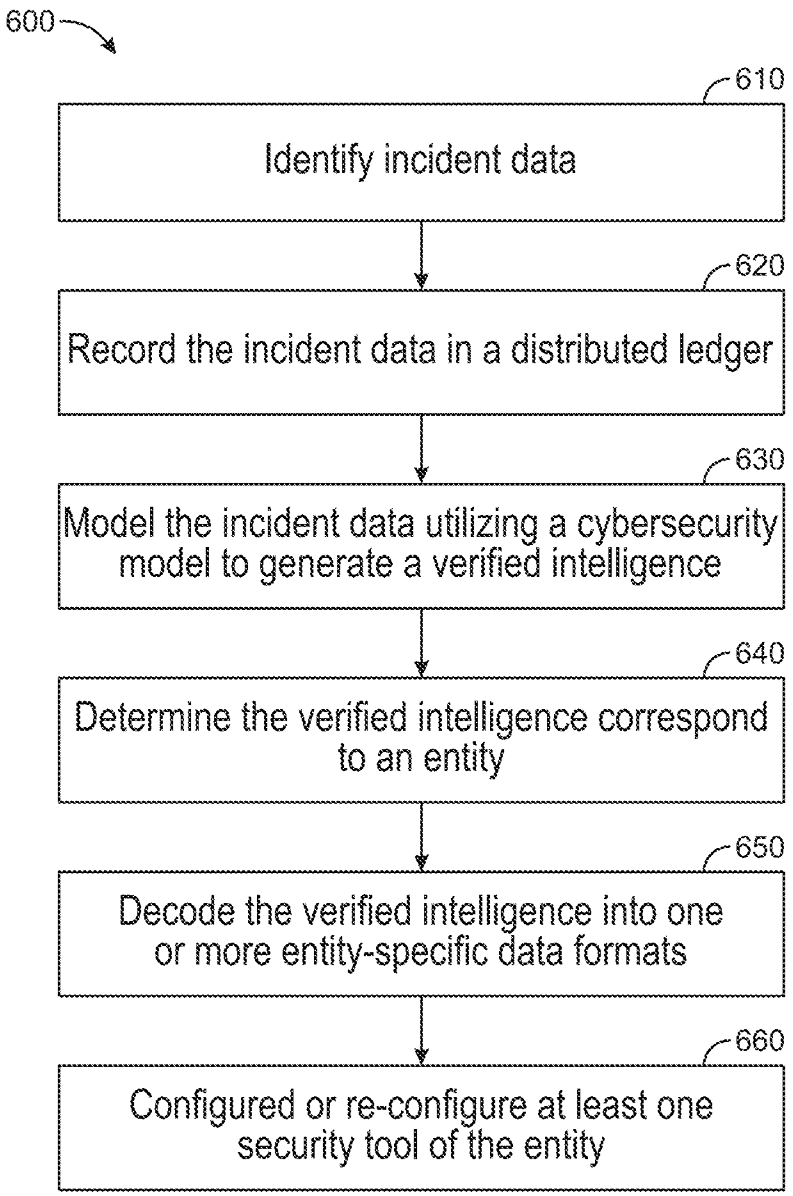
FIG. 6 depicts a flowchart of a method for improving cybersecurity protections across the plurality of entities, according to some implementations.

FIG. 6 depicts a flowchart of a method 600 for improving cybersecurity protections across the plurality of entities. At least the computing/security architecture shown and described regarding FIG. 4 can perform method 600 according to present implementations.

In a broad overview of method 600, at block 610, the one or more processing circuits (e.g., response system 130 of FIG. 4) can identify incident data. At block 620, the one or more processing circuits can record incident data in a distributed ledger. At block 630, the one or more processing circuits can model the incident data utilizing a cybersecurity model to generate a verified intelligence. At block 640, the one or more processing circuits can determine the verified intelligence correspond to an entity. At block 650, the one or more processing circuits can decode the verified intelligence into one or more entity-specific data formats. At block 660, the one or more processing circuits can configure or re-configure at least one security tool of the entity. In some implementations, some, and/or all operations of method 600 can be performed by one or more processors executing on one or more computing devices, systems, and/or servers. In various implementations, at least one (e.g., each) operation can be re-ordered, added, removed, and/or repeated.

At block 610, the processing circuits identify or collect incident data corresponding with a cybersecurity incident. In some implementations, the processing circuits can scan network traffic and log files for abnormal patterns. For example, identifying can include parsing security logs for unauthorized access attempts. In another example, collecting can include aggregating data from intrusion detection systems. Furthermore, the cybersecurity incident can include a detected breach or unauthorized data access attempt.

At block 620, the processing circuits record the incident data in a distributed ledger or data source. In some implementations, the processing circuits can record the incident data in the distributed ledger (e.g., WEB3 data source) by encrypting and hashing the data to ensure integrity and confidentiality. For example, the process can include generating a unique cryptographic hash for at least one (e.g., each) incident record. In some implementations, the processing circuits can record the incident data in the data source (e.g., WEB2 data source) by structuring the data into predefined formats for consistency and easy retrieval. For example, the data can be formatted according to JSON or XML schemas. Furthermore, recording can include timestamping at least one (e.g., each) incident entry to establish a chronological order of events.

At block 630, the processing circuits can analyze the incident data utilizing a cybersecurity model to generate one or more verified intelligences corresponding to at least one cybersecurity threat. In some implementations, the cybersecurity model includes at least one of heuristic analysis, pattern identification, anomaly identification, and/or threat projections. For example, the processing circuits can apply machine learning techniques to the incident data to identify patterns indicative of types of cyber threats. For example, heuristic analysis can be employed to compare incident data against known threat signatures. In another example, anomaly detection algorithms might identify deviations from baseline network behavior as potential threats. In yet another example, threat projections can be generated by extrapolating current data trends. The cybersecurity model can be executed by processing circuits in response to the cybersecurity incident. That is, the model can dynamically adjust its parameters based on the nature and severity of the incident. For example, the model can prioritize incident data indicating a zero-day vulnerability.

In some implementations, the one or more verified intelligences include at least one of threat indicators, vulnerability patches, and/or mitigation strategies corresponding to the at least one cybersecurity threat. For example, the verified intelligence might include a digital signature of a malware file for antivirus software to block. In another example, it can recommend configuration changes to firewall rules to prevent similar incidents. Additionally, the firmographic data, the identified security gaps, and/or the existing protection guards can correspond to an entity profile of at least one (e.g., each) of the plurality of entities. In some implementations, an entity profile can include the technological infrastructure and software dependencies of an entity. For example, it can list network endpoints and their respective security statuses. Furthermore, the verified intelligences can guide the refinement of entity-specific cybersecurity measures. For example, they might suggest enhancements to encryption practices based on identified vulnerabilities.

At block 640, the processing circuits can determine the one or more verified intelligences corresponds to at least one of the plurality of entities based on at least one of firmographic data, identified security gaps, and/or existing protection guards. In some implementations, the generated verifiable intelligence can be cross-referenced and analyzed against entity data to determine, for example, if the cybersecurity threat is exploitable or can present a cyber vulnerability to one or more entities. For example, matching the threat indicators to network architectures or operating systems prevalent within the target entities. In another example, correlating vulnerability patches to software versions identified in the firmographic data of entities. That is, the processing circuits can use incident data collected during the claims process with a distributed ledger and automation to automatically determine the correct verified intelligence for the correct businesses, based on firmographic, gaps, and/or safeguard matching, with technology translated and usable data that can auto-change configurations of security tools to defend against these verified relevant threats. For example, automation to automatically determine can include analyzing historical breach data against current entity profiles to predict susceptibility. That is, determining the correct business includes evaluating entity-specific IT environments against the threat model to ensure relevance. For example, comparing the unique digital footprint of at least one (e.g., each) entity against the incident pattern to identify potential targets.

In some implementations, the firmographics of the entity can include, but is not limited to, industry sector, size, geographical location, and/or technology stack. For example, the verified intelligence can be determined for an entity using the firmographics when matching industry-specific threats to entities within the same sector. Additionally, the gaps of the entity can include, but is not limited to, outdated software, missing patches, and/or weak encryption protocols. For example, the verified intelligence can be determined for an entity using the gaps when identifying entities running software versions vulnerable to a newly discovered exploit. Furthermore, the safeguards of the entity can include, but is not limited to, firewalls, antivirus software, and/or intrusion detection systems. For example, the verified intelligence can be determined for an entity using the safeguard when matching mitigation strategies to existing security infrastructure. Accordingly, the various data of the entity can be matched to the verified intelligence to customize cybersecurity advice and action plans, ensuring that recommendations are actionable and address the security gaps of the entity.

At blocks 650 and 660, the processing circuits can decode the one or more verified intelligences into one or more entity-specific data formats of the at least one of the plurality of entities and configure or re-configure at least one security tool of the at least one of the plurality of entities. For example, configuration or re-configuration can include protecting the at least one of the plurality of entities from the at least one cybersecurity threat. Additionally, decoding into the one or more entity-specific data formats can include translating the one or more verified intelligences into formats compatible with the at least one security tool of the at least one of the plurality of entities. For example, decoding can include converting threat indicators into firewall rule updates to block malicious IP addresses. In another example, decoding can include translating vulnerability patches into update commands for antivirus software. That is, decoding transforms threat data into actionable security measures tailored to at least one (e.g., each) system and protection tool of the entity.

In some implementations, configuring the security tool of an entity can include setting up intrusion detection systems to monitor for patterns of malicious activity identified in the verified intelligence. For example, adjusting sensitivity levels of the detection algorithms based on the severity of the threat. In another example, configuring can include updating access control lists to restrict traffic from suspect sources. In some implementations, re-configuring the security tool of an entity can include modifying existing firewall rules to address new vulnerabilities revealed by the verified intelligence. For example, adding or removing rules to better protect against the identified threats.

In some implementations, the processing circuits can automatically generate and apply patches or updates to the at least one security tool. Generating can include creating custom patches for proprietary software based on the vulnerabilities identified. For example, compiling code changes that neutralize a newly discovered exploit. In some implementations, applying the patches or updates can include remotely pushing updates to endpoint protection tools across the network of the entity. For example, automating the deployment of patches during off-peak hours to minimize disruption. That is, the security tool can be kept up-to-date with the latest defenses against emerging threats. For example, ensuring devices and software within the network of the entity are equipped with the latest protective measures.

Passport Data Package

In some implementations, method 600 can further include a method for generating passport data packages (e.g., passport data package 502 and 506 of FIG. 5) with decentralized proof of controls attached for the entities proof of performance. It should be understood that the generation of passport data packages described with reference to method 600 can be executed and completed independently of method 600. For ease of understanding, the generation of passport data packages will be referred to in steps.

Generally, the passport data package can be a digitally encrypted file encapsulating the identity of the entity and its cybersecurity practices. For example, the passport data package can include embedded digital certificates and cryptographic proofs. Furthermore, the passport data package can be used as a verifiable credential for demonstrating compliance with cybersecurity standards and practices to partners and regulators.

In some implementations, at step 1, the processing circuit can generate a decentralized identity passport for at least one (e.g., each) of a plurality of entities. Generation can include compiling a record of the cybersecurity protocols of the entity and identity verification documents. For example, incorporating business registration documents and cybersecurity policy documents into the passport. Alternatively or in combination, generation can include digitally signing the compiled documents to ensure authenticity and integrity. For example, using SHA-256 for hashing and RSA for digital signatures. In some implementations, generating the decentralized identity passport includes using a public-private key pair unique to at least one (e.g., each) entity of the plurality of entities. For example, the public key can be recorded on the distributed ledger and the private key remains confidential to the entity.

At step 2 of the generation of the passport data package, the processing circuits can attach or embed a plurality of proof of controls to the decentralized identify passport of an entity of the plurality of entities, the plurality of proof of controls corresponding to one or more cybersecurity protection actions implemented by the entity. In some implementations, attaching can include digitally linking cybersecurity protection actions documentation to the passport. For example, appending metadata of security audits and certifications to the passport. Furthermore, the processing circuits can sign the plurality of proof of controls using a digital signature scheme before attaching the plurality of proof of controls to the decentralized identity passport. For example, employing ECDSA for digital signatures. In some implementations, embedding can include integrating QR codes or unique identifiers that link to proofs of control hosted securely online. For example, QR codes that direct to encrypted online repositories containing audit logs. The cybersecurity protection actions can include network encryption enhancements and multi-factor authentication implementation. That is, the entity can demonstrate compliance with industry security standards. Furthermore, the proofs of control are verified and timestamped to ensure their validity.

In some implementations, the processing circuits can validate the one or more cybersecurity protections of at least one (e.g., each) of the plurality of entities and record the validation on the distributed ledger or data source as a new exchange linked to the decentralized identity passport. That is, validating the one or more cybersecurity protections can include comparing the one or more cybersecurity protection actions to a predefined set of security standards or benchmarks. In some implementations, the predefined set of security standards or benchmarks can include ISO/IEC 27001 and NIST cybersecurity frameworks. For example, comparing cybersecurity measures of the entity against these frameworks to ensure compliance. In some implementations, recording can include encrypting and hashing the validation data before storage. For example, using blockchain technology to immutably store the validation results. That is, the new exchange linked to the decentralized identity passport can include a timestamped record of the validation, along with references to the standards or benchmarks used for validation. For example, a blockchain transaction containing validation metadata and outcomes.

At step 3 of the generation of the passport data package, the processing circuits can record the plurality of proof of controls on a distributed ledger or data source as one or more exchanges linked to the decentralized identity passport. In some implementations, recording the proof of controls on the distributed ledger can include creating a smart contract for at least one (e.g., each) proof of control, ensuring traceability and non-repudiation. For example, deploying smart contracts on Ethereum to represent at least one (e.g., each) proof of control. In some implementations, recording the proof of controls on the data sources can include utilizing secure cloud storage services with access control lists tailored for privacy and security. For example, storing proofs of control in buckets with encrypted data transfer. Additionally, linking to the decentralized identity passport can include assigning a unique identifier to at least one (e.g., each) proof of control that corresponds to the passport digital identity. For example, using UUIDs to link proofs of control to the passport within the distributed ledger. In another example, creating hyperlinks within the passport document that lead to the recorded proofs of control on the ledger.

In some implementations, the processing circuits can monitor environmental data of a plurality of computing systems of the plurality of entities with the decentralized identity passport. For example, utilizing network monitoring tools to detect and record changes in firewall settings or antivirus software updates. That is, the decentralized identity passport can be used by the processing circuits to authenticate and authorize access to monitored data. For example, the environmental data can correspond to the decentralized identity passport by mapping network traffic patterns and system performance metrics to the passport unique identifier. The environmental data monitored can include at least one, but is not limited to, network traffic, system performance metrics, software integrity, and/or security event logs corresponding with the plurality of computing systems. For example, monitoring can include analyzing logs for indicators of compromise or unauthorized access attempts.

In some implementations, in response to determining at least one of the plurality of entities out of compliance with a cybersecurity parameter, the processing circuits can issue an alert to at least one of the plurality of entities including a recommendation to update the one or more cybersecurity protection actions. In some implementations, the alert can specify the non-compliance issue and provide steps for remediation. Furthermore, the recommendation can include best practices for updating security protocols or installing software patches. For example, the recommendation can be generated based on real-time threat intelligence and tailored to the infrastructure of the entity and previously recorded cybersecurity actions.

In some implementations, the processing circuits can update the decentralized identity passport to include additional proof of controls based on successful validation of a newly implemented cybersecurity protection actions by the entity of the plurality of entities. In some implementations, an update to the decentralized identity passport can include appending new proofs of control and re-validating the overall security status of the passport. For example, adding digital records of recently passed security audits or newly implemented security measures. Additionally, the additional proof of controls can be determined by assessing the impact and effectiveness of the newly implemented measures. For example, successful validation of a newly implemented cybersecurity protection actions by the entity of the plurality of entities can include conducting a thorough review of the updated security protocols, supported by external audit findings and internal performance metrics. In another example, updating the cybersecurity profile of the entity within the passport to reflect the latest security posture and compliance status.

In some implementations, the passport data package can serve as a dynamic, verifiable credential for entities to demonstrate their cybersecurity posture and compliance with relevant standards. Entities can present the passport data package, which includes digital certificates, cryptographic proofs, and/or a record of cybersecurity controls, to partners, regulators, and/or clients. Upon presentation, the recipient can verify the authenticity and integrity of the passport using public keys recorded on a distributed ledger, ensuring the digital signatures and cryptographic hashes match the reported cybersecurity measures of the entity. Verification can involve checking the digital signatures against the public keys and ensuring the cryptographic proofs align with the stated security controls and actions. This process can be facilitated by software or digital platforms capable of reading and validating the contents of the passport data package, ensuring the entity adheres to the claimed security practices and standards. Such verification can support trust in digital transactions, facilitate secure partnerships, and/or streamline compliance audits by providing a transparent, immutable record of cybersecurity efforts of the entity.

ConfigLock Data Package

In some implementations, method 600 can further include a method for generating ConfigLock data packages (e.g., ConfigLock data package 504 of FIG. 5) to store configs decentralized to recover, for example during an incident affecting the entities computing structure or network. It should be understood that the generation of ConfigLock data packages described with reference to method 600 can be executed and completed independently of method 600. For ease of understanding, the generation of ConfigLock data packages will be referred to in steps.

Generally, the ConfigLock data package can be a secure, encrypted container for storing various configuration settings and proofs of compliance. For example, the ConfigLock data package can include embedded digital signatures and cryptographic hashes to ensure the integrity and authenticity of the data. Furthermore, the ConfigLock data package can be used as a means to quickly restore system configurations to a known secure state in the event of a cybersecurity incident, facilitating rapid recovery and minimizing downtime.

In some implementations, at step 1, the processing circuit can identify a plurality of first level configurations corresponding to at least one of an operational or security action performed on the a plurality of computing systems of an entity of a plurality of entities. Identifying can include scanning and analyzing system logs and configuration files for changes. For example, an operational action can be an update to server software. In another example, a security action can be the application of a new firewall rule.

In some implementations, identifying of step 1 can include (1) accessing one or more data channels of a plurality of computing systems of an entity of a plurality of entities, (2) identifying, by the one or more processing circuits, at least one of an operational or security action performed on the plurality of computing systems of the entity of the plurality of entities, and/or (3) modelling the at least one of an operational or security action using a cryptographic proof of provenance model to generate a plurality of first level configurations. Specifically, accessing can include connecting to system and application logs, network traffic analyses, and/or security event management systems. For example, aggregating data from endpoint detection and response (EDR) systems and security information and event management (SIEM) solutions. Additionally, identifying the operation or security action can include parsing and categorizing event logs based on predefined criteria. For example, classifying actions as routine maintenance or security enhancements or verifying the cryptographic proof of provenance based on one or more digital signatures. Furthermore, modeling can include applying algorithmic analysis to establish the chronological sequence and interdependencies of actions. That is, employing data science techniques to discern patterns that validate the authenticity and integrity of the actions. For example, utilizing blockchain technology to create an immutable record of configurations. In another example, applying machine learning models to predict the impact of configuration changes on system security. In some implementations, the cryptographic proof of provenance model can be a heuristic algorithm or artificial intelligence model that evaluates the reliability and security implications of at least one (e.g., each) action. For example, assessing the compatibility of new software updates with existing security protocols. In some implementations, the cryptographic proof of provenance model can be a statistical analysis algorithm configured to identify outliers in configuration changes that can indicate unauthorized or malicious alterations. In some implementations, the cryptographic proof of provenance model can be a cybersecurity analysis algorithm configured to assess the efficacy of new security configurations against emerging threat vectors. For example, simulating attack scenarios to evaluate the resilience of firewall settings.

In some implementations, a first level configuration can be system-level operations or security actions performed on the plurality of computing systems, and/or a second level configurations can be secondary or maintenance operations or security actions on the plurality of computing systems. For example, a first level configuration can be the implementation of a new network encryption protocol. That is, the first level configurations can include at least one of network settings, security tool settings, access control lists, endpoint protection settings, and/or encryption keys. In another example, a second level configuration can pertain to the scheduling of regular system backups. Accordingly, the configurations can ensure security and operational efficiency across the computing systems of the entity.

Alternatively or in combination, the configurations can be hierarchical according to the type of proof provided by the entity. For example, a first level configuration can be cryptographic proof of provenance obtained by the one or more processing circuits from the entity and programmatically. In this example, the proof of provenance might verify the source and integrity of a new software application before installation. Additionally, a second level configuration can be a validation by one or more authorized entities, for example, through third-party security audits. Furthermore, a third level configuration can be documented evidence of an action, for example, logs showing the successful application of a security patch. Moreover, a fourth level configuration can be commitments made by the entity, for example, a pledge to adhere to data protection standards. Generally, the processing circuits can prioritize or weight the first level or better level configurations to emphasize their importance in maintaining system integrity. That is, configurations at higher levels can receive more scrutiny during the verification process.

In some implementations, the processing circuits can verify the cryptographic proof of provenance based on one or more digital signatures and transaction records stored within the distributed ledger or data source. For example, verifying the digital signature of a software update to confirm its authenticity. Furthermore, the processing circuits can generate the cryptographic proof of provenance for the plurality of first level configurations. That is, the generation can include creating a secure hash of the software package. For example, using SHA-256 to ensure the integrity of the configuration data.

In some implementations, the processing circuits can update at least one of the plurality of second level configurations, the plurality of third level configurations, and/or the plurality of fourth level configurations, in response to an update in the operational or security action performed on the plurality of computing systems of the entity. For example, adjusting firewall settings in response to new threat intelligence. In another example, updating access control lists to restrict access to sensitive data following a policy change. That is, updates can include the recalibration of security measures to align with the latest security landscape and entity policies.

At step 2 of the generation of the ConfigLock data package, the processing circuits can encrypt or tokenize the plurality of first level configurations. In some implementations, encrypting can include using AES-256 to secure configuration data against unauthorized access. For example, encrypting network configuration settings to prevent tampering. In some implementations, tokenizing can include converting configuration settings into tokens stored on the blockchain, ensuring confidentiality and integrity. For example, representing access control settings as tokens. Accordingly, the ConfigLock data package can be securely stored and readily accessible by entities possessing the correct decryption or detokenization keys.

At step 3 of the generation of the ConfigLock data package, the processing circuits can record the plurality of first level configurations on the distributed ledger or data source. For example, recording the configurations on a distributed ledger can include hashing at least one (e.g., each) configuration setting and storing it on a blockchain to ensure tamper-proof records. In another example, recording the configurations on a data source can include saving them in a secure, encrypted database with restricted access.

In some implementations, the processing circuits can providing a recovery key to the entity. For example, the recovery key can configured to allow the recovery of the encrypted or tokenized plurality of first level configurations by the entity. That is, the recovery key can facilitate secure and controlled access to the stored configurations. For example, a recovery key can be generated by the processing circuits by employing a secure key generation algorithm. For example, using RSA encryption to create a unique recovery key for at least one (e.g., each) entity. In another example, distributing the recovery key to authorized personnel through a secure channel.

In response to receiving the recovery key, the processing circuits can provide the plurality of first level configurations from the distributed ledger or data source based on decrypting or detokenizing the plurality of first level configurations using the recovery key. In some implementations, providing or transmitting the configurations can include securely sending the decrypted or detokenized configurations over a secure communication channel. For example, using TLS to protect the transmission of configuration data. That is, the configurations allow the entity to restore its systems to a secure state following an incident. In some implementations, the processing circuits can regenerate the recovery key based on a detection of a potential compromise or at predefined intervals. For example, automatically updating the recovery key annually or following the detection of a security breach. In another example, implementing a multi-factor authentication process for recovery key regeneration to enhance security.

In some implementations, to restore from a ConfigLock data package, the entity can first authenticate using a predetermined recovery key to access the encrypted package. Upon successful authentication, the entity can decrypt the package, which contains serialized configuration settings, digital signatures, and/or cryptographic hashes of the original state of system configurations. These configurations can include network settings, firewall rules, access control lists, and/or software version information. The restoration process can include deserializing the configuration data and programmatically applying it to the respective systems and devices, ensuring that at least one (e.g., each) component is reverted to its verified secure state. This process can include automated scripts or configuration management tools that validate at least one (e.g., each) integrity of a setting using the included cryptographic hashes before applying them, ensuring the restoration does not inadvertently introduce vulnerabilities.

In some implementations, an NFT can be minted for at least one (e.g., each) Passport Data Package or ConfigLock Data Package, encapsulating a unique digital representation of a cybersecurity credentials or configuration settings of an entity. The minting process can include the processing circuits generating a digital hash of the package contents, including digital certificates, cryptographic proofs, and/or configuration data, and/or embedding this hash within the NFT. Following the minting, the processing circuits can record the NFT on a distributed ledger, assigning a unique identifier to at least one (e.g., each) NFT that correlates with the respective Passport or ConfigLock Data Package. Furthermore, the processing circuits facilitate the verification of the NFT by external parties, allowing for the authentication of the encapsulated data against the blockchain to confirm its validity and integrity. This mechanism facilitates entities to prove compliance with cybersecurity standards and the secure status of their system configurations in a decentralized, tamper-proof manner. Accordingly, by integrating NFT technology with the method 600 framework and leveraging insights from FIG. 7, the processing circuits can utilize blockchain to enhance cybersecurity management.

In some implementations, generative AI can be employed in creating and validating both Passport Data Packages and ConfigLock Data Packages within the framework of method 600. Initially, generative AI can automate the compilation of cybersecurity protocols and identity verification documents of an entity. This automation can include parsing through databases to extract relevant information, synthesizing cybersecurity policy documents, and/or integrating business registration documents. Furthermore, generative AI can assist in digitally signing these compiled documents, employing cryptographic algorithms to ensure their authenticity and integrity. During the second steps, generative AI can be used in attaching or embedding a plurality of proof of controls to the decentralized identity passport. The generative AI can analyze the cybersecurity protection actions implemented by the entity, generating metadata for at least one (e.g., each) action. This metadata can then be digitally linked to the passport or embedded as QR codes or unique identifiers, directing to encrypted online repositories containing audit logs and certifications. Moreover, generative AI can optimize the digital signature process, selecting a secure and efficient digital signature scheme based on the latest advancements in cryptographic technology. The AI can also dynamically update these proofs of control based on new cybersecurity actions or validations, ensuring that the passport data package remains current and reflective of the compliance status of an entity. In validating the cybersecurity protections of entities, generative AI can compare the documented cybersecurity protection actions against a predefined set of security standards or benchmarks, such as ISO/IEC 27001 and NIST frameworks. This can include an analysis of the cybersecurity measures of an entity, utilizing machine learning algorithms to identify discrepancies or areas of non-compliance. Following validation, GAI can automate the recording of this data on a distributed ledger or data source, encrypting and hashing the validation results for security.

To safeguard the integrity and confidentiality of Passport Data Packages and ConfigLock Data Packages against potential future quantum computing threats, the processing circuits can implement quantum-resistant cryptographic algorithms. These algorithms can be designed to withstand the decryption capabilities of quantum computers, ensuring that digital signatures, cryptographic proofs, and/or the encryption of data remain secure. By incorporating post-quantum cryptography into the encryption process, the processing circuits secure the data against advanced computational attacks, maintaining the long-term viability and security of the stored information. The processing circuits can also integrate decentralized identity verification mechanisms to enhance the security and efficiency of verifying Passport Data Packages. Utilizing blockchain technology, this approach can be used by entities to prove their identity and the authenticity of their digital credentials autonomously, without centralized verification authorities. Through this mechanism, the processing circuits facilitate a secure, privacy-preserving method of identity verification, allowing entities to manage their digital identities and associated proofs of control on a blockchain. In some implementations, the processing circuits can use machine learning and statistical modeling to improve anomaly detection capabilities within the cybersecurity framework. These systems can be used to analyze datasets in real time, detecting unusual patterns that can indicate cybersecurity threats or vulnerabilities. By employing algorithms that learn from historical data, the processing circuits equip entities with dynamic monitoring tools that adapt to new and evolving threats.

Figure 7:
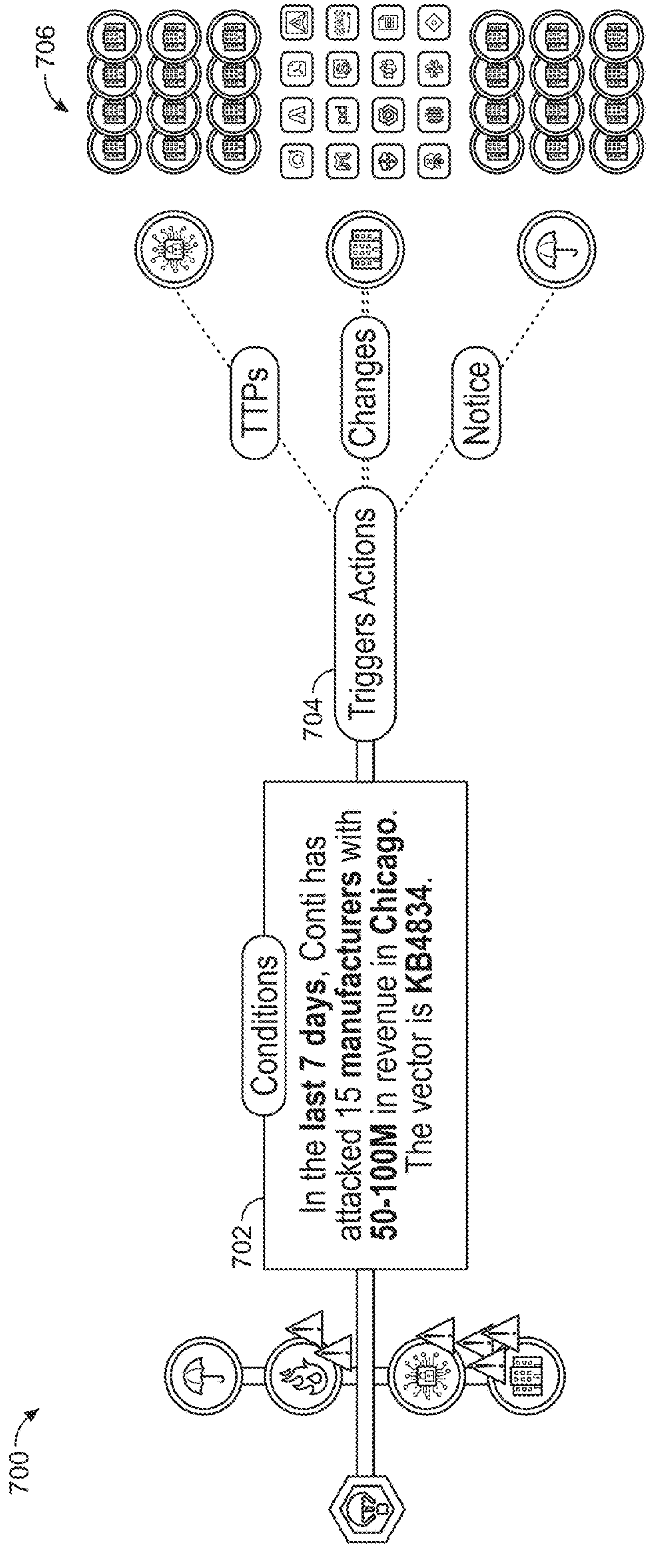
FIG. 7 depicts a block diagram of another architecture of certain systems or devices of FIG. 4, according to some implementations.

Referring now to FIG. 7, a block diagram depicting a cyber threat intelligence (CTI) model 700 to modify security tools, according to some implementations. The response system 130 of FIG. 4 can be configured to perform the various actions and functions described in FIG. 10. At block 702, a processing circuit of the response system 130 can be configured to determine various cyber threats such as phishing attacks, ransomware, and/or DDOS attacks. For example, the depiction of a locked processor with an explanation point can indicate. Additionally, the processing circuits can determine one or more conditions. For example, the cyber threat intelligence (CTI) model 700 depicts the condition that "In the last 7 days, Conti has attached 15 manufacturers with 50-100M in revenue in Chicago. The vector is KB4B4834." In this example, the affected sector is manufacturing, and/or the impact location is Chicago. In particular, the vector can be a malware signature or attack methodology.

Next, at block 704, the processing circuits of the response system 130 of FIG. 4 can determine or model one or more trigger actions to perform on the security tools of companies, security vendors, and/or insurers/brokers. The security tools can be firewalls, intrusion detection systems, and/or antivirus software. In some implementations, the trigger actions can be, but are not limited to, TTPs, changes, notices, and/or so on. The processing circuit of the response system 130 can model and determine trigger actions by analyzing threat intelligence and predicting likely attack vectors. For example, the processing circuits can determine TTPs of the security tools to address emerging threats identified through real-time data analysis. In another example, the processing circuit can determine changes of the security tools to enhance their responsiveness to threat indicators. In yet another example, the processing circuits can generate notices to be provided to the security to inform about updates or patches. At block 706, the security tools of the various entities can implement the trigger actions. For example, automatic updates to threat definitions. In yet another example, configuration changes to optimize threat detection and response. In some implementations, the TTPs can be provided to an entity, the changes can be provided to a vendor, and/or notices can be provided to a protection entity.

For example, in the context of the scenario of the CTI model, Conti, a cybercriminal group, has launched targeted attacks against 15 manufacturing companies within the Chicago area, all of which report revenues between 50 to 100 million dollars. This selection indicates preference of a Conti for industries with significant financial turnovers but potentially weaker cybersecurity measures compared to larger conglomerates. The vector, identified as KB4B4834, would indicate a malware or attack methodology that has been previously associated with operations of the Conti, for example, exploiting vulnerabilities that these mid-sized entities have overlooked. This incident can be modeled by the processing circuits to customize cybersecurity responses that are predictive, leveraging real-time threat intelligence to anticipate and mitigate such targeted attacks. The use of a vector such as KB4B4834 can allow cybersecurity systems (e.g., response system 130 of FIG. 4) to trace the attack pattern back to its source, allowing for a more directed and efficient countermeasure implementation. In this example, the cybersecurity model can be used to provide actionable intelligence based on firmographic data and threat vectors for the affected manufacturing entities in Chicago.

In some implementations, the CTI model 700 of FIG. 7 can be incorporated into various methods through its functionality for dynamically adapting security tools in response to cyber threat intelligence. For example, the CTI model 700 can be incorporated into a process for capturing, verifying, and/or updating the cybersecurity capabilities of an organization, including configurations and technologies in use. The CTI model 700, as part of this method, can determine the nature of cyber threats (e.g., phishing, ransomware) and model trigger actions for security tool adjustments. This is similar to steps of receiving capabilities, verifying their state, and/or adjusting configurations based on identified gaps. Further, the CTI model 700 can be shown in the analysis and application phases where cyber threats are analyzed, and/or appropriate responses are formulated. For example, the CTI model 700 can provide real-time threat intelligence that informs the process of verifying the state of cybersecurity capabilities and deciding on adjustments. When the CTI model 700 identifies a threat, such as a malware vector, mechanisms for changing state or configuration can be executed, providing an immediate and informed response to the identified threat. Thus, the integration of CTI model 700 within the broader scope of other cybersecurity processes and methods improves the capability of the disclosed systems and methods to dynamically adapt cybersecurity measures to respond to threats. That is, by leveraging threat intelligence to inform verification and adjustment steps of cybersecurity capturing, updating, and/or verification methods, the CTI model 700 can facilitate the use of security configurations and technologies that remain effective against current cyber threats.

Cyber Resilience Tokenization

Figure 8:
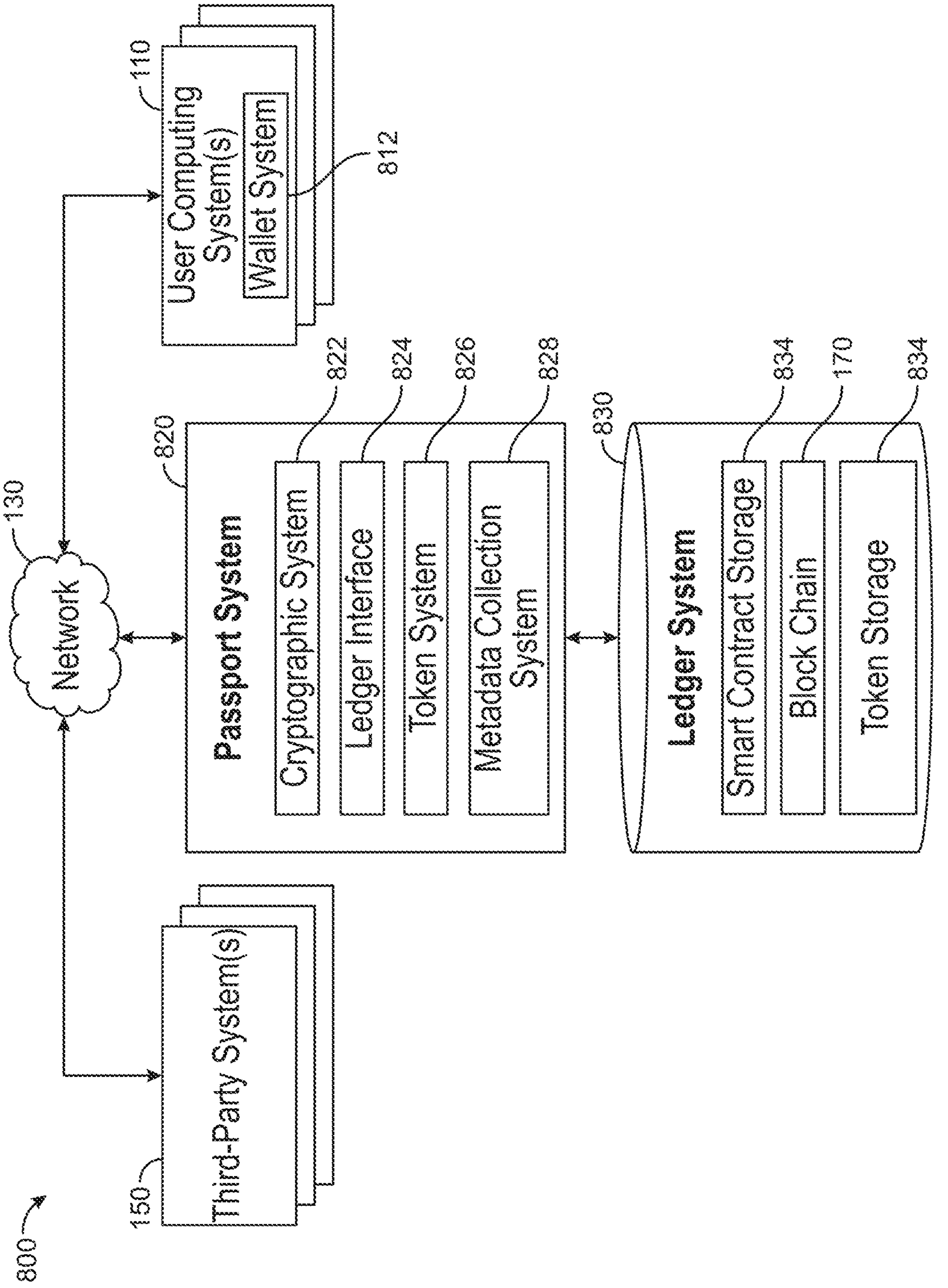
FIG. 8 depicts a block diagram of an implementation of a system for cyber resilience tokenization, according to some implementations.

Referring to FIG. 8, a block diagram of an implementation of a system for cyber resilience tokenization is shown, according to some implementations. The implementation shown in FIG. 8 can include client device(s) 110, third-party system(s) 150 (also referred to herein as "third party devices 150"), a passport system 820, and/or a ledger system 830. In some implementations, the client device(s) 110 can include a wallet system 812. In some implementations, the passport system 820 can include a cryptographic system 822, a ledger interface 824, a token system 826, and/or a metadata collection system 828. In some implementations, the ledger system 830 can include smart contract storage 832, blockchain 170, and/or token storage 834. These components can be interconnected through a network 120 that supports secure communications profiles (e.g., TLS, SSL, HTTPS, etc.). In some implementations, the passport system 820 can incorporate the same or similar features and/or functionality as described regarding the response system 130 of FIG. 1. Although the various computing elements of FIG. 8 can be described in the singular form (e.g., client device 110, third-party system 150, etc.), it should be understood that the implementation shown in FIG. 8 can include two or more of any device/system described herein (e.g., two or more client device(s) 110, two or more third-party system(s) 150, etc.).

Each system or device of FIG. 8 can include one or more processors, memories, network interfaces (sometimes referred to herein as a "network circuit") and user interfaces. The memory can store programming logic that, when executed by the processor, controls the operation of the corresponding computing system or device. The memory can also store data in databases. For example, memory can store programming logic that when executed by a processor within a processing circuit, causes a database to update parameters or store a system or event log. For example, the memory can include any non-transitory computer-readable medium (CRM). The network interfaces can allow the computing systems and devices to communicate wirelessly or otherwise. The various components of devices in FIG. 1 (e.g., within a computing environment) can be implemented via hardware (e.g., circuitry), software (e.g., executable code), and/or any combination thereof. Devices, systems, and/or components in FIG. 8 can be added, deleted, integrated, separated, and/or/or rearranged in various implementations of the disclosure.

Generally, the client device(s) 110, third-party system(s) 150, passport system 820, and/or ledger system 830, wallet system 812, cryptographic system 822, ledger interface 824, token system 826, metadata collection system 828, smart contract storage 832, blockchain 170, token storage 834, and/or/or network 120 can include one or more logic devices, which can be one or more computing devices equipped with one or more processing circuits that run instructions stored in a memory device to perform various operations. The processing circuit can be made up of various components such as a microprocessor, an ASIC, and/or an FPGA, and/or the memory device can be any type of storage or transmission device capable of providing program instructions. The instructions can include code from various programming languages commonly used in the industry, such as high-level programming languages, web development languages, and/or systems programming languages. The client device(s) 110, third-party system(s) 150, passport system 820, and/or other various components of FIG. 8 can also include one or more databases for storing data that receive and provide data to other systems and devices on the network 120.

Generally, the passport system 820 can execute and/or be utilized to execute various processes and/or tasks corresponding with modeling cyber resilience data. For example, the passport system 820 can provide a single sign-on gateway (e.g., using an identity management system like AuthO) facilitating access to an associated security posture, threat, incident, and/or insurance data sets using data sets encapsulated within various tokens. For example, the passport system 820 can generate a token (e.g., a passport) linked to various additional tokens and further linked to a control structure restricting access to one or more of the additional tokens based on rules (e.g., RBACs). For example, a cyber resilience identifier (e.g., passport) of an entity can include entity data and/or additional cyber resilience data stored in tokens, and/or the passport system 820 can provide and/or restrict access to one or more portions of the tokenized data based on various conditions, entity types, data types, regulations, and/or so on. That is, an entity can have a control structure with access controls and a passport created by the passport system 820 linked to both sensitive (e.g., private) and non-sensitive (e.g., public) data, and/or the passport system 820 can deny access (e.g., to sensitive data) and provide access (e.g., to non-sensitive data) based the access control (e.g., whether the user to access the data is a customer, insurer, vendor, MDR/XDR provider, etc.).

Generally, the passport system 820 can provide secure access to token-related data and facilitate interactions between different cybersecurity systems and data sources of FIG. 8 (e.g., client devices 110, third party systems 150, ledger system 830, etc.) based on various access controls. For example, the passport system 820 can create a cyber resilience identity with tokens and rule-based access controls controlling access to the tokens. For example, the passport system 820 can generate a passport for a third party linked to controls such that the third party can access (e.g., only) their own data within the token structure. In some implementations, a third-party entity can use the passport system 820 to access performance tokens stored in the token structure, such as in a passport associated with the cybersecurity status of an entity, with RBAC rules restrict other entities from viewing or modifying these tokens. Another example can include third-party vendors having access to their own evaluation tokens that include the results of security assessments relevant to their services, without the ability to access data from other vendors.

In some implementations, the passport system 820 can include one or more processing circuits, including processor (s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the passport system 820 can include an interface circuit and function circuit.

In some implementations, the passport system 820 can model cyber resilience data using cyber resilience identities and associated metadata. For example, the passport system 820 can use templates to structure cyber resilience data and apply attributes to model various cyber resilience metrics (e.g., threat detection capabilities, response readiness). In some implementations, the passport system 820 can receive or identify cyber resilience data. For example, the passport system 820 can collect data from various sources, including security incident reports, vulnerability assessments, and/or system performance metrics. In some implementations, the passport system 820 can encrypt a portion of the cyber resilience data. For example, the passport system 820 can apply cryptographic techniques to secure sensitive information within the cyber resilience dataset, such as private keys or confidential incident data. In some implementations, the passport system 820 can generate a metadata object including metadata of cyber resilience data. For example, the metadata object can include information such as data creation timestamps, data source identifiers, and/or encryption keys. In some implementations, the passport system 820 can generate a cyber resilience identity including at least a link with the metadata object, a unique identifier (UID), and/or a performance event dataset. For example, the cyber resilience identity can include a URI linking to the metadata object, a UID for tracking the identity, and/or a dataset summarizing key performance events.

In some implementations, the passport system 820 can encapsulate the cyber resilience identity within a control structure restricting one or more updates and redemptions of the metadata object. For example, the control structure can use access controls and permission rules to prevent unauthorized modifications or access to the metadata object. In some implementations, the passport system 820 can determine at least one access data structure being compatible with the control structure. For example, the passport system 820 can analyze data structures such as access control lists (ACLs) or role-based access controls (RBAC) to facilitate compatibility with the control structure. In some implementations, the passport system 820 can broadcast, using the control structure, the cyber resilience identity to a ledger or distributed ledger. For example, the passport system 820 can publish the cyber resilience identity to a blockchain or distributed ledger, and/or the identify can be securely recorded and accessed by authorized entities via the distributed ledger.

In some implementations, the token system 828 can generates various tokens. In some implementations, the token system 828 can generate cyber resilience identities (e.g., a passport including a token linked to various additional tokens with metadata). That is, generating the cyber resilience identities can include generating tokens that include metadata objects or metadata with information corresponding to components and/or metrics of a cybersecurity posture of an entity, such as firmographic information, security safeguards, threat detection capabilities, incident response data, compliance metrics, and/or other relevant cybersecurity information. For example, the token system 828 can generate, mint, and/or otherwise create unified safeguard tokens, unified requirements tokens, performance tokens, coverage tokens, incident readiness tokens, insurability readiness tokens, gap tokens, effectiveness tokens, and/or/or various additional tokens. For example, the token system 828 can structure a token to encapsulate data sets related to different aspects of cybersecurity such that a set of tokens can facilitate an evaluation of a security status of an entity (e.g., by an insurer or vendor). The various tokens generated by the token system 828 and encapsulated in cyber resilience identities are described in greater detail herein.

In some implementations, the cyber resilience identities can include a coverage token. The coverage token can be structured to store information about insurance policies, including policy numbers, premium amounts, and/or coverage data. That is, the token system 828 can generate a coverage token when insurance coverage data of an entity is to be documented and managed. For example, the coverage token can be created to include policy information such as the insured client, domain, and/or premium data. In generating the cyber resilience identities, the coverage token generated by the token system 828 can include data on insurance coverage, retention terms, and/or claims associated with the policy. For example, the coverage token can store data related to premium payment schedules, policy numbers, and/or claim UIDs that are linked to an insurance policy of an entity corresponding to a cyber resilience identity.

In some implementations, the cyber resilience identities can include an effectiveness token. The effectiveness token can be structured to store a record of a security effectiveness of an entity over time, linking to historical data through performance tokens and capturing outcomes related to incidents and claims. That is, the token system 828 can generate an effectiveness token to document and evaluate the results of past and ongoing security measures within an organization. For example, the effectiveness token can be generated to include the unique effectiveness token UID, the creation date, a list of performance tokens, and/or outcomes related to security incidents and claims. In generating the cyber resilience identities, the effectiveness token generated by the token system 828 can include references to associated performance tokens, incident tokens, and/or claims tokens, providing a longitudinal view of security effectiveness. For example, the effectiveness token can include data indicative of how various incidents have impacted the security posture of an organization over time, including the effectiveness of response efforts and any gaps identified during evaluations.

In some implementations, the cyber resilience identities can include a gaps token. The gaps token can be structured to record and track information about vulnerabilities and compliance issues within an IT infrastructure of an organization. That is, the token system 828 can generate a gaps token to identify and monitor security gaps that can affect a cybersecurity posture of an organization. For example, the gaps token can be generated to include a unique gap UID, timestamp, description of the vulnerability, impact description, severity rating, and/or recommended actions for remediation. In generating the cyber resilience identities, the gaps token generated by the token system 828 can include metadata about at least one (e.g., each) identified gap, including the category of the threat, impact on confidentiality, integrity, and/or availability, and/or references to external resources for further information. For example, the gaps token can capture the severity of a local privilege escalation vulnerability in an IT infrastructure and provide recommendations for mitigating the threat.

In some implementations, the cyber resilience identities can include an IOC (Indicators of Compromise) token. The IOC token can be structured to store and describe indicators of malicious activity detected within an environment of an organization. That is, the token system 828 can generate an IOC token to catalog and track known indicators of compromise that are associated with cybersecurity incidents. For example, the IOC token can be generated to include a unique indicator UID, type of indicator (e.g., file hash), description of the indicator, and/or a pattern representing the malicious activity. In generating the cyber resilience identities, the IOC token generated by the token system 828 can include data such as the confidence level in the indicator (e.g., high, medium, low, and/or a scale between 1 and 10), the type of malicious activity it represents, and/or the pattern or signature detected. For example, the IOC token can store information about a malicious file hash associated with a known malware instance, helping to identify and respond to similar threats in the future.

In some implementations, the cyber resilience identities can include an incident token. The incident token can be structured to capture information about a cybersecurity incident, including the type, date, outcome, and/or associated claims data. That is, the token system 828 can generate an incident token when to document and manage the lifecycle of a cybersecurity incident within an organization. For example, the incident token can be generated to include a unique incident UID, the title of the incident, incident data such as the type of attack, impacted data, response actions taken, and/or the associated costs. In generating the cyber resilience identities, the incident token generated by the token system 828 can include references to related tokens, such as TTPs (Tactics, Techniques, and/or Procedures) tokens, IOC tokens, and/or breach team data, providing an overview of the incident. For example, the incident token can document the timeline of a ransomware attack, the response efforts, the root cause analysis, and/or the financial impact on the organization.

In some implementations, the cyber resilience identities can include a performance token. The performance token can be structured to provide a record of evaluations associated with safeguards and requirements within an organization at a time. That is, the token system 828 can generate a performance token when to store the results of evaluations and assessments related to the cybersecurity safeguards of an organization. For example, the performance token can be generated to include a unique performance token UID, the date of creation, safeguard results, safeguard transformation results, and/or comparison results against predefined requirements. In generating the cyber resilience identities, the performance token generated by the token system 828 can include outcomes of safeguard evaluations, transformation proofs, and/or any identified gaps in compliance at a point in time. For example, the performance token can track the effectiveness of endpoint security measures, document how well the measures meet the thresholds, and/or identify areas for improvement.

In some implementations, the cyber resilience identities can include a ransom token. The ransom token can be structured to capture data about a ransomware incident, including ransom demands, payment data, and/or outcomes. That is, the token system 828 can generate a ransom token when to document and manage the specifics of a ransomware event within an organization. For example, the ransom token can be generated to include a unique ransom UID, the incident UID it is associated with, data of the ransomware attack such as the group involved, payment wallet address, currency type, and/or the outcome of the payment. In generating the cyber resilience identities, the ransom token generated by the token system 828 can include references to the breach team involved, post-incident follow-up data, and/or information about the threat actor. For example, the ransom token can document the financial impact of the ransom payment, the success rate of data decryption, and/or ongoing risks posed by the threat actor.

In some implementations, the cyber resilience identities can include a TTPs (Techniques, Tactics, and/or Procedures) token. The TTPs token can be structured to provide an overview of a detected cybersecurity threat event, outlining the tactics, techniques, and/or procedures identified. That is, the token system 828 can generate a TTPs token to document and analyze adversarial behaviors detected during a cybersecurity incident. For example, the TTPs token can be generated to include a unique TTP UID, the event data such as the event code, provider, start and end time, and/or description of the event, as well as information about the threat, including the tactic employed, techniques used, procedures followed, and/or the threat actor involved. In generating the cyber resilience identities, the TTPs token generated by the token system 828 can include observations from the event, such as the actions taken by the adversary, the outcome of those actions, and/or any data artifacts observed. For example, the TTPs token can document a phishing attack, detailing how it was executed, the tools used by the attacker, and/or the impact on the organization.

In some implementations, the cyber resilience identities can include a unified asset token. The unified asset token can be structured to provide information about the assets managed within an organization, including types, operational statuses, and/or associated identifiers. That is, the token system 828 can generate a unified asset token when to document and manage the lifecycle of assets within an IT infrastructure. For example, the unified asset token can be generated to include a unique asset UID, the date of creation, asset data such as type, name, description, location, and/or owner, and/or the operational status of the asset. In generating the cyber resilience identities, the unified asset token generated by the token system 828 can include identifiers and sources related to the asset, such as inventory data, cloud provider information, and/or any additional metadata. For example, the unified asset token can document an operational status of a server, its cloud instance data, and/or any associated identifiers such that an organization can track and monitor assets.

In some implementations, the cyber resilience identities can include an incident readiness token. The incident readiness token can be structured to capture the attributes that demonstrate a preparedness of an organization for responding to cybersecurity incidents. That is, the token system 828 can generate an incident readiness token to document and verify an ability of the organization to handle cybersecurity incidents effectively. For example, the incident readiness token can be generated to include a unique incident readiness UID, the associated passport UID, and/or a description of the readiness to respond to cybersecurity incidents. In generating the cyber resilience identities, the incident readiness token generated by the token system 828 can include attributes such as the incident response plan, training and awareness programs, tools and technologies used, and/or testing exercises conducted. For example, the incident readiness token can document the annual incident response plan updates, quarterly training sessions, and/or various additional tools and technologies in place to detect and mitigate cybersecurity threats.

In some implementations, the cyber resilience identities can include an insurability readiness token. The insurability readiness token can be structured to capture the attributes used for an organization to qualify for cybersecurity insurance, including risk assessments, security measures, and/or incident history. That is, the token system 828 can generate an insurability readiness token to document and assess a preparedness of an organization for obtaining cybersecurity insurance. For example, the insurability readiness token can be generated to include a unique insurability readiness UID, the carrier UID, the associated passport UID, and/or a description of the preparedness for cybersecurity insurance. In generating the cyber resilience identities, the insurability readiness token generated by the token system 828 can include attributes such as risk assessments, security measures, documentation and compliance, and/or incident history. For example, the insurability readiness token can document the annual risk assessments, the implementation of strong cybersecurity controls, and/or the effective mitigation of past incidents, providing an overview of the qualifications of the organization for cybersecurity insurance.

In some implementations, the cyber resilience identities can include or be associated with a passport, which can be a token or a distinct entity interacting with other tokens. The passport can be structured to encapsulate information about an entity, including firmographic data, indicators of cybersecurity readiness, and/or more. That is, the token system 828 can generate or link to a passport to provide certain information corresponding to a cybersecurity posture and readiness of the entity for insurance purposes. For example, the passport can contain or link to various tokens, such as unified safeguard tokens, unified requirements tokens, performance tokens, coverage tokens, incident readiness tokens, insurability readiness tokens, gap tokens, effectiveness tokens, and/or/or various additional tokens. For example, the token system can generate a cyber resilience identity or passport providing access to metadata inclusive of various cyber resilience data (e.g., legal structure, number of protected records, preparedness for cyber insurance, etc.) through linked tokens. Additional, token system 826 can generate the passport linked with a control structure to limit access to data and updates, as further described herein.

In some implementations, the wallet system 812 can include one or more processing circuits, including processor (s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the wallet system 812 can include an interface circuit and function circuit.

In some implementations, the wallet system 812 can include a storage mechanism for holding digital assets, including cyber resilience tokens, private keys, and/or access credentials. In some examples, the wallet system 812 can perform cryptographic operations to encrypt and decrypt token-related data and sign transactions, authenticating the client device 110 during interactions with the passport system 820 and the ledger system 830. The wallet system 812 can manage permissions and access control so that authorized can entities initiate or authorize updates to the cyber resilience tokens stored within the ledger system 830. In some implementations, the wallet system 812 can communicate with dynamic non-fungible tokens (DNFTs) or other various tokens (e.g., fungible tokens, semi-fungible tokens, fractionalized tokens, synthetic tokens, quantum-resistant tokens, cross-chain tokens) or cryptographic elements (e.g., digital signatures, hashes, encryption keys, zero-knowledge proofs, homomorphic encryption keys, lattice-based cryptographic keys, quantum entanglement signatures) associated with the cyber resilience identity. For example, the wallet system 812 can store and manage multiple NFTs or DNFTs representing different aspects of a cybersecurity posture (e.g., cyber resilience status) of an organization or entity. The wallet system 812 can facilitate updates to the tokens by performing cryptographic operations that validate and record changes to the cybersecurity data encapsulated within the DNFTs. The wallet system 812 can also provide an interface that authorized entities use to access and manage the DNFTs, facilitating the review and assessment of the cybersecurity posture of the entity over time.

In another example, a quantum-resistant token can be structured to secure cyber resilience data against potential attacks from quantum computers using post-quantum cryptographic techniques, and/or the wallet system 812 can store, manage, and/or facilitate access to these tokens within a cyber resilience identity framework. In yet another example, a zero-knowledge proof can be a cryptographic method allowing verification of certain cybersecurity attributes (e.g., compliance status) without revealing the underlying sensitive data, and/or the wallet system 812 can process and validate these proofs as part of secure interactions with the cyber resilience identity. In yet another example, a quantum entanglement signature can be a method for facilitating data authenticity and integrity using entangled quantum states, and/or the wallet system 812 can generate, store, and/or apply these signatures to authenticate and validate the integrity of cyber resilience data. In yet another example, a fractionalized token can be a representation of a cyber resilience asset divided into smaller units (e.g., portions of an insurance policy or coverage token), and/or the wallet system 812 can manage the distribution, ownership, and/or transactions involving these fractionalized units within the tokenized cyber resilience identity.

In some implementations, the wallet system 812 can store, create, and/or update a variety of tokens associated with the cybersecurity posture of an organization or entity. The wallet system 812 can create and update performance tokens, which can include results of cybersecurity events, assessments, and/or incident responses (e.g., a security breach response or a periodic vulnerability assessment). The wallet system 812 can create and maintain unified tokens, which can include data representing the state of various cybersecurity elements over time (e.g., safeguards implemented across the organization, internal and third-party requirements compliance, and/or asset management). The wallet system 812 can capture and record evaluation tokens, which can include cybersecurity data captured at multiple points in time (e.g., snapshots of the organization cybersecurity posture at regular intervals). The wallet system 812 can aggregate and store roll-up tokens, which can include combined data from unified and real-time tokens to provide a view of the cybersecurity performance over a specified period (e.g., annual security performance summary). The wallet system 812 can create and update resilience tokens, which can include tokens representing different dimensions of the organization cybersecurity posture (e.g., tokens for cybersecurity resilience metrics). The wallet system 812 can further provide interfaces for entities to access, manage, and/or review the various tokens.

In some implementations, the systems or components of FIG. 8 can communicate over network 120. Network 120 can include computer networks such as the Internet, local, wide, metro or other area networks, intranets, satellite networks, other computer networks such as voice or data mobile phone communication networks, combinations thereof, and/or any other type of electronic communications network. Network 120 can include or constitute a display network. As a non-limiting example, network 120 can implement transport layer security (TLS), secure sockets layer (SSL), hypertext transfer protocol secure (HTTPS), and/or/or any other secure communication protocol. In some implementations, network 120 can be composed of various network devices (nodes) communicatively linked to form one or more data communication paths between participating devices. The network 120 can facilitate communication between the various nodes, such as the client device(s) 110, third-party system(s) 150, passport system 820, etc. (e.g., using an OSI layer-4 transport protocol such as the User Datagram Protocol (UDP), the Transmission Control Protocol (TCP), Stream Control Transmission Protocol (SCTP), etc.). At least one (e.g., each) networked device can include at least one network interface for receiving and/or transmitting data, typically as one or more data packets. An illustrative network 120 is the Internet (however, other networks can be used). Network 120 can be an autonomous system (AS), e.g., a network that is operated under a consistent unified routing policy (or at least appears to from outside the AS network) and is generally managed by a single administrative entity (e.g., a system operator, administrator, and/or administrative group).

In some implementations, the ledger system 830 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the ledger system 830 can include an interface circuit and function circuit.

In some implementations, the ledger system 830 can be a ledger or a decentralized ledger. For example, the ledger system 830 can include a distributed ledger technology (DLT) that supports immutable record-keeping and secure data transactions. The ledger system 830 can store various types of tokens and cybersecurity data, including performance tokens, unified tokens, evaluation tokens, roll-up tokens, and/or resilience tokens. The ledger system 830 can securely record updates and changes to tokens (e.g., providing data integrity and traceability). For example, the ledger system 830 can use blockchain to provide a tamper-evident record of token-related transactions.

In some implementations, the ledger system 830 can include smart contract storage 832, blockchain 170, and/or token storage 834. In some implementations, the smart contract storage 832, blockchain 170, and/or/or token storage 834 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the smart contract storage 832, blockchain 170, and/or/or token storage 834 can include an interface circuit and function circuit.

In some implementations, smart contract storage 832 can manage and execute predefined agreements related to token transactions and updates. In one example, smart contract storage 832 can store role-based access controls (RBACs or other rule-based control systems) or other access control mechanisms restricting access or updates to tokenized cyber resilience data stored via the ledger system 830. In some examples, the smart contract storage 832 can store rules or other data to automate processes such as token validation, data access control, and/or compliance checks. For example, smart contract storage 832 can store smart contracts that define the rules and logic for managing token transactions and updates. In some examples, smart contract storage 832 can manage contract templates that specify access permissions, including RBACs to restrict access based on user roles. That is, the smart contract storage 832 can implement RBAC to control permissions for executing transactions or modifying token data. Smart contract storage 832 can execute stored access controls/smart contracts to enforce access permissions, validate transactions, and/or verify compliance of entities or organizations with various cyber resilience parameters. In some implementations, smart contract storage 832 can process transactions according to terms, parameters, and/or rules to restrict access to tokens or other cyber resilience data.

In some implementations, blockchain 170 can include a decentralized ledger that records and validates token transactions. For example, blockchain 170 can utilize consensus mechanisms (e.g., proof of provenance, proof of work, proof of stake) to validate transactions involving tokenized cyber resilience data across a distributed network. In some examples, blockchain 170 can provide a tamper-evident and/or immutable record of token data by employing cryptographic techniques (e.g., hashing functions) to record and verify token transactions. That is, blockchain 170 can provide transparency and traceability of token-related activities by securely recording token transactions on a distributed computing architecture.

In some implementations, token storage 834 can store tokenized cyber resilience data. For example, token storage 834 can store and/or manage tokens including performance tokens, unified tokens, evaluation tokens, and/or roll-up tokens generated and/or provided by the token system 828. In some examples, token storage 834 interfaces with blockchain 170 to manage and organize token data. For example, token storage 834 can handle different token types, including performance tokens, unified tokens, evaluation tokens, and/or roll-up tokens. Token storage 834 can utilize data structures such as relational databases, NoSQL databases, and/or file systems to organize and manage tokens and/or corresponding data. In some examples, token storage 834 can maintain data accuracy by integrating with blockchain 170 to validate and update token records.

In some implementations, the passport system 820 can include one or more systems and/or subsystems to model cyber resilience data using cyber resilience identities and associated metadata (e.g., cryptographic system 822, ledger interface 824, token system 828, and/or metadata collection system 828). In some implementations, the cryptographic system 822, ledger interface 824, token system 828, and/or/or metadata collection system 828 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the cryptographic system 822, ledger interface 824, token system 828, and/or/or metadata collection system 828 can include an interface circuit and function circuit.

In some implementations, the metadata collection system 828 can receive or identify cyber resilience data. That is, receiving or identifying can include the metadata collection system 828 acquiring, processing, and/or categorizing data from various sources, such as cybersecurity events, system performance metrics, and/or vulnerability assessments stored on ledger system 830. For example, the metadata collection system 828 can gather and/or organize data attributes like event timestamps, sources, and/or types corresponding to a cyber resilience status and other cyber protection information of an entity. Additionally, the metadata collection system 828 can link these data attributes to cyber resilience metrics and update the corresponding records to reflect changes in the cyber protection posture.

In some implementations, the encryption system 822 can encrypt a portion of the cyber resilience data. That is, encrypting can include the encryption system 822 securing sensitive data using cryptographic techniques tailored to the requirements of the data. For example, the encryption system 822 can apply encryption algorithms to protect sensitive data, such as performance metrics or identifiers of an organization or entity. Further, the encryption system 822 can utilize key management techniques to facilitate secure data encryption and decryption process such that authorized entities can access the encrypted data. Additionally, the encryption system 822 can use asymmetric encryption to secure data before it is stored or transmitted. For example, the encryption system 822 can apply hashing algorithms to verify the integrity of data associated with cyber resilience events and assessments such that the data remains unaltered during transmission or storage.

In some implementations, the token system 828 and/or metadata collection system 828 can generate a metadata object including metadata of cyber resilience data. That is, the token system 828 can create structured metadata objects that include information about tokenized data, such as fields, tags, headers, and/or other relevant attributes like data type, source, and/or context. For example, the token system 828 can organize metadata into formats that provide descriptions and classifications for at least one (e.g., each) element of cyber resilience data. Further, the metadata collection system 828 can collect and integrate various metadata elements, such as timestamps, source identifiers, and/or data relevance indicators, into the metadata object. Additionally, the token system 828 can structure the metadata to improve the understanding and usability of the collected cyber resilience data.

In some implementations, the token system 828 can generate a cyber resilience identity including at least a link with the metadata object, a unique identifier (UID), and/or a performance event dataset. That is, generating can include creating, associating, and/or linking metadata objects, unique identifiers, and/or performance datasets with an identifier of an organization or entity. For example, the token system 828 can generate a passport that links to metadata stored in one or more tokens, at least one (e.g., each) containing data related to different aspects of a cyber resilience of an entity. The passport can include a unique identifier for tracking and linking the metadata object to other associated tokens. Further, the performance event dataset within the passport can capture and store cyber resilience performance data, such as that stored in multiple performance tokens, which can be collected at different points in time. For example, the token system 828 can issue or mint tokens linked to a single token that reference metadata objects and include unique identifiers for tracking, and/or the token system 828 can embed performance metrics and historical data within the tokens to provide insights into cyber resilience.

In some implementations, the token system 828 can encapsulate the cyber resilience identity within a control structure restricting one or more updates and redemptions of the metadata object. That is, encapsulating can include implementing token gating mechanisms or smart contracts to enforce rules on who can update or redeem the cyber resilience identity, based on predefined criteria and access control policies. For example, the token system 828 can establish a control structure that allows a customer to view relevant data within their own passport while restricting an access of an insurer to tokenized data used for underwriting decisions. Generally, the passport system 820 can implement a control structure that enforces rules on who can update or redeem the cyber resilience identity based on predefined criteria (e.g., entity type, user preferences/selections, etc.)

In some implementations, the ledger interface 824 can determine at least one access data structure that is compatible with the control structure. That is, determining can include analyzing various data structures to identify or determine alignment with the access control policies and update restrictions defined by the control structure. For example, the ledger interface 824 can evaluate different data structures to verify compatibility with access levels and permissions for interacting with the cyber resilience identity. Additionally, the ledger interface 824 can select and implement data structures that support the secure and compliant management of access and updates within the token system 828.

The control structure (e.g., implemented as a smart contract) governs access to a token structure containing various tokens, such as performance tokens, unified tokens, evaluation tokens, and/or roll-up tokens. The token structure can include metadata, such as unique identifiers (UIDs), creation timestamps, and/or links to related data sets. The smart contract specifies predefined rules for accessing and updating these tokens. The ledger interface 824 can process the smart contract to extract rules that define role-based access control (RBAC) permissions. For example, the smart contract can specify that at least one (e.g., each) third party can access their own data within the token structure. In some implementations, a third-party entity can have access its own performance tokens stored in the token structure, such as in a passport associated with the cybersecurity status of an entity. The RBAC rules restrict other entities from viewing or modifying these tokens. Another example can include third-party vendors having access to their own evaluation tokens that detail the results of security assessments relevant to their services, without the ability to access data from other vendors.

The ledger interface 824 can configure the selected access data structure to enforce these RBAC permissions as extracted from the smart contract. That is, the configuration can include mapping the access permissions to the token structure, linking at least one (e.g., each) token type to the appropriate access control mechanisms. For example, performance tokens related to a particular third-party can be linked to a role of the third-party. Similarly, unified tokens related to internal compliance can be accessible by authorized roles within the organization itself (e.g., excluding third-party access). The ledger interface 824 can integrate the configuration within the ledger system 830 to apply the rules of the control structure to token-related operations. The RBAC can facilitate access to tokens to entities or individuals that have been granted access or authorized to read, update, and/or add. For example, the control structure can use an access level of an entity or individual to determine whether to allow a user to read data but not update or add to the data (e.g., a third-party insurer can access performance datasets on performance tokens linked to a passport of the prosecutive insured, but can be restricted from modifying certain performance data stored thereon), to have full rights (e.g., read/update/add, etc.), and/or so on. That is, the passport system 820 can determine, identify, and/or/or provide an access level or permissions to a person or entity attempting to access or otherwise interact with tokenized data corresponding to a cyber resilience identity, and/or the access level/permissions can be used by the passport system 820 to restrict or allow the user or entity to perform various actions related to the tokens.

In some implementations, if the smart contract is modified, the ledger interface 824 can reconfigure the access data structures to match the updated RBAC rules. For example, if the smart contract is updated to change access permissions for a particular third-party entity, the ledger interface 824 can adjust the RBAC configurations to reflect this change such that the access control mechanisms allows access and is consistent with the control structure. In some implementations, an access data structure can function as a token or another access control mechanism within the token structure. That is, the access data structure can facilitate operations, such as reading, writing, adding, and/or removing metadata objects associated with tokens in the cyber resilience identity (e.g., also operating and implemented as a token). For example, an access control token can link to other tokens representing performance, evaluation, and/or resilience data. The access control token can encapsulate the permissions for interacting with the tokens and can include metadata defining allowed operations and roles or entities authorized to perform at least one (e.g., each) operation. Additionally, an access data structure can implement write access to one or more metadata objects within the token structure. For example, an access control token can identify which entities have permission to update particular aspects of the cyber resilience identity, such as modifying performance metrics or altering the status of an evaluation token. Another access data structure can be used to manage read permissions, restricting a third-party entity to viewing metadata associated with its own tokens within the structure without granting modification rights. In some implementations, an access control structure can function as a token that defines hierarchical permissions across multiple tokens. For example, a control structure token can specify that a designated role within an organization has the authority to add or remove tokens from the cyber resilience identity. Additionally, the access control token can be used to facilitate interactions with other tokens within the token structure to apply these permissions.

In some implementations, the ledger interface 824 can broadcast, using the control structure, the cyber resilience identity to a ledger or distributed ledger. That is, broadcasting can include publishing, sharing, and/or otherwise transmitting a passport (e.g., cyber resilience identity) of an entity to authorized participants on the distributed ledger network, including insurers, regulators, and/or cybersecurity vendors, to facilitate secure access, auditing, and/or validation of the cybersecurity posture of the entity or for use in in providing protection or insurance quotes, verifying compliance, offering targeted cybersecurity services (e.g., through advertisements), and/or generating analytical insights based on the data of the entity. For example, the ledger interface 824 can transmit the cyber resilience identity to a blockchain or similar distributed ledger to maintain an immutable record of the cyber resilience identity and associated data. In this example, the transmission process can include creating a transaction that includes the cyber resilience identity, signing the transaction using cryptographic keys associated with the control structure, and/or broadcasting the transaction to the distributed ledger network. The network nodes can then validate the transaction through a consensus mechanism (e.g., proof of work, proof of stake) and, once validated, add it to a block in the blockchain. Additionally, the ledger interface 824 can store the cyber resilience identity locally (e.g., in a back-end database or other local data store). Further, the ledger interface 824 can transmit or send the cyber resilience identity (e.g., via a shareable link) to various entities, who can access a portion of the data corresponding with the cyber resilience identity but not access another portion of the data based on various access controls.

Referring to the control structure (e.g., smart contract) generally, the one or more control structures can be embedded within the transaction or linked via a unique identifier or hash, which can be included in the transaction data. That is, the rules and conditions defined by the smart contract can be inherently tied to the cyber resilience identity, facilitating the for automated enforcement of access controls and other predefined operations when the identity is accessed or modified on the distributed ledger. In some implementations, the one or more control structures can be referenced by a unique smart contract address included in the transaction. That is, the reference can allow the distributed ledger to call and execute the smart contract independently when certain events are triggered, such as a request to access or update the cyber resilience identity. In some implementations, the one or more control structures can be included as a separate transaction linked to the cyber resilience identity transaction via a cryptographic reference. The smart contract transaction can be broadcasted and stored on the blockchain, where it can autonomously enforce the conditions and permissions associated with the cyber resilience identity when an interaction with the identity occurs on the distributed ledger. In some implementations, the one or more control structures can be encoded into the blockchain transaction as executable code. That is, the smart contract can automatically execute its logic in response to blockchain events, such as validation of the cyber resilience identity transaction.

Figure 9:
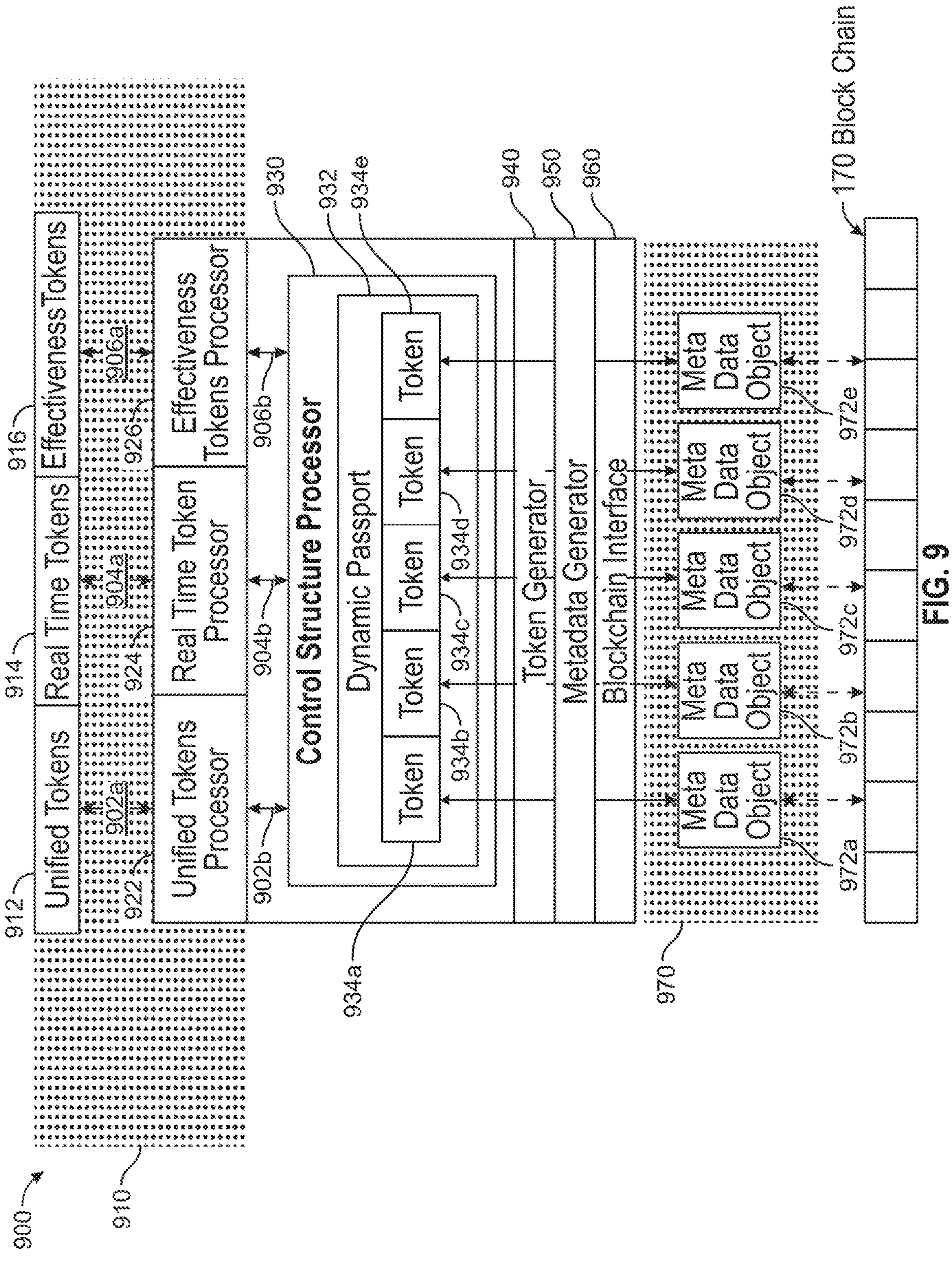
FIG. 9 depicts a block diagram of another architecture of certain systems or devices of FIG. 8, according to some implementations.

Referring now to FIG. 9, a block diagram of an architecture of certain systems or devices of FIG. 8 is shown, according to some implementations. The implementation shown in FIG. 9 can include a token interface 910 including unified tokens 912, real-time tokens 914, and/or effectiveness tokens 916. The implementation shown in FIG. 9 can also include a smart contract control structure 920 including a unified token processor 922, a real-time token processor 924, and/or an effectiveness token processor 926. Further, the smart contract control structure 920 can include a control structure processor 930, a token generator 940, a metadata generator 950, and/or a blockchain interface 960. In some implementations, the control structure processor 930 can include a dynamic passport 932, and/or dynamic passport 932 can include tokens 934*a*-1234*e* (collectively, 934). At least one (e.g., each) of the tokens 934 can be linked to a metadata interface 970 including one or more metadata objects 972*a*-972*e* (collectively, metadata objects 972). In some implementations, the implementation shown in FIG. 9 can include blockchain 170.

In some implementations, FIG. 9 depicts an example smart contract control structure 920. In some examples, the unified token processor 922, real-time token processor 924, and/or effectiveness token processor 926 can detect a presence of a token (fungible, non-fungible, partially-fungible, etc.), and/or can transmit the token to a compatibility processor (e.g., 922, 924, 926) compatible with that particular token. The detection can be responsive to an action by the token interface 910 to transmit the tokens to the smart contract control structure 920. In some examples, the token interface 910 can include a communication channel between one or more of the smart contract control structure 920 and one or more of the unified tokens 912, real-time tokens 914, and/or effectiveness tokens 916. The token interface 910 can include an application programming interface compatible with the smart contract control structure 920 to detect various cyber resilience tokens. At least the token interface 910 or the smart contract control structure 920 can execute one or more instructions to determine whether one or more of the tokens are compatible with the smart contract control structure 920.

In some implementations, the unified token processor 922 can perform detection of unified tokens 912 via a link 902*a* or other communication channel (e.g., via a network such as network 120). The detection can be responsive to receiving a unified token from token system 828, client devices 110, and/or third-party systems 150, over link 902*a*. The unified token processor 922 can be configured to be compatible with a unified token 912, and/or can be generated to be compatible with a particular unified token 912. For example, the unified token processor 922 can be integrated with or store a hash based on a unified token 912 and a hash processor operable to generate a hash based on any unified token 912. The unified token processor 922 can generate a hash in response to detecting the presence of the unified token 912, and/or can determine whether the unified token 912 is compatible with the smart contract control structure 920 by comparing the generated hash with the stored hash. The unified token processor 922 can include logic to detect a unified token 912 passed to it, by, for example, a JSON object or a header argument. Additionally, the unified token processor 922 can provide the detected unified token to the control structure processor 930 via link 902*b*.

In some implementations, the real-time token processor 924 can perform detection of real-time tokens 914 via link 904*a*. The detection can be responsive to receiving a real-time token 914 from token system 828, client devices 110, and/or third-party systems 150, over link 904*a*. For example, the real-time token processor 924 can be integrated with or store a hash based on a real-time token 914 and a hash processor operable to generate a hash based on any real-time token 914. The real-time token processor 924 can generate a hash in response to detecting the presence of the real-time token 914, and/or can determine whether the real-time token 914 is compatible with the smart contract control structure 920 by comparing the generated hash with the stored hash. The real-time token processor 924 can include logic to detect a real-time token 914 passed to it, by, for example, a JSON object or a header argument. Additionally, real-time token processor 924 can provide the detected real-time token 914 to the control structure processor 930 via link 904*a*.

In some implementations, the effectiveness token processor 926 can perform detection of effectiveness tokens 916 via link 906*a*. The detection can be responsive to receiving an effectiveness token 916 from token system 828, client devices 110, and/or third-party systems 150, over link 906*a*. For example, the effectiveness token processor 926 can be integrated with or store a hash based on an effectiveness token 916 and a hash processor operable to generate a hash based on any effectiveness token 916. The effectiveness token processor 926 can generate a hash in response to detecting the presence of the effectiveness token 916, and/or can determine whether the effectiveness token 916 is compatible with the smart contract control structure 920 by comparing the generated hash with the stored hash. The effectiveness token processor 926 can include logic to detect an effectiveness token 916 passed to it, by, for example, a JSON object or a header argument. Additionally, the effectiveness token processor 926 can provide the detected effectiveness token 916 to the control structure processor 930 via link 906*b*.

In some implementations, the smart contract control structure 920 can include a control structure processor 930 configured to generate and/or store tokens 934. The tokens 934 can include one or more unified tokens 912, real-time tokens 914, and/or effectiveness tokens 916. That is, responsive to receiving one or more of the unified tokens 912, real-time tokens 914, and/or effectiveness tokens 916 from the unified token processor 922, real-time token processor 924, and/or/or effectiveness token processor 926, the control structure processor 930 can receive the tokens 934 via links 902*b*, 904*b*, and/or/or 906*b*. It should be understood that a control structure (or smart contract control structure) used herein can refer to a logical or structural construct that encapsulates one or more elements, such as tokens, and/or metadata objects, within a defined boundary. The control structure serves as an organizational framework that groups these elements together, allowing them to be referenced, accessed, and/or transmitted as a single unit. The smart contract control structure 920 or other control mechanisms can manage interactions and enforce access controls based on predefined rules. For example, a control structure can be a data structure that stores references or pointers to the encapsulated elements. In another example, it can be a structure that includes metadata defining relationships and dependencies between the elements.

In some implementations, a container or wrapper can encapsulate a cyber resilience identity having a control structure, which can include multiple tokens linked to metadata objects. Encapsulation can be implemented by defining a data structure within a memory or storage system that can include relevant tokens and their associated metadata objects. The container itself can be a structured data object, such as a JSON object, a database schema, and/or a serialized data structure, that stores pointers, references, and/or data fields corresponding to at least one (e.g., each) token and its linked metadata. The smart contract control structure 920, such as a smart contract, can be included within the container by referencing its address or embedding its bytecode within the container data structure. When the container is instantiated or accessed, the control structure processor 930 can reference the smart contract control structure 920 to enforce the rules and permissions associated with the cyber resilience identity.

In some implementations, a smart contract can encapsulate a cyber resilience identity, which can include multiple tokens linked to metadata objects. The smart contract can encapsulate the cyber resilience identity by defining a set of rules and data fields within its code that represent the cyber resilience identity and its components. The control structure processor 930 can create and maintain a mapping or registry within the blockchain 170 or distributed ledger that associates at least one (e.g., each) token with its corresponding metadata objects. The encapsulation occurs as the smart contract control structure 920 references these tokens and metadata objects within its execution environment, using internal storage variables or linked data structures (e.g., mappings) to track and enforce relationships between them. The smart contract control structure 920 can encapsulate the cyber resilience identity by controlling access to these mappings, allowing authorized operations as defined by the logic of the contract.

In some implementations, the control structure processor 930 can generate a metadata object, such as a wrapper, where a smart contract control structure 920 (e.g., a smart contract) is wrapped or otherwise linked to dynamic passport 932, which can further include links to metadata (e.g., stored data, fields, etc.) of tokens 934. For example, the dynamic passport 932 can be encapsulated in a smart contract control structure 920 and can generated by metadata generator 950 as part of the metadata interface 970. The linking dynamic passport 932 and the smart contract processor 930 can provide access to the tokenized cyber information based on the smart contract control structure 920.

In some implementations, the control structure processor 930 can generate a dynamic passport 932 including a token with a link to (e.g., encapsulated in) the smart contract control structure 920. The link can be established via a digital signature or cryptographic hash that securely associates the dynamic passport 932 with corresponding metadata. The dynamic passport 932 can be provided to a metadata interface 970 such that a blockchain (e.g., blockchain 170) can verify and store the metadata securely on the chain. Additionally, the control structure processor 930 can encapsulate the dynamic passport 932 and tokens 934 within the smart contract control structure 920. For example, encapsulating can include encrypting the data and setting permissions for data access. That is, the encapsulation can restrict outputs of the metadata objects 972. For example, when the dynamic passport 932 and tokens 934 are encapsulated, the control structure processor 930 can output when conditions or permissions are verified. In another example, when the dynamic passport 932 and tokens 934 are encapsulated in a smart contract control structure 920, the control structure processor 930 can output when a valid decryption key is presented. For example, the control structure processor 930 can authorize transactions after verifying that compliance and regulatory requirements are met based on data of the tokens 934.

In some implementations, the control structure processor 930 can be configured to perform segmentation or allocation of tokens 934 of the dynamic passport 932 based on parameters by accessing the metadata of a token and evaluating compliance with cyber resilience standards. Accordingly, the control structure processor 930 can automatically pool (or tranche) asset tokens (associated with underlying assets) based on parameters. For example, the parameters can be programmed into smart contracts of the control structure processor 930. For example, the dynamic passport 932 can include one or more segmented allocations of the tokens 934 (e.g., with token 934*a* and 934*b* segmented into an allocation and tokens 934*c*-934*e* segmented into another allocation). While not shown in FIG. 9, a segmented allocation smart contract control structure can be within the smart contract control structure 920 and be operated by the control structure processor 930. In some examples, this integration facilitates automated re-segmentation based on real-time data analysis. In another example, this integration facilitates compliance checks and performance tracking without external system intervention.

In some implementations, at least one (e.g., each) of the tokens 934 can include metadata objects 972. For example, links 909 can connect at least one (e.g., each) token 934 to a respective metadata object 972. In some examples, the metadata interface 970 can be utilized to connect at least one (e.g., each) token 934 to its metadata object 972. For example, the token 934*a* can be connected to the metadata object 972*a* via the link 909*a*, the token 934*b* can be connected to the metadata object 972*b* via the link 909*b*, and/or so on.

In some examples, the metadata interface 970 can include a communication channel between one or more of the tokens in the smart contract control structure 920 and metadata objects of blockchain 170. That is, metadata objects 972 can be accessed and verified through blockchain transactions to verify integrity and authenticity. Furthermore, blockchain 170 can store links to the metadata objects 972 or store the metadata objects 972 in blocks of the blockchain 170. For examples, the blockchain 170 can store the metadata objects 972 in blocks to verify that participants have consistent and unalterable access to the cyber resilience information stored in the tokens 934 of the dynamic passport 932.

In some implementations, the token interface 910 can include an application programming interface compatible with the smart contract control structure 920 to detect various cyber resilience tokens. In some examples, at least the token interface 910 or the smart contract control structure 920 can execute one or more instructions to determine whether one or more of the tokens (e.g., tokens 934 or corresponding unified tokens 912, real-time tokens 914, and/or/or effectiveness tokens 916) are compatible with the smart contract control structure 920.

In some implementations, the token generator 940 (e.g., token system 828) can generate one or more tokens (e.g., fungible, semi-fungible, and/or non-fungible tokens, collectively referred to herein as "controllable electronic records") in accordance with a token obtained at one or more of the unified token processor 922, real-time token processor 924, and/or/or effectiveness token processor 926. For example, the token generator 940 can generate tokens based on a number of new metadata objects indicated by an obtained token, and/or linked with respective smart contract control structures. For example, the token generator 940 can generate a cyber resilience identity (e.g., dynamic passport 932) with links to one or more tokens at least one (e.g., each) linked with a particular smart contract control structure 920 with which the respective token is compatible. The token generator 940 can thus generate a corresponding number of keys that can control restrictions on output by the particular metadata object linked with the particular smart contract control structure compatible with the particular token. The token generator 940 can modify and delete tokens (e.g., tokens 934) linked with cyber resilience identity (e.g., dynamic passport 932), to update control of a partial distribution or exchange of metadata object control.

In some implementations, the metadata generator 950 can generate one or more metadata objects (e.g., metadata objects 972) in accordance with a token obtained at one or more of the unified token processor 922, real-time token processor 924, and/or/or effectiveness token processor 926 (e.g., at a compatibility processor). That is, the metadata object can include metadata of cyber resilience data. For example, metadata generator 950 can generate multiple tokens based on a number of new metadata objects linked with respective smart contract control structure(s) 920 and encapsulated with a cyber resilience identity (e.g., passport). For example, the metadata generator 950 can generate one or more metadata objects 972 at least one (e.g., each) linked to respective tokens 934 and further linked, via the tokens 934, to the dynamic passport 932 with a particular smart contract control structure 920 by which the metadata object co is controlled. In some examples, the metadata generator 950 can modify and delete metadata objects linked with tokens or smart contract control structures to update control of a partial transfer of metadata object control. Further, the metadata generator 950 can modify and/or update tokens and/or associated information of existing tokens (e.g., tokens 934) corresponding to a cyber resilience identity (e.g., passport 932).

In some implementations, the blockchain interface 960 can include an API compatible with the blockchain 170 via metadata generator 950. The blockchain interface 960 can selectively add, modify, and/or delete blocks from the blockchain 170. The blockchain interface 960 can add, modify, and/or delete blocks in accordance with restrictions or interfaces of the blockchain 170, and/or can add, modify, and/or delete blocks independently of the restrictions or interfaces of the blockchain 170 at any portion or index of the blockchain 170.

Figure 10:
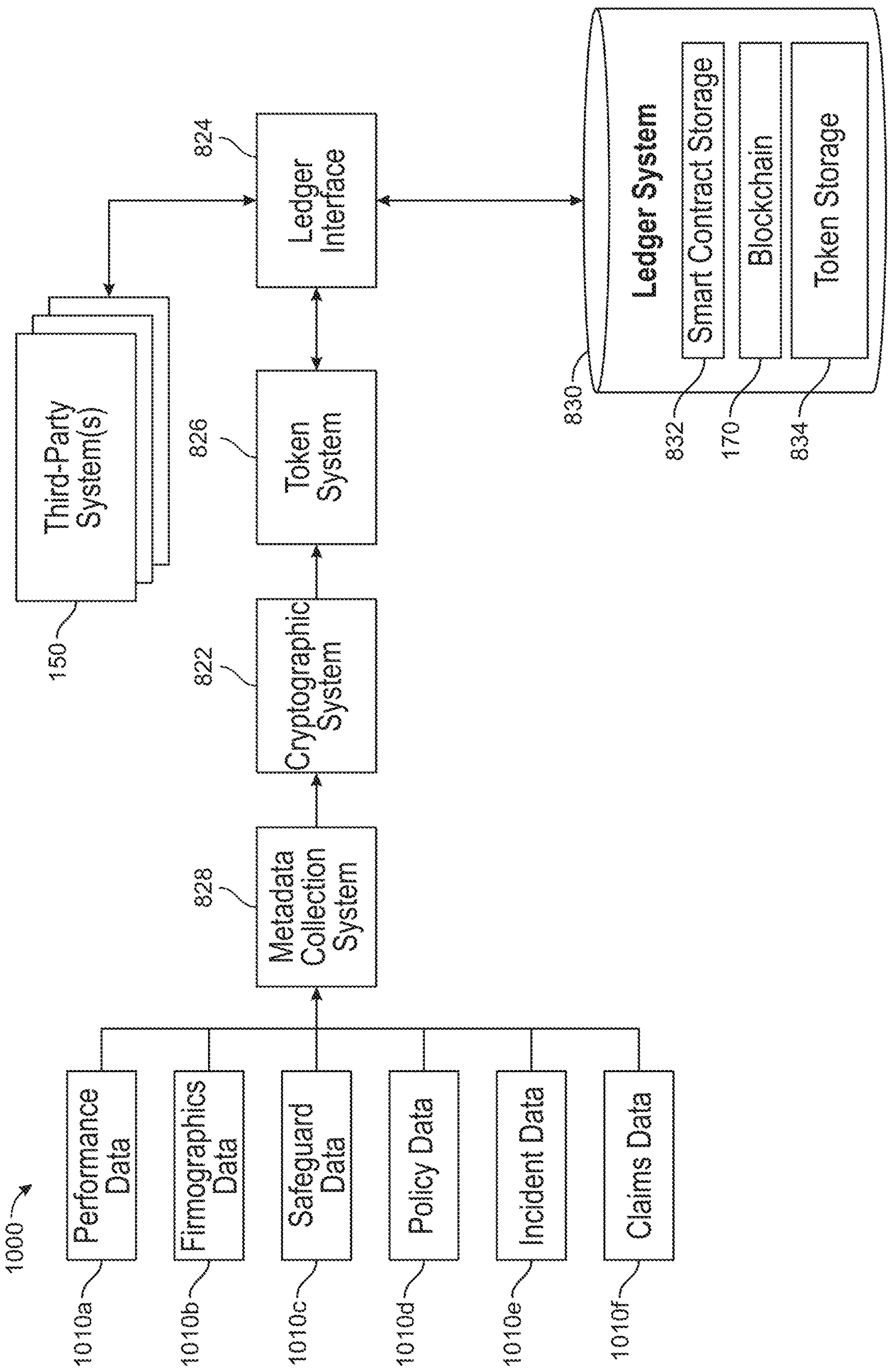
FIG. 10 depicts a block diagram of another architecture of certain systems or devices of FIG. 8, according to some implementations.

Referring now to FIG. 10, a block diagram of an architecture of certain systems or devices of FIG. 8 is shown, according to some implementations. The implementation shown in FIG. 10 includes third-party systems 150 and ledger system 830. The ledger system 830 can include smart contract storage 832, blockchain 170, and/or token storage 834. The implementation shown in FIG. 10 can also include metadata collection system 828, cryptographic system 822, token system 828, and/or ledger interface 824. The implementation shown in FIG. 10 can also include performance data 1010*a*, firmographics data 1010*b*, safeguard data 1010*c*, policy data 1010*d*, incident data 1010*e*, and/or claims data 1010*f* (collectively, cyber resilience data 1010).

In some implementations, the metadata collection system 828 can receive or identify cyber resilience data 1010. For example, the metadata collection system 828 can collect or retrieve performance data 1010*a* (e.g., metrics related to cybersecurity incidents or system performance), firmographics data 1010*b* (e.g., company size, industry type, and/or geographic location), safeguard data 1010*c* (e.g., implemented security controls or measures), policy data 1010*d* (e.g., security policies or compliance requirements), incident data 1010*e* (e.g., records of security breaches or system failures), and/or claims data 1010*f* (e.g., insurance claims or risk assessments) of an entity or organization. In some examples, the metadata collection system 828 can integrate data from various cybersecurity tools and databases (e.g., third party systems 150, blockchain 170, etc.) to compile a cyber resilience dataset. In some implementations, the metadata collection system 828 can provide the received or identified cyber resilience data to the cryptographic system 822.

In some implementations, the cryptographic system 822 can encrypt a portion of the cyber resilience data. For example, the cryptographic system 822 can apply symmetric encryption algorithms (e.g., AES) to secure sensitive data such as performance data 1010*a* (e.g., performance metrics) or firmographics data 1010*b* (e.g., firmographic metrics). In another example, the cryptographic system 822 can use asymmetric encryption techniques (e.g., RSA) to protect keys and authentication credentials. Further, the cryptographic system 822 can implement hashing algorithms (e.g., SHA-256) to verify the integrity of the data by generating unique hash values for at least one (e.g., each) data record. In some implementations, the cryptographic system 822 can provide the portion of encrypted cyber resilience data to the token system 828.

In some implementations, the token system 828 can generate a metadata object including metadata of cyber resilience data. For example, the token system 828 can create metadata objects that encapsulate encrypted performance data, safeguard records, and/or compliance data. In some implementations, the token system 828 can include additional metadata such as timestamps, data sources, and/or integrity checks. In some implementations, the token system 828 can generate a cyber resilience identity including at least a link with the metadata object, a unique identifier (UID), and/or a performance event dataset. For example, the cyber resilience identity can include a UID to uniquely identify the entity, a link to a metadata object (e.g., data of one or more tokens), and/or include a dataset with performance events or incidents. In some implementations, the token system 828 can encapsulate the cyber resilience identity within a control structure restricting one or more updates and redemptions of the metadata object. The control structure can be a data structure or other system including a cyber resilience identifier (e.g., passport) with linked tokens and restricting accessing to metadata object (e.g., data) of certain tokens. In some implementations, the token system 828 can determine at least one access data structure being compatible with the control structure. For example, the token system 828 can utilize various access management techniques, such as access control lists (ACLs), role-based access controls (RBACs), and/or attribute-based access controls (ABACs), to verify that the access data structure aligns with the permissions and restrictions defined within the control structure. The passport system 802 can assess these access data structures to determine whether the structures comply with predefined standards or policies (e.g., determining whether an entity or authorized user has the appropriate credentials or attributes to access, modify, and/or update the metadata objects encapsulated within the control structure). Additionally, the token system 828 can dynamically adjust the access parameters based on changes in roles, permissions, and/or security requirements such that the control structure remains consistent with the evolving access parameters used by various entities and users involved in managing or interacting with the cyber resilience identity.

In some implementations, access controls, such as role-based access controls (RBACs) or access parameters, can be implemented in various forms to manage permissions for entities interacting with the metadata object (e.g., token). Access controls can include any method or mechanism that limits, restricts, and/or authorizes access to certain data based on predefined criteria. Examples of access controls can involve establishing rules that dictate who can view, modify, and/or delete data elements within the metadata object or cyber resilience identity. Such controls can be used to regulate access across different entities, such as allowing a third party like an insurer to view certain data, modify data, and/or be restricted from accessing other sensitive data. These access controls can also be configured within a broader access management framework, such as ACLs or RBACs, that dynamically adapts to the roles and permissions associated with different users or systems.

In some implementations, the token system 828 can generate a cyber resilience identity including at least a link with the metadata object, a unique identifier (UID), and/or a performance event dataset. For example, the cyber resilience identity can incorporate a UID to uniquely identify the entity, link to the metadata object to reference encrypted data, and/or include a dataset detailing performance events or incidents. The token system 828 can encapsulate the cyber resilience identity within a control structure restricting one or more updates and redemptions of the metadata object. Further, the token system 828 can determine at least one access data structure that aligns with the control structure. For example, the token system 828 can use access control lists or role-based access controls to verify alignment with the control structure for control over which data elements can be accessed or modified by different entities. In some implementations, the ledger interface 824 can broadcast, using the control structure, the cyber resilience identity to a ledger or distributed ledger. For example, the ledger interface 824 can interact with the ledger system 830, including smart contract storage 832, blockchain 170, and/or token storage 834, to submit the cyber resilience identity and associated metadata and publish the cyber resilience identity to blockchain 170. In some examples, the ledger interface 824 can also communicate with third-party systems 150 to share and verify the cyber resilience identity across different platforms and networks (e.g., to transmit to a vendor or insurer).

Figure 11:
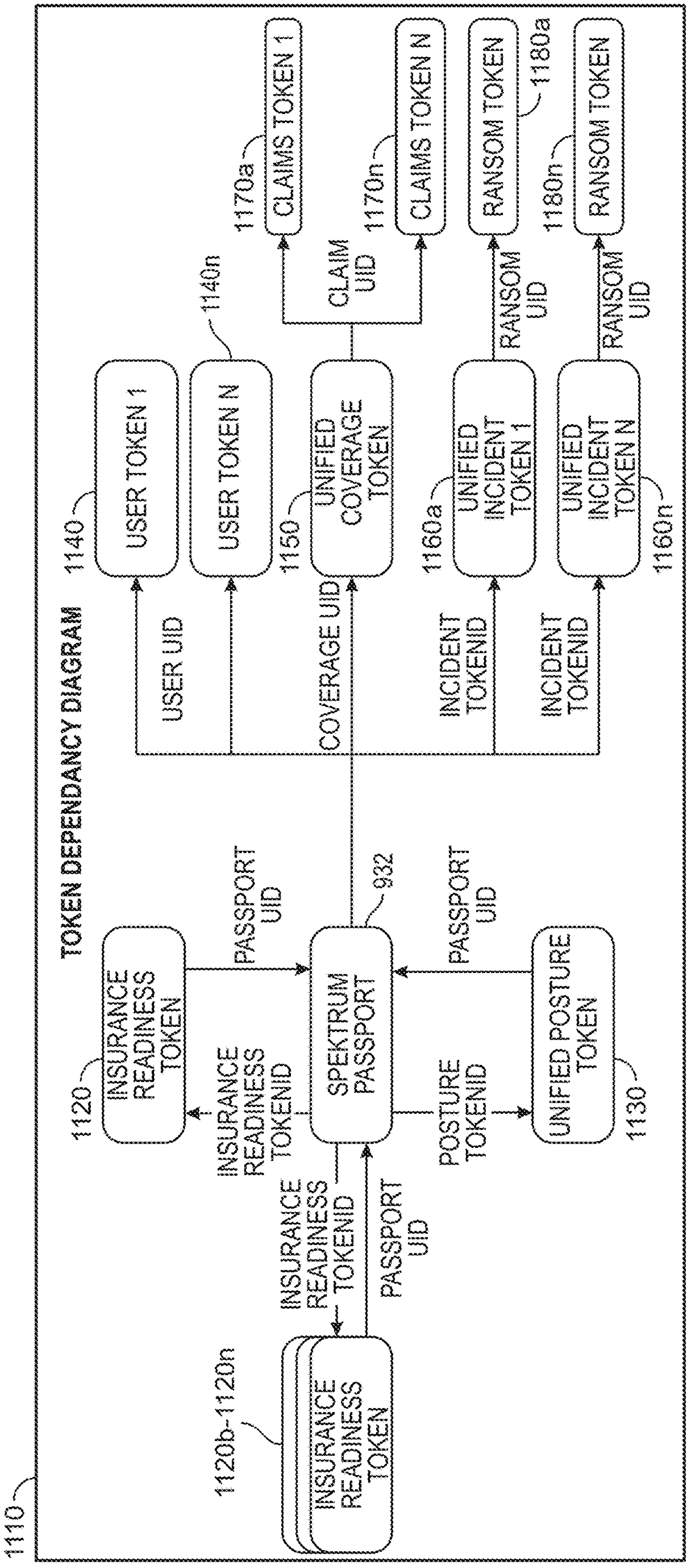
FIG. 11 depicts a block diagram of a token dependency system for tokenized cyber resilience data, according to some implementations.

Referring now to FIG. 11, a block diagram of a token dependency system 1110 for tokenized cyber resilience data is shown, according to some implementations. The implementation shown in FIG. 11 includes a dynamic passport 932 and one or more insurance readiness tokens 1120*a*-1120*n* (collectively, 1120), a unified posture token 1130, one or more user tokens 1140*a*-1140*n* (collectively 1140), a unified coverage token 1150, one or more unified incident tokens 1160*a*-1160*n* (collectively 1160), claims tokens 1170*a*-1170*n* (collectively 1170), and/or ransom tokens 1180*a*-1180*n* (collectively 1180).

In some implementations, the dynamic passport 932 can operate as a central node and be linked to tokenized cyber resilience data (e.g., tokens) to facilitate interactions across the various tokens in managing, accessing, and/or/or updating cyber resilience data. For example, the dynamic passport 932 can be linked to the insurance readiness tokens 1120 via the passport UID and/or insurance readiness token ID. In another example, the dynamic passport 932 can be linked to the unified posture token 1130 through the passport UID and/or posture token IDs. Further, the dynamic passport 932 can be linked to user tokens 1140 through a user UID. The dynamic passport 932 can further be linked to the user to a unified coverage token 1150 via a coverage UID. In some examples, the unified coverage token 1150 can be linked to claims tokens 1170 via a claim UID, and/or the link can provide the dynamic passport 932 with access to the claims tokens 1170. Further, the dynamic passport 932 can be linked with the unified incident tokens 1160 via an incident token ID. In some examples, the unified incidents tokens 1160 can be linked to the ransom tokens 1180 via a ransom UID, and/or the link can provide the dynamic passport 932 with access to the ransom tokens 1180.

Figure 12A:
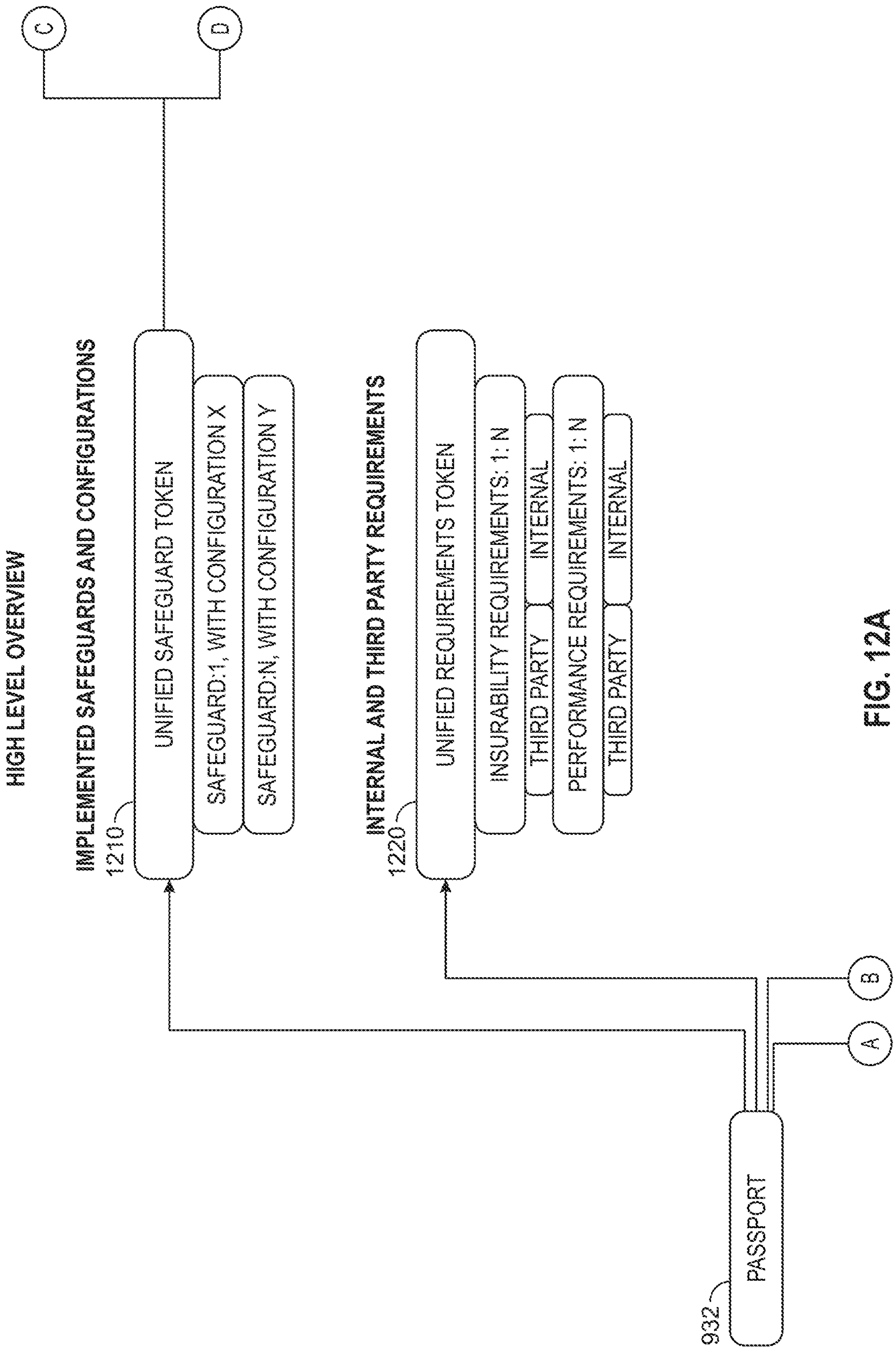
FIGS. 12A-12D depict an architecture for tokenized cyber resilience data, according to some implementations.

Referring generally to FIGS. 12A-12D, an architecture for tokenized cyber resilience data is shown, according to some implementations. Referring now to FIG. 12A, in some examples, the dynamic passport 932 can be linked with data corresponding to implemented safeguards and configurations. For example, a unified safeguard token 1210 can generate by token system 828 and be provided to dynamic passport 932 and include data corresponding to a number of implemented safeguards or other cyber resilience protections of an entity (e.g., safeguards 1-N with configurations X-Y). That is, the safeguard token 1210 can include data or metadata on various safeguards, protections, and/or systems implemented by an entity (e.g., Managed Detection and Response (MDR) systems, Extended Detection and Response (XDR) platforms, network segmentation strategies, coding practices, endpoint security protocols, etc.). The unified safeguard token 1210 can further be linked to and/or receive data from node C and/or node D, as further described herein. In some examples, the dynamic passport 932 can be linked with data corresponding to internal and third party requirements. For example, a unified requirements token 1220 can be linked or provided to dynamic passport 932 and include data corresponding to a number of cyber resilience requirements or other standards (e.g., insurability requirements 1-N with various third party and internal requirements, performance requirements 1-N with various third party and internal requirements, etc.). That is, the unified requirements token 1220 can include data on various compliance obligations, industry regulations, and/or contractual requirements that an entity must adhere to (e.g., GDPR, ISO/IEC 27001 standards, contractual security clauses, and/or sector-specific regulations such as HIPAA). In some examples, the dynamic passport 932 can be further linked to/receive data from node A and/or node B, as further described herein.

Figure 12B:
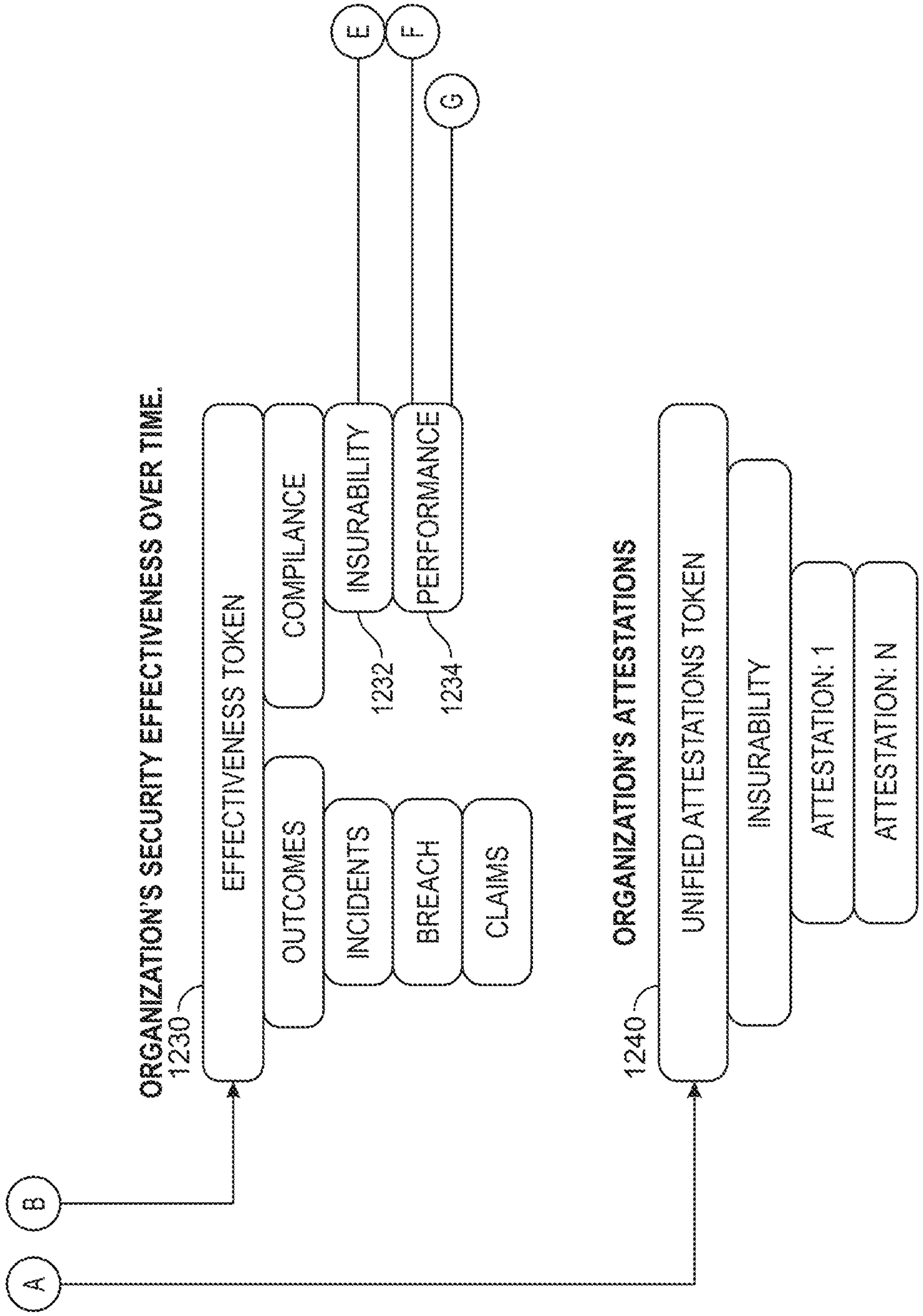

Referring now to FIG. 12B, the dynamic passport 932 can be linked with data corresponding to a security effectiveness of an organization over time. For example, the dynamic passport 932 can be linked, via node B, to an effectiveness token 1230. In some examples, the effectiveness token 1230 can be generated by the token system 828 and include data such as cyber resilience outcomes, incidents, breaches, and/or/or claims. That is, the effectiveness token 1230 can include data or metadata related to the historical security incidents, the severity of breaches, and/or/or the outcomes of any cyber resilience measures implemented over time. Further, the effectiveness token 1230 can include compliance data such as insurability data 1232 and/or performance data 1234 (e.g., stored via tokens). For example, the insurability data 1232 can include tokens or other records of insurance claims, assessments of a risk profile of an organization, and/or compliance with insurance policy requirements related to cybersecurity. In some implementations, the insurability data 1232 can be linked with other data and/or systems via node E and/or node F, as further described herein. For example, the performance data 1234 can include tokens or other data with metrics related to the efficiency of security protocols, adherence to service level agreements (SLAs), and/or other key performance indicators (KPIs) relevant to the cyber resilience performance. In some implementations, the performance data 1234 can be linked with other data and/or systems via node G and/or node H, as further described herein. In other examples, the dynamic passport 932 can be linked, via node A, to data corresponding to attestations of an organization. For example, the dynamic passport 932 can be linked to a unified attestation token 1240, which can be generated by the token system 828 and include insurability data corresponding to a number of attestations (e.g., attestations 1-N).

Figure 12C:
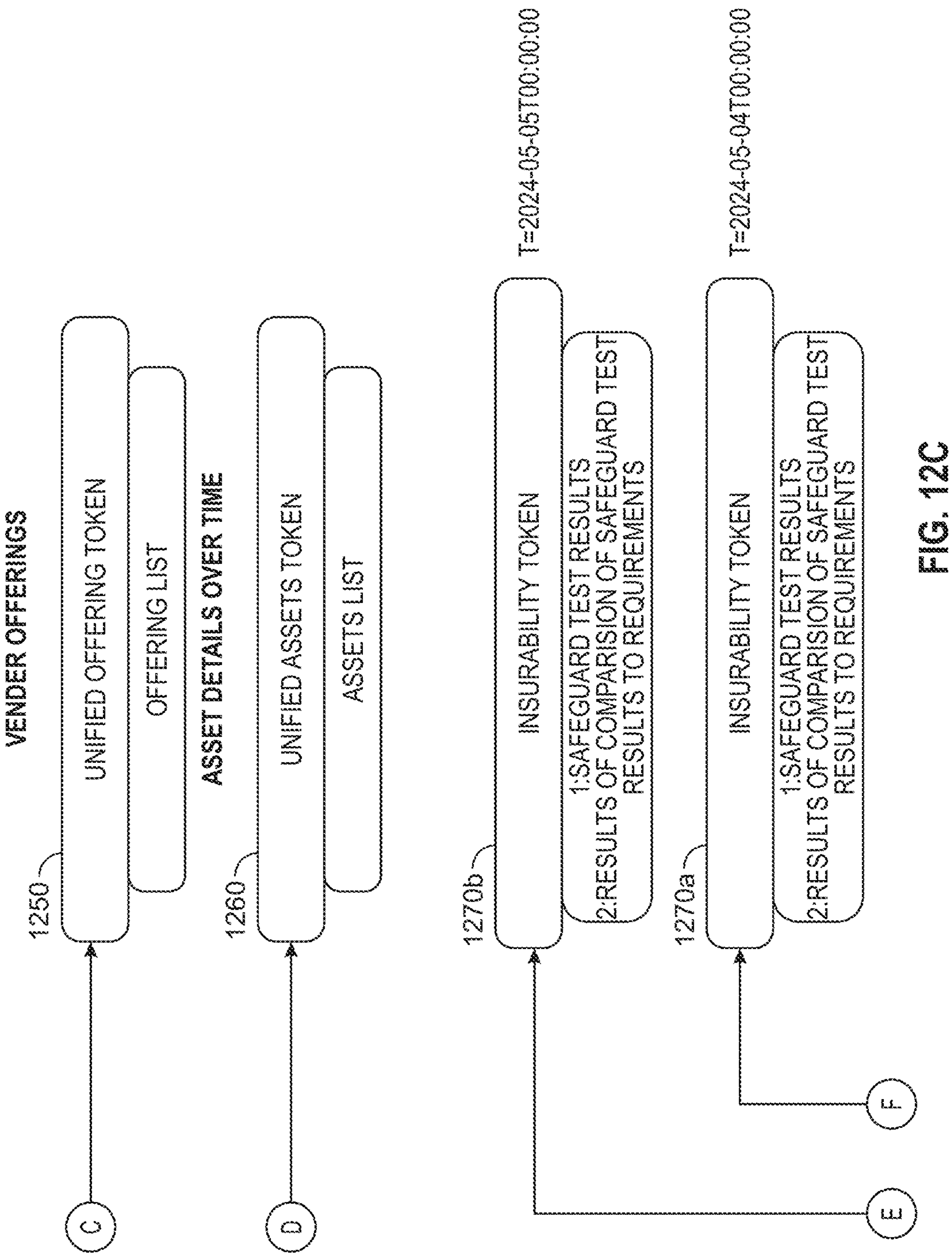

Referring now to FIG. 12C, the dynamic passport 932, via the unified safeguard token 1210, can be linked with data corresponding to vendor offerings. For example, the passport system 820 can link the unified safeguard token 1210 via node C to a unified offering token 1250 including vendor data (e.g., offering list, MDR/XDR plans, etc.). In some examples, the dynamic passport 932, via the unified safeguard token 1210, can be linked with data corresponding to an entity or assets over time. For example, the unified safeguard token 1210 can be linked via node D to a unified assets token 1260 including various asset data, such as assets lists, asset types, and/or so on. In some examples, the dynamic passport 932 can be linked with (e.g., mapped to) data corresponding with insurability over time. For example, the dynamic passport 932 can be linked, via the insurability data 1232 of the effectiveness token 1230, with an insurability token 1270*a* via node E and an insurability token 1270*b* via node F. At least one (e.g., each) of the insurability tokens 1270 can include various data corresponding to an organization or entity insurability over time, such as safeguard test results and results of comparisons of safeguard test results to requirements. That is, the insurability token 1270*a* and insurability token 1270*b* can include data or metadata reflecting changes in a risk profile, updates to insurance coverage terms, and/or/or the impact of implemented security measures on insurability. Further, the insurability token 1270*a* and insurability token 1270*b* can correspond to respective times T at which the insurability data was captured and/or updated for at least one (e.g., each) of the insurability tokens 1270*a*-1270*b*, respectively.

Figure 12D:
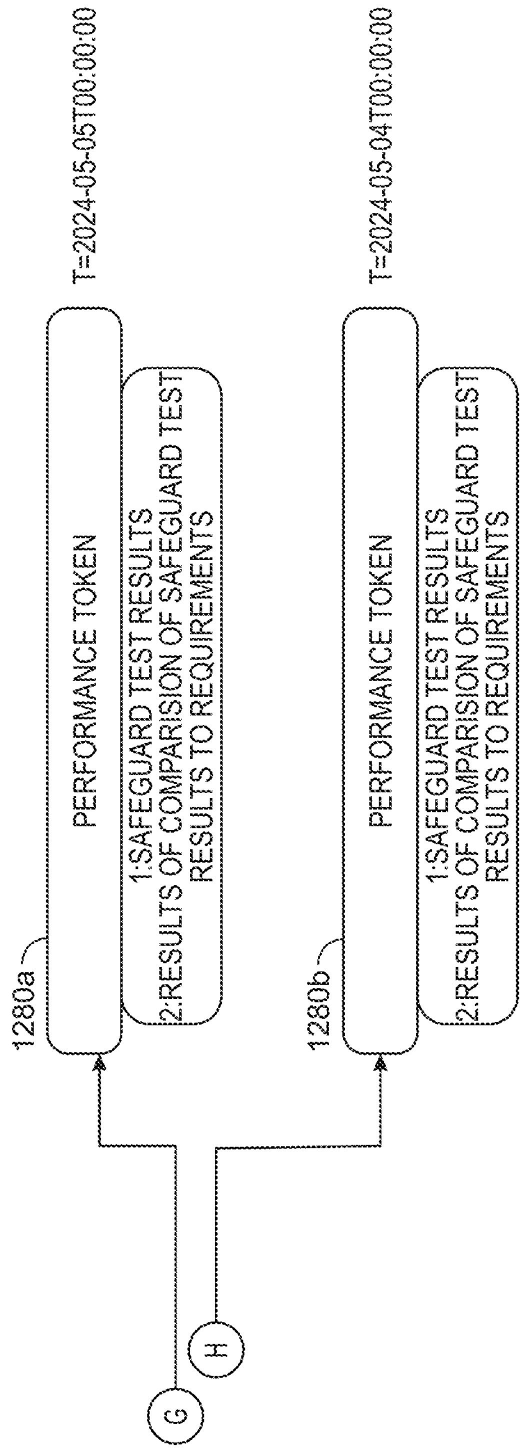

Referring now to FIG. 12D, the dynamic passport 932 can be linked with (e.g., mapped to) data corresponding with performance over time. For example, the dynamic passport 932 can be linked, via the performance data 1234 of the effectiveness token 1230, with a performance token 1280*a* via node G and a performance token 1280*b* via node H. At least one (e.g., each) of the insurability tokens 1270 can be generated by the token system 828 and include various data corresponding to an organization or entity performance over time, such as safeguard test results and results of comparisons of safeguard test results to requirements. That is, the performance token 1280*a* and performance token 1280*b* can include data or metadata reflecting the effectiveness of implemented safeguards, the frequency of security audits, and/or adherence to established security protocols over time periods. Further, the performance token 1280*a* and performance token 1280*b* can correspond to respective times T at which the performance data was captured and/or updated for at least one (e.g., each) of the performance tokens 1280*a*-1280*b*, respectively. In some implementations, one or both of the performance tokens 1280*a*, 1280*b*, and/or one or both of the insurability tokens 1270*a*, 1270*b*, can be linked to the dynamic passport 932 as a performance data set and be accessible to various individuals or entities for cyber resilience actions (assessing or adjusting insurance premiums, buying or selling cyber insurance on a marketplace, and/or making decisions related to the implementation of further security measures) based on rules (e.g., RBACs) or other access controls.

Figure 13A:
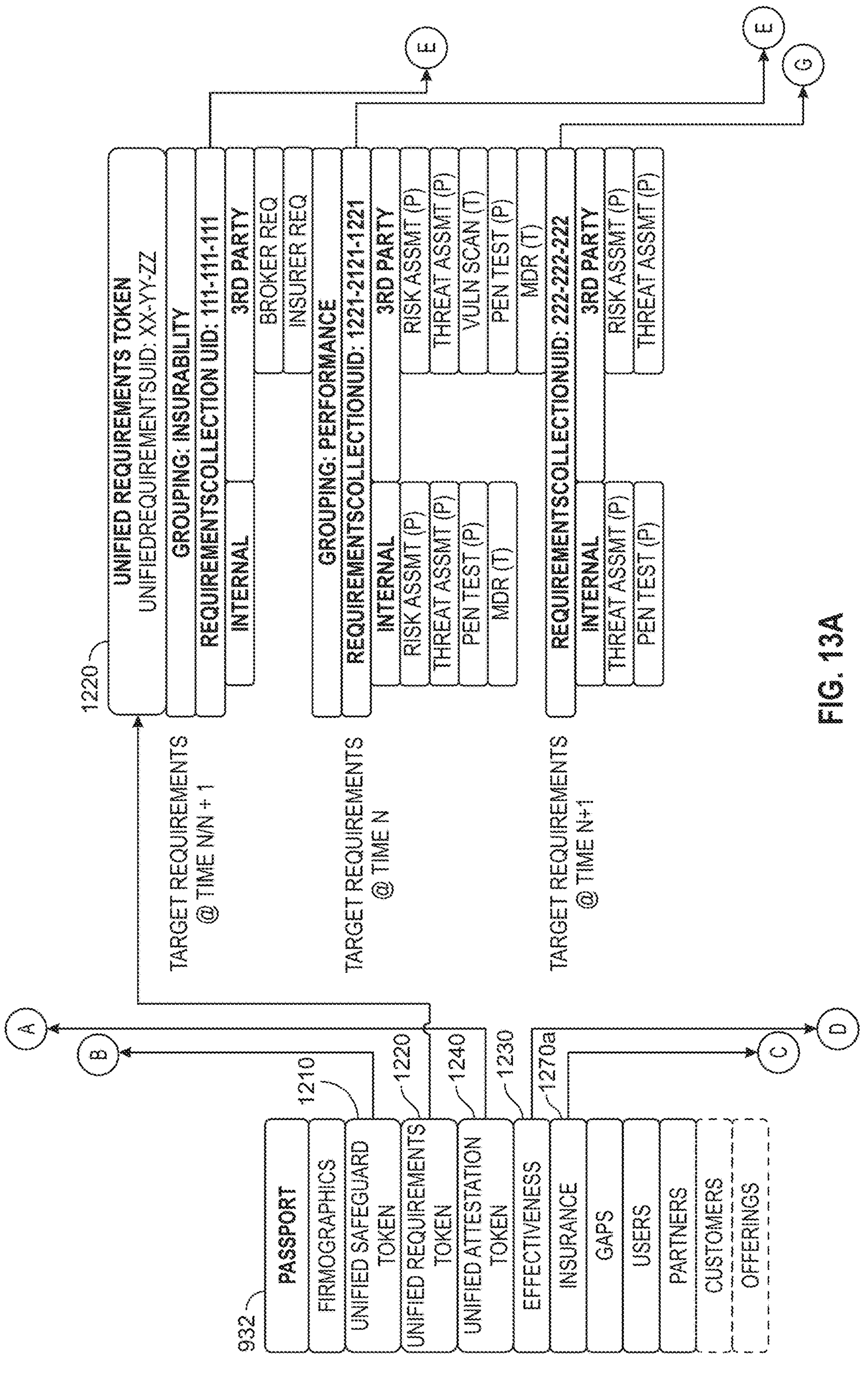
FIGS. 13A-13I depict an architecture for tokenized cyber resilience data, according to some implementations.

Referring generally to FIGS. 13A-13I, an architecture for tokenized cyber resilience data is shown, according to some implementations. Referring now to FIG. 13A, the dynamic passport 932 can include various cyber resilience data, such as firmographics data, unified safeguards token 1210, unified requirements token 1220, unified attestation token 1240, effectiveness token 1230, insurability token 1270*a*, gap information, users, partners, customers, offerings, and/or so on. In some examples, the unified safeguards token 1210 can receive data/be linked with other systems or data via node A, the unified attestation token 1240 can receive data/be linked with other systems or data via node B, the effectiveness token can receive data/be linked with other systems or data via node C, and/or the insurability token 1270*a* can receive data/be linked with other systems or data via node D, as further described herein. In some implementations, entities can interact with and/or access the dynamic passport 932 and/or linked tokens (e.g., unified safeguards token 1210, unified requirements token 1220) based on various rules (e.g., access controls with various access parameters).

In some implementations, FIGS. 13A-13I illustrates tokenized cyber security data over various times (e.g., time N/N+1, time N, time N+1, etc.). In some implementations, unified tokens (e.g., unified safeguards token 1210, unified requirements token 1220, unified attestation token 1240, etc.) can store metadata of cyber resilience data over a time period. For example, the unified requirements token 1220 can be generated by the token system 828 and can include a unified requirements UID and an insurability grouping with grouped cyber resilience data. In another example, the unified requirements token 1220 can include a first requirements collection UID corresponding to requirements (e.g., cyber resilience standards for a policy) at a first time (e.g., time N/N+1), which can be linked with other systems/and or data via node E, as further described herein. In another example, the unified requirements token 1220 can include a second requirements collection UID corresponding to requirements at a second time (e.g., time N+1), which can be linked with other systems/and or data via node F, as further described herein. Still yet, in another example, the unified requirements token 1220 can include a third requirements collection UID corresponding to requirements at a third time (e.g., time N), which can be linked with other systems/and or data via node G, as further described herein. For example, the first, second, and/or third UID can correspond to various internal and/or third-party cyber resilience requirements at different times, such as risk assessment data, threat assessment data, other testing data, MDR data, pen test data, vulnerability scan data, broker requirements, insurer requirements, and/or so on.

Figure 13B:
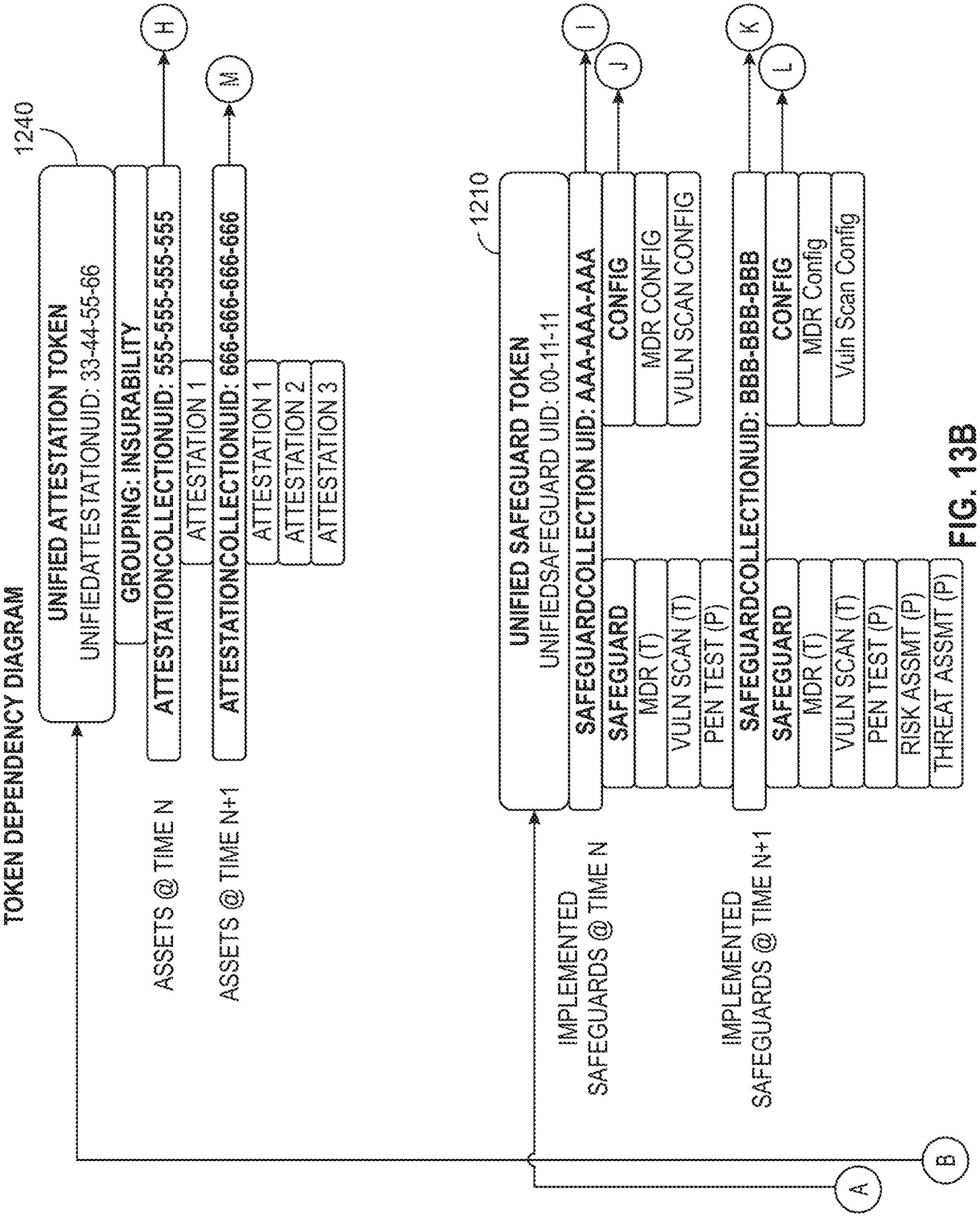

Referring now to FIG. 13B, the unified attestation token 1240 can be linked to the dynamic passport 932 via node A. As described regarding the unified requirements token 1220, the unified attestation token 1240 can include groupings and/or data corresponding to attestations at various times. For example, the unified attestation token 1240 can be generated by the token system 828 and can include an insurability grouping with a first attestation collection UID corresponding with assets (e.g., attestation 1) at a first time (e.g., time N), and/or the first attestation collection UID can be linked with other systems/data via node H. Further, the unified attestation token 1240 can include a second attestation collection UID corresponding with assets (e.g., attestation 1, attestation 2, attestation 3, etc.) at a second time (e.g., time N+1), and/or the second attestation collection UID can be linked with other systems/data via node M. In some implementations, the unified safeguard token 1210 can be linked to the dynamic passport 932 via node B. For example, as described above, the unified safeguard token 1210 can include groupings and/or data corresponding to safeguards at various times. For example, the unified safeguard token 1210 can include a first safeguard collection UID corresponding with safeguards (e.g., MDR, vulnerability scans, penetration test rules, etc.) at a first time (e.g., time N), and/or the first safeguard collection UID can be linked with other systems/data via node I. The unified safeguard token 1210 can further include a first configuration, which can be linked to other data/systems via node J and include data corresponding to cyber resilience systems and/or protection techniques implemented in an organization cyber resilience architecture (e.g., MDR configurations, vulnerability scan configurations, etc.). Further, the unified safeguard token 1210 can include a second safeguard collection UID corresponding with safeguards implemented at a second time (e.g., time N+1), and/or the second attestation collection UID can be linked with other systems/data via node K. The unified safeguard token 1210 can further include a second configuration, which can be linked to other data/systems via node L.

Figure 13C:
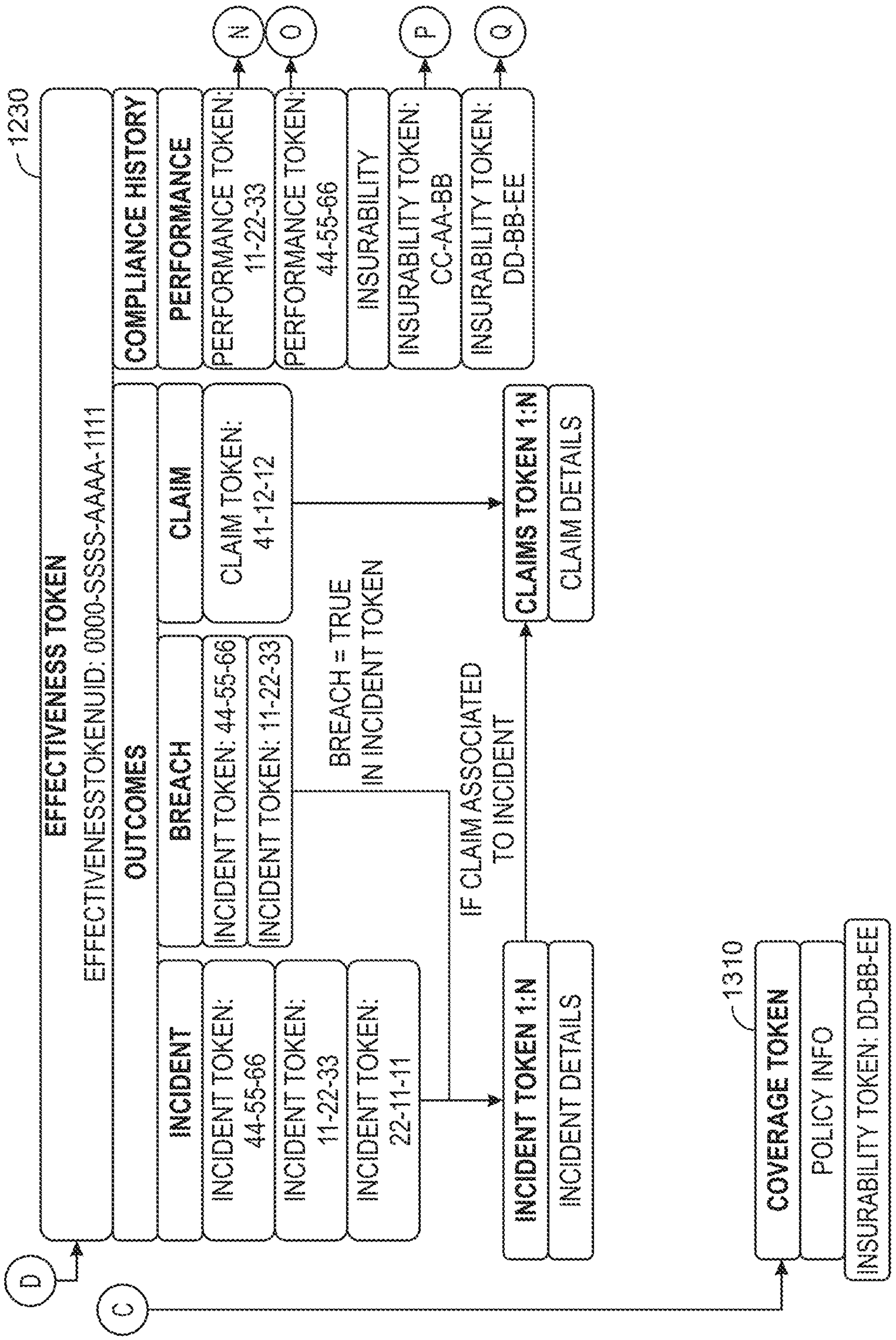

Referring now to FIG. 13C, a coverage token 1310 can be linked to the dynamic passport 932 via node C. In some examples, the coverage token 1310 can be generated by the token system 828 can include cyber protection information such as policy information (e.g., policy number, type, etc.) and various tokens including insurability information (e.g., an insurability token). In some implementations, the effectiveness token 1230 can be linked to the dynamic passport 932 via node D. The effectiveness token 1230 can include various data corresponding to cyber resilience outcomes, such as incident data (e.g., via incident tokens 1 through N), corresponding breach data (e.g., via incident tokens 1 through N), and/or corresponding claims data (e.g., via claims tokens 1 through N associated with incident tokens 1 through N). In some implementations, the effectiveness token 1230 can include various data corresponding to cyber resilience compliance history, such as performance data. For example, the performance data can include multiple performance tokens including respective timestamps or identifiers corresponding to cyber resilience performance of an entity during one or more incidents/breaches or claims associated with incident tokens and/or claims tokens, and/or the performance tokens (e.g., performance tokens 1280*a*-1280*b*) can be linked to other data/systems via node N and node O. In some implementations, the effectiveness token 1230 can include insurability data, such as one more insurability tokens (e.g., received via coverage token 1310). In some examples, the insurability tokens (e.g., insurability tokens 1270*a*-1270*b*) can be linked to other data/systems via node P and node Q.

Figure 13D:
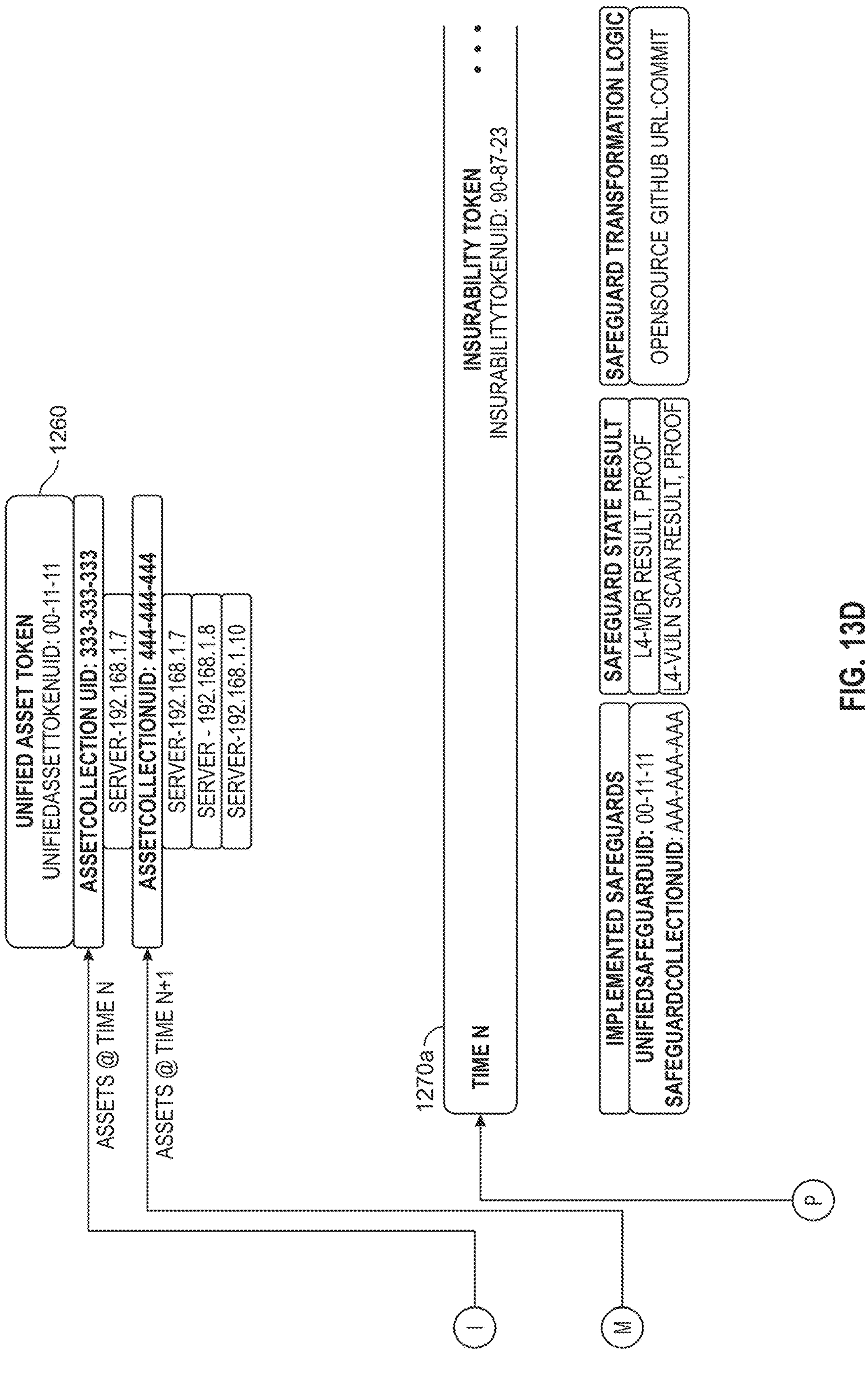
Figure 13E:
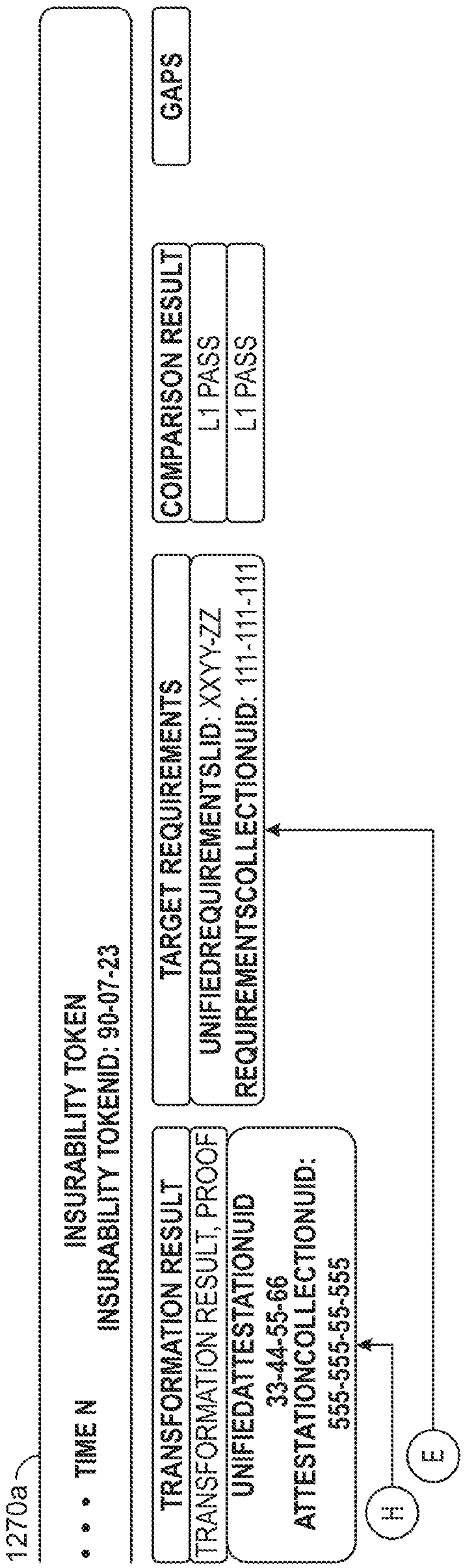

Referring now to FIG. 13D, the dynamic passport 932 can be linked to the unified asset token 1260 via node I and/or via node M. For example, the unified asset token 1260 can be generated by the token system 828 and can include a first grouping of assets (e.g., server identifier 1) at a first time (e.g., time N) and a second grouping of assets (e.g., server identifier 1, server identifier 2, server identifier 3, etc.) at a second time (e.g., time N+1). In some implementations, the insurability token 1270*a* can be linked to the dynamic passport 932 via node P with the effectiveness token 1230. For example, the insurability token 1270*a* can include insurability data at a first time (e.g., time N), such as implemented safeguards and associated identifiers, safeguard state results (e.g., L4-MDR result and proofs, L4-vulnerability scan results and proofs), and/or/or safeguard transformation logic (e.g., accessible via a URL or other link). Referring now to FIG. 13E, the insurability token 1270*a* can further include a transformation result and/or proof, which can be linked via UIDs to node H with the unified attestation token 1240. The insurability token 1270*a* can further include target requirements, which can be linked via UIDs or other identifiers with the unified requirements token 1220. The insurability token 1270*a* can further include comparison results (e.g. L1) pass, gap data (e.g., data of missing and/or inadequate cyber protections), and/or more.

Figure 13F:
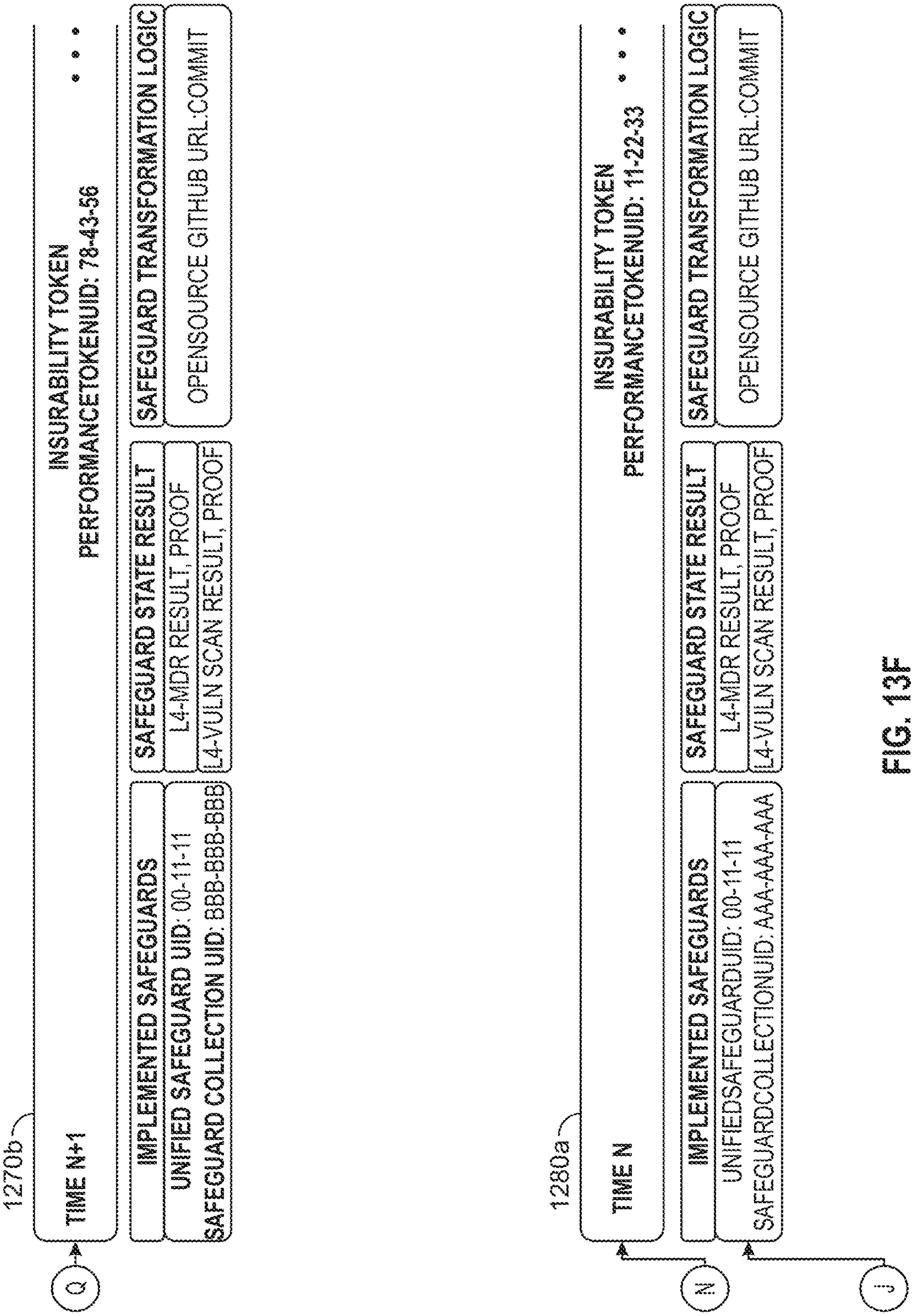

Referring now to FIG. 13F, the dynamic passport 932 can be linked to the insurability token 1270*b* via node Q. As shown in FIG. 13F, the insurability token 1270*b* can be generated by the token system 828 and can include insurability data at a second time (e.g., time N+1), such as implemented safeguards and associated identifiers, safeguard state results, and/or/or safeguard transformation logic. For example, the insurability token 1270*b* can include encrypted data of implemented safeguards, such as firewall configurations or endpoint protection settings, verified against cyber resilience requirements. The encrypted data can be encapsulated within a control structure configured to restrict updates or access based on cryptographic proofs, allowing authorized entities (e.g., those with permitted access based on RBACs) to modify, create, view, and/or/or retrieve the data in accordance with access controls defined for the dynamic passport 932. In some implementations, the dynamic passport 932 can be linked to the performance token 1280*a* via node N with the effectiveness token 1230. In some examples, the performance token 1280*a* can include performance data of an entity at a first time (e.g., time N), including implemented safeguards, results, transformation logic, and/or so on. In some implementations, the implemented safeguards can be linked, via node J, with a configuration of the unified safeguard token 1210.

Figure 13G:
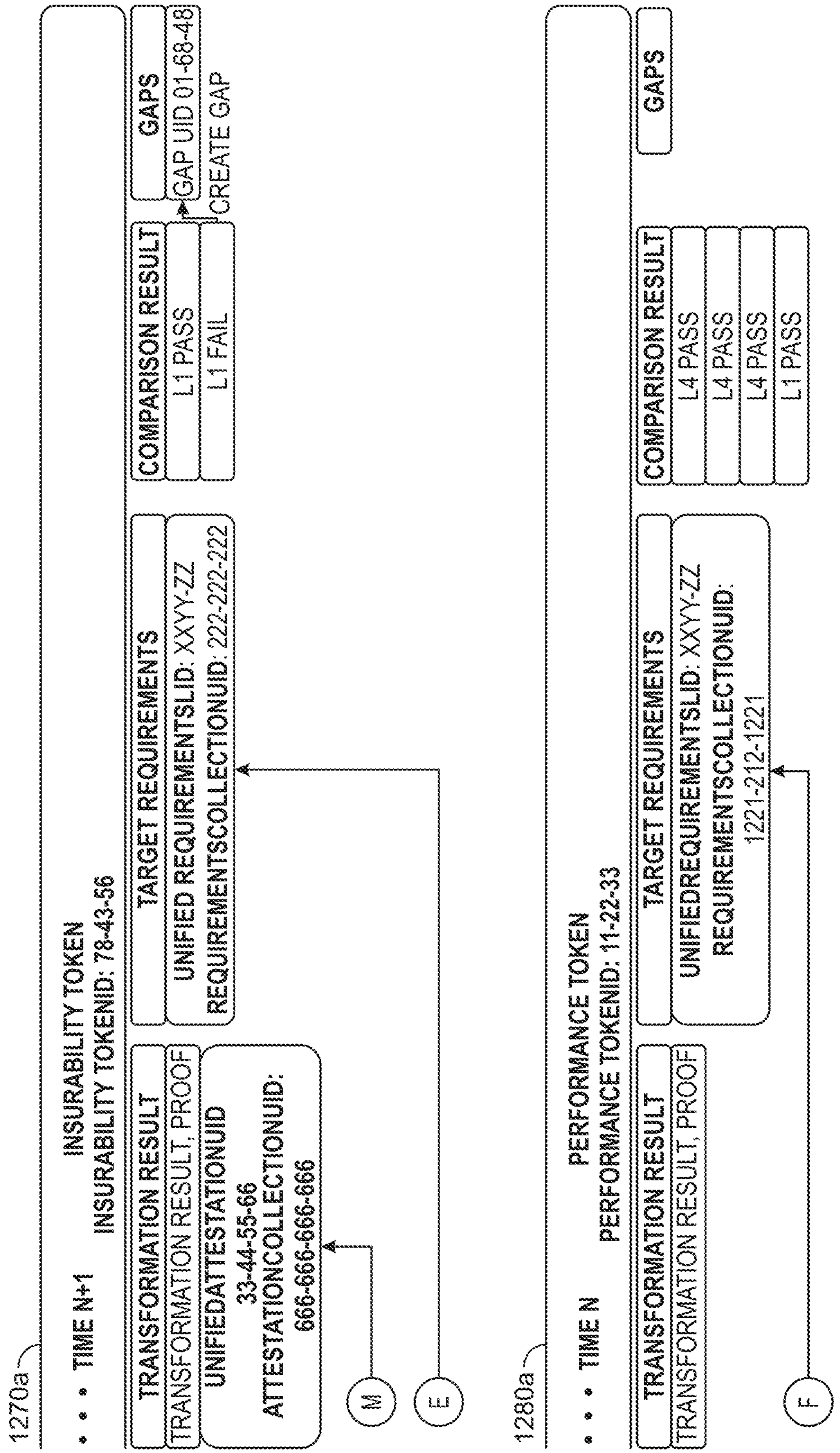

Referring now to FIG. 13G, the insurability token 1270*b* can further include a transformation result and/or proof, which can be linked via UIDs to node M with the unified attestation token 1240. In some implementations, the insurability token 1270*b* can be generated by the token system 828 and can further include target requirements, which can be linked via UIDs or other identifiers with the unified requirements token 1220 via node E. Further, the insurability token 1270*a* can further include comparison results (e.g. L1 pass/fail), gap data (e.g., gap UIDs), and/or so on. In some implementations, the performance token 1280*a* can further include transformation results and/or proofs, comparison results (e.g., LA pass/fail), and/or gaps. Further, the insurability token 1270*b* (or another token) can store cryptographic proofs of provenance corresponding with and entity and/or associated cyber resilience data. In some examples, the performance token 1280*a* can include target requirements and associated IDs, accessible via node F, from the unified requirements token 1220.

Figure 13H:
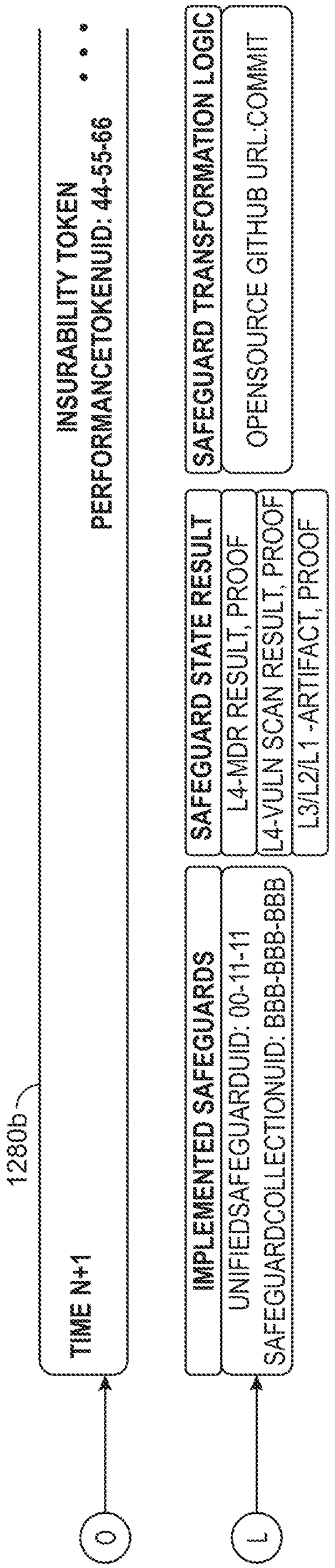
Figure 13I:
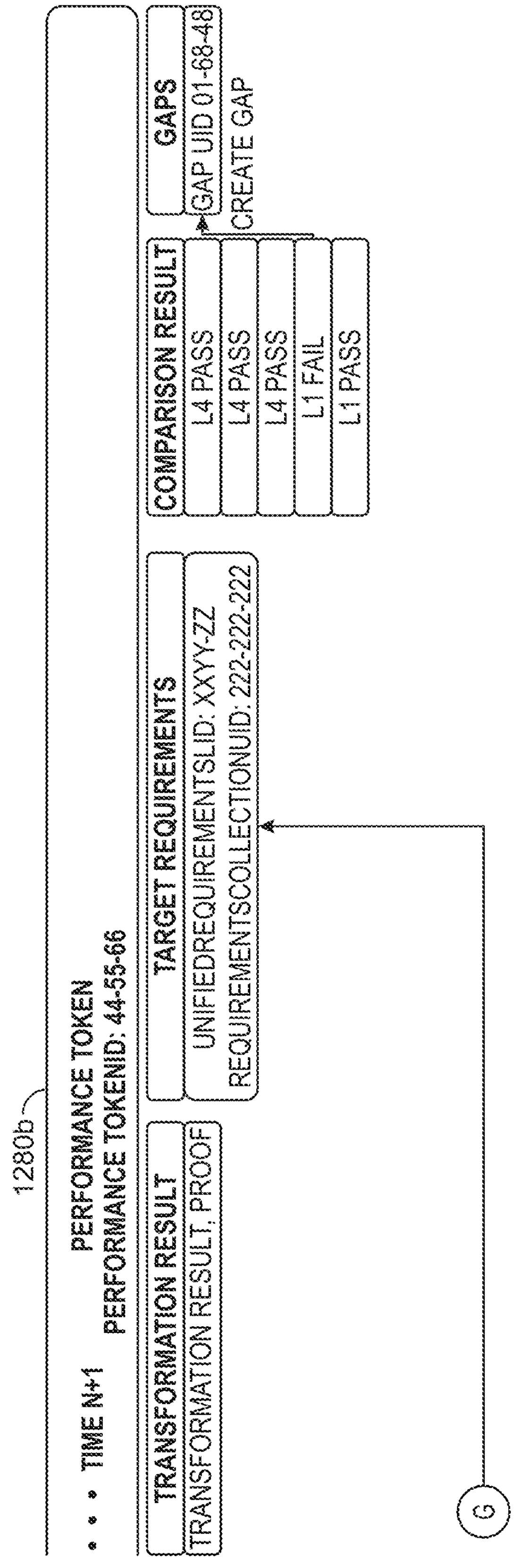

Referring now to FIG. 13H, the dynamic passport 932 can be linked to the performance token 1280*b* via node O with the effectiveness token 1230. In some examples, the performance token 1280*b* can be generated by the token system 828 and can include performance data of an entity at a second time (e.g., time N+1), including implemented safeguards, results, transformation logic, and/or so on. For example, the performance token 1280*a* and the performance token 1280*b* can include performance data sets encapsulated within a control structure corresponding to the dynamic passport 932, and/or access to data of the performance tokens 1280*a*-1280*b* can be granted based on an access data structure compatible with a control structure (e.g., allowing authorized entities to retrieve and/or update metadata of the performance token 1280*b* based on access controls, restricting access and/or updates to the performance data based on access controls, etc.). In some implementations, the implemented safeguards can be linked, via node L, with a configuration of the unified safeguard token 1210. Referring now to FIG. 13I, the performance token 1280*b* can further include transformation results and/or proofs, comparison results, and/or gaps. The performance token 1280*b* can also include target requirements and identifiers received via node G with the unified requirements token 1220.

Figure 14:
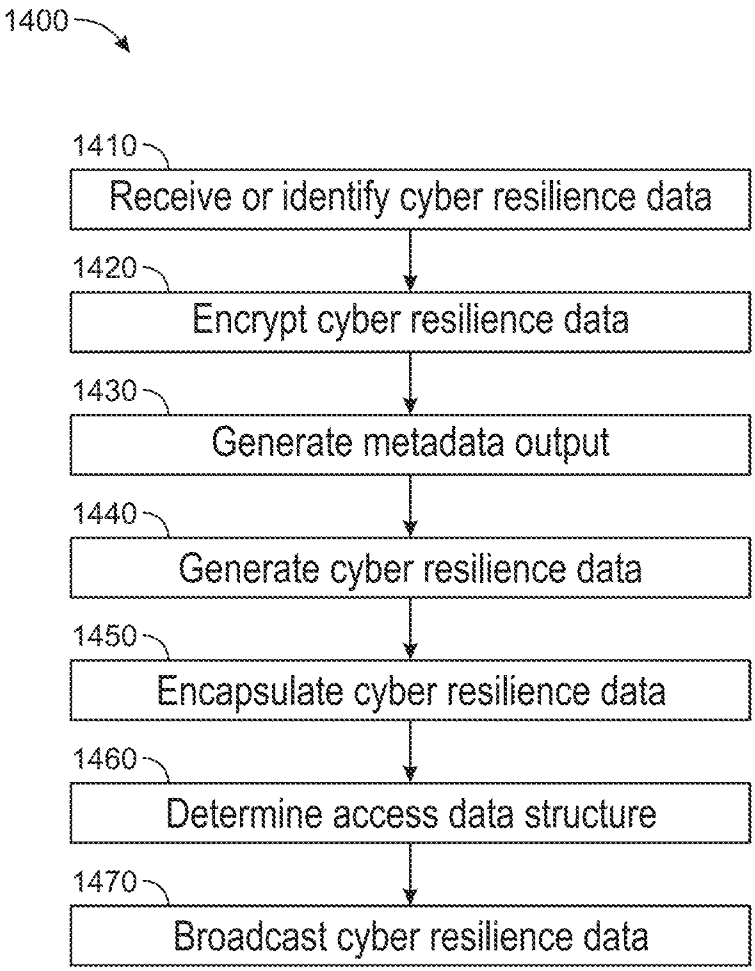
FIG. 14 depicts a flowchart for a method of modeling cyber resilience data using cyber resilience identities and associated metadata, according to some implementations.

Referring now to FIG. 14, a flowchart for a method 1400 of modeling cyber resilience data using cyber resilience identities and associated metadata is shown, according to some implementations. One or more of the components described with respect to FIG. 1 or FIG. 8 can be used to perform the steps of method 1400. For example, the response system 130 of FIG. 1 or the passport system 820 of FIG. 8 can perform one or more of the steps of the method 1400. Additional, fewer, and/or different operations can be performed depending on the particular implementation. In some implementations, some, and/or all operations of method 1400 can be performed by one or more processors executing on one or more computing devices, systems, and/or servers. In some implementations, at least one (e.g., each) operation can be re-ordered, added, removed, and/or repeated.

In a broad overview of method 1400, at block 1410, the one or more processing circuits (e.g., passport system 820 of FIG. 8) can receive or identify cyber resilience data. At block 1420, the one or more processing circuits can encrypt the cyber resilience data. At block 1430, the one or more processing circuits can generate a metadata object. At block 1440, the one or more processing circuits can generate a cyber resilience identity. At block 1450, the one or more processing circuits can encapsulate the cyber resilience identity. At block 1460, the one or more processing circuits can determine an access data structure. At block 1470, the one or more processing circuits can broadcast the cyber resilience identity.

In some implementations, at block 1410, the one or more processing circuits can receive or identify cyber resilience data. For example, the metadata collection system 828 of the passport system 820 can gather performance data 1010*a*, firmographics data 1010*b*, safeguard data 1010*c*, policy data 1010*d*, incident data 1010*e*, and/or claims data 1010*f*. In some examples, the passport system 820 can interface with blockchain 170 to retrieve historical cybersecurity events and insurance-related data. In another example, the token system 828 can provide data corresponding to token transactions and associated cyber resilience metadata, and/or the passport system 820 can receive or identify the tokenized cyber resilience data via interactions with various tokens (e.g., performance tokens, roll-up tokens, etc.). In another example, the metadata collection system 828 can receive cyber resilience data from client devices 110 or from third-party systems 150 through the ledger interface 824. In another example, the metadata collection system 828 can receive encrypted cybersecurity posture information and insurance data when a company signs up on the platform. In some implementations, the passport system 820 can collect and process retrieved cyber resilience data related to the historical cybersecurity performance and current risk assessments of the company. Further, in another example, the passport system 820 can gather data from external cybersecurity assessment tools integrated via the ledger interface 824.

In some implementations, at block 1420, the one or more processing circuits can encrypt the cyber resilience data. For example, the cryptographic system 822 of the passport system 820 can apply various encryption algorithms or techniques (e.g., AES-256, RSA, ECC (Elliptic Curve Cryptography), etc.) to encrypt various types of cyber resilience data (e.g., performance data 1010*a*, safeguard data 1010*c*, etc.). In some implementations, at block 1420, the one or more processing circuits can encrypt a portion of the cyber resilience data. That is, the passport system 820 can selectively encrypt portions of the cyber resilience data (e.g., encrypting attributes within policy data 1010*d* or particular records in claims data 1010*f*) received at block 1410 based on determined parameters (e.g., sensitivity, relevance, etc.) corresponding to the data or based on various additional factors (e.g., entity preferences, regulations, policy requirements, etc.). For example, the cryptographic system 822 can selectively encrypt attributes within policy data 1010*d*, such as encryption of policy coverage data, while leaving other attributes unencrypted. In another example, the passport system 820 can apply encryption to claims data 1010*f* to encrypt sensitive or private data such as financial amounts or claim descriptions based on determined sensitivity levels or regulatory requirements, and/or the passport system 820 can not apply encryption to other received data (e.g., firmographics data 1010*b*) such that at least a portion of data received at block 1410 is encrypted. Further, the passport system 820 can perform encryption dynamically as data is ingested or updated (e.g., encrypting transaction data when such data is entered into the system or encrypting data subsets based on access control policies).

In some implementations, at block 1430, the one or more processing circuits can generate a metadata object. In some examples, a metadata object generally refers to a structured set of data that provides information about other data, including data such as identification information, descriptive information, administrative information, structural information, and/or contextual information to assist in organizing, finding, and/or understanding the underlying data. For example, the passport system 820 can generate a metadata object including various attributes such as data collection timestamps, data source identifiers, and/or categorization tags. In another example, the metadata object can be generated to include information about the cyber resilience data, such as data on the origin of the data (e.g., client devices 110 or third-party systems 150), data processing stages, and/or data types (e.g., performance data 1010*a* or policy data 1010*d*). In some implementations, at block 1430, the one or more processing circuits can generate a metadata object including metadata of cyber resilience data. For example, the passport system 820 can generate a metadata object (e.g., information of a token) to encapsulate data related to the encrypted cyber resilience data (e.g., encryption algorithms used, encryption timestamps) and include references to related events or records (e.g., linking policy data 1010*d* that can be encrypted to security incidents or compliance checks). Further, the metadata object generated by the passport system 820 can incorporate contextual information about data handling practices (e.g., data access controls, audit trails) and compliance measures (e.g., adherence to industry standards or internal policies) corresponding to cyber resilience data received or collected at block 1410.

In some implementations, at block 1440, the one or more processing circuits can generate a cyber resilience identity. In some examples, a cyber resilience identity generally refers to a dynamic, unique identifier that encapsulates various aspects of an entity or organization cyber resilience posture (e.g., dynamic passport 932). For example, the passport system 820 can generate a dynamic passport 932 that includes a link to the metadata object, and/or the metadata object can provide context about the cyber resilience data (e.g., data type, encryption data, data source information, etc.). In some implementations, the passport system 820 can generate a cyber resilience identity linked to a unique identifier (UID) of an entity or organization. For example, the UID can be assigned by the passport system 820 to uniquely reference and track the entity cyber resilience data and provide the entity with access to such data. Further, in some examples, the passport system 820 can generate a cyber resilience identity incorporating or being otherwise linked to a performance event dataset (e.g., cyber resilience dataset used to record performance metrics, security incidents, and/or compliance activities linked to the data of the entity). For example, the passport system 820 can generate the dynamic passport 932 to reflect updates from performance tokens, track incident logs, and/or link such records with relevant compliance checks. Further, as new data or events occur, the passport system 820 can update the cyber resilience identity (e.g., dynamic passport 932) to reflect new or updated information.

In some implementations, at block 1450, the one or more processing circuits can encapsulate the cyber resilience identity. For example, encapsulation can generally including securing, containerizing, and/or/or packaging the cyber resilience identity within a data structure. In some implementations, at block 1450, the one or more processing circuits can encapsulate the cyber resilience identity within a control structure restricting one or more updates or redemptions of the metadata object. For example, the passport can be linked to a control structure which can define permissions or conditions under which a metadata object (e.g., data of tokens) can be altered or accessed. In some examples, the control structure can include tokens that represent secure access points or validation measures for the encapsulated identity. In another example, the passport system 820 can use a digital signature within the control structure to verify the authenticity of the encapsulated cyber resilience identity and protect the identity and corresponding resilience data from tampering. Additionally, the passport system 820 can implement access controls (e.g., RBACs) within the control structure that restrict access based on user roles or access levels to verify that authorized entities can modify or view elements of the cyber resilience identity. For example, the control structure can incorporate a dynamic passport 932, which can include tokens 934*a*-934*e* (e.g., resilience tokens), at least one (e.g., each) linked to a metadata interface 970 with metadata objects 972*a*-972*e*. In some examples, encapsulating can include the passport system 820 storing or aggregating the dynamic passport 932 and tokens 934 and setting corresponding access permissions (e.g., based on compliance with cyber resilience standards). For example, the control structure processor 930 can output the encapsulated data when conditions or permissions are verified or when a valid decryption key is presented.

In some implementations, at block 1460, the one or more processing circuits can determine an access data structure. For example, an access data structure can define a format and/or organization of data that specifies how access permissions and conditions are structured and/or enforced. For example, the access data structure can incorporate access control lists (ACLs) or attribute-based access control (ABAC) mechanisms to specify access rights and restrictions based on user attributes or roles. In some implementations, at block 1460, the one or more processing circuits can determine at least one access data structure being compatible with the control structure. For example, the passport system 820 can identify an access data structure that aligns with the permissions and constraints established by control structure processor 930. For example, the passport system 820 can identify an access data structure that conforms to the permissions and constraints established by the smart contract control structure 920. Additionally, the passport system 820 can integrate the access data structure with the smart contract control structure 920 by implementing token-based authorization or rule-based access controls to manage access to the cyber resilience identity. Further, the passport system 820 can configure the access data structure to enforce access permissions and conditions using control protocols (e.g., token validation procedures through token interface 910 or multi-factor authentication settings within the smart contract control structure 920). For example, the passport system 820 can configure an access data structure that uses token-based authorization to allow entities with valid tokens (e.g., tokens 934*a*-934*e*) generated by token generator 940 to access certain metadata objects 972 within the dynamic passport 932.

In some implementations, at block 1470, the one or more processing circuits can broadcast the cyber resilience identity. For example, the passport system 820 can broadcast the generated cyber resilience identity, including its associated metadata and performance event dataset, to a distributed ledger such as blockchain 170. In some examples, broadcasting can include the passport system 820 using the blockchain interface 960 to transmit the identity and associated data so that it is securely recorded and accessible across the distributed ledger network. In some implementations, at block 1470, the one or more processing circuits can broadcast the cyber resilience identity to a ledger or distributed ledger. For example, the passport system 820 can use the blockchain interface 960 to broadcast the cyber resilience identity to blockchain 170, where it can be immutably stored and made accessible for future verification and audit. In another example, the passport system 820 can broadcast the identity to multiple nodes within a distributed ledger, distributing the validation and recording of the cyber resilience identity across the network. Further, the broadcast can include cryptographic proofs or signatures to authenticate the identity, restricting updates or accesses to the identity as recorded on the ledger to authorized entities. For example, the passport system 820 can broadcast the dynamic passport 932, along with linked tokens 934*a*-934*e* and associated metadata objects 972*a*-972*e*, to blockchain 170, where the broadcasted information can be validated by consensus mechanisms and securely stored across the distributed ledger.

In some implementations, the one or more processing circuits can receive an access request for the cyber resilience identity. In some implementations, the one or more processing circuits can receive, from an entity computing system corresponding to the cyber resilience identity or from an authorized entity computing system corresponding to an authorized entity of a plurality of authorized entities, an access request including at least one access data structure compatible with a control structure for restricting one or more updates and redemptions of a metadata object corresponding with the cyber resilience identity. That is, the passport system 820 can receive an access request that includes data structures, such as access tokens or certificates, which are evaluated against role-based access controls (RBACs) defined by the control structure (e.g., smart contract). In some examples, the cyber resilience identity can be associated with an entity and can be encapsulated within a control structure that links the identity to various tokens, such as performance tokens or safeguard tokens, which authorized entities (e.g., vendors, insurers) can request access to (e.g., a type of access such as read access, write access, etc.).

In some implementations, the one or more processing circuits can verify the access data structure. In some implementations, the one or more processing circuits can verify the at least one access data structure using the control structure. For example, the control structure (e.g., smart contract) can assess whether the access request complies with the predefined role-based access controls (RBACs) and cryptographic validation protocols. That is, verifying can include determining if the requesting entity has permissions to access or modify tokens or tokenized data within the cyber resilience identity, allowing authorized entities to interact with the associated metadata objects or performance event datasets in various ways based on various access controls.

In some implementations, the one or more processing circuits can grant access to the metadata object and the performance event dataset of the cyber resilience identity. In some implementations, the one or more processing circuits can grant access to the metadata object and the performance event dataset to the entity or the authorized entity. For example, after verifying the access request, the passport system 820 can grant access to tokens within the cyber resilience identity, such as performance tokens or safeguard tokens. That is, granting access can include permitting or allowing the client device 110 or the authorized entity computing system (e.g., third-party system 150 or client device 110) to retrieve information about the cyber resilience performance of an entity over time or to view and interact with tokenized data, depending on the permissions defined by the RBACs.

In some implementations, the one or more processing circuits can decrypt the metadata object. In some implementations, the one or more processing circuits can decrypt the metadata object after access is granted. For example, the passport system 820 can use the cryptographic system 822 to decrypt tokens or portions of tokenized data as permitted by the verified access request. That is, the decryption process can be applied selectively, allowing the data segments authorized by the RBACs to be decrypted and made accessible to the requesting entity. Additionally, the decryption can be performed in real-time as the access request is processed, maintaining the security of the metadata object throughout the interaction.

In some implementations, the one or more processing circuits can provide access to the metadata object and the performance event dataset. In some implementations, the one or more processing circuits can provide access to the metadata object and the performance event dataset by facilitating retrieval using a secure interface between the one or more processing circuits and the entity computing system or the authorized entity computing system. For example, the passport system 820 can use a secure interface, such as a blockchain interface 960, to allow the client device 110 or the authorized entity computing system to retrieve and interact with the decrypted metadata object and performance event dataset. That is, the interface enforces the RBACs and control structure policies during data retrieval, restricting access to the performance tokens and other sensitive information to authorized entities. Additionally, encryption protocols can be applied during data transmission to protect the integrity and confidentiality of the data as it is accessed by the requesting entity.

In some implementations, the control structure includes a verification function to restrict the one or more updates and redemptions of the metadata object. For example, the smart contract control structure 920 can include a verification function that validates requests to update or redeem the metadata object based on predefined rules or policies. This function can operate within the control structure to restrict any attempted updates or redemptions to those that meet verification criteria. In some implementations, the verification function is executable by control structure to validate one or more of the one or more updates and redemptions of the metadata object by verifying one or more cryptographic proofs of authorization of authorized entities prior to updating the cyber resilience identity. For example, the smart contract control structure 920 can execute a verification function that checks cryptographic proofs, such as digital signatures or hashed authentication tokens, from multiple authorized entities before processing any changes to the metadata object. In another example, the verification function can cross-reference these cryptographic proofs with a list of pre-approved entities stored within the smart contract control structure 920 to verify that entities with the correct authorization can initiate updates. Additionally, the verification function can include multi-factor authentication protocols, where authorized entities provide multiple forms of verification (e.g., a combination of cryptographic proofs and biometric data) before any updates to the cyber resilience identity (e.g., dynamic passport 932) are processed.

In some implementations, the one or more processing circuits can be further configured to receive or identify additional cyber resilience data of an entity corresponding to the cyber resilience identity. For example, the metadata collection system 828 of the passport system 820 can gather additional data that complements the performance data 1010*a*, safeguard data 1010*c*, and/or other cyber resilience data previously received at block 1410. This additional data can include updated incident data 1010*e* or newly identified vulnerabilities from third-party systems 150. In some implementations, the one or more processing circuits can be further configured to receive at least one cryptographic proof of provenance of the additional cyber resilience data. For example, the passport system 820 can generate a cryptographic proof of provenance by creating a secure hash (e.g., using SHA-256) of the additional cyber resilience data, such as a software update or new compliance report. This proof of provenance can be used to verify the origin and integrity of the data, ensuring that it has not been tampered with during transmission or storage. In some implementations, the one or more processing circuits can be further configured to verify, using the verification function of the control structure, the at least one cryptographic proof of provenance. For example, the smart contract control structure 920 can compare the cryptographic proof with existing transaction records and digital signatures stored within blockchain 170 or other distributed ledgers, validating the authenticity and integrity of the newly received data before it is appended to the cyber resilience identity.

In some implementations, the one or more processing circuits can be further configured to update, using the control structure, the cyber resilience identity by updating the metadata object or appending the additional cyber resilience data to the performance event dataset. For example, the smart contract control structure 920 can automatically update the metadata object to reflect new security incidents or append the additional data to the performance event dataset, linking the metadata object with existing records in dynamic passport 932. In some implementations, the one or more processing circuits can be further configured to broadcast, using the control structure, the updated cyber resilience identity to the ledger or the distributed ledger. For example, the passport system 820 can use blockchain interface 960 to broadcast the updated cyber resilience identity and verify that nodes within blockchain 170 receive the update and that the updated identity is securely recorded across the distributed ledger for future verification and access.

In some implementations, the one or more processing circuits can be further configured to receive, from an entity computing system of an entity corresponding to the cyber resilience identity or from an authorized entity computing system corresponding to an authorized entity of a plurality of authorized entities, an access request for the cyber resilience identity. For example, the passport system 820 can receive an access request from third-party systems 150 or client devices 110, where the request can originate from an entity seeking to access or update the cyber resilience identity. This request can be routed through the ledger interface 824, which can validate the origin of the request and determine the appropriate access level. The request can involve accessing data, such as policy data 1010*d* or performance data 1010*a*, with verification against stored access control policies. In some implementations, the access request includes the at least one access data structure. For example, the request can include an access data structure such as a token-based authentication key or a cryptographic certificate that aligns with the smart contract control structure 920 predefined access protocols to identify and authenticate the requesting entity.

In some implementations, the one or more processing circuits can verify, using the control structure, the at least one access data structure. For example, the smart contract control structure 920 can cross-reference the access data structure with stored access permissions, checking against the ACLs or ABAC mechanisms to determine if the requesting entity is authorized to access or modify the cyber resilience identity. In some implementations, the one or more processing circuits can be further configured to grant access to the metadata object and the performance event dataset within the cyber resilience identity to an entity or an authorized entity. For example, upon successful verification, the passport system 820 can unlock portions of the metadata object and performance event dataset, allowing the authorized entity to retrieve and view the data through a secure access protocol. In some implementations, the one or more processing circuits can be further configured to decrypt the metadata object. For example, the cryptographic system 822 of the passport system 820 can apply decryption algorithms to the metadata object, such as decrypting policy data or incident logs for an authorized entity to review. In some implementations, the one or more processing circuits can be further configured to provide access to the metadata object and the performance event dataset by facilitating retrieval using a secure interface between the one or more processing circuits and the entity computing system or the authorized entity computing system. For example, the passport system 820 can establish a secure communication channel with the entity computing system via the ledger interface 824, transmitting the metadata object and performance event dataset to the verified entity or authorized entity.

In some implementations, the cyber resilience identity is a data structure encapsulating a plurality of resilience tokens. For example, the passport system 820 can generate a dynamic passport 932 that includes multiple resilience tokens 934. In some implementations, at least one (e.g., each) of the plurality of resilience tokens corresponds to a cybersecurity dimension of a posture of an entity corresponding to the cyber resilience identity. For example, the unified tokens 912, real-time tokens 914, and/or effectiveness tokens 916 can at least one (e.g., each) represent distinct cybersecurity dimensions, such as implemented safeguards, compliance with requirements, and/or ongoing security assessments. That is, a cybersecurity dimension can correspond to an aspect or category of an overall cybersecurity posture of an entity, such as a performance, requirements, insurability, and/or incident response readiness category. For example, one dimension can include the technical measures in place to prevent unauthorized access (e.g., encryption standards, firewall configurations), and/or another dimension can assess the adherence of the entity to industry regulations (e.g., GDPR compliance). The various tokens described herein collectively provide a multi-faceted or multi-dimensional perspective on the cybersecurity posture, reflecting various aspects or dimensions of the security over time.

In some implementations, the plurality of resilience tokens can include at least one unified token including the cyber resilience data captured over a period of time, at least one evaluation token including the cyber resilience data captured at a plurality of points in time over the period of time, and/or at least one roll-up token including data of the at least one unified token and the at least one real-time corresponding with a security performance of the entity over the period of time. For example, the unified token processor 922 of the smart contract control structure 920 can generate unified tokens 912 that aggregate cybersecurity data (e.g., safeguards, policies, incidents) over a period of time, providing an overview of the cybersecurity measures. The real-time token processor 924 can generate real-time tokens 914 (e.g., evaluation) that capture snapshots of the cybersecurity posture at various intervals, reflecting the ongoing security status of the entity. The effectiveness token processor 926 can generate effectiveness tokens 916 (e.g., roll-up) by combining data from the unified tokens 912 and real-time tokens 914, providing an assessment of the security performance of the entity over time, including significant events or changes in security posture.

In some implementations, the at least one unified token can include a unified safeguard token including data of implemented safeguards and configurations over the period of time, a unified requirements token including data of entity-specific requirements and third-party requirements over the period of time, a unified asset token including data of a plurality of assets of the entity over the period of time, and/or a unified attestation token including data of entity attestations over the period of time. For example, the unified token processor 922 can generate a unified safeguard token that includes records of security measures implemented by the entity, such as firewall settings or encryption protocols, over a specified period. In another example, the unified token processor 922 can generate a unified requirements token that captures compliance data related to internal policies and third-party security standards, tracking how the entity meets these requirements over time. The unified token processor 922 can also generate a unified asset token that records information about the assets of the entity, such as servers, network devices, and/or software licenses, and/or their associated security configurations during the period. Additionally, the unified token processor 922 can generate a unified attestation token that includes data on certifications, audits, and/or attestations made by the entity regarding its cybersecurity posture over the period.

In some implementations, the at least one real-time token can include a plurality of evaluation tokens including data of at least one of a posture of the entity, a state of the entity, and/or a protection of the entity at a point in time of the plurality of points in time over the period of time. For example, the real-time token processor 924 of the smart contract control structure 920 can generate evaluation tokens that capture snapshots of the cybersecurity posture of the entity at various points in time. These tokens can include data on the state of implemented security measures (e.g., firewall rules, encryption status), the overall security posture of the entity (e.g., risk levels, compliance status), and/or the effectiveness of protection mechanisms deployed across the infrastructure of the entity. In another example, the evaluation tokens can reflect the response of the entity to incidents or threats, documenting how the security systems were adjusted or enhanced in real-time. The real-time token processor 924 can also generate tokens that track the operational status of systems within the entity, such as the availability of services or the integrity of key data at intervals. These tokens provide a time-stamped record of the security environment of the entity, which supports analysis of how the cybersecurity posture of the entity changes over time.

In some implementations, the one or more processing circuits can be further configured to generate the at least one access data structure for at least one of an entity computing system of an entity corresponding to the cyber resilience identity or an authorized entity computing system corresponding to an authorized entity of a plurality of authorized entities. For example, the passport system 820 can generate an access data structure that defines access permissions and conditions for the cyber resilience identity, incorporating attributes such as user roles, access levels, and/or data access rights. In another example, the passport system 820 can generate a role-based access control (RBAC) mechanism, where at least one (e.g., each) role is associated with predefined access rights and permissions linked to aspects of the cyber resilience identity. Alternatively, in some implementations, the one or more processing circuits can be further configured to receive, from at least one of the entity computing system or the authorized entity computing system, the at least one access data structure. For example, the passport system 820 can receive an access data structure from a third-party system 150, where the structure includes access control lists (ACLs), attribute-based access control (ABAC) definitions, RBAC policies, and/or various additional and/or alternative controls. In another example, the passport system 820 can receive access tokens or digital certificates from the authorized entity computing system, specifying access permissions and conditions for interacting with the cyber resilience identity.

In some implementations, the least one access data structure can include a token, key, certificate, and/or access mechanism. For example, the passport system 820 can generate a digital token that grants access rights to an authorized entity to interact with certain components of the dynamic passport 932. In another example, the passport system 820 can issue a cryptographic key or digital certificate to decrypt certain portions of the cyber resilience data or verify the authenticity of transactions related to the dynamic passport 932. In some implementations, the one or more processing circuits are further configured to, in determining the at least one access data structure being compatible with the control structure, in response to receiving the at least one access data structure, configure the at least one access data structure by updating the control structure to enforce restrictions on the one or more updates and redemptions of the metadata object. For example, the passport system 820 can receive a token from an authorized entity computing system and update the smart contract control structure 920 to restrict the modification of metadata objects linked to the dynamic passport 932 based on the permissions encoded within the token. In another example, the passport system 820 can update the smart contract control structure 920 to incorporate the received access data structure, thereby enforcing restrictions on how and when metadata objects can be accessed or modified.

In some implementations, updating the control structure includes updating one or more access parameters of the control structure. For example, the passport system 820 can modify access control lists (ACLs) or role-based access control (RBAC) settings within the smart contract control structure 920 to align with the permissions granted by the new access data structure. For example, RBACs can include rules for accessing tokenized data (e.g., metadata object) based on roles (e.g., entity types or roles of a user within an entity) or other access control parameters (e.g., date/time, user preferences, etc.) In some examples, users or entities associated with a cyber resilience identity (e.g., passport) can select or provide information used for generated RBACs (e.g., based on consent preferences selected via a user interface, other data sharing preferences associated with an entity, regulations, etc.). For example, the passport system 820 can modify access control lists (ACLs) or role-based access control (RBAC) settings within the smart contract control structure 920 to align with the permissions granted by the new access data structure. That is, the passport system 820 can dynamically adjust the control structure to reflect changes in authorized entities, permission levels, and/or data access restrictions as defined by the new access data structure. Further, the passport system 820 can update cryptographic keys or tokens associated with the control structure to ensure that the entities with the updated permissions can access or modify the cyber resilience identity. Additionally, the passport system 820 can track and log these updates in the distributed ledger.

In another example, the passport system 820 can adjust encryption parameters or key management policies within the smart contract control structure 920 to confirm that entities with a correct or matching access data structure can interact with the dynamic passport 932. In some implementations, the one or more processing circuits are further configured to, in determining the at least one access data structure being compatible with the control structure, in response to generating the at least one access data structure, provide, to the entity computing system or the authorized entity computing system, the at least one access data structure. For example, the passport system 820 can generate a digital certificate or token and transmit it to the authorized entity computing system, granting access to components of the dynamic passport 932 based on the permissions encoded within the access data structure. In another example, the passport system 820 can provide an access key to the entity computing system, authorizing interaction with the metadata object or performance event dataset associated with the dynamic passport 932 (e.g., interaction with the tokens 934) to one or more entities (e.g., an entity corresponding to the passport, another authorized entity such as an insurer of a group of approved insurers, etc.).

In some implementations, the cyber resilience data can include at least one of firmographics data, safeguard data, performance data, policy data, incident data, and/or claims data. For example, the passport system 820 can collect and categorize cyber resilience data from various sources, such as firmographics data 1010*b* detailing organizational characteristics, safeguard data 1010*c* describing implemented security measures, performance data 1010*a* capturing cybersecurity performance metrics, policy data 1010*d* outlining internal and external security policies, incident data 1010*e* reporting security breaches or vulnerabilities, and/or claims data 1010*f* related to insurance or legal claims following security incidents. In some implementations, the control structure can include a smart contract, and/or the control structure can include a smart contract control structure. For example, a smart contract generally refers to a self-executing contract with the terms of the agreement written into code. In some examples, the smart contract control structure can manage the execution of rules and conditions tied to the cyber resilience identity. For example, the smart contract control structure can automate token transactions, verify cryptographic proofs, and/or enforce access control measures without manual intervention. The smart contract can interact with the tokens (e.g., unified tokens 912, real-time tokens 914, effectiveness tokens 916) to validate actions such as updating the metadata object, transferring ownership of tokens, and/or adjusting permissions within the control structure. The smart contract control structure can also execute predefined functions based on the conditions encoded in the smart contract, such as triggering updates to the dynamic passport 932 when new resilience data is received or when certain criteria are met.

In some implementations, tokenization of the data can provide a secure and efficient method for clients to share their cyber risk information with brokers and carriers. For example, the passport system 820 can use a tokenization process to convert cyber resilience data into tokens that can be securely shared and managed. In some implementations, DNFTs can include a journal of performance history events, such as cybersecurity management events or insurance-related events. For example, the passport system 820 can generate DNFTs verifiable through a multi-signature wallet or a signature verification mechanism within the smart contract, involving trusted entities to sign off on events they participated in. In some implementations, insureds can create and manage their DNFTs using an interface provided by the passport system 820, securely storing their cybersecurity posture and insurance information. In some examples, DNFTs can track and verify performance history events, maintaining authenticity and transparency.

In some implementations, access to sensitive data can be controlled through an access control mechanism within the smart contract, restricting decryption and access to authorized parties. For example, the passport system 820 can manage access controls to sensitive data, ensuring authorized entities can decrypt and access data. The DNFT structure can feature a unique identifier, encrypted metadata, and/or a list of performance history events. The passport system 820 can use an updateDNFT function (e.g., DNFT.updateDENT ( ) to update the encrypted metadata link in the DNFT, and/or a signEvent function to verify the authenticity of performance history events by including a fee in tokens, allowing the DNFT owner to add event signatures. The passport system 820 can implement DNFT visibility and access control through an access control mechanism in the smart contract or the API.

In some implementations, the components and data flow for creating a dynamic NFT (DNFT) for at least one (e.g., each) business that tokenizes its security posture can include business registration and data collection. For example, the passport system 820 can facilitate the registration process, where businesses provide information, including firmographics, posture information, and/or insurance data. Once the data is collected, it can be encrypted using key management via an API and stored in a secure data storage service. The passport system 820 can deploy a smart contract to facilitate the creation, update, and/or transfer of DNFTs, using blockchain oracles to access encrypted data from the API and include it in the DNFT as metadata.

In some implementations, the DNFT structure can include a unique identifier, encrypted metadata linked to data accessible via the API, and/or a journal of performance history events. For example, as a cybersecurity posture and insurance information change of a company, the encrypted data can be updated in secure storage, and/or the metadata link in the DNFT can be revised. The passport system 820 can use a multi-signature wallet or a signature verification mechanism within the smart contract to maintain the authenticity of performance history events, involving trusted entities to sign off on events they were involved in. For example, authorized parties can access the encrypted information via an access control mechanism in the smart contract or the API, restricting decryption and access to the DNFT owner, authorized insurers, and/or brokers. The architecture of the passport system 820 can achieve tokenization of a cybersecurity posture of a business while maintaining data confidentiality and allowing authorized parties to securely access the information.

In some implementations, a company can register on a platform and create an account. For example, the passport system 820 can facilitate the company in uploading its encrypted cybersecurity posture and insurance information to the platform. The company can create metadata from the uploaded information, encrypt it with key management systems, and/or upload it to a secure data storage service. The passport system 820 can facilitate the creation of the DNFT using platform-acquired tokens and incorporate the encrypted data as metadata within the DNFT. In some implementations, the company can view and manage its DNFTs through an interface provided by the passport system 820. For example, this can involve handling performance history events, such as cybersecurity management events or insurance-related events, and/or updating the encrypted metadata link. The passport system 820 can use a signEvent function to verify the authenticity of events, involving a fee paid in tokens and engaging trusted entities to sign off on events they participated in. In some implementations, insurers or brokers can access the encrypted information in the DNFTs with the permission of the company to assess risk and propose suitable insurance policies. For example, the passport system 820 can provide a method for authorized parties to securely manage and verify the cybersecurity posture and insurance information of a company, improving trust and reducing the likelihood of fraud.

Capturing and Preserving Cyber Resilience Performance Primitives

Figure 15:
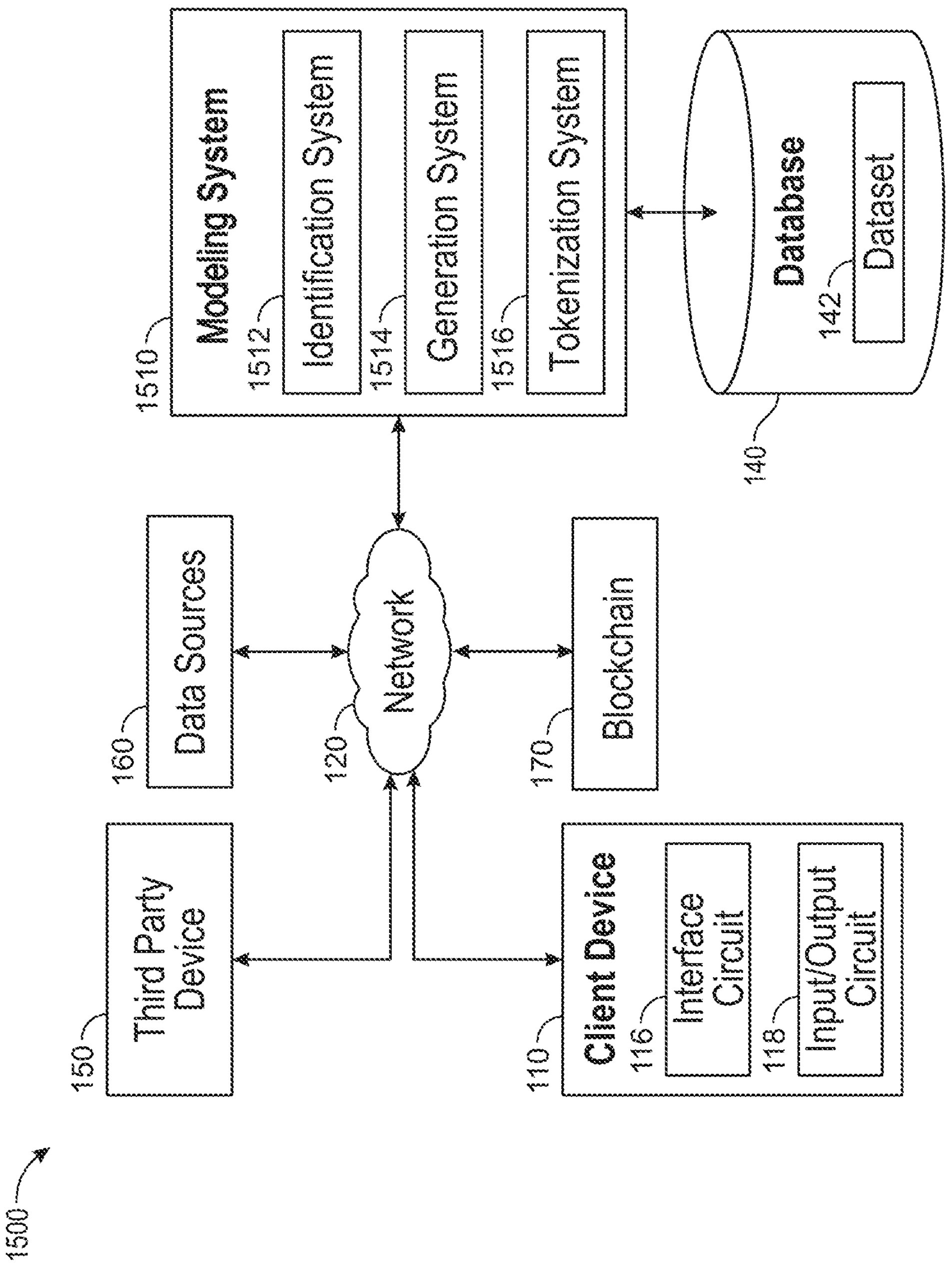
FIG. 15 depicts a block diagram of an implementation of a system for cyber resilience modeling, according to some implementations.

Referring to FIG. 15, a block diagram of an implementation of a system 1500 for cyber resilience modeling is shown, according to some implementations. In some implementations, the system 1500 can include client device 110, database 140, third-party system 150, data sources 160, and/or blockchain 170. In some implementations, the system 1500 can include a modeling system 1510. In some implementations, the modeling system 1510 can include an identification system 1512, a generation system 1514, and/or a tokenization system 1516. At least one (e.g., each) of the systems or components of FIG. 1 can be interconnected through network 120 that supports secure communications profiles (e.g., TLS, SSL, HTTPS, etc.). Although the various computing elements of FIG. 15 can be described in the singular form (e.g., client device 110, third-party device 150, etc.), it should be understood that the implementation shown in FIG. 15 can include two or more of any device/system described herein (e.g., two or more client devices(s) 110, third-party systems(s) 150, etc.). Devices, systems, and/or components in FIG. 15 can be added, deleted, integrated, separated, and/or/or rearranged in various implementations of the disclosure.

Generally, the client device 110, database 140, third-party system 150, data sources 160, modeling system 1510, identification system 1512, generation system 1514, tokenization system 1516, etc. can include one or more logic devices, which can be one or more computing devices equipped with one or more processing circuits that run instructions stored in a memory device to perform various operations. The processing circuit can be made up of various components such as a microprocessor, an ASIC, and/or an FPGA, and/or the memory device can be any type of storage or transmission device capable of providing program instructions. The instructions can include code from various programming languages commonly used in the industry, such as high-level programming languages, web development languages, and/or systems programming languages. The devices, systems, and/or components of FIG. 15 can also include or be communicatively coupled with one or more databases for storing data that receive and provide data to other systems and devices on the network 120 (e.g., database 140).

In some implementations, the client device 110 (sometimes referred to herein as a "user computing system") can be a mobile computing device, smartphone, tablet, smart watch, smart sensor, and/or any other device. For example, the client device 110 can be associated with an entity and be receiving or providing data used for modeling safeguards of the entity. In some implementations, client device 110 can include an interface circuit 116 for receiving and/or displaying content or elements (e.g., a graphical user interface or GUI, an application programming interface or API, etc.). For example, interface circuit 116 can display a GUI including a dashboard with cybersecurity safeguard scores and various elements and/or content (e.g., visualizations such as bar charts, pie charts, and/or line graphs representing historical trends or current performance metrics, etc.). For example, the interface circuit 116 can present interactive elements (e.g., drop-down menus, toggles, buttons, etc.) via a GUI, receive input via input/output circuit 118, and/or update an implementation of content or elements displayed via the GUI responsive to the input. In some implementations, client device 110 can also include input/output circuit 118 for communicating data over network 120 (e.g., receiving and transmitting data to modeling system 1510). For example, the client device 110 can transmit one or more requests and receive corresponding responses or outputs via input/output circuit 118. In some examples, client device 110 can include an application to receive and display content and to receive user interaction with the content.

In some implementations, the database 140 can include any type of memory or storage. For example, the database 140 can include data structures (e.g., dataset 142) for storing information such as, but not limited to, scoring data, safeguard data, tokens, entity configurations, thresholds, versioning information, front end information, interfaces, dashboards, incident information, claim information, user information, vendor information, contract information, invoices, a blockchain ledger, etc. The database 140 can be part of the modeling system 1510, and/or a separate component that the modeling system 1510, the client device 110, and/or the third party device 150 can access via the network 120. In some implementations, the database 140 can also be distributed throughout system 1500. For example, the database 140 can include multiple databases associated with the modeling system 1510, the client device 110, and/or the third party device 150, and/or all three. Database 140 can include one or more storage mediums. The storage mediums can include but are not limited to magnetic storage, optical storage, flash storage, and/or/or RAM. The modeling system 1510 can implement or facilitate various APIs to perform database functions (e.g., managing data stored in database 140). The APIs can be but are not limited to SQL, ODBC, JDBC, NOSQL and/or any other data storage and manipulation API.

In some implementations, the modeling system 1510 can include any computing system, device, and/or collection of such systems or devices. In some implementations, the modeling system 1510 can incorporate the same or similar features and/or functionality as described regarding the response system 130 of FIG. 1 and/or additional features and/or functionality. In some implementations, the modeling system 1510 can interface with one or more devices or systems of FIG. 1 (e.g., client device 110, third-party system 150, etc.) or one or more sub-systems or components of modeling system 1510 (e.g., identification system 1512, a generation system 1514, tokenization system 1516, etc.). Generally, the modeling system 1510 and/or sub-systems of the modeling system 1510 (e.g., identification system 1512, a generation system 1514, tokenization system 1516, etc.) can execute and/or be utilized to execute various processes and/or tasks corresponding with modeling cyber resilience data, as described further below.

In some implementations, the modeling system 1510 and/or identification system 1512 can receive a request to re-model one or more safeguards of at least one entity. For example, the modeling system 1510 and/or identification system 1512 can receive a request to evaluate immutable cybersecurity primitives (e.g., any type of cyber resilience or cybersecurity data, such as configurations, incident data, posture states, etc.) associated with one or more organizations using updated scoring methodologies or algorithms provided by one or more insurers via network 120. In some implementations, the modeling system 1510 and/or identification system 1512 can identify one or more tokens including the one or more safeguards and one or more proofs of the at least one entity at the temporal interval. For example, the modeling system 1510 and/or identification system 1512 can determine or access various tokens (e.g., performance tokens, unified tokens, etc.) including tokenized data corresponding to the cybersecurity configurations, incident data, and/or posture states at one or more times, intervals, and/or periods. For example, the modeling system 1510 and/or identification system 1512 can determine or access corresponding attestations that verify or validate the existence, validity, and/or performance of tokenized cybersecurity safeguards or configurations a temporal interval (e.g., MDR configurations in place at a time of an incident, breach data corresponding to cybersecurity breaches of an entity over the first quarter of 2024, etc.).

In some implementations, modeling system 1510 and/or identification system 1512 can identify tokens including one or more safeguards corresponding with a plurality of modeled outputs, and/or the plurality of modeled outputs can include at least one first modeled output corresponding with a safeguard status based at least on a safeguard threshold and at least one second modeled output corresponding with at least one resilience score. For example, the plurality of modeled outputs can include one or more resilience scores or sub-scores corresponding with the one or more safeguards generated by the modeling system 1510 by applying heuristic scoring algorithms or models. For example, modeling system 1510 and/or identification system 1512 can determine a safeguard status including a result (e.g., "pass" or "fail") associated with compliance of an entity with third-party requirements and a safeguard threshold including one or more criteria, parameters, and/or standards for complying with the third-party requirements (e.g., a passing score of 95% corresponding with implemented safeguards and/or corresponding configurations). For example, modeling system 1510 and/or identification system 1512 can determine a resilience score including an aggregation of various protection sub-scores (e.g., configuration scores, coverage scores, etc.) corresponding with various safeguards, configurations, and/or coverages of an entity based on a scoring model.

In some implementations, the modeling system 1510 and/or generation system 1514 can generate, using the one or more tokens, at least one re-modeled output at the temporal interval based at least on re-modeling the one or more tokens. For example, the modeling system 1510 and/or generation system 1514 can update a coverage status (e.g., pass-fail) and/or a sub-score previously modeled at a time interval (e.g., year, day, month, etc.) and/or generate a new coverage status or sub-score at the corresponding time interval. For example, the modeling system 1510 and/or the generation system 1514 can use the underlying primitives at the same time interval the primitives were previously modeled to re-model or pivot the primitives to various scoring methodologies retroactively. For example, the modeling system 1510 and/or generation system 1514 can update, based on the one or more modeling parameters, at least one of (i) the safeguard status or (ii) the at least one resilience score. That is, the modeling system 1510 and/or generation system 1514 can generate an updated status or score using new third-party parameters, which can be used for insurance decisions (e.g., plan eligibility, discounts, rates, etc.), cyber resilience modeling (e.g., posture state updates or determinations, incident categorization, etc.).

In some implementations, the modeling system 1510 and/or tokenization system 1516 can generate at least one new token including the at least one re-modeled output, the one or more safeguards, and/or the one or more proofs. For example, the modeling system 1510 and/or tokenization system 1516 can access or identify safeguard data (e.g., implemented safeguards, configurations, incident response plans, breach data, etc.), encrypt the data, generate cryptographic proofs (e.g., attestations, zero-knowledge proofs, etc.) corresponding with the validity or legitimacy of the data at a temporal interval, and/or tokenize or encapsulate the data (e.g., as a third-party token) for future storage or access. For example, the one or more processing circuits can generate the token in a structured format, which can include any format for tokens as described herein (e.g., performance tokens, unified tokens, safeguard tokens, proof tokens, etc.). In some implementations, the modeling system 1510 can record the at least one new token in a token storage. For example, the modeling system 1510 can broadcast, publish, and/or store the new token in a data store (e.g., database 140) or distributed ledger (e.g., blockchain 170).

The system 1500 can implement at least a portion of the safeguard modeling pipeline, such as a cyber resilience pipeline, a compliance evaluation pipeline, or a risk assessment pipeline. The system 1500 can be used to generate safeguard tokens and/or re-model historical data by any of various systems described herein, including but not limited to insurance underwriting systems, cybersecurity audit systems, vendor evaluation systems, post-incident response systems, compliance verification systems, predictive analysis systems, and/or operational resilience systems.

Generally, the safeguard modeling pipeline can include operations performed by the system 1500. For example, the safeguard modeling pipeline can include any one or more of a request stage, an identification stage, an output generation stage, a token generation stage, and/or a recordation stage. At least one (e.g., each) stage of the safeguard modeling pipeline includes one or more components of the system 1500 that perform the functions described herein.

The system 1500 (e.g., implementing the safeguard modeling pipeline) can receive (e.g., from a third-party device 150 and/or client device 110) a request to re-model one or more safeguards (e.g., cyber resilience data) of at least one entity. For example, the request can include one or more modeling parameters and a temporal interval. In some implementations, implementing the safeguard modeling pipeline can include the system 100 identifying one or more tokens includes the one or more safeguards and one or more proofs (e.g., attestations) of the at least one entity at the temporal interval. For example, the one or more safeguards can correspond with a plurality of modeled outputs. Additionally, the plurality of modeled outputs can include at least one first modeled output corresponding with a safeguard status based at least on a safeguard threshold and at least one second modeled output corresponding with at least one resilience score (e.g., actualCoverage: 100; actualConfiguration: 93).

Implementing the safeguard modeling pipeline can include the system 100 generating (e.g., using the one or more tokens) at least one re-modeled output at the temporal interval based at least on re-modeling the one or more tokens (e.g., using the underlying primitives at the same time interval the output were previously generated). For example, the at least one re-modeled output includes an update, based on the one or more modeling parameters (e.g., update the coverage status and/or update the sub-score based on third-party provided scoring parameters), to at least one of (i) the safeguard status or (ii) the at least one resilience score. Additionally, the update to at least one of (i) the safeguard status or (ii) the at least one resilience score can be based at least on the one or more safeguards or the one or more proofs.

Implementing the safeguard modeling pipeline can include the system 100 generating at least one new token includes the at least one re-modeled output, the one or more safeguards, and/or the one or more proofs. For example, the system 100 can use third-party requirement tokens and/or apply different scoring methods that does not modify the primitives. That is, the original token can remain unaltered while third parties overlay their own evaluations based on evolving standards. Implementing the safeguard modeling pipeline can include the system 100 recording the at least one new token in a token storage. Thus, the safeguard modeling pipeline can improve operational flexibility, enhance compliance assessments, and facilitate retrospective evaluations of cyber resilience.

In some implementations, the request stage can be the stage in the safeguard modeling pipeline in which the system 100 can process a request to re-model one or more safeguards of at least one entity. The system 100 can include at least one identification system 1512. The identification system 1512 can receive a request to re-model one or more safeguards of at least one entity. For example, the request can include one or more modeling parameters and a temporal interval. That is, the identification system 1512 can parse the modeling parameters and temporal interval to define the scope of the requested re-modeling operation. For example, during the request stage, the identification system 1512 can register the request details for subsequent processing. In some implementations, the identification system 1512 can validate the format of the request and/or otherwise organize its components for pipeline execution. The modeling parameters can specify safeguard thresholds or scoring models. That is, the modeling parameters can represent the compliance criteria or evaluation metrics for the requested operation. For example, the identification system 1512 can prepare a modeling task definition based on the received request.

In some implementations, the identification stage can be the stage in the safeguard modeling pipeline in which the system 100 can locate and retrieve the relevant tokens and associated proofs based on the parameters in the request. The system 100 can include at least one identification system 1512. The identification system 1512 can identify one or more tokens including the one or more safeguards and one or more proofs of the at least one entity at the temporal interval. For example, the one or more safeguards can correspond with a plurality of modeled outputs and the plurality of modeled outputs can include at least one first modeled output corresponding with a safeguard status based at least on a safeguard threshold and at least one second modeled output corresponding with at least one resilience score. That is, the identification system 1512 can locate tokens containing safeguard metadata that aligns with the parameters of the request. For example, during the identification stage, the identification system 1512 can extract proofs verifying the tokenized safeguards. In some implementations, the identification system 1512 can filter tokens and/or otherwise narrow results by analyzing metadata fields. The tokens can include safeguard configurations and temporal validity. That is, the tokens can represent immutable records of safeguards implemented during the requested time frame. For example, the identification system 1512 can extract data for endpoint protection safeguards at a specific temporal interval.

In some implementations, the output generation stage can be the stage in the safeguard modeling pipeline in which the system 100 can generate updated outputs based on the identified tokens and modeling parameters. The system 100 can include at least one generation system 1514. The generation system 1514 can generate, using the one or more tokens, at least one re-modeled output at the temporal interval based on the modeling parameters in the request. For example, the at least one re-modeled output can include an update to at least one of (i) the safeguard status or (ii) the at least one resilience score. That is, the generation system 1514 can compute outputs based on the criteria provided in the request. For example, during the output generation stage, the generation system 1514 can apply the updated scoring methodology to generate resilience scores and safeguard statuses. In some implementations, the generation system 1514 can adjust outputs and/or otherwise recalculate metrics by incorporating the provided parameters. The re-modeled outputs can include revised evaluations of safeguard performance. That is, the re-modeled outputs can reflect compliance under updated thresholds. For example, the generation system 1514 can generate a new resilience score reflecting adjustments to a third-party scoring model.

In some implementations, the token generation stage can be the stage in the safeguard modeling pipeline in which the system 100 can encapsulate the re-modeled outputs into new tokens. The system 100 can include at least one tokenization system 1516. The tokenization system 1516 can generate at least one new token including the re-modeled outputs, the one or more safeguards, and the proofs associated with the original tokens. That is, the tokenization system 1516 can package the re-modeled outputs in a structured format suitable for storage and subsequent analysis. For example, during the token generation stage, the tokenization system 1516 can assign unique identifiers to the new tokens and integrate metadata for future retrieval. In some implementations, the tokenization system 1516 can apply cryptographic integrity checks and/or otherwise secure the tokens by embedding digital signatures. The new tokens can include updated safeguard results and proofs. That is, the new tokens can encapsulate compliance evaluations for the defined modeling parameters. For example, the tokenization system 1516 can create a token including a recalibrated resilience score and a safeguard status.

In some implementations, the recordation stage can be the stage in the safeguard modeling pipeline in which the system 100 can store the newly generated tokens. The system 100 can include at least one tokenization system 1516. The tokenization system 1516 can record the at least one new token in a token storage. That is, the tokenization system 1516 can ensure the secure and structured storage of the new tokens. For example, during the recordation stage, the tokenization system 1516 can write the tokens to a distributed ledger or database. In some implementations, the tokenization system 1516 can implement access controls and/or otherwise manage the tokens by appending metadata for querying. The stored tokens can include proofs and outputs. That is, the stored tokens can facilitate compliance tracking and retrospective evaluations. For example, the tokenization system 1516 can record a token with recalibrated resilience scores in a blockchain 170 for retrieval by stakeholders.

Generally, the system 100 can generate re-modeled outputs based on requirements provided by the entity. For example, the entity can provide an updated safeguard threshold corresponding to a new compliance benchmark (e.g., requiring a threshold of 97% instead of 95%). The system 100 can generate an updated safeguard status by re-modeling safeguard data based on the updated safeguard threshold. For example, the modeling process can determine whether a safeguard status meets or fails the updated threshold based on the prior performance data. The safeguard status can be generated as a modeled output reflecting the updated requirements, such as marking compliance or non-compliance with the provided threshold.

In some implementations, the system 100 can generate re-modeled outputs based on a scoring heuristic provided by the entity. For example, the entity can provide a scoring heuristic specifying how resilience scores and sub-scores are calculated. The system 100 can generate one or more protection sub-scores using the scoring heuristic, where the sub-scores can be aggregated to produce an updated resilience score. For example, the scoring heuristic can specify weighted contributions from parameters such as configuration integrity, coverage scope, and/or incident response capability. The modeling process can generate sub-scores for at least one (e.g., each) parameter (e.g., a configuration sub-score of 93% and a coverage sub-score of 100%) and use the scoring heuristic to calculate an updated resilience score.

In some implementations, the system 100 can generate re-modeled outputs based on both updated safeguard thresholds and a scoring heuristic provided by the entity. For example, the system 100 can generate an updated safeguard status using the updated safeguard threshold while generating one or more protection sub-scores and an updated resilience score using the scoring heuristic. The modeling process can incorporate the updated requirements and scoring parameters into a unified modeling task. For example, the system 100 can evaluate a safeguard status against a threshold of 97% while generating protection sub-scores for individual parameters and aggregating the sub-scores into a resilience score using the scoring heuristic. The re-modeled outputs can include the updated safeguard status and resilience score based on the provided requirements of the entity.

In some implementations, the system 100 can be used for insurance underwriting and risk assessment by applying retroactive risk models to historical cybersecurity data. For example, insurers can provide updated scoring models or thresholds to re-evaluate the cybersecurity posture of an entity at specific temporal intervals. The system 100 can generate re-modeled outputs, such as updated resilience scores and safeguard statuses, reflecting the historical cybersecurity configurations under the updated risk models. For example, the system 100 can process a tokenized record of safeguards implemented during the first quarter of 2023 and determine compliance or risk levels based on revised underwriting criteria. The re-modeled outputs can be used by insurers to adjust premiums, determine eligibility, and/or inform policy renewals based on historical cybersecurity postures.

In some implementations, the system 100 can facilitate cybersecurity audits by re-evaluating past configurations against evolving compliance standards. For example, auditors can provide updated safeguard thresholds or scoring heuristics representing new regulatory benchmarks. The system 100 can identify tokens representing the configurations and safeguards of an entity during a specified time frame and generate re-modeled outputs reflecting compliance with the updated standards. For example, the system 100 can evaluate historical configurations from 2022 to determine if they meet compliance thresholds introduced in 2024. The re-modeled outputs can include updated safeguard statuses and resilience scores, providing auditors with insights into whether the past configurations align with current regulatory requirements.

In some implementations, the system 100 can be used for vendor performance evaluation by applying scoring models to assess the effectiveness of solutions deployed across multiple client environments. For example, security vendors can provide scoring heuristics defining the parameters for evaluating safeguard performance, such as incident response times or configuration integrity. The system 100 can generate re-modeled outputs for at least one (e.g., each) client environment using the provided scoring models and historical safeguard data. For example, the system 100 can aggregate resilience scores for safeguards implemented across five client entities during 2023 and compare the results to determine solution effectiveness. The re-modeled outputs can include performance metrics for at least one (e.g., each) client environment, allowing vendors to assess and refine their solutions.

In some implementations, the system 100 can be used for post-incident response by re-evaluating historical safeguards and preparedness based on updated scoring methodologies. For example, legal teams or incident response firms can provide scoring heuristics or safeguard thresholds to assess a readiness of an entity during a past cybersecurity incident. The system 100 can identify tokens representing the safeguards and proofs at the time of the incident and generate re-modeled outputs reflecting compliance or effectiveness under the updated scoring methods. For example, the system 100 can re-model data from a ransomware incident in 2022 to determine if the safeguards in place at that time met the revised thresholds. The re-modeled outputs can include updated resilience scores and safeguard statuses, providing insights into the preparedness of an entity and areas for improvement.

In some implementations, the system 100 can capture and preserve primitive data in tokens to support cybersecurity modeling and evaluations. For example, the system 100 can include a mechanism for capturing primitive data, such as cybersecurity configurations, incident data, and posture states (e.g., configuration files, incident logs, posture reports). The system 100 can tokenize these primitives into immutable tokens that encapsulate the primitives and prevent modification of the underlying data. For example, tokenization can include encrypting the primitives and embedding metadata, such as timestamps, cryptographic signatures, and unique identifiers, to maintain data integrity. The system 100 stores these tokens in secure storage systems, such as distributed ledgers or centralized repositories (e.g., blockchain or databases), for subsequent processing or analysis.

In some implementations, the system 100 can generate tokens with unique identifiers and cryptographic integrity mechanisms to maintain immutability. For example, at least one (e.g., each) token can include a unique identifier corresponding to the original primitives, such as a hash value or digital signature (e.g., SHA-256 hash, RSA signature). The cryptographic integrity mechanisms can verify the authenticity of stored data by detecting unauthorized modifications. For example, the system 100 can calculate and compare hash values for stored primitives and their originals. The system 100 uses these mechanisms to link tokens to their original data and ensure consistent access to accurate historical records.

In some implementations, the system 100 can adjust primitives to third-party requirement tokens for compliance and risk evaluations. For example, third-party entities such as insurers, auditors, or regulatory bodies can provide their compliance or risk evaluation tokens (e.g., insurance scoring models, regulatory compliance thresholds, audit criteria). The system 100 applies these third-party tokens to preserved primitives to evaluate historical data under updated and/or new methodologies. For example, an insurer can request the system 100 to analyze cybersecurity configurations from 2021 using scoring models introduced in 2023 to evaluate compliance with updated underwriting standards.

In some implementations, the system 100 can use a scoring flexibility mechanism to apply multiple scoring models to the same primitives. For example, third-party stakeholders such as auditors or security vendors can provide proprietary scoring models to evaluate primitives across various time periods. The system 100 overlays these scoring models on the primitives while preserving the underlying tokenized data. For example, a security vendor can evaluate primitives from 2022 using scoring models focused on parameters such as incident response times, configuration integrity, and/or safeguard coverage areas. The system 100 stores the scoring models and their outputs as layers.

In some implementations, the system 100 can implement a non-destructive scoring method to retain the original data and produce dynamic evaluations. For example, the system 100 applies third-party scoring models or requirement tokens as separate, versioned layers over the primitive tokens. The system 100 generates new evaluation results for at least one (e.g., each) scoring model application without modifying the original tokenized primitives. For example, the system 100 records multiple scoring layers for a tokenized safeguard, allowing third-party stakeholders to retrieve and compare evaluation results generated under different compliance standards or scoring models.

In some implementations, the system 100 can evaluate historical primitives using updated scoring models in a retroactive evaluation process. For example, the system 100 retrieves cybersecurity configurations or posture states from previous years and compares them with current compliance benchmarks or risk assessment standards. The system 100 uses the retrieved data to generate outputs that align with updated scoring criteria. For example, regulatory bodies can use the system 100 to analyze tokenized incident data from 2020 against compliance benchmarks introduced in 2024.

In some implementations, the system 100 can generate visualizations of posture or risk scores under various third-party scoring models. For example, the system 100 applies scoring models to generate visual representations of posture changes, compliance metrics, or risk assessments. These visualizations can include bar charts, line graphs, and heat maps (e.g., score trend lines, safeguard coverage maps, compliance comparisons). The system 100 integrates the visualizations with the tokenized data to represent historical scoring layers or current evaluations as defined by third-party requirements.

In some implementations, the system 100 can incorporate a third-party integration framework to allow external stakeholders to apply their proprietary scoring models. For example, insurers, brokers, or regulatory bodies can integrate their custom scoring models with the system 100 to evaluate tokenized primitives retroactively. The system 100 processes the integrated models and produces evaluation results based on the requirements of at least one (e.g., each) stakeholder. For example, multiple stakeholders can evaluate tokenized safeguards from 2021 using distinct scoring models without modifying the primitives or their associated metadata.

In some implementations, the system 100 can apply temporal scoring control to analyze data across specific time intervals. For example, stakeholders can request evaluations of cybersecurity readiness or performance during defined temporal contexts (e.g., quarterly performance, annual compliance checks, incident response evaluations). The system 100 retrieves tokens corresponding to the specified time intervals and applies the requested scoring models or compliance thresholds. For example, the system 100 can analyze incident response capabilities during the second quarter of 2023 based on performance metrics defined in 2024.

In some implementations, the system 100 can apply updated scoring models dynamically to existing tokenized primitives through real-time scoring updates. For example, stakeholders can provide updated scoring parameters, compliance thresholds, or heuristic models, and the system 100 can evaluate the existing tokenized data against the provided updates. The system 100 processes these evaluations without altering the original tokens. For example, an insurer can request the system 100 to apply a newly introduced risk model to tokenized safeguard data from 2020 to generate updated resilience scores for underwriting purposes.

In some implementations, the system 100 can capture and preserve primitives representing cybersecurity data within immutable tokens. For example, primitives can include cybersecurity configurations, incident data, or posture states (e.g., firewall configurations, event logs, system status reports). The system 100 can tokenize these primitives by encapsulating them into secure, verifiable tokens that include metadata such as unique identifiers and cryptographic integrity mechanisms. For example, the system 100 can generate tokens with hash values or digital signatures to confirm the authenticity of the data. The tokens can be stored in secure repositories, such as distributed ledgers or centralized databases (e.g., blockchain, relational databases), preventing any modification to the underlying primitives while maintaining their accessibility for future evaluations.

In some implementations, the system 100 can be configured to pivot primitives to third-party requirement tokens for compliance and risk evaluations. For example, insurers, auditors, or regulatory bodies can provide their compliance or scoring tokens (e.g., ISO compliance criteria, NIST cybersecurity standards, insurance underwriting thresholds). The system 100 applies these third-party tokens to preserved primitives to generate evaluations based on updated requirements. For example, the system 100 can retrieve primitives corresponding to a cybersecurity configuration from 2021 and re-evaluate the configuration against compliance thresholds provided by a regulatory body in 2023. The system 100 processes the third-party requirements (e.g., without altering) the original tokens, allowing diverse evaluations.

In some implementations, the system 100 can apply retroactive scoring methodologies to preserved primitives. For example, stakeholders can provide updated scoring models to re-evaluate historical configurations or posture states. The system 100 applies these models to generate outputs such as updated resilience scores or compliance statuses. For example, the system 100 can analyze tokenized firewall configurations from Q1 2021 using a scoring model introduced in Q3 2023 to determine compliance with evolving standards. The system 100 supports temporal flexibility by allowing evaluations across specified time periods, such as monthly or quarterly intervals.

In some implementations, the system 100 can implement version control mechanisms to support non-destructive scoring. For example, an application (e.g., every) of a scoring model generates a versioned (e.g., distinct) evaluation layer stored separately from the original primitives. The system 100 can maintain the immutability of the original tokens while allowing stakeholders to compare or revert between different scoring models. For example, an auditor can request the system 100 to retrieve tokenized safeguard data and generate evaluation results for both 2020 and 2023 scoring standards. The system 100 provides outputs that align with the parameters of at least one (e.g., each) scoring application without modifying the primitives.

In some implementations, the system 100 can dynamically update scoring models applied to tokenized primitives in real time. For example, stakeholders can request re-evaluations of historical data using newly provided scoring models. The system 100 retrieves the tokens and applies the updated models to generate outputs reflecting the current evaluation criteria. For example, an insurer can provide a revised risk model and request the system 100 to analyze tokenized safeguards from 2019. The system 100 generates resilience scores and compliance statuses based on the updated risk thresholds while preserving the original tokenized data.

In some implementations, the system 100 can generate visualizations to represent posture changes or risk scores across different scoring regimes. For example, the system 100 can process evaluation results to produce graphical outputs, such as trend lines, heat maps, or compliance threshold comparisons (e.g., risk score progression, safeguard coverage maps). The system 100 integrates these visualizations with tokenized primitives, allowing stakeholders to analyze scoring changes across time periods or regulatory standards. For example, an auditor can use the system 100 to compare safeguard effectiveness in Q2 2020 and Q2 2023 under distinct compliance benchmarks.

In some implementations, the system 100 can integrate third-party scoring models to support collaborative evaluations. For example, external stakeholders such as insurers, brokers, or regulatory bodies can incorporate their proprietary scoring models into the system 100. The system 100 processes the models and generates evaluation results for the preserved primitives without modifying their underlying data. For example, multiple stakeholders can evaluate tokenized posture data from 2021 using distinct compliance thresholds or risk criteria. The system 100 facilitates independent evaluations while preserving the integrity of the tokenized primitives.

In some implementations, the system 100 can analyze data across defined time intervals using temporal scoring control. For example, stakeholders can request evaluations for specific periods, such as quarterly compliance checks or annual cybersecurity assessments. The system 100 retrieves the tokenized primitives corresponding to the specified time intervals and applies the requested scoring models or benchmarks. For example, the system 100 can evaluate incident response capabilities from Q4 2022 using a scoring methodology introduced in 2024.

In some implementations, the system 100 can process primitives to support various use cases, such as insurance underwriting, cybersecurity audits, vendor performance evaluation, and post-incident response analysis. For example, the system 100 can retrieve primitives corresponding to historical cybersecurity configurations and generate re-modeled outputs tailored to the requirements of insurers, auditors, or legal teams. The system 100 provides outputs such as safeguard statuses, resilience scores, and/or compliance metrics for use in underwriting decisions, compliance verifications, or retrospective incident assessments.

Figure 16:
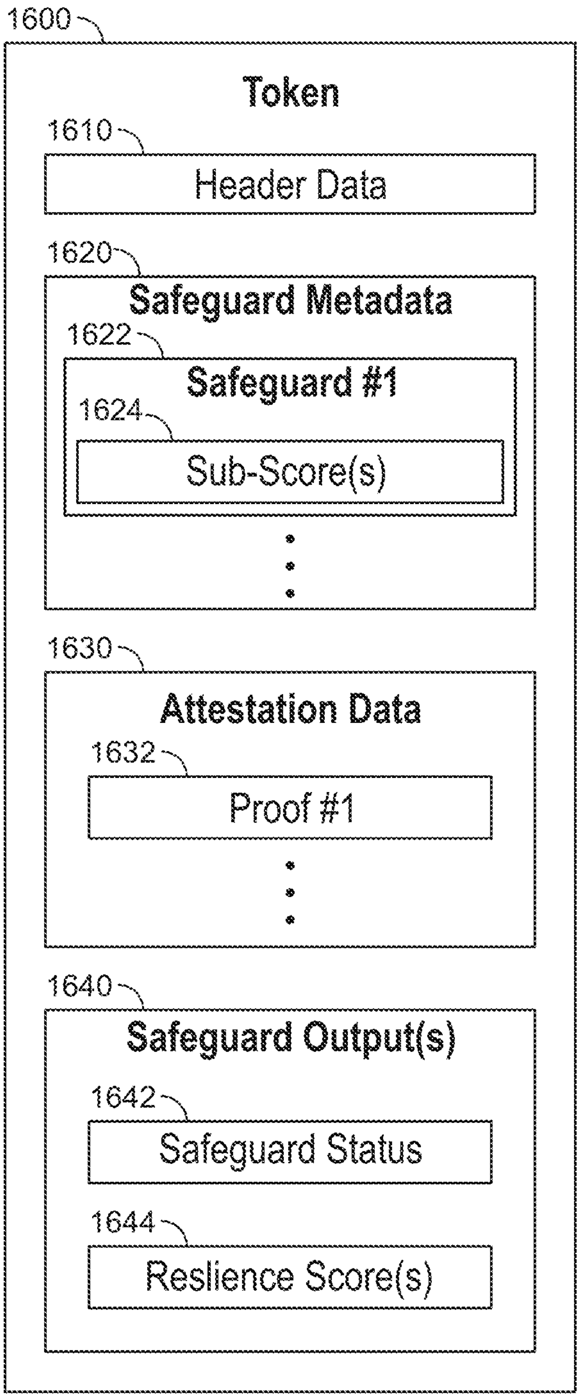
FIG. 16 depicts a block diagram of an implementation of a token for cyber resilience modeling, according to some implementations.

Referring now to FIG. 16, a block diagram of an implementation of a token 1600 for cyber resilience modeling is shown, according to some implementations. In some implementations, the token 1600 can include header data 1610, safeguard metadata 1620, attestation data 1630, and/or safeguard output(s) 1640. In some implementations, the safeguard metadata 1620 can include data of one or more safeguards 1622 (e.g., safeguard #1), and/or the safeguards 1622 can include one or more sub-scores 1624. In some implementations, the attestation data 1630 can include one or more proofs 1632 (e.g. proof #1). In some implementations, the safeguard output(s) 1640 can include a safeguard status 1642 and a resilience score 1644. In some implementations, the token 1600 can include the same or similar functionality and/or be used as described regarding the various tokens herein (e.g., performance tokens, unified tokens, proof tokens, etc.) and/or additional functionality and/or uses. In some implementations, the token 1600 can correspond to a structured format (e.g., JSON, etc.) including a plurality of metadata fields (e.g., header data 1610, safeguard metadata 1620, attestation data 1630, and/or safeguard output(s) 1640, etc.) corresponding with one or more safeguards of an entity and one or more proofs of an entity.

In some implementations, the header data 1610 can include metadata or contextual information corresponding to the token 1600. For example, the header data 1610 can include a timestamp indicating the temporal interval associated with the tokenized data, a unique token identifier, and/or an entity identifier corresponding to the organization or system generating or associated with the token. The header data 1610 can further include information regarding the scoring model, parameters, and/or algorithms applied to generate outputs included in the token 1600. In some implementations, the header data 1610 can include references to third-party systems or requirements utilized for modeling or scoring safeguards encapsulated within the token 1600. In some implementations, the header data 1610 can include address information, API or endpoint information, pointers for accessing data associated with the token, one or more links to identifiers (e.g., data corresponding with a decentralized cyber identity or passport), and/or so on. For example, the header data 1610 can include a data link with a cyber resilience identity (e.g., passport) of one or more entities.

In some implementations, the safeguard metadata 1620 can include information or data corresponding with or representing various configurations, safeguards, and/or cybersecurity posture data encapsulated within the token 1600. For example, the safeguard metadata 1620 can include data or descriptions of the safeguards implemented by an entity (e.g., endpoint detection and response systems, intrusion prevention systems, multifactor authentication mechanisms, etc.) and corresponding sub-scores 1624 representing the parameters (e.g., existence, performance, effectiveness, etc.) of the various safeguards. In some implementations, the safeguard metadata 1620 can include contextual information, such as the scope or coverage of the safeguards, associated configurations, and/or operational environments. For example, the safeguard metadata 1620 can indicate a coverage area for a safeguard (e.g., "network perimeter monitoring" or "endpoint defense for corporate devices") implemented in a computing environment of an entity or organization.

In some implementations, the attestation data 1630 can include one or more proofs 1632 corresponding to the validity or performance of the safeguard metadata 1620 or associated outputs included within the token 1600. For example, the attestation data 1630 can include cryptographic proofs verifying the integrity of the data, such as hash values or digital signatures corresponding to configuration logs, incident response reports, and/or compliance checklists. In some implementations, the attestation data 1630 can include attestations generated by third-party systems verifying the effectiveness or compliance of the safeguards, such as certifications issued by auditors or insurers. For example, the attestation data 1630 can include zero-knowledge proofs (ZKPs) verifying that a safeguard or configuration meets a compliance threshold without exposing the underlying data.

In some implementations, the safeguard output(s) 1640 can include modeled outputs corresponding to the effectiveness or compliance of the safeguards encapsulated within the token 1600. For example, the safeguard status 1642 can represent a binary determination of compliance (e.g., "pass" or "fail") with third-party requirements or benchmarks based on a comparison of a safeguard result (e.g., 95% score) to a safeguard threshold (e.g., 97% to pass) at a given time (e.g., January, at a random week, at bi-monthly intervals, etc.). In some implementations, the resilience score 1644 can include aggregated or individual scores representing the performance of safeguards across various cybersecurity dimensions or cyber resilience dimension, such as configuration integrity, incident response capability, and/or coverage scope. For example, the resilience score 1644 can indicate a weighted average of sub-scores 1624 corresponding to specific safeguards or configurations included in the token 1600 based on a heuristic scoring model.

In some implementations, the various systems or components described herein (e.g. response system 130, modeling system 1510, etc.) can utilize token 1600 for various purposes, including cyber resilience modeling or retroactive evaluations or assessments of cyber resilience protections, safeguards, and/or performance. For example, third-party system 150 of FIG. 15 can identify or access the token 1600 to apply updated scoring methodologies to previously modeled safeguard outputs 1640 or safeguard metadata 1620. For example, client device 110 can interface with or use the token 1600 to determine whether cybersecurity posture of an entity corresponding to client device 110, as modeled during an applicable temporal interval, aligns with updated compliance thresholds or requirements (e.g., for providing insurance or protection products). Various users, intermediaries, third-parties, providers, and/or/or other entities can interface with token 1600 for protection modeling or scoring.

In some implementations, the token 1600 depicts how primitives are captured, tokenized, and stored as immutable tokens. For example, the header data 1610 can include metadata corresponding to the token 1600, such as a timestamp, a unique token identifier, and/or references to third-party systems or scoring requirements. In some implementations, primitives can be encapsulated as safeguard metadata 1620, which can include data representing safeguards, such as endpoint protection mechanisms, intrusion prevention systems, and/or authentication configurations, and corresponding parameters or sub-scores 1624. Attestation data 1630 can include proofs verifying the validity and integrity of the safeguard metadata 1620, such as cryptographic signatures and/or zero-knowledge proofs. The safeguard output(s) 1640 can include safeguard status 1642 and resilience score 1644, which can correspond to outputs modeled from the tokenized primitives and provide a basis for assessing performance or compliance.

For example, cryptographic mechanisms embedded in attestation data 1630 can be used to ensure that the primitives and metadata remain immutable and verifiable. The token 1600 can be stored in a structured format, such as JSON, including a plurality of metadata fields corresponding with the captured primitives, proofs, and safeguard outputs. The structured storage allows the token 1600 to be used as a reference for subsequent evaluations. For example, safeguard metadata 1620 and safeguard output(s) 1640 can be used to determine compliance with updated scoring requirements, preserving the ability to evaluate historical data under new or evolving standards. In some implementations, systems can access and retrieve the tokens 1600 using unique identifiers to apply third-party scoring methodologies or update compliance evaluations.

Additionally, the token 1600 also depicts how third-party stakeholders can retrieve and apply their requirement tokens and scoring models to the preserved primitives. For example, a modeling system can access safeguard metadata 1620 and associated attestation data 1630 to evaluate whether an entity meets compliance thresholds under a third-party scoring framework. The safeguard metadata 1620 can include data encapsulating the configurations and parameters of the safeguards 1622, such as coverage area, scope, performance, and/or sub-score(s) 1624. Attestation data 1630 can include third-party-issued attestations or cryptographic proofs (e.g., proof 1632) verifying the authenticity and effectiveness of the safeguards. In some implementations, safeguard outputs 1640, including resilience score 1644, can represent aggregated or detailed results of the safeguards evaluated under third-party scoring requirements.

In some implementations, the process of applying third-party scoring models to tokens 1600 ensures that assessments are dynamic and context-sensitive. For example, the modeling system 1500 can retrieve safeguard metadata 1620 and associated outputs, such as resilience score 1644, to compare historical safeguard performance against updated compliance benchmarks or risk parameters. Third-party scoring models can overlay dynamic evaluation criteria on the immutable token data (e.g., without altering the original primitives). This allows stakeholders to perform retrospective or comparative analyses across temporal intervals. For example, safeguard status 1642 can be re-evaluated using newly implemented scoring thresholds to determine compliance or adjust risk assessments.

Figure 17:
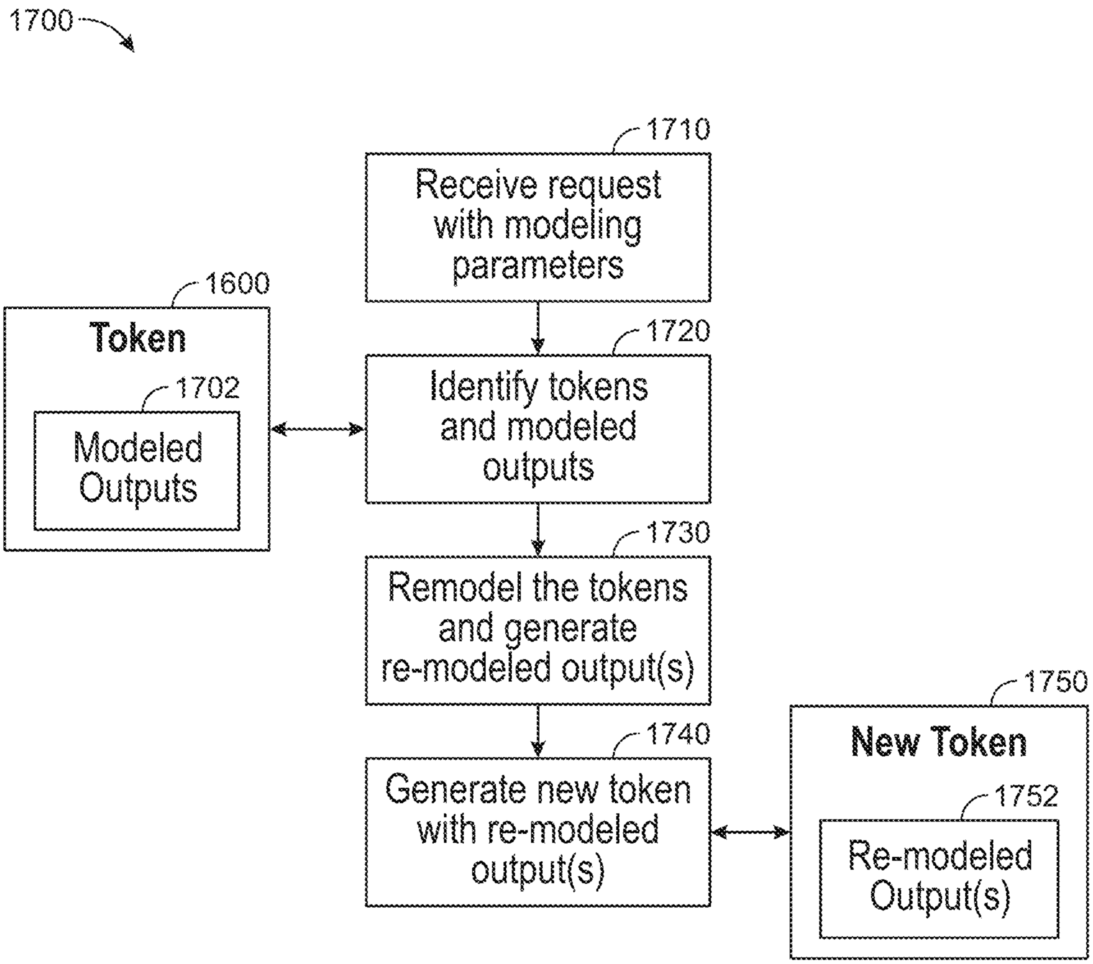
FIG. 17 depicts a flowchart of an implementation of method for modeling a token, according to some implementations.

Referring now to FIG. 17, a flowchart of an implementation of method 1700 for modeling a token 1600 is shown, according to some implementations. In some implementations, the method 1700 can correspond to re-modeling or pivoting the token 1600. In a general overview, method 1700 can include receiving a request at block 1710, identifying tokens at block 1720, re-modeling tokens at block 1730, and/or generating a new token at block 1740. In some implementations, the steps or blocks of method 1700 can be performed, executed, carried out, and/or/or implemented by one or more processing circuits. In some implementations, the steps or blocks of method 1700 can be performed, executed, carried out, and/or/or implemented by any computing system and/or processor (e.g., response system 130, system 1500, modeling system 1510, etc.). The steps or blocks of method 1700 can be performed in any order, re-arranged, added, removed, and/or/or modified in various implementations.

In some implementations, method 1700 includes receiving a request with modeling parameters at block 1710. For example, block 1710 can include the modeling system 1510 and/or identification system 1512 receiving a data package including modeling parameters, such as safeguard thresholds, scoring methodologies, and/or temporal intervals, from client device 110 or third-party system 150. In some implementations, the modeling system 1510 and/or identification system 1512 can analyze the received data or request and extract relevant parameters or criteria for evaluating cybersecurity safeguards (e.g., requirements, compliance thresholds, resilience score weightings, temporal intervals for retroactive scoring, etc.). For example, the modeling system 1510 and/or identification system 1512 can receive the request and provide data corresponding with the request (e.g., the modeling parameters or requirements) to the tokenization system 1516 to generate a requirements token used to evaluate immutable safeguards or configurations corresponding with token 1600. In some implementations, the request can specify tokens associated with an entity, reference configurations or incident data of an entity, and/or include links to compliance requirements of entities, intermediaries, and/or/or third-parties.

In some implementations, method 1700 includes identifying tokens and modeled outputs at block 1720. For example, block 1720 can include the modeling system 1510 and/or identification system 1512 identifying token 1600 including modeled outputs 1702 corresponding to one or more safeguards or resilience scores of an entity associated with token 1600. In some implementations, the modeling system 1510 and/or identification system 1512 can access stored tokens from a database 140 or blockchain 170 and extract or retrieve information (e.g., safeguard metadata, proofs, timestamps associated with prior evaluations, etc.) from the tokens at block 1720. For example, the identification system 1512 can retrieve tokenized cybersecurity or resilience data, such as configurations or incident reports, and/or validate the data using cryptographic proofs. In some implementations, the identification system 1512 can identify modeled outputs corresponding to past evaluations, such as resilience scores aggregated across safeguards or safeguard statuses determined using specific scoring thresholds at past temporal intervals.

In some implementations, method 1700 includes re-modeling tokens and generating re-modeled outputs at block 1730. For example, block 1730 can include the modeling system 1510 and/or generation system 1514 applying updated scoring models or methodologies to generate re-modeled outputs based on the identified tokens. For example, the modeling system 1510 and/or generation system 1514 can adjust safeguard sub-scores, update compliance statuses, and/or calculate resilience scores corresponding with the token 1600 based on updated insurance parameters or requirements. For example, re-modeled outputs 1752 can include revised resilience scores reflecting changes in scoring methodologies or new safeguard criteria and facilitating retroactive evaluations of cybersecurity postures over specified temporal intervals. In some implementations, the modeling system 1510 and/or generation system 1514 can determine safeguard statuses, such as "pass" or "fail," based on updated thresholds or criteria, and/or aggregate resilience scores to generate or determine a compliance or risk posture of an entity.

In some implementations, method 1700 includes generating a new token with re-modeled outputs at block 1740. For example, block 1740 can include the modeling system 1510 and/or tokenization system 1516 encapsulating re-modeled outputs, safeguard metadata, and/or proofs of token 1600 into new token 1750 as re-modeled outputs 1752. In some implementations, block 1740 can include the tokenization system 1516 encrypting safeguard data, generating cryptographic proofs verifying data integrity, and/or generating metadata (e.g., timestamps, scoring model identifiers, etc.) corresponding to the updated outputs. For example, the new token 1750 can updated resilience scores or safeguard statuses and/or original safeguard metadata and proofs to provide immutability and traceability or facilitate comparative or temporal evaluations. In some implementations, block 1740 can include the modeling system 1510 and/or tokenization system 1516 storing the new token (e.g., token 1750) in a database 140 or blockchain 170 to facilitate compliance evaluations, risk assessments, and/or underwriting decisions based on outputs of updated scoring methodologies. In some implementations, the new token 1750 can be a third-party token and be associated with a third-party (e.g., third-party computing system 150). That is, the modeling system 1510 and/or tokenization system 1516 can generate or mint a new third-party token 1750 in response to retrospective updates and/or re-analysis of safeguard data.

Figure 18:
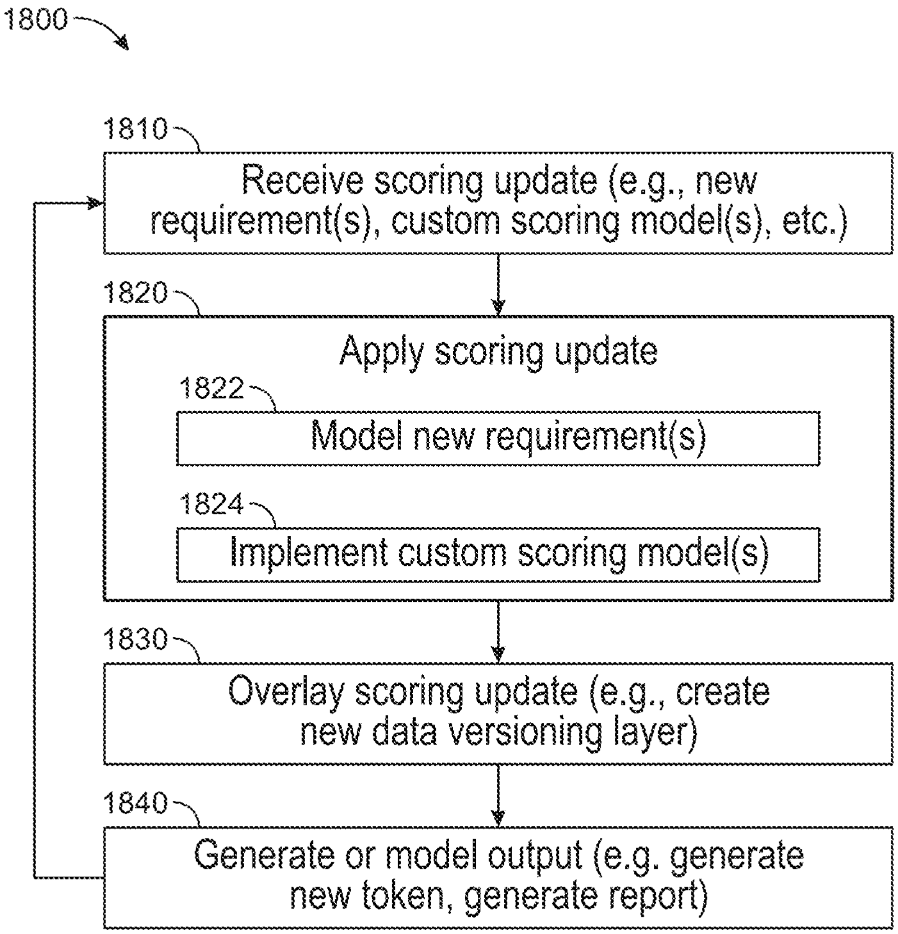
FIG. 18 depicts a flowchart of an implementation of method for cyber resilience modeling, according to some implementations.

FIG. 18 depicts a flowchart of an implementation of method 1800 for cyber resilience modeling, according to some implementations. In some implementations, the method 1800 can correspond to updating protection or safeguard scores. In a general overview, method 1800 can include receiving a scoring update at block 1810, applying a scoring update a block 1820, overlaying a scoring update at block 1830, and/or generating or modeling an output at block 1840. In some implementations, block 1820 can include modeling new requirement(s) at block 1822 and implementing custom scoring model(s) at block 1824. In some implementations, the steps or blocks of method 1800 can be performed, executed, carried out, and/or/or implemented by one or more processing circuits. In some implementations, the steps or blocks of method 1800 can be performed, executed, carried out, and/or/or implemented by any computing system and/or processor (e.g., response system 130, system 1500, modeling system 1510, etc.). The steps or blocks of method 1800 can be performed in any order, re-arranged, added, removed, and/or/or modified in various implementations.

In some implementations, method 1800 includes receiving a scoring update (e.g., new requirements, custom scoring models, etc.) at block 1810. For example, block 1810 can include the modeling system 1510 and/or identification system 1512 receiving a request or data package via network 120 from a client device 110, third-party system 150, and/or another system or sub-system. In some implementations, one or more processing circuits can access, identify, retrieve, and/or receive the scoring update including corresponding to one or more updated parameters or requirements (e.g., modeling parameters such as revised safeguard thresholds, new compliance criteria, updated resilience score algorithms, temporal intervals, temporal sub-intervals, etc.). For example, the scoring update can include a new set of third-party requirements for evaluating entity safeguards or include custom scoring models configured to assess entity configurations or incidents.

In some implementations, method 1800 includes applying a scoring update at block 1820. For example, applying or executing the scoring update at block 1820 can include the modeling system 1510 analyzing tokens (e.g., token 1600) to determine safeguards or resilience scores for updates. For example, applying or executing the scoring update at block 1820 can include the modeling system 1510 applying or implementing new scoring models, weightings, and/or evaluation criteria to adjust resilience scores, safeguard statuses, and/or safeguard thresholds associated with the tokenized data. In some implementations, block 1820 can include modeling new requirements at block 1822 and implementing custom scoring models at block 1824. For example, modeling new requirements at block 1822 can include one or more processing circuits updating safeguard evaluation criteria to align with revised third-party parameters (e.g., stricter thresholds for incident response readiness, etc.). For example, implementing custom scoring models at block 1824 can include one or more processing circuits applying entity, intermediary, and/or third-party algorithms, frameworks, models, weighting factors, and/or other parameters to generate updated resilience scores used in cybersecurity modeling (e.g., for posture state determinations, underwriting decisions, eligibility metrics, etc.).

In some implementations, method 1800 includes overlaying a scoring update (e.g., creating a new data versioning layer) at block 1830. For example, block 1830 can include the modeling system 1510 and/or tokenization system 1516 generating a new layer of versioned data to preserve historical evaluations while incorporating updated scoring methodologies. For example, the modeling system 1510 can overlay a scoring update by creating a new data layer including updated resilience scores, safeguard statuses, and/or compliance thresholds linked to tokenized primitives (e.g., cybersecurity data, performance data, etc.) and accessible by various computing systems to verify the underlying primitive data. For example, block 1830 can include one or more processing circuits generating or overlaying one or more tokens or stored data corresponding with one or more tokens with metadata corresponding with updated scoring models, parameters, and/or temporal intervals used for retrospective modeling or evaluations. Accordingly, block 1830 can include one or more processing circuits overlaying or appending updated or re-modeled data corresponding with tokenized entity configurations, safeguards, incident data, and/or so on (e.g., one or more data versioning layers) without altering or modifying the original data.

In some implementations, method 1800 includes generating or modeling one or more outputs at block 1840. For example, block 1840 can include the modeling system 1510 and/or tokenization system 1516 generating a new token (e.g., token 1750) that encapsulates updated or re-modeled safeguard statuses, resilience scores, and/or proofs. In some implementations, in block 1840, the modeling system 1510 and/or generation system 1514 can generate outputs (e.g., modeled outputs) for inclusion in the new token including various data corresponding to the update or re-modeling of the tokenized cyber resilience data or safeguards (e.g., aggregated resilience scores reflecting the updated scoring methodologies, reports summarizing changes in compliance or risk posture, alerts indicating areas of non-compliance or risk, etc.). For example, the modeling system 1510 or one or more processing circuits can update resilience scores or safeguard scores, create or mint a token including data corresponding to the update, and/or/or provide various additional data or outputs (e.g., reports identifying safeguards, updated thresholds and safeguards that fail to comply, underwriting, regulatory compliance, and/or cybersecurity strategy adjustments, etc.) at block 1840. In some implementations, block 1840 can include storing or transmitting the generated outputs. For example, the modeling system 1510 or one or more processing circuits can store, record, and/or broadcast data corresponding with the outputs to a database (e.g., database 140) or ledger (e.g., blockchain 170). For example, the modeling system 1510 or one or more processing circuits can transmit the output data to client device 110, third-party system 150, and/or so on.

Figure 19:
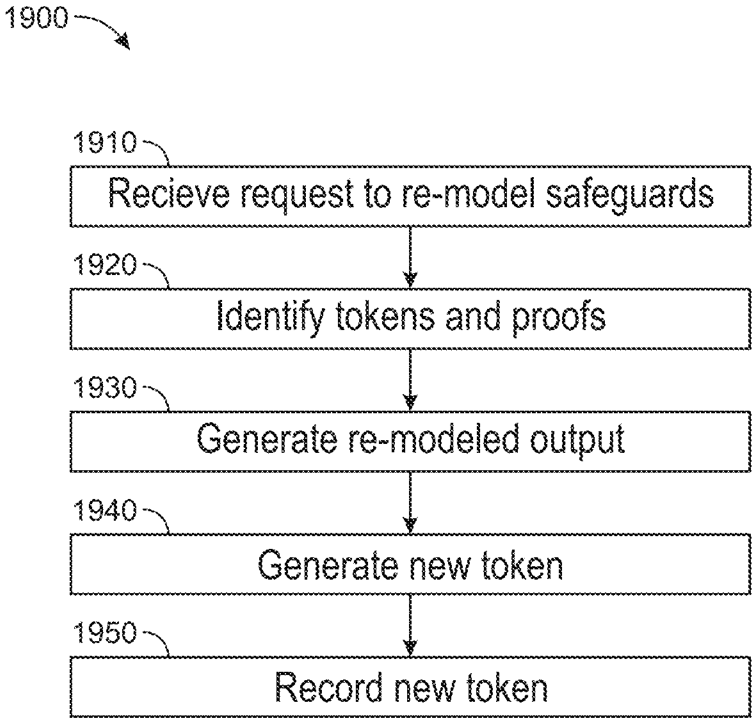
FIG. 19 depicts a flowchart of an implementation of method for cyber resilience modeling, according to some implementations.

FIG. 19 depicts a flowchart of an implementation of method 1900 for cyber resilience modeling, according to some implementations. In a general overview, method 1900 can include receiving a request to re-model safeguards at block 1910, identifying tokens and proofs at block 1920, generating a re-modeled output at block 1930, generating a new token at block 1940, and/or recording the new token at block 1950. In some implementations, the steps or blocks of method 1900 can be performed, executed, carried out, and/or/or implemented by one or more processing circuits. In some implementations, the steps or blocks of method 1900 can be performed, executed, carried out, and/or/or implemented by any computing system and/or processor (e.g., response system 130, system 1500, modeling system 1510, etc.). The steps or blocks of method 1900 can be performed in any order, re-arranged, added, removed, and/or/or modified in various implementations.

In some implementations, the method 1900 can include receiving a request to re-model safeguards at block 1910. For example, block 1910 can include one or more processing circuits receiving, from a third-party computing system, a request to re-model one or more safeguards of at least one entity. For example, safeguards of the entity can include various information corresponding with cybersecurity configurations, incident data, and/or posture states, such as endpoint protections, server protections, MDR (managed detection and response), network protections, cloud security, mobile protections, email security, phishing protections, zero trust network access (ZTNA), encryption, and/or/or any other protection or configuration corresponding to any safeguard type. For example, the modeling system 1510 can receive a request including instructions or parameters including or indicating safeguards states or resilience scores to be evaluated or re-modeled. For example, the request can include a formatted data package (e.g., JSON, XML) transmitted over a secure protocol (e.g., HTTPS, TLS). For example, the modeling system 1510 can parse the request to extract relevant modeling parameters and initiate subsequent processes (e.g., providing data corresponding to safeguards to be updated based on recent regulatory changes, modified risk tolerance levels, new insurer or third party requirements, newly identified threats, etc.). In some implementations, the request can include or correspond to a cyber resilience identifier (e.g., decentralized cyber passport) of the entity.

In some implementations, the request received at block 1910 can include one or more modeling parameters and a temporal interval. For example, the modeling parameters can include various criteria or factors used in scoring methodologies or models (e.g., weightings assigned to particular safeguards, thresholds for compliance, additional parameters used by insurers or regulatory entities, etc.) and/or a corresponding time period (e.g., temporal interval, temporal sub-interval, etc.). That is, the modeling parameters (e.g., set of modeling parameters, single parameter, etc.) can define aspects of the safeguard evaluation or re-evaluation (e.g., whether to prioritize data encryption policies over physical security measures when determining a resilience score, safeguard thresholds, other entity requirements, etc.). For example, the temporal interval can include a defined or dynamic timeframe (e.g., "Q4 2023," "past 12 months," "at a time of the most recent catastrophic incident, etc.) during which the safeguards are to be evaluated or re-modeled. That is, the temporal interval can specify historical or past periods for retroactive analyses of immutable safeguard data against updated scoring methodologies. For example, block 1920 can include the one or more processing circuits receiving a first set of modeling parameters corresponding with tokenized safeguard data and a temporal interval or temporal sub-interval (e.g., a time period).

In some implementations, the method 1900 can include identifying tokens and proofs at block 1920. For example, block 1920 can include one or more processing circuits identifying one or more tokens including the one or more safeguards and one or more proofs of the at least one entity at the temporal interval. For example, the modeling system 1510 and/or identification system 1512 can retrieve tokens stored in a token storage, such as a distributed ledger (e.g., blockchain 170) or centralized repository (e.g., database 140) or combination, by querying a corresponding storage location using an index or unique identifier (e.g., any data construct or marker that distinctly associates a token with its corresponding storage location, such as a label, hash value, address, metadata reference, and/or any combination thereof) associated with the tokens. For example, if the token storage includes a distributed ledger, the modeling system 1510 can perform a blockchain query by broadcasting a request to the network 120 and receiving the token data from participating nodes that validate the request (e.g., third-party system 150). For example, the modeling system 1510 can use a cryptographic key or digital signature to authenticate access to the token data. For example, identifying at block 1920 can include one or more processing circuits verifying the integrity of the token through hash comparisons or consensus mechanisms employed by the blockchain network.

In some implementations, if the token storage includes a data source or centralized repository, such as database 140, the modeling system 1510 can execute structured queries (e.g., SQL commands) to retrieve tokens based on metadata fields such as timestamps, entity identifiers, and/or safeguard types at block 1920. For example, the modeling system 1510 can retrieve tokens matching a specific temporal interval by filtering results from the database using indexed fields corresponding to the requested interval. In some examples, the token storage or repository can include access control mechanisms (e.g., role-based access control (RBAC)) to verify access of authorized systems or users to access, view, modify, and/or otherwise interact with the tokenized data. For example, the modeling system 1510 and/or identification system 1512 can identify tokens by analyzing metadata or mappings stored with or corresponding to the tokens. For example, the one or more processing circuits can execute a hierarchical search to navigate through a directory of safeguards and associated tokens or employ machine learning models to predict and locate tokens (e.g., based on patterns in past retrieval requests, etc.).

In some implementations, the cryptographic proofs identified at block 1920 can include attestations verifying the authenticity of the entity configurations (e.g., a digital signature confirming the integrity of endpoint settings as of January 2024). For example, the one or more processing circuits can access or identify one or more proofs (e.g., zero-knowledge proofs) validating compliance of an entity with predefined criteria without revealing sensitive details of the entity (e.g., while obscuring or protecting data such as vulnerabilities or specific implementations linked with entity identifiers). In some implementations, the identified tokens can also include performance tokens representing historical safeguard evaluations (e.g., incident response timelines, detection rates, remediation metrics for one or more safeguards, etc.).

In some implementations, the one or more safeguards correspond with a plurality of modeled outputs. For example, block 1920 can include one or more processing circuits associating at least one (e.g., each) identified safeguard with corresponding modeled outputs stored in token metadata, such as compliance statuses, performance metrics, and/or aggregated risk scores. For example, the modeling system 1510 and/or identification system 1512 can map safeguards from tokens to outputs using indices stored in a centralized repository or cryptographic links embedded in a distributed ledger (e.g., hash pointers). In some implementations, the plurality of modeled outputs includes at least one first modeled output corresponding with a safeguard status based at least on a safeguard threshold. For example, the safeguard status can include binary indicators (e.g., "compliant," "non-compliant", "pass", "fail," a color (e.g., red, green), etc.) based on thresholds or requirements such as minimum uptime, encryption strength, and/or data access controls evaluated during past temporal intervals.

In some implementations, the plurality of modeled outputs include at least one second modeled output corresponding with at least one resilience score. For example, the resilience score can include numerical or weighted values for aggregating sub-scores from multiple safeguards, such as endpoint configurations, network security levels, and/or incident response metrics. For example, the modeling system 1510 and/or identification system 1512 can compute resilience scores based on criteria such as encryption algorithm complexity, coverage of phishing protections, and/or adherence to zero-trust network policies. In some examples, the one or more processing circuits can dynamically adjust weights assigned to individual safeguards based on evolving compliance standards or insurer requirements.

In some implementations, the method 1900 can include generating a re-modeled output at block 1930. For example, block 1930 can include one or more processing circuits generating, by the one or more tokens, at least one re-modeled output at the temporal interval based at least on re-modeling the one or more tokens. That is, re-modeling at block 1930 can include the one or more processing circuits applying updated scoring methodologies, safeguard thresholds, and/or regulatory criteria to tokenized data corresponding with previously identified safeguards. For example, the modeling system 1510 and/or generation system 1514 can apply heuristic algorithms or machine-learning-based models to re-evaluate resilience scores or compliance statuses. For example, re-modeling can include recalculating a resilience score by integrating new parameters, such as updated models, threat intelligence feeds, modified risk tolerance metrics, and/or additional safeguard sub-categories introduced by an insurer. In some examples, block 1930 can include one or more processing circuits validating the accuracy of updated outputs by comparing the updated outputs against historical data. For example, the one or more processing circuits can cross-reference newly generated scores with previously stored benchmarks to identify discrepancies or validate improvements in safeguard performance.

In some implementations, the at least one re-modeled output includes an update, based on the one or more modeling parameters, to at least one of (i) the safeguard status or (ii) the at least one resilience score. For example, the update can include an update to one or more tokens or tokenized data (e.g., one or more fields of a JSON object of a token). For example, a safeguard status can refer to a binary determination (e.g., "requirementsSatisfied" indicating "true" or "false") derived from comparing a safeguard score (e.g., "actualCoverage") to a safeguard threshold (e.g., "requiredCoverage"). Additionally, an update to a safeguard status can include an update to the binary determination based on new or received data (e.g., new coverage threshold, new scoring model, etc.).

For example, the modeling system 1510 and/or one or more processing circuits can update an "actualCoverage" value of a token representing updated coverage levels of one or more safeguards (e.g., "Endpoint Protection," "Encryption," "Zero Trust Network Access," etc.) based on the re-modeling. For example, the modeling system 1510 and/or one or more processing circuits can determine whether an existing or updated score (e.g., "actualCoverage" of a safeguard) meets or exceeds an existing or updated threshold (e.g., "requiredCoverage" parameter) based on one or more updated requirements or third-party scoring models at a corresponding interval. For example, the modeling system 1510 can determine that an entity previously had safeguard score of 100 (e.g., "actualCoverage=100") compared to a safeguard threshold of 95 (e.g., "requiredCoverage") and a safeguard status of "true" or "passed" (e.g., "requirements-Satisfied"), and/or further determine an update to the safeguard status causing the entity to continue to satisfy the threshold (e.g., based on determining a higher safeguard score and/or a lower safeguard threshold) or to fail the threshold (e.g., based on receiving a lower safeguard score and/or a lower safeguard threshold).

For example, an update to the resilience score can include recalculating or adjusting the overall score based on the one or more modeling parameters and safeguard sub-scores associated with the entity. For example, the modeling system 1510 and/or one or more processing circuits can compute the resilience score as a composite value derived from multiple sub-scores corresponding to specific safeguards (e.g., "Endpoint Protection," "Encryption," "Zero Trust Network Access"). In some implementations, the modeling system 1510 can adjust one or more safeguard or protection sub-scores in updating the resilience score. For example, the modeling system 1510 can recalculate a protection sub-score for "Encryption" based on a detected use of stronger cryptographic protocols or more comprehensive encryption coverage across a computing environment of an entity. For example, the modeling system 1510 can adjust sub-scores for "Endpoint Protection" based on newly deployed endpoint security solutions or improved detection rates for known threats. In some examples, the resilience score update can include the one or more processing circuits applying updated weightings or new scoring algorithms to the safeguard or protection sub-scores. For example, the modeling system 1510 can receive a set of modeling parameters (e.g., specifying that "Endpoint Protection" is to contribute 30% of the total resilience score, while "Email Security" contributes 10%) and dynamically re-calculate or adjust resilience scores and/or sub-scores based on the update.

In some implementations, the method 1900 can include generating a new token at block 1940. For example, block 1940 can include one or more processing circuits generating at least one new token encapsulating the at least one re-modeled output, the one or more safeguards, and/or the one or more proofs. For example, the modeling system 1510 and/or tokenization system 1516 can create a new token object (e.g., a JSON object, token 1750, etc.) including updated safeguard data, re-modeled outputs, and/or cryptographic proofs configured to validate the integrity of the data. For example, the one or more processing circuits can generate the new token 1750 including modeled outputs 1752 and one or more proofs corresponding to the modeled outputs 1752. For example, the one or more processing circuits can use the proofs to validate that the updated safeguard data complies with specific external requirements or scoring criteria without disclosing sensitive information. For example, the modeling system 1510 and/or tokenization system 1516 can tokenize the re-modeled outputs using various encryption algorithms or techniques (e.g., RSA, quantum-resistant techniques, etc.) to secure the updated safeguard data.

For example, the new token can include a various fields representing resilience scores and/or sub-scores of an entity (e.g., as shown in safeguard output(s) 1640 token 1600) and fields corresponding to individual safeguard evaluations (e.g., safeguard 1622 or sub-score 1624 of token 1600). In some examples, the new token can include unique identifiers linking the token to specific entities, time intervals, and/or scoring methodologies. For example, the token can include a "Version" field indicating the version of the scoring algorithm applied during re-modeling for traceability and reproducibility of the updated resilience scores. In some examples, the tokenization system 1516 can digitally sign the new token to verify authenticity or prevent unauthorized alterations.

In some implementations, the method 1900 can include recording the new token at block 1950. For example, block 1950 can include one or more processing circuits recording the at least one new token in a token storage system. For example, the modeling system 1510 can transmit the new token to a distributed ledger (e.g., blockchain 170) for secure and immutable storage. In such cases, the tokenization system 1516 can execute a smart contract validate a compliance of the token with ledger protocols or to log metadata (e.g., hash values, transaction identifiers) of the token. If the token is recorded in a centralized repository, such as database 140, the modeling system 1510 can use database APIs or structured query language (SQL) commands to store the token in a secure and indexed format. For example, the modeling system 1510 can include fields such as entity IDs, safeguard types, timestamps, and/or scoring models in the database entry to facilitate retrieval and querying. In some implementations, the token storage system can include version control mechanisms to maintain a history of updates and provide for comparisons between different iterations of corresponding safeguards or other cyber resilience data. In some examples, the modeling system 1510 can log the recording operation and generate an audit trail that includes various versioning information (e.g., the storage location, user or system that initiated the operation, timestamps of the recording, etc.). In some examples, the tokenization system 1516 can broadcast a notification or alert to entity or third-party systems (e.g., insurers, auditors) to confirm that the updated token has been securely stored or is available for future compliance or risk assessments.

In some implementations, the method 1900 can include one or more processing circuits receiving an updated safeguard threshold corresponding with the at least one entity. For example, the modeling system 1510 can receive one or more parameters or requirements for generating the safeguard status (e.g., a safeguard threshold, such as 97%) from one or more entities associated with the safeguards being modeled and/or retroactively scored. That is, the entity providing the safeguards can transmit updated requirements, such as minimum coverage levels or acceptable compliance scores, and/or the modeling system 1510 or identification system 1512 can receive the updated requirements (e.g., new safeguard threshold) and process the updates for retroactive modeling. For example, one or more processing circuits can tokenize the updated safeguard threshold by encapsulating data corresponding to the updated threshold and storing the tokenized updates in a data source or distributed ledger (e.g., token storage).

In some implementations, the method 1900 can include one or more processing circuits generating the at least one re-modeled output including an update to the safeguard status based on the updated safeguard threshold. For example, the modeling system 1510 and/or identification system 1512 can compare safeguard metadata 1620, such as the "actualCoverage" value, with the updated threshold value (e.g., "requiredCoverage"). That is, the modeling system 1510 can compute whether the updated safeguard score satisfies the updated safeguard threshold using a binary determination process. For example, a safeguard status field (e.g., "requirementsSatisfied") can be updated to "true" if the actual coverage meets or exceeds the updated threshold, and/or "false" otherwise. In some examples, the updated safeguard status can be logged in safeguard outputs 1640 of token 1600. For example, the safeguard status update can include metadata fields indicating the source of the updated threshold, such as a third-party scoring model or regulatory requirement identifier. In some examples, the modeling system 1510 can generate an audit trail tracking changes to safeguard statuses across different time intervals, storing versioned data for subsequent analysis or compliance verification.

In some implementations, the method 1900 can include one or more processing circuits receiving a heuristic scoring model corresponding with the at least one entity. For example, the modeling system 1510 can receive a scoring model from a third-party system (e.g., insurers, auditors) including parameters for calculating resilience scores or sub-scores associated with various safeguard types (e.g., endpoint protection, encryption, phishing protection). Additionally, in response to receiving third-party parameters or data (e.g., scoring models, updated threshold, etc.), the one or more processing circuits can generate one or more tokens (e.g., requirements tokens) encapsulating the third-party parameters or data in a structured format and store the one or more tokens in a token storage. In some examples, the heuristic scoring model can define scoring criteria based on configuration policies or endpoint coverage. For example, the scoring model can be configured to model an "Endpoint Protection" sub-score as the percentage of computers with endpoint protection assigned out of the total number of computers multiplied by 100. For example, the scoring model can define "Encryption" sub-scores based on the percentage of endpoints with encryption activated on endpoints, as compared to the total number of endpoints, and/or combine, consolidate, and/or/or aggregate the sub-scores based on one or more assigned weights to generate a weighted aggregation (e.g., resilience score). In applying or executing the heuristic scoring model, the modeling system 1510 can apply various rules, store parameters (e.g., coverage parameters, configuration parameters, modeling parameters, etc.) in a secure storage system (e.g., database 140), and/or map the safeguard policies to relevant metadata fields in token 1600 (e.g., safeguard metadata 1620). Additionally, the heuristic scoring model can include rules for avoiding double-counting safeguards. In some implementations, the heuristic scoring model can include weighting factors for sub-scores. For example, the scoring model can specify that "Email Security" contributes 10% to the overall resilience score, while "Phishing Protection" contributes 15%. For example, the modeling system 1510 and/or one or more processing circuits can dynamically apply weightings during re-modeling operations.

In some implementations, the method 1900 can include one or more processing circuits generating, using the heuristic scoring model and the one or more safeguards, the at least one re-modeled output including an update to the at least one resilience score or one or more protection sub-scores. For example, the modeling system 1510 can compute updated sub-scores by applying the rules and parameters of the heuristic scoring model to safeguard metadata 1620 in token 1600. That is, the modeling system 1510 can determine protection sub-scores by analyzing updated safeguard states (e.g., number of endpoints protected, encryption policies activated, etc.) or security postures. For example, the system can recalculate a "Network Protection" sub-score by evaluating the percentage of endpoints with a network threat protection service running. Similarly, a "Cloud Security" sub-score can be adjusted by analyzing the number of cloud endpoints with the corresponding policies activated at a temporal interval (e.g., a time period, a temporal sub-interval, etc.). In some examples, the modeling system 1510 can use configuration policies (e.g., "policy.type" and "policy.activated") from the heuristic scoring model to determine whether specific safeguards, such as zero trust network access or encryption, meet the coverage parameters. For example, the updated resilience scores can be aggregated from the sub-scores using weightings defined in the heuristic scoring model. For example, the modeling system 1510 can compute the overall resilience score by summing weighted sub-scores or verifying the calculation reflects a weighting of at least one (e.g., each) safeguard type based on the third-party, intermediary, and/or entity scoring model. In some example, the updated heuristic scoring model can introduce additional parameters (e.g., stricter conditions for phishing protection, such requiring both "threat-protection-.activated" and "exploit-mitigation.safe-browsing.activated" fields to be true, etc.).

In some implementations, the method 1900 can include one or more processing circuits receiving an updated safeguard threshold corresponding with the at least one entity and a heuristic scoring model corresponding with the at least one entity. For example, the modeling system 1510 can receive the updated threshold and scoring model via an interface (e.g., GUI, API, etc.). That is, the updated safeguard threshold can include minimum acceptable levels of protection for based on safeguard types and the scoring model can include revised coverage parameters or configuration rules for calculating sub-scores. For example, the updated safeguard threshold can define a "requiredCoverage" value of 90% for endpoint protection, up from a previous threshold of 80%. For example, the modeling system 1510 can use the updated inputs or thresholds to evaluate whether the safeguard status (e.g., "requirementsSatisfied") is to be updated (e.g., changed from pass to fail).

In some implementations, the method 1900 can include one or more processing circuits generating the at least one re-modeled output including an update to the safeguard status based on the updated safeguard threshold and an update to the at least one resilience score or one or more protection sub-scores using the heuristic scoring model and the one or more safeguards. For example, the modeling system 1510 can evaluate safeguard metadata 1620 in token 1600 against the updated safeguard threshold and scoring model to determine updated safeguard statuses and resilience scores. That is, the modeling system 1510 can determine whether at least one (e.g., each) safeguard type meets or complies with updated coverage requirements or parameters retroactively. For example, generating the at least one re-modeled output can include the one or more processing circuits updating a score or threshold associated with an "Email Security" safeguard. For example, generating the at least one re-modeled output can include the one or more processing circuits updating a safeguard score or result to "requirementsSatisfied=false" if the determined actual coverage is 85% and the updated threshold is 90%. Further, the modeling system 1510 can adjust the resilience score by recalculating sub-scores for affected safeguards (e.g., lowering the sub-score for "Mobile Protection" based on reduced endpoint coverage) and/or re-aggregated or compiling the sub-scores to determine the resilience score.

In some implementations, the method 1900 can include generating a first plurality of protection sub-scores based on the one or more safeguards and one or more coverage parameters of a heuristic scoring model. In some implementations, the one or more coverage parameters correspond with safeguard types of the one or more safeguards implemented in one or more entity computing systems of the at least one entity. For example, a coverage parameter or score for a type of protection (e.g., endpoint protection) can correspond with a number of entity computing system implementing the corresponding protections and/or a total number of entity computing systems associated with the at least one entity. For example, the modeling system 1510 can compute sub-scores for safeguards such as "Encryption," "Email Security," and "Phishing Protection" by evaluating whether coverage parameters defined in the scoring model are satisfied based on determining a percentage or total corresponding with implementations of such safeguards. That is, the modeling system 1510 can analyze a percentage of endpoints with encryption activated (or enabled), the number of email accounts with spam filtering activated, and/or the presence of phishing detection policies across entity computing systems to determine or apply coverage parameters. In some examples, the modeling system 1510 can calculate sub-scores for "Network Protection" by verifying that a "network-protection" policy is activated on endpoints. In some examples, the one or more processing circuits can store data corresponding with the sub-scores in safeguard outputs 1640 of token 1600 or modeled outputs 1752 (e.g., re-modeled outputs) of new token 1750.

In some implementations, the method 1900 can include generating a second plurality of protection sub-scores based on the one or more safeguards and one or more configuration parameters of the heuristic scoring model, the one or more configuration parameters corresponding with entity configurations associated with the safeguard types. For example, a configuration parameter or score for a type of protection or safeguard (e.g., endpoint protection) can correspond with activation of one or more policies associated with the safeguard (e.g., where a "threat-protection" policy is activated and/or otherwise unlocked (e.g., policy type=='threat-protection' and policy.activated are true) within one or more entity computing systems. For example, a configuration parameter or score for an entity configuration (e.g., any configuration associated with any type of protection, such as firewall protection settings, access control rules, encryption standards, etc.) can correspond with verifying that specific rules or filters are active within a network policy (e.g., policy.type=="firewall" and policy.rules.active==true). As another example, a configuration parameter for multi-factor authentication (MFA) safeguards can correspond with determining whether an entity configuration for MFA is enforced for all user accounts within the entity system (e.g., policy.type=="MFA" and policy.enforcement=="mandatory"). That is, a heuristic scoring model can include various parameters, such as coverage parameters (e.g., associated with safeguard coverage of an entity), configuration parameters (e.g., associated with one or more entity configurations of safeguards), and/or other parameters or thresholds to analyze safeguards implemented in one or more entity computing systems and entity configurations (e.g., policies, settings, parameters, etc.) corresponding to the safeguards.

In some implementations, the method 1900 can include generating the at least one resilience score based on a weighted aggregation of the first plurality of protection sub-scores and the second plurality of protection sub-scores. For example, the modeling system 1510 and/or one or more processing circuits can compute the resilience score by retrieving sub-scores associated with individual safeguards (e.g., "Encryption," "Endpoint Protection," "Zero Trust Network Access") from the tokenized data and combining the sub-scores according to one or more rules or factors (e.g., weights) to produce a composite score (e.g., weighted aggregation). That is, the modeling system 1510 can apply predefined or dynamically updated weights to the retrieved sub-scores using heuristic scoring models. For example, if a heuristic model prioritizes certain safeguard types (e.g., "Encryption" assigned a weight of 40%), the modeling system 1510 can compute the resilience score as a weighted sum of sub-scores. In some examples, the one or more processing circuits can dynamically adjust the weights based on internal or external parameters or requirements, such as updated scoring methodologies, insurer risk models, regulatory changes, and/or historical performance trends. In some implementations, the modeling system 1510 can normalize sub-scores across different safeguard types (e.g., provide equal weighting, adjusting weights, generating a weighted aggregation, etc.). For example, normalization can include scaling sub-scores for safeguard types with differing evaluation metrics (e.g., coverage percentages, configuration policy states) to a uniform range (e.g., 0-100). Additionally, the modeling system 1510 can apply exclusion criteria to ignore sub-scores from overlapping safeguards (e.g., "Server Protection" overlapping with "Network Protection") to prevent double-counting in the weighted aggregation.

In some implementations, the one or more tokens correspond with the temporal interval, and/or the temporal interval corresponds with a time period for evaluating the at least one entity. A temporal interval (or temporal sub-interval) can include any period of time for evaluating safeguards or other cyber resilience data of an entity. For example, the one or more tokens can be associated with an evaluation period (e.g., "Q4 2023"). That is, the modeling system 1510 can embed metadata fields within the token schema (e.g., "evaluationPeriod" field in token 1600) to provide an indication of a temporal interval corresponding with token. In some implementations, at least one token of the one or more tokens corresponds with a temporal sub-interval including a portion of the temporal interval. For example, the one or more tokens can correspond to a sub-set or sub-interval of an overall evaluation period (e.g., a week within a month, etc.). For example, the one or more processing circuits can analyze incident response metrics for a "January 2024" sub-interval as part of a "Q1 2024" interval. In some examples, an interval can include multiple sub-intervals (e.g., a yearly interval with monthly sub-intervals). In some examples, the modeling system 1510 can generate temporal mappings between tokens to support retrospective evaluations. For example, the one or more processing circuits can map historical safeguard states (e.g., configuration coverage as of "March 2022") to updated scoring criteria (e.g., revised insurer thresholds for "Encryption" coverage in "2024") corresponding with an interval or sub-interval.

In some implementations, the method 1900 can include, responsive to determining the safeguard status fails to satisfy the safeguard threshold, determining, by one or more processing circuits, one or more actions to perform the update to the at least one of (i) the safeguard status or (ii) the at least one resilience score. For example, the modeling system 1510 can analyze safeguard metadata and scoring models to identify remediation steps for failed safeguards. That is, the modeling system 1510 can use failure conditions (e.g., low "actualCoverage" values or gaps between "actualCoverage" and "requiredCoverage") to generate remediation instructions. For example, if "Zero Trust Network Access" fails due to inadequate endpoint coverage, the one or more processing circuits can recommend or deploy ZTNA solutions across endpoints. In some implementations, the modeling system 1510 can dynamically prioritize actions based on scoring weights. For example, if "Encryption" carries a higher weight in the resilience score, the system can recommend deploying stronger cryptographic protocols first. In some examples, the modeling system 1510 can generate actionable insights (e.g., reports summarizing failures, root causes, and/or suggested remediations) and share the insights with entity, intermediary, and/or third-party systems (e.g., and/organizations, insurers, auditors, etc.).

In some implementations, generating the at least one new token (e.g., at block 1940) can include retrieving or extracting, by the one or more processing circuits, the at least one re-modeled output, the one or more safeguards, and/or the one or more proofs. For example, the modeling system 1510 can extract safeguard metadata (e.g., safeguard 1622, safeguard outputs 1640), cryptographic proofs (e.g., proof 1632), and/or updated resilience scores or statuses from token 1600. In some implementations, generating the at least one new token (e.g., at block 1940) can include the one or more processing circuits encapsulating the at least one re-modeled output, the one or more safeguards, and/or the one or more proofs in a structured format corresponding to the at least one new token. That is, the modeling system 1510 and/or tokenization system 1516 can encapsulate the re-modeled output in a structured format corresponding to token 1600 and/or token 1750. In some implementations, the structure format includes a plurality of metadata fields corresponding with the one or more safeguards and the one or more proofs. For example, the new token can include JSON fields representing updated safeguard scores (e.g., "actualCoverage"), safeguard statuses (e.g., "requirementsSatisfied"), and/or metadata (e.g., evaluation periods, scoring model identifiers). In some examples, the modeling system 1510 can include version control metadata fields in the new token structure. For example, a "version" field can indicate that the token corresponds to scoring model version "2.1." Additionally, the one or more processing circuits can record lineage metadata within a structured format for the token and linking the new token to previous iterations or supporting historical comparisons. In some implementations, the new token can be a third-party token associated with a third party or any other token (e.g., entity token, etc.).

In some implementations, the method 1900 can include updating, by the one or more processing circuits, the at least one new token as a third-party token by adding or updating a metadata field of the at least one new token indicating an association with a third-party entity corresponding with the third-party computing system. For example, the modeling system 1510 and/or tokenization system 1516 can modify the token schema to include a field such as "associatedEntity" or "thirdPartyID" linking the new token to the third-party computing system.

That is, the metadata can indicate that the token has been evaluated or re-modeled using requirements provided by the third-party. In some examples, the metadata can include unique identifiers corresponding to the third-party requirements or compliance frameworks applied during re-modeling (e.g., "NIST_800-53"). For example, the one or more processing circuits can record timestamps of when the token was associated with the third-party entity to support historical traceability or compliance validation.

In some implementations, the method 1900 can include, responsive to generating one or more additional tokens, programmatically establishing, by the one or more processing circuits, a data link between the at least one new token and the one or more additional tokens based on determining one or more metadata fields of the one or more additional tokens indicate the association with the third-party entity. For example, the modeling system 1510 can programmatically establish a data link or metadata relationship between tokens by executing one or more programmatic instructions or operations to create a data link that represents a logical association, such as shared dependencies, hierarchical relationships, and/or temporal groupings between tokenized safeguard data (e.g., safeguard or performance tokens) and new tokens generated based on re-modeling the tokenized safeguard data. In some implementations, the data link can correspond to common metadata fields between the token (e.g., a shared or corresponding "evaluationPeriod," "entityID," "safeguardID," "thirdPartyID," etc.). For example, the modeling system 1510 can programmatically establish a data link by appending a "linkedTokens" field to the metadata of at least one (e.g., each) associated token. In another example, programmatically establishing a data link can include the one or more processing circuits generating or accessing an index or database mapping (e.g., a token map) that organizes tokens into groups based on values (e.g., tokens sharing the same "thirdPartyID" or "evaluationPeriod") and updated stored data of the index or database mapping to indicate the safeguard token is linked to the new token (e.g., third-party token). That is, the modeling system 1510 can create a hierarchical or relational link between the new token and other tokens to represent dependency or association in a structured format (e.g., JSON, XML, and/or database relationships). For example, the one or more processing circuits can generate a token hierarchy where a primary token serves as a parent to multiple child tokens representing individual safeguard evaluations or compliance outputs.

In some implementations, the method 1900 can include, responsive to determining the request corresponds with re-analysis of the one or more safeguards, re-analyzing, by the one or more processing circuits, the one or more safeguards and the one or more proofs. For example, the modeling system 1510 can identify or determine that the request corresponds with re-analysis based on a request type, format, and/or/or included content (e.g., identifiers, metadata, etc.). In response to determining the request corresponds with re-analysis (e.g., retroactive modeling, etc.), the one or more processing circuits can retrieve safeguard metadata and proofs from token storage (e.g., database 140, blockchain 170) and compare the retrieved data against updated requirements or scoring criteria provided in the request. That is, the re-analysis or re-analyzing can include applying scoring models (e.g., heuristic models with configuration parameters, coverage parameters, etc.), re-modeling or safeguard scores or resilience scores, validating cryptographic proofs (e.g., hash verification or digital signature checks) to verify the authenticity of the safeguards and detecting changes or deviations in safeguard configurations (e.g., updated encryption protocols or newly applied endpoint security measures), and/or so on. For example, re-analyzing can include modeling safeguards previously modeled safeguards with updated modeling parameters (e.g., a new set of modeling parameters) to generated updates scores or outputs. In some implementations, the method 1900 can include determining, by the one or more processing circuits, an update to at least one safeguard of the one or more safeguards based on the re-analysis or re-analyzing. For example, the modeling system 1510 can re-analyze tokenized safeguard data and detect, based on re-analyzing, that a previously non-compliant safeguard now satisfies the updated scoring model (e.g., "Encryption" coverage increased from 80% to 100%) or recommend additional remediation steps if compliance remains unmet. For example, the modeling system 1510 can determine an overall resilience score and/or protection sub-scores of one or more entities based on updated modeling parameters or requirements provided for re-analysis or retroactive modeling.

In some implementations, the request received at block 1910 includes a requirements token including one or more third-party requirements of a third-party associated with the third-party computing system. For example, the modeling system 1510 can parse the requirements token to extract data fields specifying third-party criteria, such as safeguard thresholds, scoring weights, and/or compliance benchmarks. That is, the token can include structured metadata (e.g., JSON fields such as "requiredCoverage," "minScore," or "prioritySafeguards") representing the requirements. In some implementations, the method 1900 can include identifying, by the one or more processing circuits, the one or more modeling parameters based on extracting the one or more third-party requirements from the requirements token. For example, the modeling system 1510 can use natural language processing models or data parsing to identify tokenized parameters used for corresponding updates (e.g., adjusting weightings for specific safeguards like "Zero Trust Network Access" or applying stricter thresholds for high-priority safeguards).

In some implementations, the method 1900 can include receiving, by the one or more processing circuits from the third-party computing system in real-time, a second request including a second set of modeling parameters to re-model the one or more safeguards. For example, the third-party computing system 150 can transmit an additional request including a second set of updated modeling parameters or scoring criteria used to re-evaluate the data (e.g., via an additional retrospective evaluation such as a second evaluation, third evaluation, etc.). That is, the request can include a list or group of new evaluation parameters or revised safeguard thresholds based on updated entity or third-party requirement data (e.g., new thresholds, new configuration parameters, new coverage parameters, etc.). In some examples, the modeling system 1510 can immediately receive or apply the second set of modeling parameters to re-analyze safeguards and update the corresponding resilience scores or statuses (e.g., based on computing sub-scores and determining a weighted aggregation of the sub-scores). For example, the one or more processing circuits can execute any number of safeguard evaluations and re-analyze the underlying safeguard data (e.g., implemented safeguards, entity configurations, incident data, etc.) in response to receiving an updated set (e.g., second set, third set, etc.) of modeling parameters.

Configuration of Exemplary Implementations

While this specification contains many specific implementation details and/or arrangement details, these should not be construed as limitations on the scope of any implementations or of what can be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features can be described above as acting in certain combinations and even initially claimed as such, one or more features from a claimed combination can in some cases be excised from the combination, and/or the claimed combination can be directed to a subcombination or variation of a subcombination.

Additionally, features described with respect to particular headings can be utilized with respect to and/or in combination with illustrative implementation described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, and/or that all illustrated operations be performed, to achieve desirable results. In some cases, the actions recited in the claims can be performed in a different order and still achieve desirable results. In addition, the processes depicted in the accompanying figures do not necessarily require the particular order shown, and/or sequential order, to achieve desirable results.

In certain circumstances, multitasking and parallel processing can be advantageous. Moreover, the separation of various system components in the implementations and/or arrangements described above should not be understood as requiring such separation in all implementations and/or arrangements, and/or it should be understood that the described program components and systems can generally be integrated together in a single software product or packaged into multiple software products.

Having now described some illustrative implementations, illustrative arrangements, and/or embodiments it is apparent that the foregoing is illustrative and not limiting, having been presented by way of example. In particular, although many of the examples presented herein involve specific combinations of method acts or system elements, those acts, and/or those elements can be combined in other ways to accomplish the same objectives. Acts, elements and features discussed in connection with one implementation and/or arrangement are not intended to be excluded from a similar role in other implementations or arrangements.

The phraseology and terminology used herein is for the purpose of description and should not be regarded as limiting. The use of "including" "including" "having" "containing" "involving" "characterized by" "characterized in that" and variations thereof herein, is meant to encompass the items listed thereafter, equivalents thereof, and/or additional items, as well as alternate implementations and/or arrangements consisting of the items listed thereafter exclusively. In some implementations, the systems and methods described herein consist of one, at least one (e.g., each) combination of more than one, and/or all of the described elements, acts, and/or components.

Any references to implementations, arrangements, and/or elements or acts of the systems and methods herein referred to in the singular can also embrace implementations and/or arrangements including a plurality of these elements, and/or any references in plural to any implementation, arrangement, and/or element or act herein can also embrace implementations and/or arrangements including a single element. References in the singular or plural form are not intended to limit the presently disclosed systems or methods, their components, acts, and/or elements to single or plural configurations. References to any act or element being based on any information, act or element can include implementations and/or arrangements where the act or element is based at least in part on any information, act, and/or element.

Any implementation disclosed herein can be combined with any other implementation, and/or references to "an implementation," "some implementations," "an alternate implementation," "various implementation," "one implementation" or the like are not necessarily mutually exclusive and are intended to indicate that a particular feature, structure, and/or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and/or all of the described terms.

Where technical features in the drawings, detailed description or any claim are followed by reference signs, the reference signs have been included for the sole purpose of increasing the intelligibility of the drawings, detailed description, and/or claims. Accordingly, neither the reference signs nor their absence have any limiting effect on the scope of any claim elements.

The systems and methods described herein can be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and/or changes that come within the meaning and range of equivalency of the claims are embraced therein.

What is claimed is:

1. A method, comprising:

receiving, by one or more processing circuits from a third-party computing system, a request to re-model one or more safeguards of at least one entity, wherein the request comprises one or more modeling parameters and a temporal interval;

identifying, by the one or more processing circuits, one or more tokens comprising the one or more safeguards and one or more proofs of the at least one entity at the temporal interval, wherein the one or more safeguards correspond with a plurality of modeled outputs, and wherein the plurality of modeled outputs comprise at least one first modeled output corresponding with a safeguard status based at least on a safeguard threshold and at least one second modeled output corresponding with at least one resilience score;

generating, by the one or more processing circuits using the one or more tokens, at least one re-modeled output at the temporal interval based at least on re-modeling the one or more tokens, wherein the at least one re-modeled output comprises an update, based on the one or more modeling parameters, to at least one of (i) the safeguard status or (ii) the at least one resilience score, and wherein the update to at least one of (i) the safeguard status or (ii) the at least one resilience score is based at least on the one or more safeguards or the one or more proofs;

generating, by the one or more processing circuits, at least one new token comprising the at least one re-modeled output, the one or more safeguards, and the one or more proofs; and recording, by the one or more processing circuits, the at least one new token in a token storage.

2. The method of claim 1, comprising:

receiving, by the one or more processing circuits, an updated safeguard threshold corresponding with the at least one entity; and generating, by the one or more processing circuits, the at least one re-modeled output comprising an update to the safeguard status based on the updated safeguard threshold.

3. The method of claim 1, comprising:

receiving, by the one or more processing circuits, a heuristic scoring model corresponding with the at least one entity; and generating, by the one or more processing circuits using the heuristic scoring model and the one or more safeguards, the at least one re-modeled output comprising an update to the at least one resilience score or one or more protection sub-scores, wherein generating the one or more protection sub-scores comprises generating the at least one resilience score.

4. The method of claim 1, comprising:

receiving, by the one or more processing circuits, an updated safeguard threshold corresponding with the at least one entity and a heuristic scoring model corresponding with the at least one entity; and generating, by the one or more processing circuits, the at least one re-modeled output comprising an update to the safeguard status based on the updated safeguard threshold and an update to the at least one resilience score or one or more protection sub-scores using the heuristic scoring model and the one or more safeguards.

5. The method of claim 1, comprising:

generating, by the one or more processing circuits, a first plurality of protection sub-scores based on the one or more safeguards and one or more coverage parameters of a heuristic scoring model, the one or more coverage parameters corresponding with safeguard types of the one or more safeguards implemented in one or more entity computing systems of the at least one entity;

generating, by the one or more processing circuits, a second plurality of protection sub-scores based on the one or more safeguards and one or more configuration parameters of the heuristic scoring model, the one or more configuration parameters corresponding with entity configurations associated with the safeguard types; and generating, by the one or more processing circuits, the at least one resilience score based on a weighted aggregation of the first plurality of protection sub-scores and the second plurality of protection sub-scores.

6. The method of claim 1, wherein the one or more tokens correspond with the temporal interval, wherein the temporal interval corresponds with a time period for evaluating the at least one entity, wherein at least one token of the one or more tokens corresponds with a temporal sub-interval comprising a portion of the temporal interval.

7. The method of claim 1, comprising:
responsive to determining the safeguard status fails to satisfy the safeguard threshold, determining, by the one or more processing circuits, one or more actions to perform the update to the at least one of (i) the safeguard status or (ii) the at least one resilience score.

8. The method of claim 1, wherein generating the at least one new token comprises:
retrieving or extracting, by the one or more processing circuits, the at least one re-modeled output, the one or more safeguards, the one or more proofs; and
encapsulating, by the one or more processing circuits, the at least one re-modeled output, the one or more safeguards, the one or more proofs in a structured format corresponding with the at least one new token, the structured format comprising a plurality of metadata fields corresponding with the one or more safeguards and the one or more proofs.

9. The method of claim 1, comprising:
updating, by the one or more processing circuits, the at least one new token as a third-party token by adding or updating a metadata field of the at least one new token indicating an association with a third-party entity corresponding with the third-party computing system; and
responsive to generating one or more additional tokens, programmatically establishing, by the one or more processing circuits, a data link between the at least one new token and the one or more additional tokens based on determining one or more metadata fields of the one or more additional tokens indicate the association with the third-party entity.

10. The method of claim 1, comprising:
responsive to determining the request corresponds with re-analysis of the one or more safeguards, re-analyzing, by the one or more processing circuits, the one or more safeguards and the one or more proofs; and
determining, by the one or more processing circuits, an update to at least one safeguard of the one or more safeguards based on the re-analysis.

11. The method of claim 1, wherein the request comprises a requirements token comprising one or more third-party requirements of a third-party associated with the third-party computing system, the method comprising:
identifying, by the one or more processing circuits, the one or more modeling parameters based on extracting the one or more third-party requirements from the requirements token.

12. The method of claim 1, comprising:
receiving, by the one or more processing circuits from the third-party computing system in real-time, a second request comprising a second set of modeling parameters to re-model the one or more safeguards.

13. A system, comprising:
one or more processing circuits configured to:
receive, from a third-party computing system, a request to re-model one or more safeguards of at least one entity, wherein the request comprises one or more modeling parameters and a temporal interval;
identify one or more tokens comprising the one or more safeguards and one or more proofs of the at least one entity at the temporal interval, wherein the one or more safeguards correspond with a plurality of modeled outputs, and wherein the plurality of modeled outputs comprise at least one first modeled output corresponding with a safeguard status based at least on a safeguard threshold and at least one second modeled output corresponding with at least one resilience score;
generate, using the one or more tokens, at least one re-modeled output at the temporal interval based at least on re-modeling the one or more tokens, wherein the at least one re-modeled output comprises an update, based on the one or more modeling parameters, to at least one of (i) the safeguard status or (ii) the at least one resilience score, and wherein the update to at least one of (i) the safeguard status or (ii) the at least one resilience score is based at least on the one or more safeguards or the one or more proofs;
generate at least one new token comprising the at least one re-modeled output, the one or more safeguards, and the one or more proofs; and
record the at least one new token in a token storage.

14. The system of claim 13, the one or more processing circuits configured to:
receive an updated safeguard threshold corresponds with the at least one entity; and
generate the at least one re-modeled output comprising an update to the safeguard status based on the updated safeguard threshold.

15. The system of claim 13, the one or more processing circuits configured to:
receive a heuristic scoring model corresponding with the at least one entity; and
generate, using the heuristic scoring model and the one or more safeguards, the at least one re-modeled output comprising an update to the at least one resilience score or one or more protection sub-scores, wherein generating the one or more protection sub-scores comprises generating the at least one resilience score.

16. The system of claim 13, the one or more processing circuits configured to:
receive an updated safeguard threshold corresponding with the at least one entity and a heuristic scoring model corresponding with the at least one entity; and
generate the at least one re-modeled output comprising an update to the safeguard status based on the updated safeguard threshold and an update to the at least one resilience score or one or more protection sub-scores using the heuristic scoring model and the one or more safeguards.

17. The system of claim 13, the one or more processing circuits configured to:
generate a first plurality of protection sub-scores based on the one or more safeguards and one or more coverage parameters of a heuristic scoring model, the one or more coverage parameters corresponding with safeguard types of the one or more safeguards implemented in one or more entity computing systems of the at least one entity;
generate a second plurality of protection sub-scores based on the one or more safeguards and one or more configuration parameters of the heuristic scoring model, the one or more configuration parameters corresponding with entity configurations associated with the safeguard types; and
generate the at least one resilience score based on a weighted aggregation of the first plurality of protection sub-scores and the second plurality of protection sub-scores.

18. The system of claim 13, wherein the one or more tokens correspond with the temporal interval, wherein the temporal interval corresponds with a time period for evaluating the at least one entity, and wherein at least one token of the one or more tokens corresponds with a temporal sub-interval comprising a portion of the temporal interval.

19. The system of claim 13, the one or more processing circuits configured to:

responsive to determining the safeguard status fails to satisfy the safeguard threshold, determine, by the one or more processing circuits, one or more actions to perform the update to the at least one of (i) the safeguard status or (ii) the at least one resilience score.

20. A non-transitory computer readable medium (CRM) comprising one or more instructions stored thereon and executable by one or more processors to:

receive, from a third-party computing system, a request to re-model one or more safeguards of at least one entity, wherein the request comprises one or more modeling parameters;

identify one or more tokens comprising the one or more safeguards of the at least one entity, wherein the one or more safeguards correspond with a plurality of modeled outputs;

generate, using the one or more tokens, at least one re-modeled output based at least on re-modeling the one or more tokens, wherein the at least one re-modeled output comprises an update, based on the one or more modeling parameters, to at least one of (i) a safeguard status or (ii) at least one resilience score based at least on the one or more safeguards;

generate at least one new token comprising the at least one re-modeled output and the one or more safeguards; and record the at least one new token in a token storage.

* * * * *